(12) United States Patent  (10) Patent No.: US 8,301,482 B2
Reynolds et al.  (45) Date of Patent: Oct. 30, 2012

(54) DETERMINING STRATEGIES FOR INCREASING LOYALTY OF A POPULATION TO AN ENTITY

(75) Inventors: Tom Reynolds, Wilson, WY (US); Tom Greene, Encinitas, CA (US)

(73) Assignee: Tom Reynolds, Wilson, WY (US)

( * ) Notice: Subject to any disclaimer, the term of this patent is extended or adjusted under 35 U.S.C. 154(b) by 1148 days.

(21) Appl. No.: 11/925,663

(22) Filed: Oct. 26, 2007

(65) Prior Publication Data

US 2008/0065471 A1  Mar. 13, 2008

Related U.S. Application Data

(63) Continuation-in-part of application No. 10/927,222, filed on Aug. 25, 2004, now Pat. No. 7,769,626.

(60) Provisional application No. 60/497,882, filed on Aug. 25, 2003.

(51) Int. Cl.
*G06Q 30/00* (2012.01)
(52) U.S. Cl. ..................................... 705/7.29
(58) Field of Classification Search ............... 705/7.29
See application file for complete search history.

(56) References Cited

U.S. PATENT DOCUMENTS

| | | | |
|---|---|---|---|
| 4,613,946 A | 9/1986 | Forman | |
| 4,853,854 A | 8/1989 | Behar et al. | |
| 4,895,518 A | 1/1990 | Arnold et al. | |
| 5,041,972 A * | 8/1991 | Frost | 705/7.32 |
| 5,122,952 A | 6/1992 | Minkus | |
| 5,124,911 A | 6/1992 | Sack | |
| 5,135,399 A | 8/1992 | Ryan | |
| 5,207,580 A | 5/1993 | Strecher | |
| 5,312,114 A | 5/1994 | Lipson | |
| 5,372,507 A | 12/1994 | Goleh | |
| 5,435,324 A | 7/1995 | Brill | |
| 5,436,830 A | 7/1995 | Zaltman | |
| 5,503,561 A | 4/1996 | Cohen | |
| 5,551,880 A | 9/1996 | Bonnstetter et al. | |
| 5,572,421 A | 11/1996 | Altman et al. | |
| 5,594,994 A | 1/1997 | David | |
| 5,596,994 A | 1/1997 | Bro | |

(Continued)

FOREIGN PATENT DOCUMENTS

WO  WO 99/45489  9/1999

(Continued)

OTHER PUBLICATIONS

Thomas J. Reynolds & Jonathan Gutman, "Laddering Theory, Method, Analysis, and Interpretation," Journal of Advertising Research, Feb./Mar. 1988, pp. 1-26.*

(Continued)

*Primary Examiner* — Neil Kardos
(74) *Attorney, Agent, or Firm* — Dennis J. Dupray; StrategemIP Ltd.

(57) ABSTRACT

A method and system is disclosed that provides: (a) a theoretical framework for designing psychological research that uncovers individual decision-making networks, both in terms of sampling requirements and questioning methods, (b) an implementation interface to schedule and administer the appropriate question sequences between an interviewer and a given individual, in real-time, via a web-based system, and (c) a coding and analysis system to summarize and quantify the potential of alternative decision structures to be used to optimize the development of marketing and communication strategies.

17 Claims, 60 Drawing Sheets

U.S. PATENT DOCUMENTS

| | | |
|---|---|---|
| 5,634,101 A | 5/1997 | Blau |
| 5,676,551 A | 10/1997 | Knight et al. |
| 5,692,501 A | 12/1997 | Minturn |
| 5,722,418 A | 3/1998 | Bro |
| 5,734,890 A | 3/1998 | Case et al. |
| 5,743,743 A | 4/1998 | Ho et al. |
| 5,784,539 A | 7/1998 | Lenz |
| 5,835,087 A | 11/1998 | Herz et al. |
| 5,879,163 A | 3/1999 | Brown et al. |
| 5,890,131 A | 3/1999 | Ebert et al. |
| 5,911,581 A | 6/1999 | Reynolds et al. |
| 5,954,510 A | 9/1999 | Merrill et al. |
| 5,961,332 A | 10/1999 | Joao |
| 5,967,789 A | 10/1999 | Segel et al. |
| 5,995,728 A | 11/1999 | Forman |
| 5,999,908 A | 12/1999 | Abelow |
| 6,099,319 A | 8/2000 | Zaltman et al. |
| 6,101,479 A | 8/2000 | Shaw |
| 6,105,046 A | 8/2000 | Greenfield et al. |
| 6,108,665 A | 8/2000 | Bair et al. |
| 6,125,358 A | 9/2000 | Hubbell et al. |
| 6,148,297 A | 11/2000 | Swor et al. |
| 6,151,565 A | 11/2000 | Lobley et al. |
| 6,192,360 B1 | 2/2001 | Dumais et al. |
| 6,210,272 B1 | 4/2001 | Brown |
| 6,227,862 B1 | 5/2001 | Harkness |
| 6,236,975 B1 | 5/2001 | Boe et al. |
| 6,296,487 B1 | 10/2001 | Lotecka |
| 6,315,569 B1 | 11/2001 | Zaltman |
| 6,330,426 B2 | 12/2001 | Brown et al. |
| 6,338,039 B1 | 1/2002 | Lonski et al. |
| 6,341,267 B1 | 1/2002 | Taub |
| 6,347,943 B1 | 2/2002 | Fields et al. |
| 6,361,326 B1 | 3/2002 | Fontana et al. |
| 6,368,111 B2 | 4/2002 | Legarda |
| 6,375,469 B1 | 4/2002 | Brown |
| 6,425,764 B1 | 7/2002 | Lamson |
| 6,454,705 B1 | 9/2002 | Cosentino et al. |
| 6,471,521 B1 | 10/2002 | Dornbush et al. |
| 6,477,504 B1 | 11/2002 | Hamlin et al. |
| 6,497,577 B2 | 12/2002 | Kanter |
| 6,565,359 B2 | 5/2003 | Calhoun et al. |
| 6,574,614 B1 | 6/2003 | Kesel |
| 6,618,746 B2 | 9/2003 | Desai et al. |
| 6,648,649 B2 | 11/2003 | Rappaport |
| 6,655,963 B1 | 12/2003 | Horvitz et al. |
| 6,658,395 B1 | 12/2003 | Barnhill |
| 6,728,695 B1 | 4/2004 | Pathria et al. |
| 6,766,319 B1 * | 7/2004 | Might ................................. 1/1 |
| 6,767,211 B2 | 7/2004 | Hall et al. |
| 6,769,915 B2 | 8/2004 | Murgia et al. |
| 6,773,266 B1 | 8/2004 | Dornbush et al. |
| 6,850,891 B1 | 2/2005 | Forman |
| 6,863,534 B1 | 3/2005 | Sadka |
| 6,865,578 B2 | 3/2005 | Hays |
| 6,895,382 B1 | 5/2005 | Srinivasan et al. |
| 6,898,737 B2 | 5/2005 | Goeller et al. |
| 6,915,269 B1 | 7/2005 | Shapiro et al. |
| 6,968,375 B1 | 11/2005 | Brown |
| 6,971,881 B2 | 12/2005 | Reynolds |
| 6,974,328 B2 | 12/2005 | Aspe et al. |
| 6,988,088 B1 | 1/2006 | Miikkulainen et al. |
| 6,996,560 B1 | 2/2006 | Choi et al. |
| 7,054,758 B2 | 5/2006 | Gill-Garrison et al. |
| 7,058,566 B2 | 6/2006 | Shaw |
| 7,080,027 B2 | 7/2006 | Luby et al. |
| 7,103,561 B1 | 9/2006 | Sarkisian et al. |
| 7,379,964 B1 | 5/2008 | Buechler et al. |
| 2001/0031451 A1 | 10/2001 | Sander et al. |
| 2002/0045154 A1 | 4/2002 | Wood et al. |
| 2002/0082888 A1 | 6/2002 | Graff et al. |
| 2002/0120491 A1 * | 8/2002 | Nelson ............................ 705/10 |
| 2002/0152110 A1 | 10/2002 | Stewart et al. |
| 2002/0161764 A1 | 10/2002 | Sharo |
| 2002/0169658 A1 | 11/2002 | Adler |
| 2002/0188460 A1 | 12/2002 | Resh |
| 2003/0017440 A1 | 1/2003 | Bergey et al. |
| 2003/0018517 A1 | 1/2003 | Dull et al. |
| 2003/0023685 A1 | 1/2003 | Cousins et al. |
| 2003/0046140 A1 | 3/2003 | Callahan et al. |
| 2003/0061096 A1 | 3/2003 | Gallivan et al. |
| 2003/0074253 A1 | 4/2003 | Scheuring et al. |
| 2003/0126009 A1 * | 7/2003 | Hayashi et al. ................. 705/10 |
| 2003/0167197 A1 | 9/2003 | Shoemaker et al. |
| 2004/0024620 A1 | 2/2004 | Robertson et al. |
| 2004/0093296 A1 | 5/2004 | Phelan et al. |
| 2004/0107131 A1 | 6/2004 | Wilkerson et al. |
| 2004/0117239 A1 | 6/2004 | Mittal et al. |
| 2005/0091077 A1 | 4/2005 | Reynolds |
| 2006/0053046 A1 | 3/2006 | Bonnstetter et al. |
| 2006/0115802 A1 | 6/2006 | Reynolds |
| 2006/0224434 A1 | 10/2006 | Rumi et al. |

FOREIGN PATENT DOCUMENTS

| | | |
|---|---|---|
| WO | WO 00/31666 | 6/2000 |
| WO | WO 00/34910 | 6/2000 |
| WO | WO 00/34911 | 6/2000 |
| WO | WO 01/42873 | 6/2001 |
| WO | WO 01/86516 | 11/2001 |
| WO | WO 01/86611 | 11/2001 |
| WO | WO 01/93077 | 12/2001 |
| WO | WO 02/29653 | 4/2002 |
| WO | WO 02/063435 | 8/2002 |
| WO | WO 03/009199 | 1/2003 |
| WO | WO 03/085488 | 10/2003 |

OTHER PUBLICATIONS

Jerry C. Olson & Thomas J. Reynolds, "The Means-End Approach to Understanding Consumer Decision Making," in Understanding Consumer Decision Making: The Means-End Approach to Marketing and Advertising Strategy (2001), pp. 3-19.*

Thomas J. Reynolds & David B. Whitlark, "Applying Laddering Data to Communications Strategy and Advertising Practice," Journal of Advertising Research, Jul./Aug. 1995, pp. 9-17.*

Brian Wansink, "Using Laddering to Understand and Leverage a Brand's Equity," 6 Qualitative Market Research: An International Journal 111-118 (2003).*

"Data Mining Tools See5 and C5.0", available at http://www.rulequest.com/see5-info.html, last updated Nov. 2007, 1 page.

"TopCoder uses the best developers from around the world to build your application", available at http://software.topcoder.com, site updated Aug. 10, 2007, pp. 1-2.

Graham-Cumming, "Naïve Bayesian Text Classification", Dr. Dobbs Journal, CMP Media, LLC, May 2005, pp. 1-9.

Joachims, "SVM light Support Vector Machine", available at http://svmlight.joachims.org, dated Feb. 9, 2004, pp. 1-12.

McCallum "Bow: A toolkit for statistical language modeling, text retrieval, classification and clustering", available at http://www.cs.cmu.edu/~mccallum/bow, last updated Sep. 12, 1998, 2 pages.

McCallum "Rainbow", available at http://www.cs.cmu.edu/~mccallum/bow/rainbow/, last updated Sep. 30, 1998, 12 pages.

U.S. Appl. No. 10/896,438, filed Jul. 21, 2004, Lycas.

"Assessing Treatment Needs", available at http://www.chioshealing.com/HealingLevel2/AssessingTreatment/assessingtreatment.htm, 2000 (printed Aug. 6, 2001), pp. 1-5.

"Cure #5: Understanding and Healing the Human Energy Field", available at http://www.healpastlives.com/future/cure/crfield.htm, 2000 (printed Aug. 6, 2001), pp. 1-5.

"Healing Level I", available at http://www.chioshealing.com/HealingLevel1/healinglevel1.htm, 2000 (printed Aug. 6, 2001), pp. 1-3.

"Healing Level II", available at http://www.chioshealing.com/HealingLevel2/healinglevel2.htm, 2000 (printed Aug. 6, 2001), pp. 1-4.

"Healing Touch", available at http://www.virginiaacademy.com/rohun.htm, 2000 (printed Aug. 6, 2001), pp. 1-3.

"Reflexology", available at http://www.virginiaacademy.com/reflexology.htm, 2000 (printed Aug. 6, 2001), pp. 1-3.

"Reiki", available at http://reiki.7gen.com/, printed Aug. 6, 2001, pp. 1-5.

"The Human Energy Systems Laboratory", available at http://www.livingenergyunivers.com/lab/default.htm, printed Aug. 6, 2001, pp. 1-6.

"Welcome to CHIOS® Energy Field Healing", available at http://www.chioshealing.com/index.htm, 2000 (printed Aug. 6, 2001), pp. 1-2.

"You Can Learn Integrated Energy Therapy (IET)!", available at http://www.integratedenergytherapy.net/, last modified Jul. 3, 2001, pp. 1-5.

Barrett, "Chios® Energy Field Healing Course Manual", 2000, pp. 1-16.

Birkman; "Dictionary for the Components" as early as 1966; 2 pgs.

Brewer "CAM Handbook: Energy Healing", available at http://medicine.wustl.edu/~compmed/CAM_ENE.HTM, printed Aug. 6, 2001, pp. 1-5.

Gan; "Multimedia Environmental Education Courseware for Promoting Cooperative Learning and Higher-Order Thinking Skills"; Paper presented at the National Curriculum Seminar, Port Dickson, Malaysia; Dec. 1995; pp. 1-9.

Kasabov "Foundations of Neural Networks, Fuzzy Systems, and Knowledge Engineering", Marcel Alencar, 1996 p. 491.

Managable, Definition of. Random House Unabridged Dictionary, Random House Inc. 2006 [Retrieved Sep. 8, 2008] Retrieved from Dictionary.com <http://dictionary.reference.com/browse/manageable>.

Website Printout Entitled, "The Big Five Personality Test", http://www.outofservice.com/bigfive/results, dated Sep. 23, 2003, 3 pages.

Website Printout Entitled, "The Do-Re-Mi's of Personality—What your music tastes say about your personality: take . . . ", dated Sep. 23, 2003, 5 pages.

Website Printout Entitled, "The Morality Test", dated Sep. 23, 2003, 13 pages.

Woods; The Giving Gift (All We Really Need); Education for a Sustainable Future, Jun. 26, 2000; pp. 1-8.

Notice of Allowance for U.S. Appl. No. 10/972,222, mailed Jan. 25, 2010.

Official Action for U.S. Appl. No. 10/927,222, mailed Feb. 23, 2009.

Carroll, J., Green, P.E. and Schaffer, C. (1986). Interpoint Distance Comparisons in Correspondence Analysis, Journal of Marketing Research, (Aug. 23): 271-80.

Christensen, G.L. and Olson, J.C. (2002). Mapping Consumers' Mental Models with ZMET. Psychology and Marketing, vol. 19(6), 477-502.

Jolly, J.P., Reynolds, T.J., and Slocum, J.W. (1988). Application of the Means-End Theoretic for Understanding the Cognitive Bases of Performance Appraisal. Organization Behavior and Human Decision Process, vol. 41, 153-179.

Reynolds, T.J., Gengler, C. and Howard, D. (1995). A Means-End Analysis of Brand Persuasion through Advertising. International Journal of Research in Marketing, (12), 257-266.

Reynolds, T.J. and Rochon, J. (1991). Means-End Based Advertising Research: Copy Testing is not Strategy Assessment. Journal of Business Research, vol. 22, 131-142.

Reynolds, T.J. and Sutrick, K.H. (1986). "Assessing the correspondence of one or more vectors to a symmetric matrix using ordinal regression" Psychometrika, vol. 51(1), 101-112.

Official Action for U.S. Appl. No. 10/927,222, mailed Apr. 1, 2008.

Alwis et al.; "Information as a Tool for Management Decision Making: A Case Study of Singapore"; Information Research; Jan. 2002; vol. 7, No. 2; 23 pp.

Kellen; "CRM Measurement Frameworks"; Adjunct Faculty, E-Commerce, DePaul University, Chicago, IL, U.S.A.; Mar. 2002; 37pp.

McQuitty et al.; "Systematically Varying Consumer Satisfaction and Its Implications for Product Choice"; Academy of Marketing Science; 2000; 29 pp.

Roberts; "Building Roi-Based Decision Support Simulators"; Burke White Paper Series; 2002; vol. 3; 6 pp.

Reynolds et al., "Laddering Theory, Method, Analysis, and Interpretation", Journal of Advertising Research Feb./Mar. 1988, vol. 28(1), 26 pages.

Reynolds, "Methodological and Strategy Development Implications of Decision Segmentation", Journal of Advertising Research, Dec. 1, 2006, 18 pages.

Evans "Measuring and managing customer value", Work Study, ISSN: 0043-8022, Year: 2002, vol. 51, Issue: 3, pp. 134-139.

Low, "Are College Students Satisfied? A National Analysis of Changing Expectations", Noel-Levitz, Inc., available at http://www.noellevitz.com/NR/rdonlyres/DB91046E-59FE-4AB0-AB49-9CAF8EE84D73/0/Report.pdf, Feb. 2000, 34 pages.

Reynolds, "In Search of True Brand Equity Metrics: All Market Share Ain't Created Equal", Journal of Advertising Research, Jun. 2005, p. 171-186.

".net Document Classifier Version 1.0", available at http://software.topcoder.com/catalog/c_component.jsp?comp=15462331&over=1, © 2000-2007, pp. 1-2.

"Choices® II User's Guide", Professional Resource Center, 1997, pp. 1-56.

"Java Text Classification Version 1.0", available at http://software.topcoder.com/catalog/c_component.jsp?comp=1000837&over=1, © 2000-2007, pp. 1-2.

"RuleQuest Research Data Mining Tools", available at http://www.rulequest.com, as early as Nov. 14, 2007, 1 page.

"Weka 3: Data Mining Software in Java", available at http://www.cs.waikato.ac.nz/ml/weka/index.html, as early as Mar. 11, 2007, 1 page.

"Instructional Strategies," Government of Saskatchewan, as early as Apr. 5, 2007, found at http://www.sasked.gov.sk.ca/docs/midlsoc/gr7/stratege7.html, 33 pages.

"Taking Responsibility Grades K-6: Teaching Young Students to Take Responsibility for their Behavior"; Tom Snyder Productions; © 2001, 2 pages.

"WorldOpinion—Tools for eResearch" as early as Nov. 15, 2004, 5 pages.

Aaker, D. (1991). "Managing Brand Equity", New York: Free Press, entire book.

Blattberg, R., Getz, G. and Thomas, J. (2001). "Customer Equity: Building and managing relationships and valuable assets", Boston, MA.:Harvard Business School Press, entire book.

Cliff, N. (1987). "Analyzing Multivariate Data", New York: Harcourt, Brace and Jovanovich, entire book.

Fishbein, M. (1967). "Readings in Attitude Theory and Measurement", New York: John Wiley and Sons, entire book.

Johansson, J. and Nonaka, I. "Relentless: The Japanese Way of Marketing", NY, NY: HarperCollins Publishers, Inc., 1996, entire book.

Kahle et al. (1997). "Values, Lifestyles and Psychographics". Mahwah, NJ.: Lawrence Erlbaum Associates, entire book.

Peter, J. P. and Olson, J. (1993). "Consumer Behavior and Marketing Strategy", Homewood, IL.: Irwin, entire book.

Reynolds et al. "Understanding Consumer Decision-Making: The Means-End Approach to Marketing and Advertising Strategy", Mahwah, NJ, Lawrence Erlbaum Associates, 2001, entire book.

Reynolds et al., "A Review and Comparative Analysis of Laddering Research Methods: Recommendations for Quality Metrics", 2009, 56 pages.

* cited by examiner

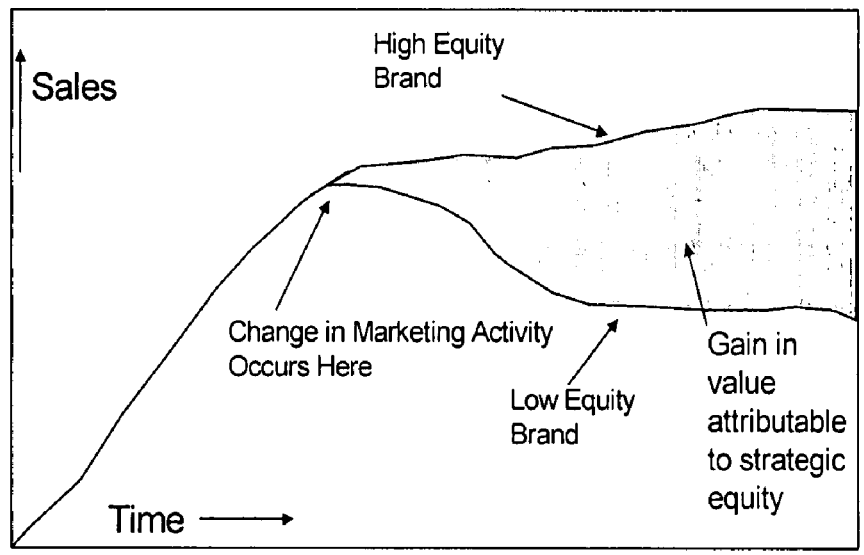
Fig. 1 Strategic Equity and Value Retention
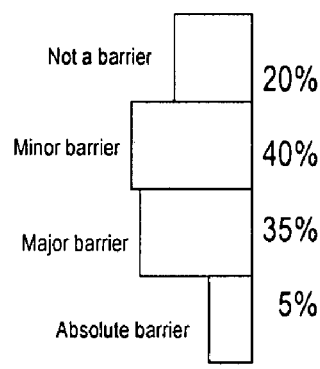
Fig. 2 A Distribution of Price Sensitivities

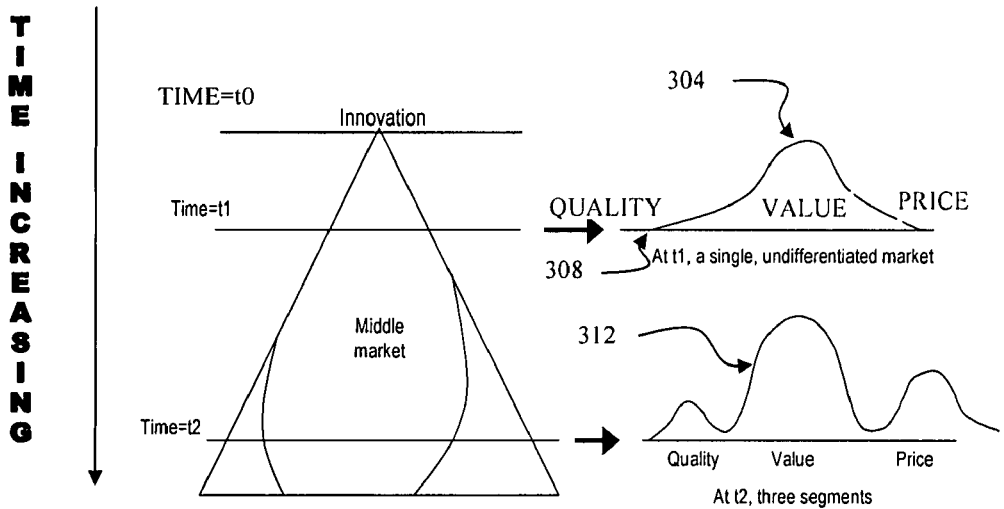
Fig. 3    The Time Distribution of Quality, Value, and Price Segments
Conditional belief: All things considered, Brand A is perceived to be...
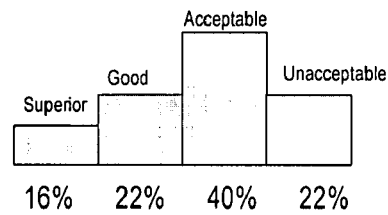
Fig. 4    A Distribution of Beliefs

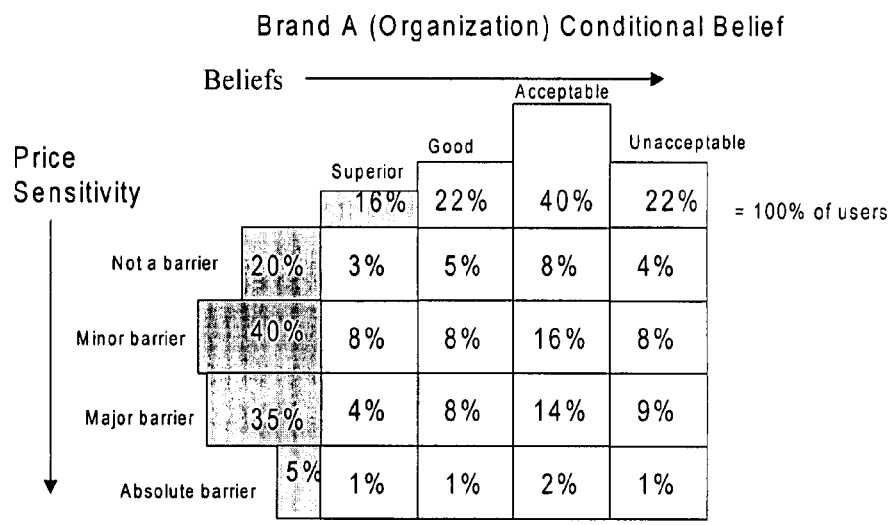
Fig. 5 The Joint Distribution of Users' Beliefs and Sensitivities
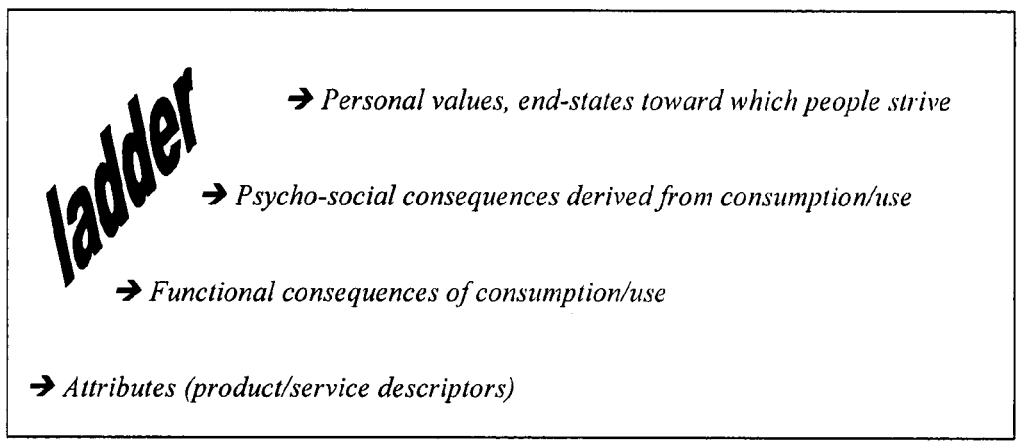
Fig. 6

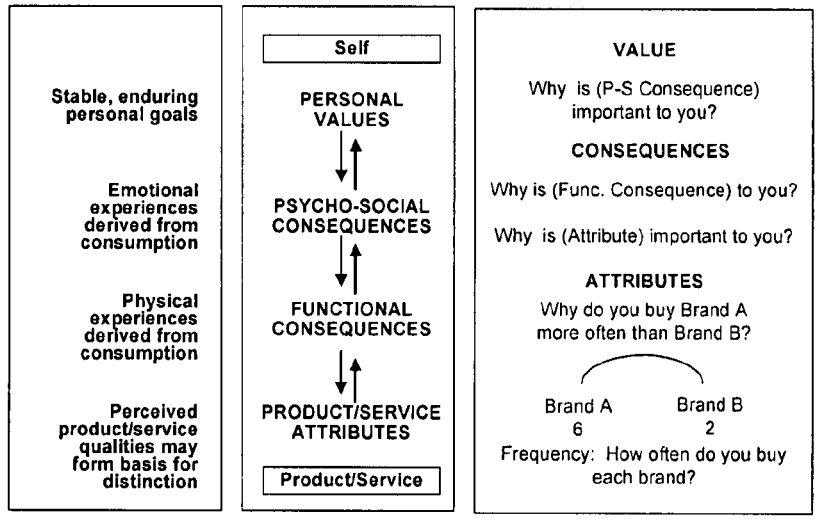
Fig. 7 Understanding Choice
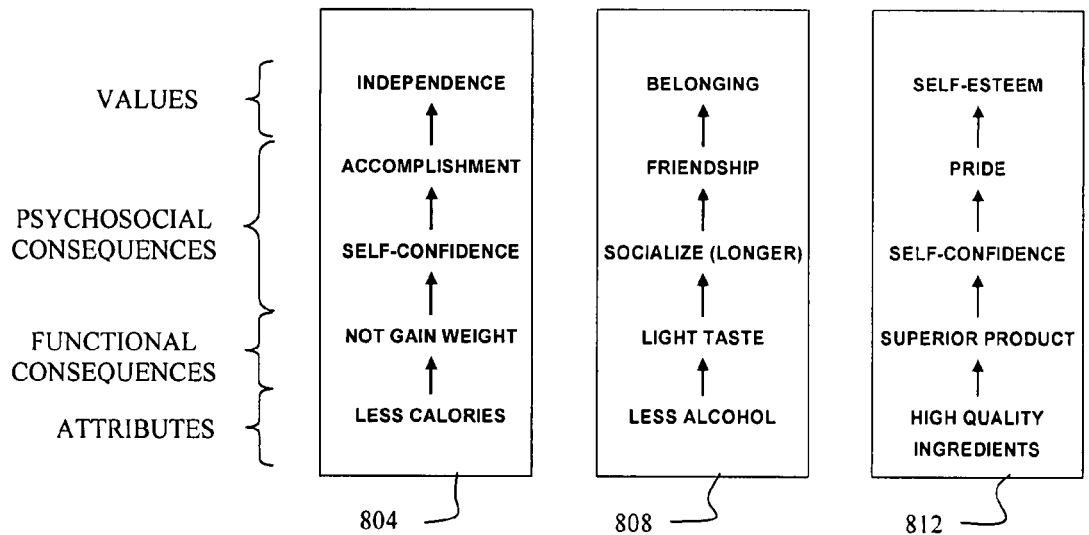
Fig. 8 Alternative Decision Orientations

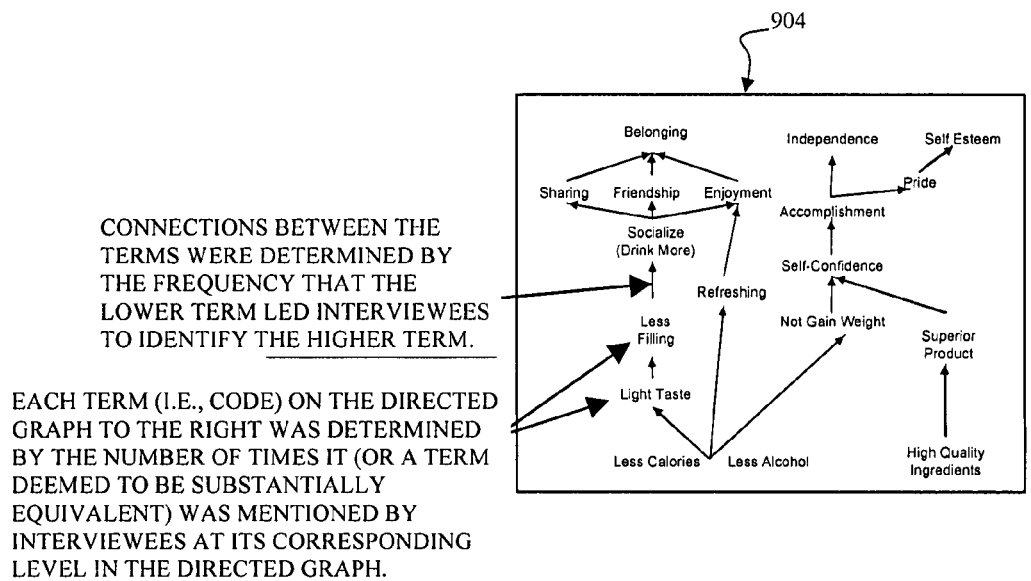

CONNECTIONS BETWEEN THE TERMS WERE DETERMINED BY THE FREQUENCY THAT THE LOWER TERM LED INTERVIEWEES TO IDENTIFY THE HIGHER TERM.

EACH TERM (I.E., CODE) ON THE DIRECTED GRAPH TO THE RIGHT WAS DETERMINED BY THE NUMBER OF TIMES IT (OR A TERM DEEMED TO BE SUBSTANTIALLY EQUIVALENT) WAS MENTIONED BY INTERVIEWEES AT ITS CORRESPONDING LEVEL IN THE DIRECTED GRAPH.

Fig. 9   Summarizing Decision Structure in a CDM

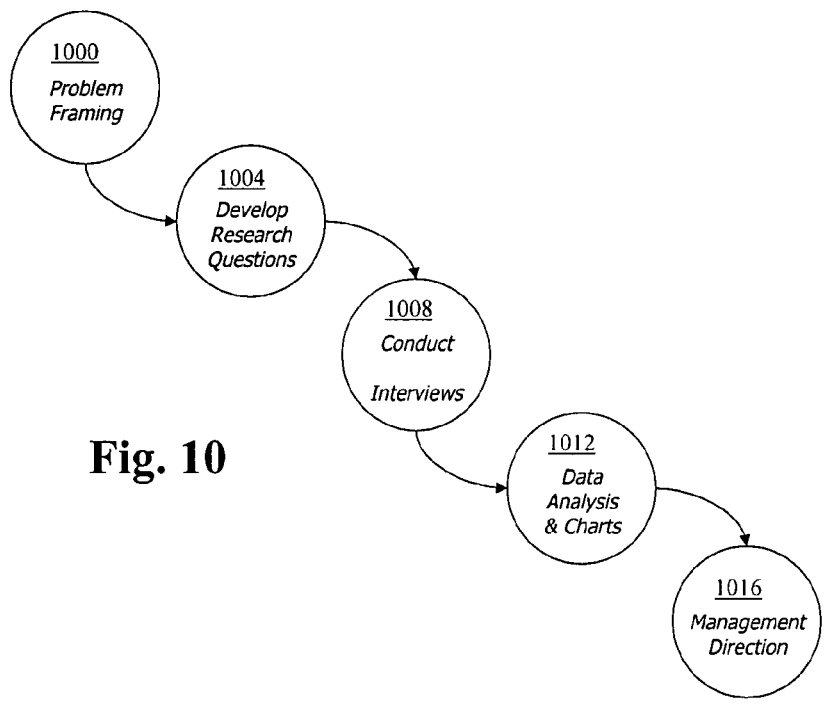

Fig. 10

Why did you join?

|  |  | USAGE (per week) | |
|---|---|---|---|
|  |  | (3+) | (1-3) |
| Member activities | 46% | 34% | 12% |
| Golf | 34 | 5 | 29 |
| Tennis | 9 | 6 | 3 |
| Location | 7 | 3 | 4 |
|  | 96% | 48% | 48% |

Fig. 12

Equity Summary Percentages by Content Code.

|  | EQUITY QUESTION RESPONSES | | WEEKLY USAGE | | | |
|---|---|---|---|---|---|---|
|  | | | (3+) | | (1-3) | |
|  | +EQUITY | -EQUITY | +EQUITY | -EQUITY | +EQUITY | -EQUITY |
| GOLF | 35 | 43 | | | | |
| Course condition | 21 | 12 | 6 | 6 | 15 | 6 |
| Pace of play | 0 | 26 | 0 | 4 | 0 | 22 |
| Staff/service | 14 | 5 | 9 | 3 | 5 | 2 |
| ENVIRONMENT | 48 | 22 | | | | |
| Staff/service | 31 | 10 | 21 | 8 | 10 | 2 |
| Facilities | 17 | 12 | 10 | 5 | 7 | 7 |
| DINING | 10 | 16 | | | | |
| Food (value) | 7 | 7 | 0 | 5 | 7 | 2 |
| Service | 3 | 9 | 1 | 5 | 2 | 4 |
| TENNIS | 7 | 9 | | | | |
| Permanent indoor court | 0 | 6 | 0 | 2 | 0 | 4 |
| Clinics | 4 | 0 | 2 | 0 | 2 | 0 |
| Staff/service | 3 | 3 | 0 | 3 | 3 | 0 |
| OTHER | 0 | 10 | | | | |
| Workout facilities | 0 | 10 | 0 | 8 | 0 | 2 |
| TOTAL | 100 | 100 | | | | |

Fig. 13. +EQUITY and –EQUITY Resort Comments

Equity Assessment and Leverage Analysis (ELA).

| | I (%) | x B (0-10) | = EA (%) | Leverage Index ($\Delta L = I * (10-B)/2$) |
|---|---|---|---|---|
| GOLF | 39 | | 33 | |
| Course condition | 17 | 6 | 20 | 34 (2) |
| Pace of play | 13 | 0 | 0 | 65 (1) |
| Staff/service | 10 | 7 | 13 | 15 |
| ENVIRONMENT | 35 | | 49 | |
| Staff/service | 21 | 8 | 32 | 21 (5) |
| Facilities | 15 | 6 | 17 | 30 (3) |
| DINING | 13 | | 10 | |
| Food (value) | 7 | 5 | 7 | 18 |
| Service | 6 | 3 | 3 | 11 |
| TENNIS | 8 | | 7 | |
| Permanent indoor court | 3 | 0 | 0 | 15 |
| Clinics | 2 | 10 | 4 | 0 |
| Staff/service | 3 | 5 | 3 | 8 |
| OTHER | 5 | | 0 | |
| Workout facilities | 5 | 0 | 0 | 25 (4) |
| TOTAL % | 100 | | 99 | |

Fig. 14. Leverage Analysis

Why did you join the Circle of Friends?

|  | (%) | USAGE (Events last year) | |
|---|---|---|---|
|  | OVERALL | (≥ 2) | (0-1) |
| Programs and education | 36 | 28 | 8 |
| Support arts in general | 31 | 6 | 25 |
| Specific "collection" of art | 18 | 16 | 2 |
| Local philanthropic support | 14 | 6 | 8 |
|  | 99 | 56 | 43 |

Fig. 15. Initial Reasons for Museum Membership

Past and Future Trend Anchor Contrast.

|  |  | PAST (Δ One year) | | | | | |
|---|---|---|---|---|---|---|---|
|  |  | + + | + | = | - | - - | Σ |
|  | + + | 0 | 2 | 4 | 0 | 0 | 6 |
|  | + | 2 | 3 | 14 | 3 | 2 | 24 |
| FUTURE (Δ One year) | = | 0 | 6 | 15 | 10 | 0 | 31 |
|  | - | 0 | 0 | 18 | 11 | 2 | 31 |
|  | - - | 0 | 0 | 4 | 3 | 1 | 8 |
|  | Σ | 2 | 11 | 55 | 27 | 5 | 100 |

Fig. 16. Self-reported museum participation trends

Equity Assessment and Leverage Analysis (ELA).

|  | I (%) | x B (1-10) | = EA (%) | (L)everage Index ΔL=I • (10-B)/2 |
|---|---|---|---|---|
| EXHIBIT QUALITY | 42 |  | 61 |  |
| Collection | 26 | 6 | 34 | 52 (2) |
| Artists | 16 | 8 | 27 | 16 |
| STIMULATING | 32 |  | 28 |  |
| Tutorials | 24 | 3 | 16 | 84 (1) |
| Variety | 8 | 7 | 12 | 12 |
| ENVIRONMENT | 18 |  | 10 |  |
| Presentation | 10 | 3 | 7 | 35 |
| Facilities | 8 | 2 | 3 | 32 |
| OTHER | 8 |  | -- |  |
| TOTAL % | 100 |  | 99 |  |

Fig. 17. Museum ELA derived from TREND questions

What is your primary source of museum activity information?

|  | % | Cost (%) |
|---|---|---|
| Postcards / calendar | 57 | 19 |
| Newsletter | 24 | 28 |
| Paid media (newspaper) | 12 | 53 |
| Friends | 7 | -- |
|  | 100 | 100 |

Fig. 18. Communications source summary

Content EQUITY Codes by Satisfaction Scale Classifications.

|  | % (I) | OVERALL + | OVERALL - | [-] (1-4) + | [-] (1-4) - | [0] (5-6) + | [0] (5-6) - | [+] (7-9) + | [+] (7-9) - |
|---|---|---|---|---|---|---|---|---|---|
| | | | | SATISFACTION SCALE | | | | | |
| Nurses (attending) | 39 | 49 | 29 | 14 | 9 | 15 | 12 | 20 | 8 |
| Staff (department) | 27 | 34 | 20 | 11 | 4 | 11 | 8 | 12 | 8 |
| Personal (pain, stress) | 18 | 12 | 24 | 7 | 18 | 3 | 4 | 2 | 2 |
| MD's | 10 | 5 | 15 | 1 | 3 | 4 | 4 | 0 | 8 |
| Facilities (environment) | 6 | 0 | 12 | 0 | 0 | 0 | 4 | 0 | 8 |
| | 100% | | | | | | | | |

Fig. 19. Percentage of Code Equities by Recoded Satisfaction Level [ - , 0 AND +]

Equity Indices: Nurses (I=39).

$[T_s = +.38]$

Percentage

44   Information.   ($I_c$ =17: B=5)

(+) "told me what to expect"   (-) "Our policy is this"

38   Manners.   ($I_c$ =15: B=7)

(+) "cheerfulness made me relax"   (-) "abrupt with me"

18   Empathy.   ($I_c$ =18: B=8)

(+) "understood my problems"   (-) "not responsive to my needs"

Fig. 20. Example of satisfaction comments by sub-code.

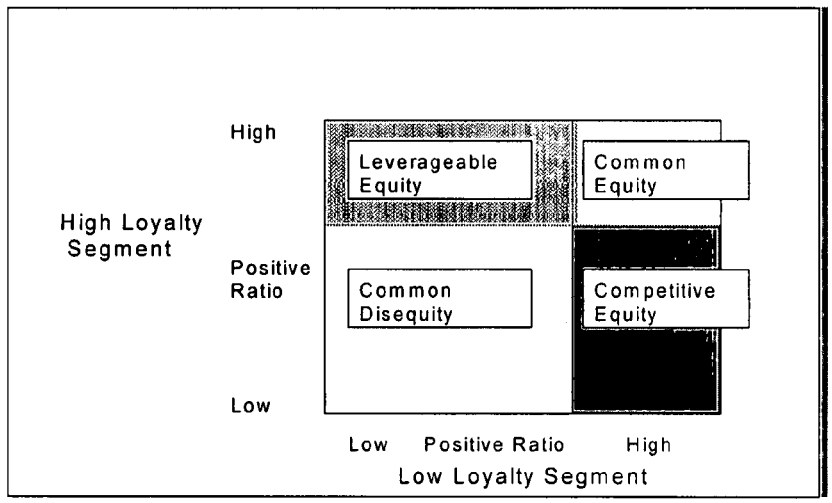
Fig. 21    An Equity/Disequity Grid
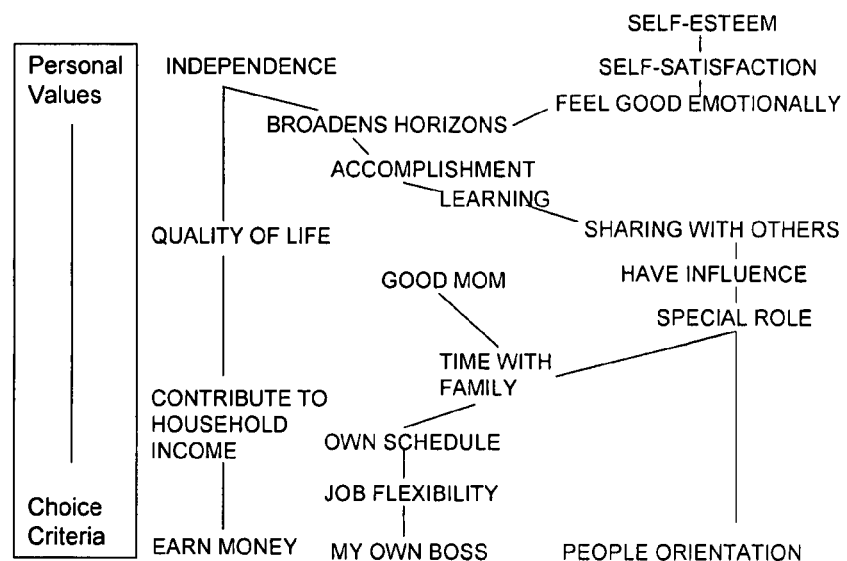
Fig. 22    Customer Decision Map: Direct Selling
(i.e., decision model 3936, Fig. 39)

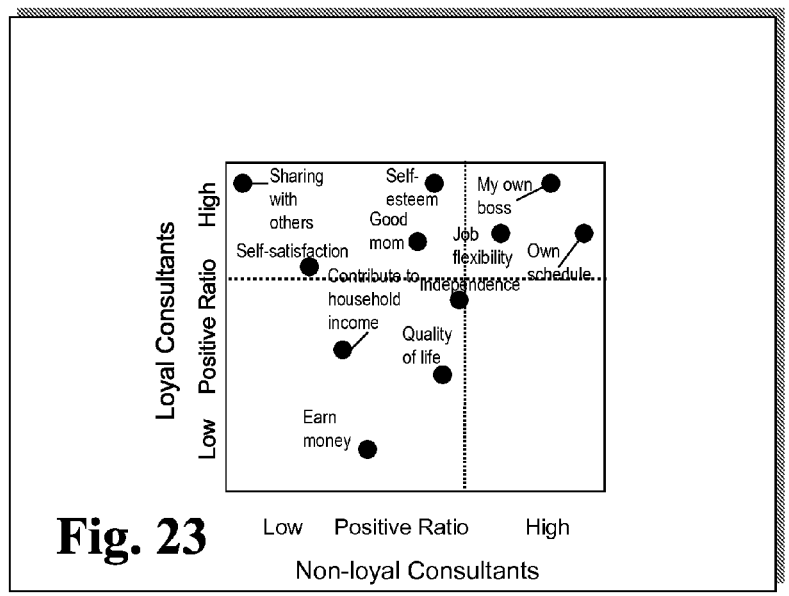
Mary Kay's Equity/Disequity Grid

EXAMPLE OF EGOSODIC VALENCED DECISION STRUCTURE CODES AND LADDERS
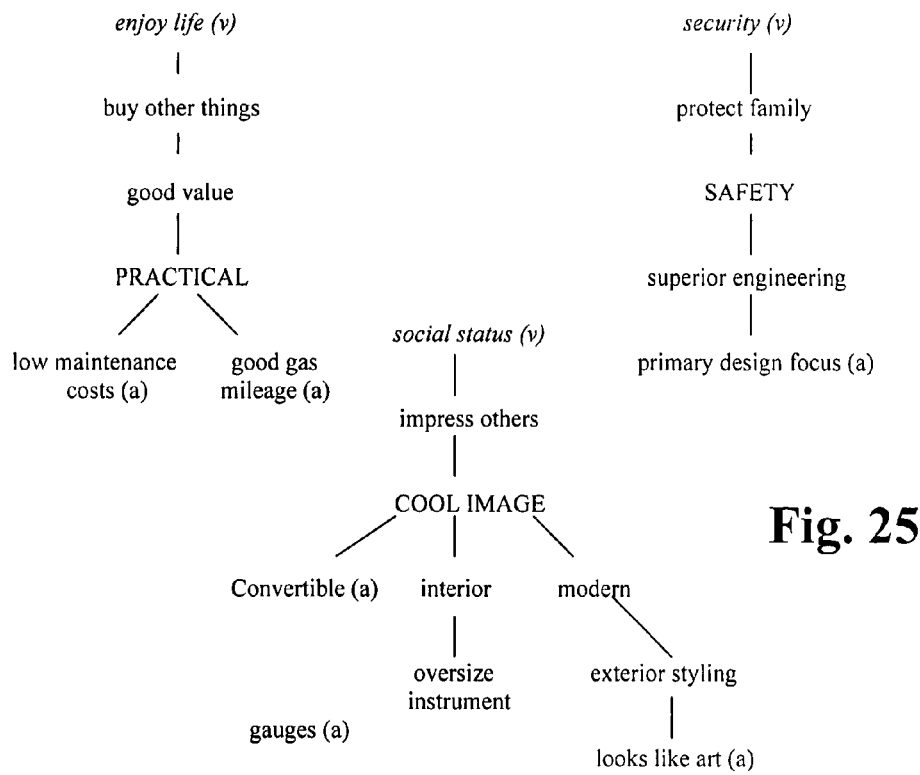
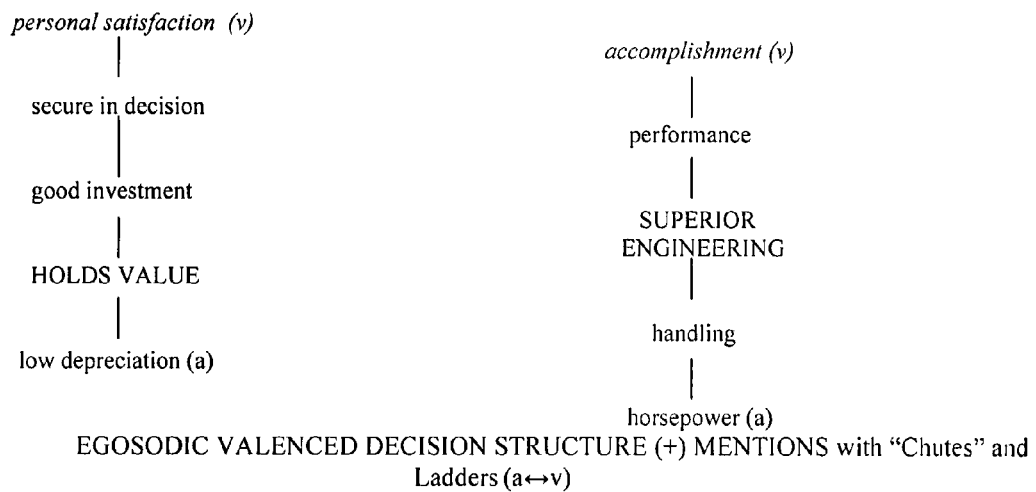
Fig. 25
EGOSODIC VALENCED DECISION STRUCTURE (+) MENTIONS with "Chutes" and Ladders (a↔v)

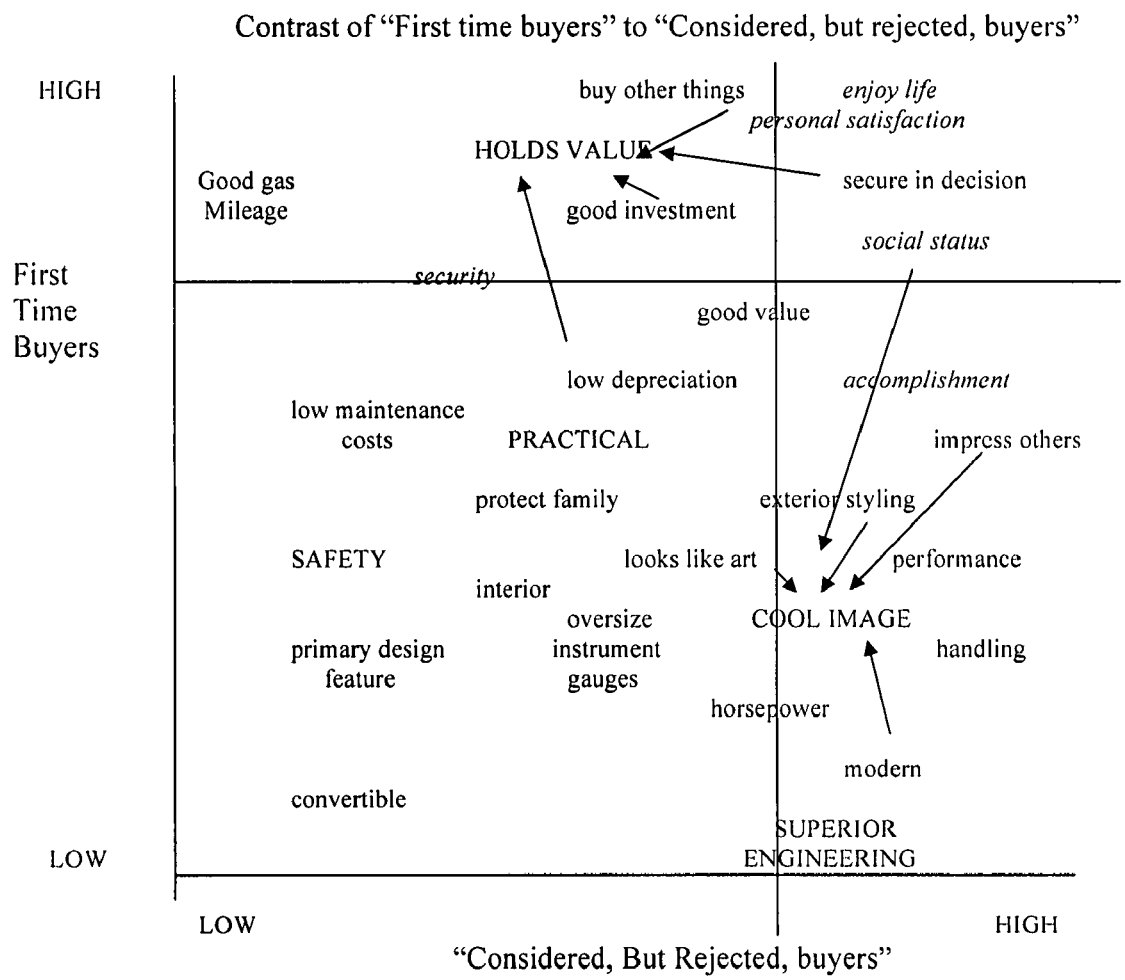
Fig. 26. StrEAM Equity Grid™ application to automobiles

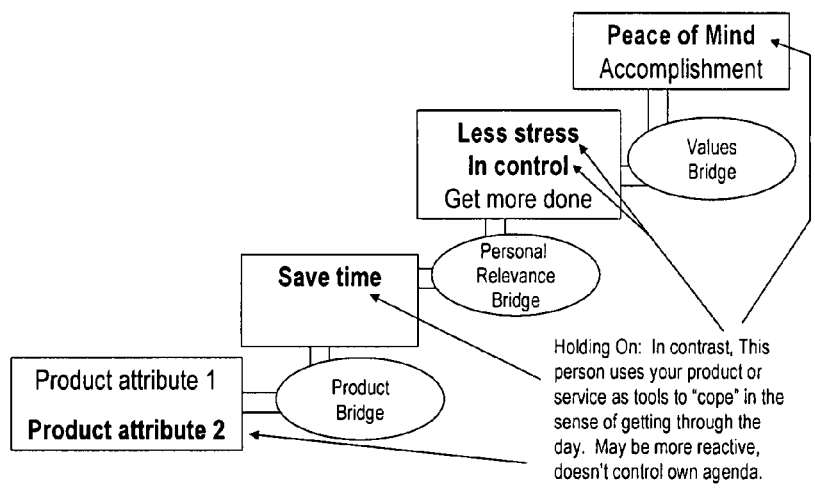
Fig. 28 Accomplish-driven Coping Orientation

Interviewer:

I UNDERSTAND YOU LIKE BRAND X MORE THAN BRAND Y BECAUSE IT HAS LESS CALORIES AND GIVES YOU THE SAME SATISFACTION AND ALERTNESS.

3500

| Why is that important to you? |
| How does this help you out? |
| What do you get from that? |
| What happens to you as a result of that? |
| How does that make you feel? |

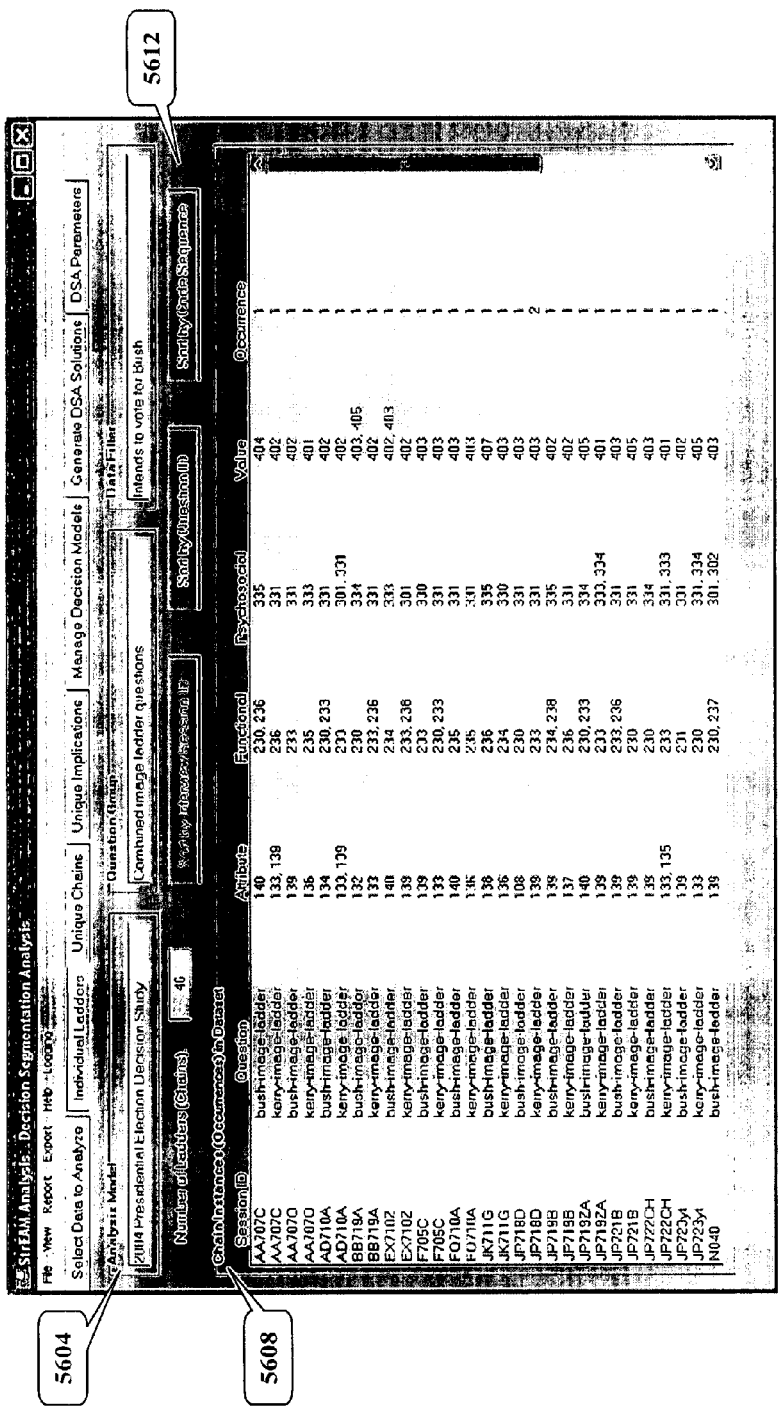
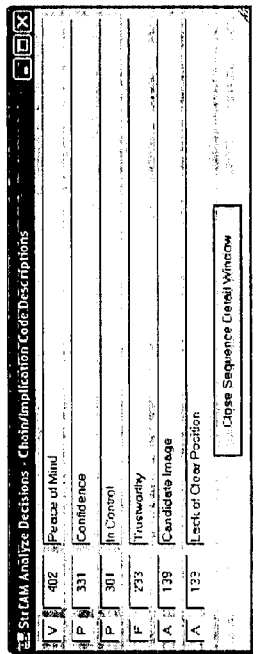
Fig. 56

StrEAM Analysis Model Statistics Report                                                                                    4/15/2005 3:11 PM

Analysis Model Statistics

Analysis Model: 2004 Presidential Election Decision Study
Total Number of Interviews: 72

Analysis Model Ladders

| | | |
|---|---:|---:|
| Total Number of Ladders: | 261 | |
| Ladders with 4 Levels: | 260 | 99.6 % |
| Ladders with 3 Levels: | 1 | 0.4 % |
| Ladders with 2 Levels: | 0 | 0.0 % |
| Ladders with Value(s): | 260 | 99.6 % |
| Ladders with Psychosocial Consequences: | 261 | 100.0 % |
| Ladders with Functional Consequences: | 261 | 100.0 % |
| Ladders with Attributes: | 261 | 100.0 % |

Analysis Model Ladder Elements

| | | |
|---|---:|---:|
| Total Number of Ladder Elements: | 1,152 | |
| Value Elements: | 277 | 24.0 % |
| Psychosocial Consequence Elements: | 288 | 25.0 % |
| Functional Consequence Elements: | 313 | 27.2 % |
| Attribute Elements: | 274 | 23.8 % |
| Elements with No Level Assigned: | 0 | 0.0 % |
| Coded Elements: | 1,144 | 99.3 % |
| Uncoded Elements: | 8 | 0.7 % |

Fig. 59

Question Group Statistics

Question Group: Combined image ladder questions
Number of Questions in Group: 2

Question Group Ladders

| | | |
|---|---|---|
| Total Number of Ladders: | 144 | |
| Ladders with 4 Levels: | 144 | 100.0 % |
| Ladders with 3 Levels: | 0 | 0.0 % |
| Ladders with 2 Levels: | 0 | 0.0 % |
| Ladders with Value(s): | 144 | 100.0 % |
| Ladders with Psychosocial Consequences: | 144 | 100.0 % |
| Ladders with Functional Consequences: | 144 | 100.0 % |
| Ladders with Attributes: | 144 | 100.0 % |

Question Group Ladder Elements

| | | |
|---|---|---|
| Total Number of Ladder Elements: | 641 | |
| Value Elements: | 152 | 23.7 % |
| Psychosocial Consequence Elements: | 156 | 24.3 % |
| Functional Consequence Elements: | 178 | 27.8 % |
| Attribute Elements: | 155 | 24.2 % |
| Elements with No Level Assigned: | 0 | 0.0 % |
| Coded Elements: | 636 | 99.2 % |
| Uncoded Elements: | 5 | 0.8 % |

StrEAM Analysis Model Statistics Report 4/15/2005 3:11 PM

Fig. 60

StrEAM Analysis Model Statistics Report                                  4/15/2005 3:11 PM

Data Set Statistics

| | |
|---|---|
| Data Filter: | Intends to vote for Bush |
| Potential Ladders in Dataset: | 46 |
| Potential Elements in Dataset: | 212 |

Valid Items (included for DSA)

| | | |
|---|---|---|
| Number of Analyzeable Ladders: | 46 | 100.0 % |
| Number of Analyzeable Ladder Elements: | 210 | 99.1 % |
| Ladders with 4 Levels: | 46 | 100.0 % |
| Ladders with 3 Levels: | 0 | 0.0 % |
| Ladders with 2 Levels: | 0 | 0.0 % |
| Ladders with Value(s): | 46 | 100.0 % |
| Ladders with Psychosocial Consequences: | 46 | 100.0 % |
| Ladders with Functional Consequences: | 46 | 100.0 % |
| Ladders with Attributes: | 46 | 100.0 % |

Data Set (DSA) Analysis Statistics

| | | |
|---|---|---|
| Total Number of Unique Chains: | 45 | |
| Total Number of Unique Implications: | 184 | |
| Total Number of Implications: | 383 | |
| Direct Implication Count: | 164 | 42.8 % |
| Indirect Implication Count: | 219 | 57.2 % |

Fig. 61

2004 Presidential Election Decision Study
Combined image ladder questions
Intends to vote for Bush

StrEAM Implication Matrix

4/15/2005 3:09 PM

| Code | Average Citizen Orientation [108] | Change in Office [122] | Aggressive Foreign Policy [132] | Lack of Clear Position [133] | Intellegence [134] | Military Record [135] | Liberal Democrat [136] | Individual Rights [137] | Society Rights [138] | Candidate Image [139] | Conservative Republican [140] | US Issues Need Attention [214] | Leadership Ability [230] | Experience [231] | US Military Lives [232] | Trustworthy [233] | Voter Representation [234] | US Economy [235] | Principles Values [236] | US World Standing [237] | Caring [238] |
|---|---|---|---|---|---|---|---|---|---|---|---|---|---|---|---|---|---|---|---|---|---|
| Average Citizen Orientation [108] | | | | | | | | | | | | | 1.00 | | | | | | | | |
| Change in Office [122] | | | | | | | | | | | | | | | | | | | | | |
| Aggressive Foreign Policy [132] | | | | | | | | | | 2.00 | | | 2.00 | | | 1.00 | | | | | |
| Lack of Clear Position [133] | | | | | | 1.00 | | | | | | | 4.00 | | | 2.03 | | | | | |
| Intellegence [134] | | | | | | | | | | | | | 2.00 | | | 0.01 | | | | | |
| Military Record [135] | | | | | | | | | | | | | | | | 1.00 | | | | | |
| Liberal Democrat [136] | | | | | | | | | | | | | 1.00 | | | | | | 0.02 | | |
| Individual Rights [137] | | | | | | | | | | | | | | | | | | | 1.00 | | |
| Society Rights [138] | | | | | | | | | | | | | | | | | | | 2.00 | | |
| Candidate Image [139] | | | | | | | | | | | | | 1.00 | 1.00 | | 8.00 | 1.00 | 2.00 | 1.02 | 1.00 | 1.00 |
| Conservative Republican [140] | | | | | | | | | | | | | 6.00 | | | 0.01 | 2.00 | | | 0.01 | 0.01 |
| US Issues Need Attention [214] | | | | | | | | | | | | | 3.00 | 0.01 | | | 1.00 | 1.00 | 0.01 | | 0.03 |
| Leadership Ability [230] | | | | | | | | | | | | | | 1.00 | | 3.00 | | | | | |
| Experience [231] | | | | | | | | | | | | | | | | | | | | | |
| US Military Lives [232] | | | | | | | | | | | | | | | | | | | | | |
| Trustworthy [233] | | | | | | | | | | | | | | | | | | | 2.00 | | |
| Voter Representation [234] | | | | | | | | | | | | | | | | | | | | 2.00 | 2.00 |
| US Economy [235] | | | | | | | | | | | | | | | | | | | | | |
| Principles Values [236] | | | | | | | | | | | | | | | | | | | | 1.00 | 1.00 |
| US World Standing [237] | | | | | | | | | | | | | | | | | | | | | 1.00 |
| Caring [238] | | | | | | | | | | | | | | | | | | | | | |
| In Control [301] | | | | | | | | | | | | | | | | | | | | | |
| Defense Orientation [302] | | | | | | | | | | | | | | | | | | | | | |
| Informed Need [306] | | | | | | | | | | | | | | | | | | | | | |
| Personal Freedom [330] | | | | | | | | | | | | | | | | | | | | | |
| Confidence [331] | | | | | | | | | | | | | | | | | | | | | |
| Economic Opportunity [333] | | | | | | | | | | | | | | | | | | | | | |
| American Unity [334] | | | | | | | | | | | | | | | | | | | | | |
| US Society Well-Being [335] | | | | | | | | | | | | | | | | | | | | | |
| Quality of Life [401] | | | | | | | | | | | | | | | | | | | | | |
| Peace of Mind [402] | | | | | | | | | | | | | | | | | | | | | |

Fig. 62

Presidential Election Decision Study
Combined image ladder questions
Intends to vote for Bush

4/15/2005 3:05 PM

| Code | Title | # of Mentions | % Used Overall | % Used in Level | Level Index |
|---|---|---|---|---|---|
| Attributes | | | | | |
| 108 | Average Citizen Orientation | 1 | | 2 | 0.2 |
| 122 | Change in Office | 3 | 1 | 6 | 0.7 |
| 132 | Aggressive Foreign Policy | 9 | 4 | 18 | 2.2 |
| 133 | Lack of Clear Position | 2 | 1 | 4 | 0.5 |
| 134 | Intellegence | 1 | 1 | 2 | 0.2 |
| 135 | Military Record | 5 | 2 | 10 | 1.2 |
| 136 | Liberal Democrat | 2 | 1 | 4 | 0.5 |
| 137 | Individual Rights | 3 | 1 | 6 | 0.7 |
| 138 | Society Rights | | | | |
| 139 | Candidate Image | 18 | 9 | 37 | 4.4 |
| 140 | Conservative Republican | 5 | 2 | 10 | 1.2 |
| | Level Totals: | 49 | 24 | 100 | |
| Functional Consequences | | | | | |
| 214 | US Issues Need Attention | | | | |
| 230 | Leadership Ability | 20 | 10 | 33 | 3.7 |
| 231 | Experience | 2 | 1 | 3 | 0.4 |
| 232 | US Military Lives | | | | |
| 233 | Trustworthy | 15 | 7 | 25 | 2.8 |
| 234 | Voter Representation | 4 | 2 | 7 | 0.7 |
| 235 | US Economy | 3 | 1 | 5 | 0.6 |
| 236 | Principles Values | 8 | 4 | 13 | 1.5 |
| 237 | US World Standing | 3 | 1 | 5 | 0.6 |
| 238 | Caring | 5 | 2 | 8 | 0.9 |
| | Level Totals: | 60 | 29 | 100 | |
| Psychosocial Consequences | | | | | |
| 301 | In Control | 5 | 2 | 10 | 0.9 |
| 302 | Defense Orientation | 1 | 1 | 2 | 0.2 |
| 306 | Informed Need | | | | |
| 330 | Personal Freedom | 5 | 2 | 10 | 0.9 |
| 331 | Confidence | 26 | 12 | 50 | 4.5 |
| 333 | Economic Opportunity | 7 | 3 | 14 | 1.2 |
| 334 | American Unity | 5 | 2 | 10 | 0.9 |
| 335 | US Society Well-Being | 3 | 1 | 6 | 0.5 |
| | Level Totals: | 52 | 25 | 100 | |
| Values | | | | | |
| 401 | Quality of Life | 5 | 2 | 10 | 0.9 |
| 402 | Peace of Mind | 17 | 8 | 35 | 3.1 |
| 403 | Personal Security | 18 | 9 | 37 | 3.3 |
| 404 | Independence | 3 | 1 | 6 | 0.6 |
| 405 | Patriotism | 4 | 2 | 8 | 0.7 |

Fig. 64

Presidential2004  
Combined image ladder questions  
Intends to vote for Bush

Decision Model Detail Report

4/15/2005 2:36 PM

Solution Map: Bush Voters - Combined Image Ladders - 4 ChainSolution

Cluster Chains: 4
Ladders Assigned: 29    63 %
Implications Assigned: 253    66 %
Ladders Matching 3 Codes: 23    50 %
Implications in 3 Code Match Ladders: 257    67 %

| | | Chain Strength / Quality | Ladders Assigned # | % | Implications Assigned # | % | Assignable Ladders # | % |
|---|---|---|---|---|---|---|---|---|
| Seed-1 | (402) Peace of Mind<br>(331) Confidence<br>(233) Trustworthy<br>(139) Candidate Image | 7.3   80 % | 14 | 30 % | 122 | 32 % | 17 | 37 % |
| Seed-2 | (403) Personal Security<br>(301) In Control<br>(230) Leadership Ability<br>(139) Candidate Image | 3.0   58 % | 4 | 9 % | 41 | 11 % | 6 | 13 % |
| Seed-4 | (405) Patriotism<br>(331) Confidence<br>(230) Leadership Ability<br>(133) Lack of Clear Position | 3.5   68 % | 8 | 17 % | 68 | 18 % | 16 | 35 % |
| Seed-5 | (402) Peace of Mind<br>(330) Personal Freedom<br>(234) Voter Representation<br>(136) Liberal Democrat | 1.2   70 % | 3 | 7 % | 22 | 6 % | 3 | 7 % |

Bush Voters - Combined Image Ladders - 4ChainSolution

Seed-1
(Strength=7.3)
(Quality=80%)
(L%=30%)
(IMP%=32%)

Candidate Image - 139
Trustworthy - 233
Confidence - 331
Peace of Mind - 402

| 139 | 233 | 331 | 402 |
|---|---|---|---|
|  | 6.00 | 0.08 | 0.06 |
|  |  | 7.03 | 0.06 |
|  |  |  | 8.00 |

Seed-4
(Strength=3.5)
(Quality=68%)
(L%=17%)
(IMP%=18%)

Lack of Clear Position - 133
Leadership Ability - 230
Confidence - 331
Patriotism - 405

| 133 | 230 | 331 | 405 |
|---|---|---|---|
|  | 4.00 | 0.04 | 0.01 |
|  |  | 5.03 | 0.02 |
|  |  |  | 1.01 |

Seed-2
(Strength=3.0)
(Quality=58%)
(L%=9%)
(IMP%=11%)

Candidate Image - 139
Leadership Ability - 230
In Control - 301
Personal Security - 403

| 139 | 230 | 301 | 403 |
|---|---|---|---|
|  | 4.00 | 0.02 | 0.04 |
|  |  | 0.02 | 0.04 |
|  |  |  | 1.01 |

Seed-5
(Strength=1.2)
(Quality=70%)
(L%=7%)
(IMP%=6%)

Liberal Democrat - 136
Voter Representation - 234
Personal Freedom - 330
Peace of Mind - 402

| 136 | 234 | 330 | 402 |
|---|---|---|---|
|  | 1.00 | 0.03 | 0.01 |
|  |  | 1.00 |  |
|  |  |  | 1.00 |

US 8,301,482 B2

DETERMINING STRATEGIES FOR INCREASING LOYALTY OF A POPULATION TO AN ENTITY

CROSS-REFERENCE TO RELATED APPLICATIONS

The present application in a continuation-in-part of U.S. patent application Ser. No. 10/927,222 now U.S. Pat. No. 7,769,626, filed Aug. 25, 2004 which claims priority from U.S. Provisional Patent Application No. 60/497,882 filed Aug. 25, 2003; each of the above-identified applications is fully incorporated herein by reference.

COMPUTER PROGRAM LISTING APPENDIX

A computer program listing appendix containing the source code of a computer program that may be used with the present invention is incorporated by reference in its entirety and appended to this application as one (1) original compact disc, and one (1) identical copy thereof, containing a total of three (3) files as follows:

| Filename | Size (bytes) | Date of Creation |
|---|---|---|
| Interview_Definition_XML_(1DefML)_Schema.txt | 6,949 | Apr. 20, 2010, 1:27:12 PM |
| Interview_Results_XML(1ResML)_Schema.txt | 15,993 | Apr. 20, 2010, 1:28:08 PM |
| Coding_Model_XML_(StrCodML)_Schema.txt | 8,912 | Apr. 20, 2010, 1:28:58 PM |

FIELD OF THE INVENTION

The present invention relates to a method and system for performing market research via interviewing and analysis of the resulting interview data on a communications network, and in particular, for determining customer decision-making factors that can be used to increase customer loyalty and/or market share.

BACKGROUND

There are at least two important categories of object loyalty definitions (wherein "object" may be a brand, company, organization, product or service). The first category is "operational" object loyalty definitions, wherein such loyalty is defined and measured by analysis of, e.g., customer purchasing behaviors. That is, since one cannot look into a customer's mind, one looks instead into the customer's shopping cart, a parts bin, or an order history. Thus, customer loyalty behavior toward an object is analyzed, according to at least one of the following operational definitions of loyalty: (a) "choosing the object on k of n opportunities or purchase occasions," (b) "choosing the object k times in a row," or (c) "choosing the object more often than any other."

A second category of object loyalty definitions include definitions that provide a description of a "psychological" state of: (a) a predisposition to buy, or (b) a conditional preference, e.g., an attitude, which may be favorable or unfavorable to the object. That is, the definitions of this second category provide descriptions of the mental state(s) of a customer(s) so that one can hypothesize a framework for assessing object loyalty. A customer's attitudes, however, are based in their beliefs, wherein beliefs are descriptive thoughts about things that drive customer choice behavior. Said another way, belief connotes conviction, whereas attitude connotes action.

However, neither of the above definitions of object loyalty are satisfactory for customer loyalty, and at least as importantly, for determining how customer loyalty can be cost effectively increased. For example, for an "operationally" identified loyal customer who buys over and over again, there is no certainty that this customer is actually loyal. Not unless one knows that the purchasing choice was: (a) at least relatively unconstrained, for example, that the customer did not face costs to switch to a competing product, and (b) made in congruence with the customer's preferences. In fact, it may be that the customer is uninformed regarding the market, and/or indifferent to competitive offerings. Moreover, for a "psychologically" identified loyal customer who has a predisposition to perform a transaction with or for an object (as defined hereinabove), there is also no certainty that this customer is actually loyal. In particular, it does not mean that the customer will be more likely to perform such a transaction. To illustrate, an individual may admire a Mercedes, and say it is the best of cars, but cannot afford one. Is he/she loyal? At least from a marketing perspective probably he/she is not.

With belief and behavior comes experience. Experience, over time, creates in customers' minds a set of ideas (i.e., perceptions) about an object. Thus, the term loyalty as used herein may be described as including: (1) favorable customer perceptions built up over time, as evidenced by both belief and behavior, that induce customers to perform transactions (e.g., purchases) of, from or with the object, and (2) such favorable customer perceptions are a barrier for the customers to switch to a competing object (e.g., a competing brand, company, organization, product or service). Evaluation of such object loyalty is desirable for making informed marketing decisions regarding the object, particularly, if such evaluations can be performed cost effectively.

The equity of an object (e.g., a brand, company, organization, product or service), may be described as the aggregate loyalty of the object's customers to continue acquiring or using (e.g., service(s) and/or product(s) from) the object. Equity, then, may be considered a function of: ($f_1$) the "likelihood of repeat purchase," which is a function of ($f_2$) loyalty, which in turn is a function of ($f_3$) customer satisfaction, which following from the standard satisfaction attitude research framework, is a function of ($f_4$) the belief and importances of attribute descriptors. Said another way, $$\text{Equity} = f_1(\text{likelihood of repeat purchase})$$
$$= f_2(\text{loyalty})$$
$$= f_3(\text{satisfaction})$$
$$= f_4(\text{beliefs, importances})$$

A company that has built substantial customer equity can do things that other companies cannot. In particular, the greater number of loyal customers, the greater degree of protection from competitive moves and from the vagaries of the marketplace. FIG. 1 illustrates this point. That is, customer loyalty may insulate a brand or product from competitive marketing activities and from external shocks, thus reducing risk (technically, the variance), increasing brand value, and ultimately, company value. In other words, high customer equity for an object reduces the ability of a competitor or event to shift the two components of loyalty, beliefs and behavior. For example, brand loyal customers may ignore or, even better, actively counter-argue competitive claims and resist their marketing actions. Brand loyal customers also resist, to some degree, competitive price promotions to switch to a competitor brand since the perceived risk reduction attributable to a brand to which such customers are loyal is greater than the value of the price reduction offered by the competitor.

Thus, evaluation of such object equity is desirable so that informed marketing and business decisions regarding the object can be made, particularly, if such evaluations can be performed cost effectively.

The primary focus of a marketing manager, when framing a marketing strategy for an object, in order of importance, is: (a) maintaining the object's loyal customer base, and (b) increasing the number of "new loyals." Increasing sales can be seen as a direct result of these two strategic marketing focuses. For the first "maintenance of loyals" group, two questions arise: (1) why do such loyal customers decide to, e.g., purchase our product instead of the competition's product, and (2) what barriers exist for loyal light users to becoming heavier users. The answer to the first question defines the equity of the business. The answer to the second question gives management insight into how directly to increase sales—by minimizing the barriers for increasing customer loyalty. In particular, the techniques and/or features for attracting non-loyal customers, heavy users and light users, respectively, to become more loyal to an object is the input that a marketing manager needs for developing a strategy that increases sales. Also, attracting loyal customers away from a competitive object represents yet another separate strategic issue. These key inputs, which are grounded in the ability to understand (summarize, quantify and contrast) the customer decision processes of target customer populations, provides the marketer with the insight required to optimally develop effective marketing strategy. Thus, a method and system for cost effectively answering the above two questions (1) and (2) is desirable so that informed marketing and business decisions regarding the object can be made.

Many marketers have made the realization that loyalty is key to a successful business strategy, and they have operationalized the research of loyalty in terms of customer satisfaction. In fact, customer satisfaction research is one of the largest and fastest growing areas of market research. There exist numerous specialty customer satisfaction assessment research organizations, e.g., (i) for universities: Noel-Levitz, Inc.; an example of such assessment research is Lana Low (2000). *Are College Students Satisfied? A National Analysis of Changing Expectations*. (http://www.noellevitz.com/NR/rdonlyres/DB91046E-59FE-4AB0-AB49-9CAF8EE84D73/0/Report.pdf), Noel-Levitz, Inc. incorporated herein by reference; (ii) for healthcare: Press Ganey Associates Inc. (www.pressganey.com); (iii) for government services: (Opinion Research Corporation incorporated herein by reference) and (iv) for brand satisfaction: Burke Inc. (www.burke.com). These marketing research organizations use methodologies (referred to herein as "attitudinal methodologies") based upon a traditional attitudinal research framework directed to assessing customer attitudes. That is, they ask questions of customers regarding their beliefs as to what degree a company's product, and competitive products, possess a given set of brand and/or service descriptors (e.g., attributes) and the relative importance of these descriptors to the company's customers (and/or the competitor's customers). The analysis output by such market research, as one skilled in the art will understand, is a set of mean belief ratings for the descriptor attributes, as well as mean importance ratings which can be broken down, if desired, for the various customer segments.

Moreover, the analysis output provided by these marketing research organizations provides ongoing customer tracking to assess customer attitude changes over time, so that interpretation of the mean statement customer response scores serves as a basis for strategic decision-making by the object being evaluated. As will be detailed hereinbelow, the approaches and methodologies used by these market research organizations are believed to be sub-optimal for a variety of reasons. However, before describing perceived problems with these prior art market research approaches and methodologies, examples of various marketing challenges are first provided as follows.

Consumer goods. Consider the soft drink marketplace. There are loyal customers that, regardless of small price differences, purchase and consume virtually 100% of one brand. They are satisfied with the performance of the product and what it stands for (imagery). Marketing pressures, specifically alternating weekly price promotions by the two market leaders in supermarkets, have decreased the number of loyal customers for the brand as compared to a generation ago. This reduction in loyalty translates into additional marketing and sales costs to drive revenue, which corresponds to decreased profitability.

Durable goods. Consider the automobile marketplace as recently as a generation ago. Customers were happy to wear the label reflective of their loyalty, such as "Ford" or "Buick" or "Cadillac." This label simply meant they owned and would continue to buy their brand of car. That is, they were satisfied with the performance of the product and what it stood for (imagery). As is obvious, due to competitive (and sometimes internally counterproductive) marketing efforts, this loyalty has been greatly diminished. The result is the equity of their business, and correspondingly its profitability, has decreased.

Direct sales. Consider the recruiting and retention issues for a direct sales force (Mary Kay Cosmetics, 1989). Sales revenues are a direct function (a 0.99 correlation) of the number of active sales representatives in the marketplace. The sales force has significant turnover (non-loyalty), which is a result of dissatisfaction with the job. If the sales force can be recruited at a higher rate and will remain active longer, thereby reducing the turnover rate, the size of the sales force may increase exponentially, which translates directly into significant increases in sales revenues. The equity of the direct sales company is a function of a satisfied, loyal sales force.

Healthcare. Consider the choice of hospitals in a given geographic area. If customer-patients are satisfied, they will return for future treatments and recommend the facilities to their friends. Patient loyalty translates into continued business for the hospital. Their dissatisfaction, however, means moving their business to the competition, thereby reducing the revenue of the hospital. The equity of the hospital is a function of its satisfied, loyal customers who will continue to use its services.

Nonprofit. Consider a museum, which is financially supported to a significant degree by annual donations of its membership. Their financial contributions represent a market share across a variety of competitive nonprofit options. If the members are satisfied with the offerings and operation of the museum, they will remain loyal and continue to give. If they are not satisfied, they will decrease or cease their funding activity. In this latter case, the equity of the museum, not to mention its direct operational funds, decreases. The equity of the museum is in its loyal donor base.

Resort. Consider a country club business in a given geographic area. Satisfied customers will remain members. Dissatisfied members will seek out other options, and this translates into a lower membership, meaning lower revenues received, which in turn translates into a lesser ability to fund club operations. The result is a reduction in the equity of the country club, which is a direct function of the loyalty of its membership.

The examples of marketing situations outlined above serve to illustrate the fact that the primary function of a market-driven strategy is to maximize the equity of an object, which translates to maximizing customer loyalty, which requires gaining an understanding of what customer (and employee) perceptions are that drive satisfaction. As the above examples of marketing challenges illustrate, maximizing or increasing the equity of an object is desirable for virtually all business enterprises. Thus, it would be desirable to have a method and system for performing market research that determines the relative weights of components or aspects of an object that will maintain and increase customer satisfaction (with respect to, e.g., predetermined target customer groups). These components or aspects, when communicated and delivered by the object, will likely increase the satisfaction level, thereby increasing loyalty, likelihood of repeat purchase, and result in increasing equity (as this term is used herein).

Attitude models (Allport, 1935, Ref. 2. of the "References" section incorporated herein by reference) represent the prototypical, most frequently used research framework utilized in the domain of marketing research. The tripartite social psychological orientations of cognitive (awareness, comprehension, knowledge), affective (evaluation, liking) and conative (action tendency) serve as the research basis of gaining insight into the marketplace by understanding the attitudes of its customers.

Questions regarding any component, or combinations thereof, of the attitude model are regarded as attitude research. Conative, for example, refers to behavioral intention, such as a likelihood to purchase, which is prototypically asked in the following scale format for a specific product/ service format (Zigmund, 1982, p. 325, Ref. 11 of the "References" section incorporated herein by reference).

☐ I definitely will buy
☐ I probably will buy
☐ I might buy
☐ I probably will not buy
☐ I definitely will not buy Therefore, if the past purchase or consumption behavior for each individual in the sample of respondents were known from another question in the survey (or consumer diary), the behavioral intention question would be used to compute the likelihood of repeat purchase.

Satisfaction (affect for the consumption and/or use experience) is typically measured using a scale such as the following for a specific product or service (Zigmund, 1982, p. 314-315, Ref. 11 of the "References" section incorporated herein by reference).

☐ Very satisfied
☐ Quite satisfied
☐ Somewhat satisfied
☐ Neither satisfied or dissatisfied
☐ Quite dissatisfied
☐ Very dissatisfied Attitude research is based on a theoretical model (Fishbein, 1967, Ref. 8 of the "References" section incorporated herein by reference) containing two components: one, beliefs about the product attributes of the object, and two, an evaluation of the importances of beliefs (descriptors). This theoretical relationship may be represented as:

$$A_o = \sum_{i=1}^{n} b_i e_i \text{ where, } \begin{aligned} A_o &= \text{attitude toward the object} \\ b_i &= \text{strength of the belief that object} \\ &\quad \text{has attribute } i \\ e_i &= \text{evaluation of attribute } i \\ n &= \text{number of belief descriptors} \end{aligned}$$

Attitude toward the object ($A_o$), then, is a theoretical function of a summative score of beliefs (i.e., "$b_i$" descriptors or characteristics) multiplied by their respective importances ("$e_i$"). Assuming this theory to hold, market researchers construct statements to obtain beliefs specific to product and/or services, such as (Peter and Olson, 1993, p. 189, Ref. 16 of the "References" section incorporated herein by reference):

| How likely is it that 7UP ® has no caffeine? |
| --- |
| Extremely Unlikely   1 2   3 4   5 6 7 8 9 10   Extremely Likely |
| How likely is it that 7UP ® is made from all natural ingredients? |
| Extremely Unlikely   1 2   3 4   5 6 7 8 9 10   Extremely Likely |

Additionally, market researchers obtain importances using scales that generally appear in the following format (Peter and Olson, 1993, p. 191, Ref. 16 of the "References" section incorporated herein by reference):

| 7UP ® has no caffeine. | | | | | | | | |
| --- | --- | --- | --- | --- | --- | --- | --- | --- |
| Very Bad | −3 | −2 | −1 | 0 | +1 | +2 | +3 | Very Good |
| 7UP ® has all natural ingredients. | | | | | | | | |
| Very Bad | −3 | −2 | −1 | 0 | +1 | +2 | +3 | Very Good |

For the three standard types of attitude scales noted above, the researcher assigns numbers (integers) to the response categories. In the cases of the behavioral intention scales and satisfaction (affect), successive integers are used such as (+2 to −2, and +3 to −3, respectively). Analysis of the data then involves computing summary statistics for each item, for the customer groups of interest.

In sum, from the perspective of marketing research, customer understanding is derived from studying the tables of summary statistics indicative of customer responses related to a combination of product and/or service customer beliefs (cognitive), corresponding customer importances (affective) with regard to key attribute descriptors, and the likelihood of acting (conative).

Difficulties with the above attitude research methodology for measurement of attitudes include individual differences in interpretation of questions, which result in a compounding of error of measurement. Detailed below are the assumptions that underlie the use of attitude models, along with examples of how error is introduced into the resulting measures.

1. Core Meanings or Terms are Commonly Understood.

For example, when "good value" is used as a descriptor phrase to be evaluated, there could be many different interpretations, depending on each customer's definition or operationalization of the concept of value (reciprocal trade-off between price and quality).

Therefore, if the meanings of attributes, which will be used to measure beliefs and importances, differ by respondent, there is no uniformity in the responses.

2. Social Demand Characteristics Will not Introduce Bias.

For example, when a socially acceptable norm (positive or negative) is used, such as in the case with automobiles with the terms "prestige" or "status," respondents consistently under report the importance of these attitude descriptors as contrasted to open-ended discussions describing their own choice behavior (Reynolds and Jamieson, 1984, Ref. 25 of the "References" section incorporated herein by reference).

3. The Descriptor Labels on the Judgment Scales are Commonly Understood.

For example, when using word descriptors, such as "definitely" or "probably" in scale labeling, their definitions cannot be assumed to have the same meanings to each respondent.

For example, when numbers are used, especially percentages, to define the scale points, the likelihood that a common definition or meaning of the terms are held by all respondents is very unlikely.

4. The Scales are One-Dimensional.

For example, when only end-markers of scales are used, such as "good" and "bad," this assumes these are exact opposites. It has been shown (Reynolds, 1979, Ref. 17 of the "References" section incorporated herein by reference) that a significant percentage of respondents actually use two dimensions here, namely, "good" ⬥"not good" and "bad" ⬥"not bad." Similarly, "hot" and "cold" are not opposites. Rather, "hot" ⬥"not hot" and "cold" ⬥"not cold" represent the basis for their cognitive classifications.

If the scales are not one-dimensional, the measurements are confounded, further injecting additional error into the research data.

5. The Intervals Between the Points on the Scale Will be Equal.

For example, when considering the appropriate response that represents one's position on a numerical scale, the individual must mentally impose a metric—based upon the fact that the exact difference between all scale points is equal.

If the respondents do not have a precise interval metric interpretation of all scales, in particular with respect to beliefs and importances, all that exists is an ordinal ranking of scores, which would not make simple means an appropriate summary measure of central tendency.

The above problematic assumptions have been individually discussed in virtually all psychology and marketing research textbooks. However, in reality, these issues have never been adequately addressed, especially in light of the compounding effect caused by multiple violations of the assumptions. Understanding the potential confounding effect of the above five assumption violations can be even more problematic to obtaining valid measures when the following not-previously-identified further assumption of attitude research models is also considered. Importances are assumed to be independent of beliefs. That is, in attitude research models importances are assumed to be distributed equally across belief scales. Such an assumption is denoted herein as the "uniform importances assumption".

For example, if a person has a given belief level or position on an attitude scale, e.g., an attitude of "not satisfied," what is assumed important to him/her is both: (a) some weighted composite of the importance scores across all the attribute dimensions, and (b) that these importances are somehow independent of his/her belief level. That is to say, if one asks how to increase a respondent's attitude score/satisfaction level one Δ (i.e., one scale point), the assumption that has heretofore been made is that a weighted composite of attribute scores would be needed, and regardless of the level (higher or lower) on the attitude scale, the same weighted composite is used by the person.

Asking three questions can test this uniform importances assumption. First, an "anchor" question for establishing a position on the attitude scale of interest is presented to a respondent. In the example anchor question [1] immediately below, a "satisfaction" question is presented to the respondent. Following this anchor question hereinbelow are second and third questions which simply ask for the key attribute or reason that is the basis for the person's rating in question [1].

---

[1] ANCHOR. How satisfied are you with (BRAND "Y") product/service?
NOT AT ALL                                                                                      PERFECTLY
 - - - -        - - -       - -      -      0      +      ++      +++      ++++
[2] +EQUITY. What is the one thing that causes you to rate your satisfaction at this level?
That is, why did you rate your satisfaction at (X) and not
(X − 1)(one scale point lower)?
[3] −EQUITY. What is the one thing that would increase your satisfaction by one scale level, that is, from (X) to (X + 1)?

---

If the assumption holds that importances are equally distributed across the scale points of the attitude scale, the most likely outcomes would be that the most important attribute would be mentioned for both questions [2] and [3] above, or alternatively, that the first and second most important attributes would be mentioned in the response for questions [2] and [3].

The conclusions from customer research using the above questioning format do not confirm the uniform importances assumption. In fact, importances are not equally distributed across such an attitude response scale. To empirically test this assumption, the above three questions [1], [2], and [3] were asked of independent samples of respondents (total of 750) across the five product/service categories mentioned previously, from durable goods to nonprofits. Analysis of the responses to questions [2] and [3] revealed that: (a) in less than two percent (2%) of the cases was the same attribute mentioned for both questions [2] and [3], and (b) the first and second most important attributes (determined by a traditional market research importance scale) combined were mentioned less than 50% of the time.

Thus, if the market research question(s) is how best to improve respondents' attitudes (e.g., satisfaction level underlying loyalty), then the prior art attitude research methodologies are believed to be flawed due to the implicit acceptance of the uniform importances assumption as well as the acceptance of the other five erroneous assumptions recited hereinabove.

Yet another newly discovered assumption of the attitude research methodologies that is also suspect in attitude is as follows:

Product or service attributes drive customer decisions and should be the primary area of research focus.

This assumption is held by all traditional attitude models and has been empirically demonstrated to be false. Research has shown (Reynolds, 1985, Ref. 18 of the "References" section incorporated herein by reference; Reynolds, 1988, Ref. 19 of the "References" section incorporated herein by reference; Jolly, Reynolds and Slocum, 1988, Ref. 14 of the "References" section incorporated herein by reference) that higher levels of abstraction beyond attributes (e.g., consequences and personal values) contribute more to understanding preferences and performance ratings than do lower-level descriptor attributes. Therefore, to gain a more accurate knowledge of the basis of customer decision-making, one must understand the underlying, personally relevant reasons beyond the descriptor attributes provided by respondents.

Accordingly, it is desirable to have a market research method and system that provides accurate assessments of, e.g., customer loyalty, and accurate assessments of the attributes of an object that will influence customers most if changed. In particular, it is desirable that such a market research method and system is not dependent upon the above identified flawed assumptions.

The invention disclosed hereinbelow addresses the above identified shortcomings of prior art market research methods and systems, and in particular, the invention as disclosed hereinbelow provides a market research method and system that provides the desirable features and aspects recited hereinabove.

REFERENCES SECTION

The following references are fully incorporated herein by reference as additional information related to the prior art and/or background information related to the present disclosure.

Ref. 1. Aaker, D. (1991). *Managing Brand Equity*. New York: Free Press.

Ref. 2. Allport, G. W. (1935). Attitudes. In C. Murchison (Ed.), *Handbook of Social Psychology*. Worchester, Mass.: Clark University Press.

Ref. 3. Blattberg, R., Getz, G. and Thomas, J. (2001). *Customer Equity: Building and managing relationships and valuable assets*. Boston, Mass.: Harvard Business School Press.

Ref. 4. Carroll, J., Green, P. E. and Schaffer, C. (1986). Interpoint Distance Comparisons in Correspondence Analysis, *Journal of Marketing Research*, 23 (August): 271-80.

Ref. 5. Cliff, N. (1987). *Analyzing Multivariate Data*. New York: Harcourt, Brace and Jovanovich.

Ref. 6. Cliff, N. and Keats, J. A. (2003) *Ordinal Measurement in the Behavioral Sciences*. Mahwah, N.J.: Lawrence Erlbaum Associates.

Ref. 7. Christensen, G. L. and Olson, J. C. (2002). Mapping Consumers' Mental Models with ZMET. *Psychology and Marketing*, Vol. 19(6), 477-502.

Ref. 8. Fishbein, M. (1967). Attitude and Prediction of Behavior. In M. Fishbein (Ed.), *Readings in Attitude Theory and Measurement*. New York: John Wiley and Sons.

Ref. 9. Gutman, J. (1982). A Means-end Chain Model based on Consumer Categorization Processes. *Journal of Marketing*, 46(1), 60-72.

Ref. 10. Gutman. J. and Reynolds. T. J. (1978). An Investigation of the Levels of Cognitive Abstraction Utilized by Consumers in Product Differentiation. In J. Eighmey (Ed.), *Attitude Research Under the Sun*. Chicago, Ill.: American Marketing Association, 128-150.

Ref. 11. Zikmund, W. G. (1982). Exploring Marketing Research. New York: Dryden Press.

Ref. 12. Howard, J. (1977). *Consumer Behavior: Application and Theory*. New York, N.Y.: McGraw-Hill.

Ref. 13. Johansson, J. and Nonaka, I. (1996) Relentless: *The Japanese Way of Marketing*. New York, N.Y.: HarperBusiness.

Ref. 14. Jolly, J. P., Reynolds, T. J., and Slocum, J. W. (1988). Application of the Means-End Theoretic for Understanding the Cognitive Bases of Performance Appraisal. *Organization Behavior and Human Decision Process*, Vol. 41, 153-179.

Ref. 15. Kendall, M. G. (1975). *Rank Correlation Methods*. London: C. Griffin.

Ref. 16. Peter, J. P. and Olson, J. (1993). *Consumer Behavior and Marketing Strategy*. Homewood, IL: Irwin.

Ref. 17. Reynolds, T. J. (1979). Dominance Interpretation of Binary Grid Data. Proceedings of 1979 Southern Marketing Association, Chicago, Ill.: American Marketing Association.

Ref. 18. Reynolds, T. J. (1985). Implications for Value Research: A Macro vs. Micro Perspective. *Psychology & Marketing*, Vol. 2, No. 4, 297-305.

Ref. 19. Reynolds, T. J. (1988). The Impact of Higher Order Elements on Preference: The Basic Precepts and Findings of Means-End Theory. *Proceedings of 1988 American ** ***Marketing Association Educator's Conference*, Chicago, Ill.: American Marketing Association.

Ref. 20. Reynolds, T. J. and Craddock, A. (1988). The Application of the MECCAS Model to the Development and Assessment of Advertising Strategy: A Case Study. *Journal of Advertising Research*, 1988, Vol. 28 (2), 43-54.

Ref. 21. Reynolds, T. J., Dethloff, C. and Westberg, S. (2001) Advancements in Laddering. T. Reynolds and J. Olson (Eds.), *Understanding Consumer Decision-Making: The Means-End Approach to Marketing and Advertising Strategy*, Mahwah, N.J.: Lawrence Erlbaum Associates.

Ref. 22. Reynolds, T. J., Gengler, C. and Howard, D. (1995). A Means-End Analysis of Brand Persuasion through Advertising. *International Journal of Research in Marketing*, Vol. 12, 257-266.

Ref. 23. Reynolds, T. J. and Gutman, J. (1984). Advertising is Image Management. *Journal of Advertising Research*, 24(1), 27-36.

Ref. 24. Reynolds, T. J. and Gutman, J. (1988). Laddering Theory, Method, Analysis and Interpretation. *Journal of Advertising Research*, Vol. 28(1), 11-31.

Ref. 25. Reynolds, T. J. and Jamieson, L. (1984). Image Representations: An Analytical Framework. In J. Jacoby and J. Olson (Eds.). *Perceived Quality of Products, Services, and Stores*. Lexington, Mass.: Lexington Books.

Ref. 26. Reynolds, T. J. and Olson, J. C. (2001). *Understanding Consumer Decision-Making: The Means-End Approach to Marketing and Advertising Strategy* Mahwah, N.J.: Lawrence Erlbaum Associates.

Ref. 27. Reynolds, T. J. and Rochon, J. (1991). Strategy-Based Advertising Research: Copy Testing is not Strategy Assessment. *Journal of Business Research*, Vol. 22, 131-142.

Ref. 28. Reynolds, T. J. and Rochon, J. (2001). Consumer Segmentation based on Cognitive Orientations: The ChemLawn Case. In T. Reynolds and J. Olson (Eds.), *Understanding Consumer Decision Making: The Means-end Approach to Marketing and Advertising Strategy*. Mahwah, N.J.: Lawrence Erlbaum Associates.

Ref. 29. Reynolds, T. J., Rochon, J. and Westberg, S. (2001). A Means-End Chain Approach to Motivating the Sales Force: The Mary Kay Strategy. In T. Reynolds and J. Olson (Eds.), *Understanding Consumer Decision Making: The Means-end Approach to Marketing and Advertising Strategy*. Mahwah, N.J.: Lawrence Erlbaum Associates.

Ref. 30. Reynolds, T. J. and Sutrick, K. H. (1986). Assessing the Correspondence of a Vector(s) to a Symmetric Matrix Using Ordinal Regression. *Psychometrika*, Vol. 51(1), 101-112.

Ref. 31. Reynolds, T. J. and Trivedi, M. (1989). An Investigation of the Relationship Between the MECCAS Model and Advertising Affect. In A. Tybout and P. Cafferata (Eds.), *Advertising and Consumer Psychology* (Vol. IV). Lexington, Mass.: Lexington Books.

Ref. 32. Reynolds, T. J. and Westberg, S. J. (2001). Beyond Financial Engineering: A Taxonomy of Strategic Equity. In T. Reynolds and J. Olson (Eds.), *Understanding Consumer Decision Making: The Means-end Approach to Marketing and Advertising Strategy*. Mahwah, N.J.: Lawrence Erlbaum Associates.

Ref. 33. Reynolds, T. J., Westberg, S. J., and Olson, J. C. (1997). A Strategic Framework for Developing and Assessing Political, Social Issue and Corporate Image Advertising. In L. Kahle and L. Chiagouris (Eds.), *Values, Lifestyles and Psychographics*. Mahwah, N.J.: Lawrence Erlbaum Associates.

Ref. 34. Schumpeter, J. (1934). *The Theory of Economic Development*. Cambridge, Mass.: Harvard University Press.

Ref. 36. Understanding Consumer Decision Making: The Means-end Approach to Marketing and Advertising Strategy; ed. Reynolds & Olson; 2001; (book), Lawrence Erlbaum Associates; Mahwah N.J.

Ref. 37. Reynolds; 2003, "Strategic Equity Assessment and Management Model: StrEAM®".

Ref. 38. Reynolds, "In Search of True Brand Equity Metrics: All Market Share Ain't Created Equal", Journal of Advertising Research, June 2005.

Ref. 39. Reynolds, Thomas J., "Methodological and Strategy Development Implications of Decision Segmentation", Journal of Advertising Research, Dec. 1, 2006.

DEFINITIONS AND DESCRIPTIONS OF TERMS

Object: An object as used herein may be any of the following: a brand, company, organization, product or service. In a more general context, a topic or issue, such as a political voter issue, a political persuasion, or a political candidate may be considered an "object" herein.

Decision Structure: A representation of perceived object attributes that are employed by a person in evaluating the object, and/or personal goals or values that are used by a person in evaluating the object. Such a decision structure may be a simple non-branching directed graph wherein the directional edges proceed from, e.g., perceptions of object attributes to progressively more personal goals and values of the person. However, more complex directed graphs are also contemplated.

Code Category: A code category is one of a plurality of code categories in to which interviewee responses are categorized according to semantic content (such categorizing referred to "coding" herein). Each such category is presumed to include interviewee responses that identify the same concept (e.g., an object attribute, or a personal value held by one or more interviewees). Thus, a particular code category may represent all interviewee responses mentioning "the handling" (or equivalents) of a car model being researched, or may represent all interviewee responses mentioning "safety" (or equivalents) of a car model being researched.

Importance (as applied to a code category): Data indicative of a ranking (i.e., importance) of the code category. In one embodiment, the importance for each of a plurality of code categories is computed as a non-decreasing function of the number interviewee responses (referred to as "mentions" in some contexts) associated with the category code. For example, the importance of a code category may be determined as merely the sum of the number interviewee response associated with the code category. Alternatively, such an importance may be indicative of the fractional portion of the total number mentions obtained from the interviewees that the number of mentions associated with the code category represents.

Belief (as applied to a code category): Data indicative of how favorably the interviewees perceive the code category as it applies to the object (or an aspect thereof). For example, for a code category of "fewer calories" where the object is a beverage, the belief of this code category may, in one embodiment, be determined as a value representative of the ratio of the number of object favorable interviewee responses (referred to as "positive mentions" in some contexts) associated with the category code to the total number of mentions by all interviewees. In one embodiment, such belief values may be integer values between (including) 0 and 10, wherein, e.g., a ratio of ½ is translated to the value 5. In a more general context, a belief for a code category is computed from a non-decreasing (preferably monotonically increasing) function of the number of favorable mentions in the code category. Accordingly, for code categories X and Y, if the number of favorable mentions for X is greater than the number of favorable mentions for Y, then the belief of X $\geq$ the belief of Y.

Equity: The equity of an object (e.g., a brand, company, organization, product or service), may be described as the aggregate loyalty of the object's customers to continue acquiring or using (service(s) and/or product(s) from) the object. Thus, equity is a combination of customer belief and behavior built up over time that creates customer perceptions about the desirability (or undesirability) of the object, such equity being effective for inducing (or inhibiting potential) customers to perform transactions directed to the object. Equity, then, may be considered a function of ($f_1$) the "likelihood of repeat purchase," which is a function of ($f_2$) loyalty, which in turn is a function of ($f_3$) customer satisfaction, which following from the standard satisfaction attitude research framework, is a function of ($f_4$) the belief and importances of attribute descriptors.

Strategic Equity: As used herein this term refers to the equity (i.e., loyalty) in or for an object ascribed thereto by a particular population. That is, "strategic equity" refers to the set of positive associations extant in the minds of the particular population (e.g., customers) that drive choice behavior favorable to the object, and thus generate object loyalty within the particular population.

+EQUITY question or positive equity question: A question (or imperative statement) that requests the interviewee to identify at least one of the most important positive aspects of the object being researched. In one embodiment, the positive aspect is obtained by asking the interviewee to evaluate the object, and then presenting the +Equity question (or imperative statement) to the interviewee requesting the interviewee to recite an aspect (i.e., the positive aspect) of the object that is the basis for the interviewee rating the object at an importance of "X" rather than a predetermined lesser importance of, e.g., "X−1" (on a satisfaction scale where larger values correspond to a greater satisfaction with the object). Note, it is implicit in this embodiment that the interviewee's response will recite an aspect of the object that is more positive than another aspect of the object. In another embodiment, the interviewee may be asked to respond with the most positive aspect of the object.

−EQUITY question or negative equity question: A question (or imperative statement) that requests the interviewee to identify at least one of the most important negative aspects of the object being researched. In one embodiment, the negative aspect is obtained by asking the interviewee to evaluate the object, and then presenting the −Equity question (or imperative statement) to the interviewee requesting the interviewee to recite an aspect (i.e., the negative aspect) of the object that is the basis for the interviewee rating the object lower than he/she would if the negative aspect were changed to be viewed as less negative to the interviewee. Note, it is implicit in this embodiment that the interviewee's response will recite an aspect of the object that is more negative than another aspect of the object. In another embodiment, the interviewee may be asked to respond with the most negative aspect of the object.

Equity/Disequity Grid: A grid, such as shown in FIGS. 21 and 23, wherein various perceptions of a target population are categorized on the basis of how these perceptions are shared (or not shared) by a subpopulation whose members are determined to be high in loyalty to the object being researched, and by a subpopulation whose member are determined to be low in loyalty to the object being researched.

Market segment (or simply "segment"): A group of people who are expected to react similarly to changes in an object's one or more "marketing mix elements" (such elements being: object price, object promotion (e.g., advertising, sales promotions, etc.), object distribution (e.g., places of distribution, both geographically and by distributor), and object design. While a customer and his/her neighbor may have identical incomes and other demographic characteristics, they may have different decision structures, and react differently to marketing mix efforts. But if they have the same choice structure, they will react in the same way to marketing efforts. Accordingly, the customer and his/her neighbor are members of one segment. Choice-based segmentation is important because it helps avoid thinking of "the" customer as a monolithic entity (see Reynolds and Rochon, 2001, Ref. 28 of the "References" section above. It also gives clues about how to make a product/service special and better. Again, this relates to the earlier discussions of market evolution.

Optimal competitive positioning: As used herein this term refers a process of evaluating positioning options. That is, given a competitive marketplace for a particular category of products and/or services, optimal competitive positioning is the process of selecting the option that has the most potential for the target customer population.

Means-End Theory/Analysis: Means-End theory/analysis (as described in Ref. 9 of the References Section hereinabove) examines how object (e.g., product or service) attributes are the means of achieving some personal end for a consumer or user of the object. The goal Means-End theory is to identify one or more "Means-End chains" (more generally referred to as "chains" as and described further hereinbelow, see "Chains and Ladders" description in this section), wherein each such Means-End chain is a linearly linked sequence of user perceptions (herein also referred to as "levels"), wherein the level linkages are: (i) between user recited object attributes (generally, a lowest level), and user perceived consequences of these object attributes, and (ii) between such perceived consequences and the user's personal values which are reinforced by such perceived consequences. In a general form, Means-End theory/analysis provides a framework and technique for identifying such Means-End chains regarding a particular object. Symbolically a Means-End chain can represented as follows:
Attributes→Consequences→Values
However, such chains may have additional levels of user perception). That is, at least the middle "Consequences" category above (for identifying user perceived consequences of lower level object attributes) may be subdivided into a plurality of subcategories as one skilled in the art will understand. In particular, subcategories of "functional consequences" and "psychosocial consequences" may be provided as described hereinbelow.

The "means-end approach" (as also described in Ref. 9 of the References Section hereinabove) has at its foundation the notion that decision makers choose courses of action (purchase behavior) that will achieve their desired outcomes or end-states (Gutman 1982, Ref. 9 above). Means-end research methods focus on deriving chains that represent an association network of meaning, from attributes to consequences to personal values. Values are generally defined as the important beliefs people hold about themselves and their feelings regarding others' beliefs about them. According to means-end theory, values (V) provide the overall direction and give meaning to desired consequences (C). A desirable consequence (i.e., that satisfies a higher order value) determines what attributes (A) of the choice option are salient, which define the competitive behavioral options. By uncovering the important network of meanings for a category in this way, a market researcher is provided with an in-depth understanding of how customers perceive an object and/or its marketplace.

Functional Consequences: Direct consequences of an object that are perceived by a user or supporter of the object, usually such direct consequences are performance outcomes resulting from the object's attributes, wherein such performance outcomes can be objectively assessed as to their veracity. For instance, the statement "I like the car because its fuel efficient" is a functional consequence of the car to which the statement is directed.

Psychosocial Consequences For a user or supporter of an object, a psychosocial consequence of using or supporting the object is: (1) a perception, by the user/supporter, of an aspect of the user/supporter's interpersonal relationships, and/or (2) a perception, by the user/supporter, of an aspect of a psychological characteristic of the user/supporter as being consequences of the object. Typically a psychosocial consequence is derived from one or more functional consequences of the object. For example, the statement: "I like the car because its fuel efficiency makes me feel like I'm doing something good for the environment and my girl friend likes it" has two psychosocial consequences, i.e., a perception of "doing something good for the environment", and "my girl friend likes it".

Laddering: Laddering is a methodology that utilizes in depth interviewing of a person for identifying personal hierarchies ("ladders" herein, see "Chains and Ladders" description in this section for further description) of perceptions related to a particular object, wherein each successive higher level of the hierarchy is representative of a personal value or goal that is more transcendent and personal to the interviewee. Further description of laddering can be found in the following references which are incorporated by reference herein: (Reynolds and Gutman, 1988, Ref. 24 of the "References" section; Reynolds, Detloff, and Westberg, 2001, Ref. 21 of the "References" section).

Chains and Ladders (a comparison): A chain as used herein is a hierarchical representation of levels of the perceptions of a group of one or more persons about an object, wherein each successively higher level is more descriptive of the group's persistent personal situation, goals, and ultimately values (as these values relate to the object), and generally less descriptive of the object itself. Additionally, for each chain level, its immediately next higher level is perceived by the group to be derived or a result from its preceding level. Thus, a lowest level of a chain may include substantially objective facts about an object, e.g., "the car gets at least 70 miles to the gallon", and a higher level may be representative of group statements such as "the car's fuel efficiency saves me money", and a yet higher level may be representative of group statements such as "the money saved can be used for paying off debts", and a still level may be representative of group statements such as "paying off debts is valuable because it provides me with peace of mind".

A ladder is a chain that is obtained from the laddering methodology described hereinabove. In particular, a ladder as used herein will generally have four or more levels for describing a group's perceptions of an object, wherein the levels extend from a lowest level reciting substantially objective facts that are perceived as important (enough to recite) by the group, to a highest level of persistent and personal values or beliefs.

Laddering Interview: A Laddering interview is an interview based on the laddering methodology for eliciting chains having levels corresponding to attributes, consequences, and values according to means-end theory. The purpose of this kind of interview is to uncover more abstract, personally motivating reasons behind choices of an interviewee or respondent. An interviewer guides the respondent through the laddering of a given subject (e.g., product or service) by asking questions such as: "Why is this important to you?" to thereby transition between each level.

Ladder Element: A data structure, and more particularly the information therein, that represents an interviewee response to an interview question, wherein the interview question is intended to elicit an interviewee response for an intended ladder level (e.g., one of Attribute, Functional Consequence, Psychosocial Consequence, Value ladder levels). Ladder elements, e.g., as captured during interviews, typically represent qualitative interviewee responses. For instance, such interviewee response may free-form pieces of text. There may be between 4 and 6 such ladder levels per ladder, and preferably there is one or more ladder elements corresponding to each ladder level. Each such ladder element includes data identifying the one or more ladder levels of the one or more interviewee responses for the ladder element. In one embodiment, an interviewer assigns a ladder levels to ladder elements. In some cases, a ladder element may have an initial code category (i.e., ladder code) assigned to it, wherein such a code identifies a default (semantic) categorization of an interviewee response in the event that no other code categorization is identified. Ladder results from an interview session typically has at least one ladder element at each ladder level (e.g., Attribute, Functional Consequence, Psychosocial Consequence, Value). In some embodiments, a ladder may have may be additional ladder levels (e.g., more than 6 levels), and, e.g., additional ladder elements for the corresponding additional ladder levels may be provided.

Ladder Code (or Ladder Element Code): Although ladder elements, e.g., as captured during interviews, typically represent qualitative interviewee responses, it is preferable the interviewee obtained data for ladders be analyzed in a quantitative manner. Accordingly, each ladder element may be categorized and assigned a code category (i.e., a "ladder code"), wherein the ladder code is used to equate different (syntactic) interviewee responses that appear to identify the same (or similar) semantic interview related concepts. For instance, for a particular interview design, in one or more interview sessions thereof, two interviewee responses may contain the following two text descriptions of the object of the interview: "is expensive" and "high priced". Accordingly, assuming these two text descriptions are in response to the same interview (ladder) question, each of these text descriptions may be given the ladder code for identified by, e.g., the word "cost".

Coded Ladder The corresponding sequence of codes for coding a ladder of interviewee responses.

Code Sequence: A sequence of codes $<c_1, c_2, c_3, \ldots, c_n>$, $n \geq 2$, such that the sequence of codes represents a hierarchical sequence of perceptual and/or decision associations of interviewees extending from, e.g., an attribute level to a value level. Accordingly, for $i=1, 2, 3, \ldots, n$, $c_i$ is intended to represent a lower level of interviewee perception than $c_{i+1}$, and each pair $(c_i, c_{i+1})$ is intended to represent a connection or implication between perceptual levels that exists in the minds of the interviewees.

Cluster Chain: A code sequence (as defined above), wherein the sequence is intended to be an abstraction and/or aggregation of a plurality coded ladders. In one embodiment of the present disclosure, one or more cluster chains are determined, and then of zero or more coded ladders are identified with (i.e., assigned to) each cluster chain. The coded ladders are each identified with a cluster chain that is determined to be semantically similar enough to be useful in modeling interviewee perceptions via, e.g., decision segmentation analysis (DSA) processing described below.

Decision Segmentation Analysis (DSA): A technique (as described in Ref. 38 of the References Section hereinabove) for determining from coded ladders identified from a collection of interview response data, the primary decision paths that interviewees providing the responses appear to have used in providing their interview responses. Examples of results from DSA are shown in FIGS. 9 and 38. DSA is a process for assigning (or mapping)) each coded ladder to a cluster chain that best represents the most similar coded ladders. The assignment of coded ladders is typically done in the context of what is known as a "solution map" (also referred to as a "decision map", or "ladder mappings" herein) that contains multiple cluster chains. Therefore DSA assignment of a ladder involves deciding on whether a ladder is (a) a good enough fit to one or more of the cluster chains in a solution map such that it can be assigned to the solution map, and then (b) determining which cluster chain (of potentially a plurality of such chains) is the best fit for the ladder. The ultimate result of the DSA process is a set of cluster chains that model the dominant decision paths in the interview data. The DSA process typically involves the generation of several solution maps, each one mapping the decision data ladders with a different number of cluster chains.

Decision Model (Customer Decision Map or CDM): Given a collection of ladder mappings (i.e., solution maps) obtained from a DSA analysis (as described immediately above) of interview data, a decision model represents the most significant decision pathways (i.e., the ladders that are determined to be most important) identified in the interview data. That is, a decision model is the combined representation of the coded ladders of the solution maps that are believed to best represent the decision making processes that the interviewees perform.

Interview Designer (or composer): A specialist that defines the questions/dialog to be used with study subjects (i.e., interviewees or respondents) to collect data of interest. This person may use an interview specification language to define the organization, interactions, questions to be asked during an interview; i.e., an interview. Note that the interview designer may use a graphical user interface (GUI) based software tool for generating interview definition data (herein also denoted IDefML data) that defines the organization, interactions, questions for a corresponding interview.

Interviewer: A trained person who conducts a StrEAM interview session. The Interviewer desktop drives the one-on-one conversation and is operated by the Interviewer to extract the desired information from the study subject.

Respondent (or interviewee): One of the subjects of the study who responds to queries made by the Interviewer through the StrEAM*Interview system. No expertise is required of the Respondent other than the use of a standard computer keyboard and mouse.

Analyst: Once StrEAM*Interview has collected study data, the analyst will use the StrEAMAnalysis tools to manipulate and explore the collected information regarding the subjects of interest. The primary focus will be on the decision making factors and processes revealed by the study and their relationship to various other known factors.

Administrator: Conducting a StrEAM study requires the organization and maintenance of various data items, tools, schedules, and people. Included in this is the scheduling of one-on-one interviews (appointments), assignment of interviewers, handling of data, et cetera.

Top of mind (TOM) responses: Responses to interview questions that are open ended wherein the respondent is asked "what comes to mind" regarding, e.g., an object.

Egosodic Valenced Decision (EVDS) question: A question asked an interviewee, wherein the question is phrased for obtaining a response indicative of what first comes to mind when the interviewee reflects on a particular feature or attribute of an object. Such questions are also referred to as "top of mind" or TOM questions.

Customer Decision-Making Map (CDM): A directed graph of a plurality of ladders combined to show interrelationships between the ladders, e.g., the ladder may intersect so that the rungs of different ladders may be shown as having common interviewee designated terms.

StrEAM™ joint distribution: A graph, such as shown in FIG. 5, wherein various categories of a population's beliefs about an object (e.g., the object is "superior", "good", "acceptable" or "unacceptable") are further decomposed according to price sensitivity.

SUMMARY

A market research analysis method and apparatus (collectively, also referred to as a market analysis system, and StrEAM™ herein) is disclosed for performing market research and developing marketing strategies, wherein at least the following features are disclosed:

1. The research method and apparatus identifies and prioritizes various customer market segments for analysis. In particular, the market analysis system disclosed herein can be used for assessing the various market segments with respect to their relative contribution to the sales related to an object being researched.
2. The research method and apparatus determines the key underlying customer decision elements within customers' personal decision framework that have the highest potential to increase customer satisfaction underlying loyalty.
3. The research method and apparatus determines statistical indices that can be used to track the changes in customer satisfaction for an object (e.g., a business organization) over time.
4. The research method and apparatus can be used for contrasting loyal object customers with others (e.g., other customers that use a competing object).
5. The research method and apparatus can be used to quantify the contribution of key perceptual associations that correspond to customer decision structures.
6. The research method and apparatus substantially automates market research interviews so that such interviews can be effectively performed via a communications network such as the Internet with or without a human interviewer.
7. The research method and apparatus substantially automates market research the analysis of market research information obtained from market research interviews.

The market analysis system includes a method and apparatus for obtaining and evaluating interview information regarding a particular topic, (e.g., object) thereby determining significant factors that, if changed, are more likely to persuade the interviewees (and others with similar perceptions) to change their opinions or perceptions of the topic. The market analysis system includes four subsystems. A first such subsystem is an interactive interview subsystem (also identified by the product name StrEAMInterview and StrEAM*Interview herein) which includes a set of computer-based tools used to conduct rigorous interviews and capture results therefrom about topics and/or objects related to areas such as consumer market research for a particular product or service, voter analysis, opinion polls, et cetera. The second subsystem is an interview data analysis subsystem (also referred to as StrEAMAnalysis and StrEAM*Analysis herein) that includes an integrated set of software components for analyzing interview data obtained from, e.g., the interactive interview subsystem. The interview data analysis subsystem includes interactive software tools that allow a market research analyst to: (a) categorize the interview data in terms of meaningful categories of responses, such as Means-End chains as described in the Means-End Theory description of the Definitions and Descriptions of Terms above. Note that in at least some embodiments, such chains are of at least four in length; however, longer chains are within the scope of embodiments of the market analysis system disclosed herein). The third subsystem is an administrative subsystem (also referred to herein as StrEAMAdministration and StrEAM*Administration herein) which includes market research project planning, interview scheduling, and tracking the status of market research projects. The fourth subsystem is a user support subsystem (also referred to herein as StrEAMRobot and StrEAM*Robot) which includes functionality for automating the market research method and system disclosed herein such that an interviewer for conducting interviews is substantially (if not entirely) eliminated.

The interactive interview subsystem StrEAM*Interview is, in some embodiments, network-based such that the interviews can be conducted remotely via a telecommunications network (e.g., the Internet) in an interviewee convenient setting. The interactive interview subsystem provides automated assistance to an interviewer when conducting an interview. For example, not only are interview presentations (e.g., interview questions) provided to the interviewer, but also information for interpreting and/or classifying responses by an interviewee is provided substantially while such responses are being obtained by the interviewer. In particular, the interactive interview subsystem may assist in obtaining various hierarchical views of each interviewee's reason for having a particular opinion or perception of an interview topic/object. The interview presentations presented to each interviewee (also referred to as a "respondent" herein) are designed to elicit interviewee responses that allow one or more models to be developed of the interviewee's perceptual/decision framework as it relates to the object or topic that is the subject of the interview. In particular, open-ended questions may be presented to the interviewee, thereby allowing the interviewee greater flexibility of expression in providing insight into his/her perceptions of the object.

The interactive interview subsystem includes built-in quality control features which focus the interview on obtaining both complete and detailed levels of information about interviewee perceptions, and in particular, quality control features for substantially ensuring that all levels of individual ladders and/or chains (as these term are described in the "laddering" and Means-End Theory descriptions of the Definitions and Descriptions of Terms sections hereinabove) are addressed in the interviews. Accordingly, the result of these quality control features, when used in conducting an interview via a communications network (e.g., Internet), is significantly higher quality interview data as compared to traditional face to face market research interviews.

It is also an aspect of the interactive interview subsystem disclosed herein that it can be administered and analyzed, via Internet communications, wherein such communications may include: (a) real-time interactions with a trained interviewer, and/or (b) a substantially automated interviewing process (or portions thereof) wherein the process is conducted totally or substantially by networked computational devices. In particular, an embodiment of the market analysis system may be provided wherein an interviewer is substantially only required to communicate with an interviewee when interviewee responses are detected that indicate the interviewee is confused, and/or the interviewee's responses are inappropriate.

The market analysis system (i.e., StrEAM) disclosed herein may be applied to a wide range of research topics of interest beyond determining, e.g., key object factors and/or key perceptions of an object. For instance, embodiments of the market analysis system may be used to analyze or identify perceptions and/or beliefs of: employees, product distributors, investors (or potential investors), voters, competitors, and even parties that are generally considered to be disinterested. In fact, the market analysis system disclosed herein can be used to assess and/or identify beliefs, behavior, attitude, and/or loyalty in substantially any area where human decision making is heavily dependent upon beliefs, behavior, attitude, and/or loyalty. For example, the market analysis system may be used to assess and/or identify beliefs, behavior, attitude, and/or loyalty of customers and/or employees of such diverse firms as cosmetics companies, automobile manufacturers, direct selling companies, service stations, insurance agencies, automobile dealerships, and electrical and industrial distributors.

The market analysis system disclosed herein may also provide better direction in determining advertising for an object. In particular, the market analysis system can be used to derive or identify advertising that is more effective (and cost-effective) than heretofore has been possible. For example, the market analysis system can be used to develop or identify adverting having messages to which a particular targeted population is positively disposed. Additionally, the market analysis system disclosed herein can be beneficial in identifying public relation messages that can be used for: (i) retaining and/or hiring employees with desired attitudes or perceptions, (ii) retaining or attracting distributors, and (iii) retaining or attracting investors. In particular, such public relation messages may be directed to insights resulting from the use of various embodiments of the market analysis system disclosed herein.

The market analysis system disclosed herein is effective for the assessment of customer loyalty and satisfaction for an object whose market is being evaluated. The market analysis system includes techniques or methods for performing such assessments, and also includes various computational components for embodying the methods, and in particular, providing such components for performing customer loyalty and satisfaction assessments using the Internet and/or another ubiquitous communications network.

The market analysis system may determine the substantially loyal customer groups for an object being marketed, and contrast these loyal customer groups with less loyal customer groups. In particular, the market analysis system disclosed herein facilitates understanding what drives decision making in a customer population (i.e., the aggregate population of both customers and/or possible customers) when it comes to purchasing a particular object being marketed to members of the population. Typically, object purchase price sensitivity by the population and the beliefs of such population members about the object (e.g., quality, reliability, etc.) are the important factors for such decision making. For the present disclosure, price sensitivity and customer beliefs can be described as follows:

(a) Price sensitivity may be defined as the degree to which an expenditure (e.g., price or donation) is a barrier to object acquisition (e.g., purchase or contribution). Thus, for a given customer population, there is a first segment of the population for which there may be a price sensitivity barrier that is a "absolute" barrier; i.e., the product/service (more generally, object) is simply considered to be too expensive. For a second population segment there may be a price sensitivity barrier defined by these possible customers not deciding to spend their funds on the object. For example, many individuals could buy a jar of the finest caviar, and most choose to not do so. FIG. 2 is a snapshot of an example distribution of a population of possible customers.

(b) Regarding the distribution of customer beliefs about a specific brand of an object, one distribution might be as illustrated in FIG. 4. That is, some customers may view an object as inferior or unacceptable, some as comparable to competing objects in its class or acceptable, some may see it as better, and some may say they think it is superior, all things—including price—considered. Thus, a joint distribution (herein also denoted "StrEAM™ joint distribution") of possible customer beliefs and customer price sensitivities regarding an object, as shown in FIG. 5, may be output by the market analysis system disclosed herein. In particular, an embodiment of the market analysis system may identify not only important customer population segments (e.g., the typicall relatively small segment whose members believe that a particular object is superior AND that price is a minor consideration, i.e., upper left-hand portion of the sensitivity/beliefs matrix of FIG. 5), but also identify features or characteristics of the object that: (a) produce satisfaction in customers, and/or (b) if changed will enhance customer satisfaction with the object. Accordingly, the market analysis system disclosed herein is useful for understanding the reasons for customer loyalty to substantially any marketed object. For example, for an object identified as "Brand A" (FIG. 5), the present invention is useful for understanding the reasons for the loyalty of the customer population members represented by, e.g., the upper left-hand (non-shaded) four cells of the Joint Distribution of User's Beliefs and Sensitivities graph in FIG. 5. Additionally, the market analysis system provides the ability to contrast such loyal segments of the customer population (e.g., segments represented by the upper left-hand non-shaded four cells in FIG. 5) with customer population members represented by other (non-shaded) cells in FIG. 5. Thus, the market analysis system can be useful for determining strategic market positioning strategies that can induce less loyal members of a customer population to become more loyal to a particular brand or object, and thereby become classified in, e.g., the upper left hand four cells of FIG. 5.

One aspect of the market analysis system is that for a given market research issue/problem, a joint distribution (as in FIG. 5) of price sensitivity and conditional beliefs may be determined, wherein such a joint distribution for integration with traditional research methodologies. Utilizing such a joint distribution summary, in combination with standard attitudinal and behavioral measures, may give a researcher the opportunity to contrast key market or customer segments, thereby gaining an understanding as to what measures best account for differences between customer population segments.

The present market analysis system also provides a framework for a detailed Laddering interview process, wherein there are four (4) levels to the laddering interview process. That is, the level (or rung) denoted "consequences", in the means-end theory description in the Definitions and Descriptions of Term section above, is divided into two distinct categories of "Functional Consequences" and "Psychosocial Consequences" (as also described in the Definitions Description of Terms section). Symbolically this enhanced ladder or chain can be represented as follows:

Attributes→Functional Consequences→Psychosocial Consequences→Values

However, each category in this enhanced ladder may be itself a chain of a plurality of subcategories. Thus, a resulting ladder may have more than four rungs. However, preferably each ladder obtained by the Laddering interview process has at least one term corresponding to each of the above four categories of the enhanced ladder representation.

It is a further aspect of the market analysis system disclosed herein to enhance the laddering interview technique with an additional interviewing methodology. In some laddering interviews, beginning at the object attribute level and moving up the "levels of abstraction" to personal values, such interviews may not appropriately capture a respondent's decision making structure related to the object. For example, for market assessments of objects, such as cars, wherein many prospective customers are interested in the image projected by driving or owning certain car models, an additional/alternative interview methodology may be used, known as "chutes" herein. In the chutes interview methodology, one or more questions (i.e., Egosodic Valenced Decision questions as described in the Definitions and Descriptions of Terms section above) are directed to the interviewee for thereby obtaining a "top of mind" (TOM) response(s) related to the object being researched (or competitive object(s)). Once such a TOM response(s) is obtained, additional questions are posed to the interviewee, wherein these additional questions are intended to obtain interviewee responses that identify what features of the object (or competitive object(s)) that typically serve as the primary determinants of object choice, or choice of a competing object. By initializing the laddering process through Egosodic Valenced Decision Structure (EVDS) questions, the interviewee's general decision making process can be determined. Then, by going "down" the rungs of the laddering interview process for the object (e.g., product/service), more specific features of the object are identified that the interviewee associates with the TOM response. Additionally, by going "up" the rungs of the laddering interview process, a complete ladder of the interviewee's perception of the object can be developed. These decision networks can be developed individually for common TOM descriptors, yielding specific CDMs (i.e., customer decision map, see the Definitions and Descriptions of Terms section hereinabove), which represent decision segments.

Other benefits and features of the present invention will become apparent from the accompanying drawings and the description hereinbelow.

BRIEF DESCRIPTION OF THE DRAWINGS

FIG. 1 is a graph showing how customer loyalty affects a company's sales as the company's product market becomes increasingly competitive.

FIG. 2 is an example of a distribution of responses from a sampling of a customer population regarding the degree to which the price of a product (Brand A) drives the purchasing of the product.

FIG. 3 shows graphs that represent the progression of a market from the innovation stage (where a product is initially developed) to an undifferentiated market at t1 (where the product is initially commercialized and there is no substantially significant distinction between market competitors) to a segmented market at a later time t2 (wherein it is not uncommon for there to be three market segments: one segment of product providers emphasizing quality of the product, one segment of product providers emphasizing the value that customers receive from purchasing the product, and one segment of product providers emphasizing the low price of the product). In many cases, product providers emphasize the value received by customers purchasing their products.

FIG. 4 illustrates a distribution of customer beliefs about a specific brand of, e.g., a product (more generally an object).

FIG. 5 illustrates a representative customer population distribution, wherein customers have rated a product (Brand A) both on their belief in the quality of the product and to what extent price is a barrier in purchasing the product. Note, the upper right-hand cells corresponding to (Not a barrier, Superior), (Not a barrier, Good), (Minor barrier, Superior), and (Minor barrier, Good) are generally representative of the segment of the customer population having an important amount of loyalty to the product. Accordingly, the greater percentage of customers in these cells, the more the company providing Brand A is insulated from competitive market pressures.

FIG. 6 shows the hierarchical levels (i.e., rungs) of decision-making information that are used by individuals in making a decision, such as determining whether to, e.g., purchase a product or remain with a company. Note that the hierarchical levels shown here are denoted a "ladder".

FIG. 7 provides further information related to the four levels of decision-making reasons (i.e., a ladder) that customers give for purchasing (or not purchasing) a particular product brand. In particular, such decision-making reasoning is related directly to attributes of the product at the lowest level and, as the reasoning process moves up the levels, the reasons recited by customers become progressively more personal.

FIG. 8 shows some representative laddering decision structures that express choice determination for one beer brand over another in a set of beer drinkers.

FIG. 9 shows how the results (i.e., data) from interviews with a customer (beer drinking) population can be summarized or aggregated as a directed graph, denoted herein as a Customer Decision-making Map or CDM (also referred to as a "decision map", "solution map", or "ladder mappings"). The directed graph shown in the present figure represents the beer drinking population sampled in obtaining the laddering decision structures of FIG. 8.

FIG. 10 shows the high level steps performed by the market research method and system of the present invention. In particular, the present invention provides a novel methodology and corresponding computational system for identifying cost-effective aspects of a marketed object to change and/or emphasize (de-emphasize) so that additional market share is obtained and/or greater customer loyalty is fostered.

FIG. 12 is a summary of the reasons why members of a country club joined the club and their corresponding weekly usage of the club, wherein a marketing analysis of the club is performed using aspects of the present invention.

FIG. 13 shows the sub-codes (i.e., subcategories) of aspects of the country club with their respective percentages developed from the equity question responses for the two USAGE groups. Noteworthy is the "Light Users" (identified as the golf segment) largest negative of "Pace of Play," and the largest equity is the staff and level of service (ENVIRONMENT), in particular, for the "Heavy Users."

FIG. 14 shows a table having various values calculated by the present invention for features offered by the country club. In particular, the following values are shown: importance values (I) which are representative of the perceived importances of the various features provided by the country club; belief values (B) which are representative of how favorably various features of the country club are viewed (the higher the number, the more favorably the feature is viewed); equity attitude values (EA) which are relative rankings of the country club features wherein each EA is derived as a composite function of both a corresponding importance and a corresponding belief. Additionally, the present figure shows computed values (denoted leverages or leverage indexes) that are indicative of the potential change in the equity attitude (EA) that may be gained by country club management concentrating club improvement efforts on the club features/areas that have the high leverage values.

FIG. 15 is a table showing the distribution of museum supporters' answers to the question: "Why did you join the Circle of Friends?". Additionally, the table shows, for each answer, the extent to which the supporters providing the answer use or access the museum facilities/events.

FIG. 16 shows a summary contrast of the PAST and FUTURE TREND anchor questions wherein museum supporters are asked about their past and anticipated future participation in museum activities.

FIG. 17 shows a table similar to the FIG. 14 which identifies the areas within the museum operations, which if improved, are likely to have the greatest positive affect on museum supporters' views of the museum.

FIG. 18 shows a table of museum supporter responses to the question: "What is your primary source of museum activity information?".

FIG. 19 is a table summarizing the responses of patients of a hospital regarding their satisfaction with various groups and/or facilities of the hospital.

FIG. 20 is a table summarizing, for the hospital nurse group, the nurse subareas (also denoted "sub-codes") that hospital patients mentioned (either positively or negatively). Additionally, the table provides the importance values (I) and the belief values (B) for each of the nurse subareas.

FIG. 21 provides further illustration of a result of the analysis techniques of the present invention. In particular, this figure is representative of various diagrams that may be generated by the invention, wherein two population groups (i.e., "customer population" groups) have their decision-making reasons (e.g., for staying with or leaving a direct sales company as a sales associate) categorized according to whether their perception of the company is positive or negative as it relates to each decision-making reason. Thus, distinguishing decision-making reasons between the two population groups would be classified in the upper left-hand cell (labeled "Leverageable Equity"), and the lower right-hand cell (labeled "Competitive Equity") of the figure. For example, in the case of company loyalty, the decision-making reasons for the upper left-hand cell are the reasons that a population group with loyalty to the company perceives the company as highly positive, while the less loyal population group perceives the company as substantially less positive (i.e., "low" in the present figure). Conversely, the decision-making reasons for the lower right-hand cell are the reasons that the less loyal population group perceives the company as highly positive, while the more loyal population group perceives the company as substantially less positive (i.e., "low" in the present figure). Accordingly, by generating diagrams such as the one in the present figure, the present invention allows business management to better determine marketing and/or business strategies that: (a) can potentially change the perceptions of potential customers so that, e.g., their decision-making reasons become more like those of a loyal customer population, (b) change the object (e.g., product, brand, company, etc.) so that the decision-making reasons in the lower right-hand cell move to another cell, and preferably to the upper left-hand cell, and/or (c) select individuals whose decision-making reasons are more consistent with the loyal population group.

FIG. 22 shows a "customer decision map" (CDM) summarizing various combinations of decision-making chains determined according to the present disclosure for both the direct sales associates that are intending to stay with the direct sales company, and the direct sales associates that are considering leaving the company.

FIG. 23 is an instance of the diagram of FIG. 21 that identifies the decision-making reasons used by direct sales associates that are intending to stay with the direct sales company.

FIG. 25 shows the five decision-making chains obtained from "top of mind" (TOM) questions related to purchasing automobiles.

FIG. 26 is an instance of the diagram of FIG. 21, wherein FIG. 26 shows the distinguishing decision-making reasons between respondents who are first time buyers of an automobile having a particular nameplate, and others that "considered, but rejected" automobiles having the particular nameplate.

FIG. 28 shows an alternative decision-making hierarchy that may be used with the present invention.

FIG. 35 shows a user interface popup menu available to an interviewer using the present invention, wherein the menu provides the interviewer with assistance in proceeding with the interview.

FIGS. 37A through 37C provide descriptions about the types of interview questions that the present invention supports.

FIG. 42 shows another screenshot of the user interface for the Configure Analysis 3968 tool.

FIG. 56 shows another illustrative display provided to an analyst by the decision analysis tool 3966, wherein from this display the analyst is able to view an interview data set for generating decision models 3944 and solution maps 3940.

FIGS. 59 through 66 show illustrative reports that can be generated by the analyze decisions tool 3996. Note, the reports shown in FIGS. 59 through 66 are for interview data obtained from interview sessions with registered voters just prior to the presidential election of 2004, wherein the interviewees were queried as to their perceptions of the two candidates George W. Bush, and John Kerry.

DETAILED DESCRIPTION

(1) Introduction and Examples

Figure 11A:
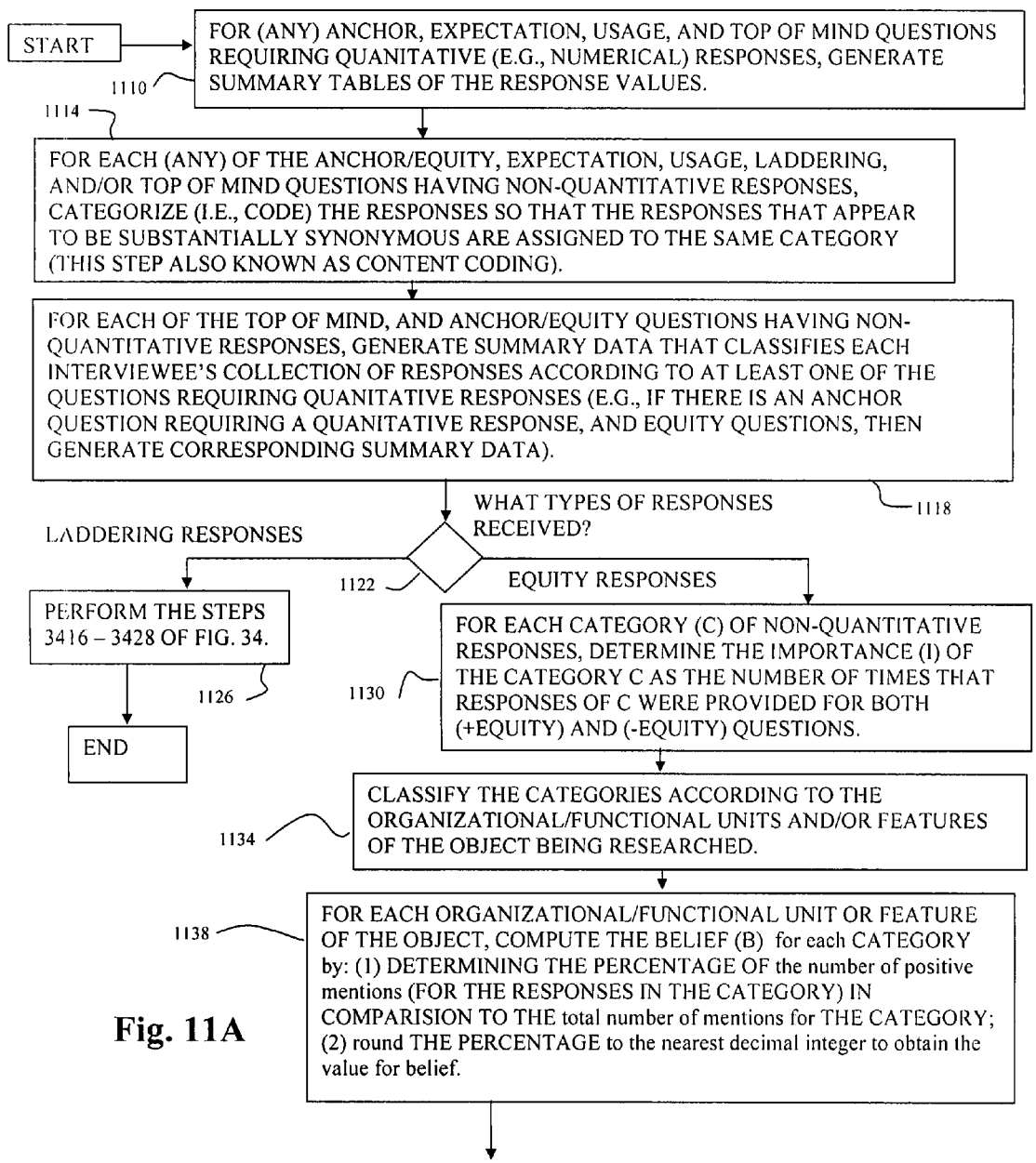
FIGS. 11A and 11B illustrate the steps of a flowchart showing additional details of the steps performed by the present invention.

The present disclosure is substantially based on a market research theory termed means-end theory (as described, e.g., in the following references incorporated herein by reference: Howard, 1977, Ref. 12 of the "References" section hereinabove; Gutman and Reynolds, 1978, Ref. 10 of the "References" section hereinabove; Gutman, 1982, Ref. 9 of the "References" section hereinabove). Means-end theory hypothesizes that end-states or goal-states (defined as personal values) serve as the basis for the relative importance of attributes, e.g., of a product or service. For instance, attributes of a product or service are hypothesized to derive their importance by satisfying a higher-level consumer need or goal. Said another way, such attributes have no intrinsic value other than providing the basis for a consumer to achieve a higher-level need or goal. For example, "miles per gallon" is an attribute of automobiles, but the importance of this attribute to a particular consumer may derive from a higher-level consumer need or goal of "saving money" which, in turn, may be personally relevant to the consumer because it enables the consumer to "have money to purchase other consumer items" or perhaps "invest money." That is, a hierarchy of progressively more personally important goals and needs (and ultimately personal values) can be identified for the consumer, wherein such a hierarchy (also referred to as a "decision-making hierarchy" herein) can be used by an embodiment of the market analysis system for modifying consumer's perception of a particular object, or the perception of other consumer's having a similar decision-making hierarchy.

Accordingly, means-end theory postulates that it is the strength of a person's desire to satisfy these higher-level goals or needs (and ultimately values) that determines the relative importance of product/service attributes (more generally, object attributes). Thus, identification of such higher-level goals or needs can translate directly into understanding the basis of customer decision-making (a more detailed discussion of means-end theory can be also found in Reynolds and Olson, 2001, Ref. 36 in the "References" section hereinabove.

One methodology used to uncover such means-end higher-level goal or value hierarchies is termed laddering as described in the Definitions and Descriptions Terms section hereinabove. The laddering methodology models both the structure and content of a person's mental associative network of cognitive meanings, and thus, models a basis of decision-making. The present market analysis system provides an effective way to identify such personal hierarchies, e.g., interviews of a target customer population are conducted for: (a) obtaining, for those interviewed, the most important (object preference discriminating) attribute(s) that underlie object selection, and then (b) laddering such attributes to higher levels of personal importance by asking alternative forms of a question such as: "Why is that important to you?". Thus, in performing [the] steps (a) and (b) immediately above for each interviewee (also denoted "respondent" herein), the interviewee's personal cognitive decision-making structure can be modeled by the market analysis system disclosed herein. In particular, a four-level goal/value hierarchy, as shown in FIG. 6, has been determined to be effective for modeling personal decision making regarding, e.g., the purchase or selection of a particular product or service (more generally, object). Accordingly, the market analysis system disclosed herein can identify the personally important attributes of an object disclosed by an interviewee (as the first level of a ladder); secondly, the personally important one or more functional consequences related to the interviewee consuming and/or using the object may be determined (as the second level of the ladder); thirdly, one or more psycho-social consequences that the interviewee obtains from consuming and/or using the object may be determined (as the third level of the ladder); and finally, the personal values and/or end-states (goals) that the interviewee is motivated to obtain may be determined. Of course, the market analysis system is not limited to constructing such ladders by sequentially determining progressively higher level aspects of object personal importance. Indeed, an interviewee may provide, e.g., a functional consequence of an object first, and accordingly, the market analysis system may be used to elicit further interviewee responses regarding object attributes perceived to be associated with the functional consequences, as well as characterizations of the associated more personally important psycho-social consequences, and personal values.

An illustrative embodiment of the laddering process is represented in FIG. 7. Note that, while implication goes "up" the rungs of the ladder, relevance (also denoted as importance in the art) goes "down" the rungs of the ladder (e.g., a psycho-social consequence derives its relevance or importance from functional consequences of the object being researched). Thus, a primary aspect of the market analysis system is to determine such ladders, wherein each such ladder models at least a portion of an interviewee's decision-based processes that link attributes of an object to personal values of the interviewee. Moreover, the market analysis system disclosed herein may also determine which rung of such a ladder is the most important for a particular (and/or for a particular target population whose decision-making processes are being researched). Additionally, the market analysis system may be used to identify why a particular rung of a ladder is most important to an interviewee.

Additionally, the market analysis method and system disclosed herein is useful for understanding the motives of why a consumer purchases (or does not purchase) a particular product or service. In particular, the market analysis system may be used for identifying consumer perceptions related to price versus quality tradeoffs for a given object. For example, as shown in FIG. 3, once a product or service is initially developed (at time t0), it is not uncommon for a market to subsequently progress from:

(a) an undifferentiated market (at time t1) as shown in graph 304 (FIG. 3), wherein the distribution of the product/service providers along an axis 308 from emphasizing product/service quality to emphasizing product/service value that consumers receive from purchasing the product/service, to emphasizing the quality of the product/service is characterized by single hump, to (b) a segmented market (at time t2) as shown in graph 312, wherein the product/service providers have substantially differentiated themselves into three categories: one segment of product/service providers emphasizing quality of the product/service, one segment of product/service providers emphasizing the value that customers receive from purchasing the product/service, and one segment of product providers emphasizing the low price of the product.

Accordingly, the market research system disclosed herein can be used to determine consumer decision-making perceptions that cause a consumer (or target population of consumers) to purchase products/services from one of the segments of a segmented market as opposed to another of the segments.

In FIG. 8, some representative laddering decision structures are presented that express choice determination in a set of beer drinkers. Note that the ladders shown in this figure (i.e., ladders 804 through 812) have more than four rungs. To further understand customer decision structures regarding a particular object (e.g., beer), a summary of such laddering decision structures may be desirable. In particular, interview results (obtained by the market analysis system disclosed herein) from a sampling of a target customer population can be summarized or aggregated in a directed graph, denoted herein as a Customer Decision-making Map (CDM), such a directed graph 904 (also referred to as a "decision map") is shown in FIG. 9 representing the beer drinking population sampled in obtaining the illustrative laddering decision structures of FIG. 8. That is, by aggregating or combining ladders resulting from interviews of a relevant sample of consumers, a customer decision map (CDM) of a product/service (more generally, object) category can be constructed. Such a summary CDM contains the key discriminating attributes, functional consequences, psycho-social consequences and personal values, along with the dominant pathways that represent the associative decision networks of the customer population interviewed. Note that in FIG. 9 additional terms are included that are not in the ladders of FIG. 8.

Figure 29:
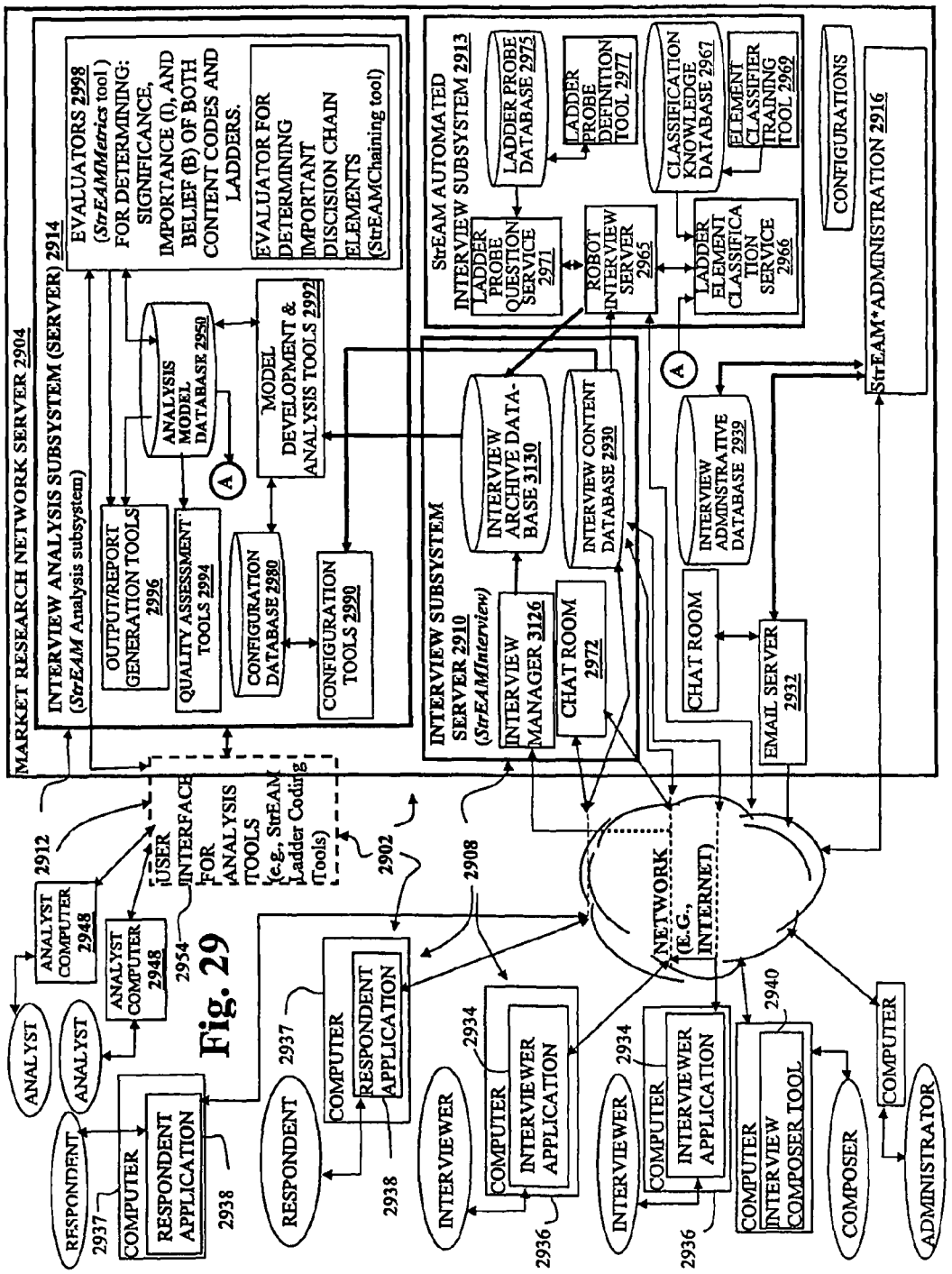
FIG. 29 is a block diagram of a network embodiment of the market analysis system, wherein the network may be the Internet (or another network such as an enterprise specific wide area network, a virtual private network, a military network).

Before describing the computational and network features of the market analysis system, a description of the methodologies used by this system, as well as a number of market research examples, will be provided, wherein the methodologies and examples are illustrative of the use of the market analysis system. In particular, these methodologies and steps are illustrated in various market research study examples hereinbelow. Note that each of the market research study example hereinbelow may in performed by the market analysis system embodiment as shown in FIG. 29 which is described below.

At a high level, the market research method (more generally, "perception" research method) upon which the market analysis system disclosed herein is based performs at least the first four of the five steps of FIG. 10. In step 1000 of FIG. 10, a research problem/issue is defined (i.e., framed) regarding a particular object such that such framing results in at least some (if not most of the following):
  (a) identification of a relevant group or population of individuals, whose perception of an object (related to the problem/issue) is to be investigated;
  (b) identification of a relevant object related characteristic(s) of the group to be studied, e.g., characteristics such as: (i) loyalty of group members to the particular object, (ii) light versus heavy use of the particular object, (iii) satisfaction versus dissatisfaction (or levels of satisfaction versus levels of dissatisfaction) with the particular object, and/or (iv) favorably disposed to the particular object versus not favorably disposed to the particular object);
  (c) identification of a relevant characteristic(s) of the context and/or environment of problem/issue, e.g., the quality of service provided by the object being researched, the safety provided by the object being researched, or the leadership abilities of the object being researched;
  (d) identification of at least one alternative that competes with the particular object for desired favorable responses from the group, e.g., a competing product, a competing political candidate, a competing service, a manufacturer, etc.

An important aspect provided herein is that the answers to only four market issue/problem "framing questions" in step 1000 provide substantially all the marketing information needed to develop a sufficiently clear understanding of the market issues to be investigated so that appropriate market research interview questions can be constructed. Accordingly, it is an important aspect disclosed herein that only answers to the four framing questions are required to address a marketing issue/problem, if the issue/problem is framed in terms of the customer decision-making that underlies satisfaction, and ultimately, loyalty. In one embodiment, these framing questions are:
  1. Who are the relevant customers?
  2. What are the relevant customer behaviors (and attitudes) of interest?
  3. What is the relevant context (i.e., customer environment) within which the issue/problem occurs?
  4. What are the (future) competing choice alternatives for customers?

Once a concise statement of the issue/problem to be researched is generated from the answers to such framing questions, interview questions then can be generated in step 1004. That is, research (i.e., interview) questions are developed according to the framing of the research problem/issue. Note, it is an aspect of the present market research method that the interview questions developed include substantially different questions from the types of questions asked in most prior art market research systems and methodologies. In particular, various "equity" questions may be constructed that are intended to elicit interviewee responses in order to identify aspects of the particular object and/or the problem/issue that could change interviewee perception of the object (positively and/or negatively). Additionally or alternatively, various "laddering" questions may be constructed for obtaining means-end chains of interviewee perceptions related to the object and/or the problem/issue, wherein collections of such chains or ladders can provide insight into the perceptual framework of the group.

It is an important aspect of the market research method disclosed herein that a substantially reduced number of interview questions are generated for presentation to members of the target group, in comparison to the number of questions likely required if a standard attitudinal market research survey were conducted, wherein 50 to 100 or more questions are likely to be generated in order to assess the beliefs and importances of a predetermined set of attribute descriptors. In particular, the market research method (and corresponding market analysis system) disclosed herein may present approximately 15 to 30 questions to interviewees including at least some of the following questions (or their equivalents):
  1. One or more information questions for obtaining relatively factual information related to an object being researched, such as:
     a. What car (more generally, object brand) did you buy last?
     b. In the last 12 months about how many museum (more generally, object related) activities and events did you attend?
     c. In an average week in the summer, about how much do you utilize each of the club's (more generally, the object's) facilities?
  2. One or more "expectation" questions, inquiring of the interviewee (i.e., respondent) one or more expectations related to the object being researched.
  3. One or more "anchor" questions, inquiring of the interviewee as to his/her satisfaction with the object being researched.
  4. For one or more of the anchor questions, two "equity" questions are asked the interviewee as follows.
     a. A question (identified as a "+EQUITY question", or a positive equity question hereinbelow) that requests the interviewee to identify at least one of the most important positive aspects of the object being researched, wherein the aspect is the basis for the interviewee rating the object at an importance of "X" rather than a predetermined lesser importance of, e.g., "X−1" (on a satisfaction scale where larger values correspond to a greater satisfaction with the object).

b. A question (identified as a "−EQUITY question", or a negative equity question hereinbelow) that requests the interviewee to identify at least one of the most important changes to the object being researched, wherein such a change could make or induce the interviewee to change his/her satisfaction rating of the object from "X" to a predetermined greater importance of, e.g., "X+1" (on a satisfaction scale where larger values correspond to a greater satisfaction with the object).

Note that it is within the scope of market research method (and corresponding market analysis system) disclosed herein that: (i) the equity questions may be phrased in various ways, (ii) the predetermined increment (e.g., −1 or +1) above may be any discrete increment corresponding to a scale of interviewee satisfaction, (iii) the increment used in each question need not be predetermined, and need not be a fixed increment, and (iv) in at least one embodiment, there may be no increment at all. Regarding (iv), the above equity questions may be phrased as follows:

c. A question that requests the interviewee to identify at least one of the most important positive aspects of the object being researched, wherein the aspect is the basis for the interviewee rating the object at an importance of "X" rather than a lesser importance (on a satisfaction scale where larger values correspond to a greater satisfaction with the object).

d. A question that requests the interviewee to identify at least one of the most important changes to the object being researched, wherein such a change could cause or induce the interviewee to change his/her satisfaction rating of the object from "X" to a greater importance (on a satisfaction scale where larger values correspond to a greater satisfaction with the object).

5. One or more laddering questions, for obtaining, i.e., at least one ladder of interviewee response corresponding to the ladder levels (described hereinabove):

6. One or more top of mind (TOM) questions, wherein a first of these questions (referred to in the art as an Egosodic Valenced Decision Structure question) asks the respondent a "what comes to mind" question when the respondent reflects on features and/or issues related to an object being researched. Subsequently, there may be one or more follow up questions (referred to in the art as valence questions) to obtain a response(s) that indicate whether the response to the "what comes to mind" question is positive or negative for the respondent. Following such a latter question, an additional question of "Why?" the response to the "what comes to mind" question is positive or negative may be asked. For example, in response to the above "what comes to mind" question, a respondent might reply "maneuverability" (e.g., wherein the object is a surfboard), and to the question regarding whether the respondent's reply is positive or negative, the respondent might answer that it is positive. Finally, in reply to the "Why?" question, the respondent may state: "the surfboard's short length".

Note that once such TOM-question responses are obtained, laddering questions may follow in order to construct a ladder of the respondent's decision structure related to the object of the TOM questions.

Accordingly, in step 1004, interview questions are constructed that are intended to elicit from each interviewee at least some (if not most of the following):

(a) Responses related to the interviewee's background, e.g.,
  (i) demographics of the interviewee, e.g., interviewee sex, marital status, home location, number of children, education, age, occupation, financial status, as well as personal preferences (or dislikes) such as preferred sports, preferred vacation spots, preferred types of cars, dislike of cigarettes, etc.;
  (ii) use of the particular object, e.g., frequency of use, circumstances when used, etc.;
  (iii) why the particular has been be chosen or not chosen;
  (iv) activities related to a competing object, e.g., purchase of a competing product or service, or voting for an alternative candidate, etc.;

(b) For each of one or more characteristics of the particular object, wherein the characteristic is of interest, and/or for one or more trends regarding interviewee use or preference for the particular object, anchoring questions are constructed. Accordingly, the responses (to such questions) establish each interviewee's rating or assessment of the characteristic or trend.

(c) For each of one or more characteristics of the particular object, and/or one or more trends rated or assessed by the interviewee, responses to corresponding equity questions, wherein the responses result in obtaining at least some (if not most of the following):
  (i) One or more identifications from the interviewee of one or more attributes of the particular object (or trend) that prevents the interviewee from rating the particular object (or trend) lower than his/her stated rating; e.g., construct a positive equity question to elicit at least one attribute of the particular object (or trend) driving the interviewee's rating of the particular object (or trend);
  (ii) One or more identifications from the interviewee of one or more attributes of the particular object (or trend) that prevents the interviewee from rating the particular object (or trend) higher than his/her stated rating; e.g., construct a negative equity question to elicit at least one attribute of the particular object (or trend) driving the interviewee's rating of the particular object (or trend);

(d) Responses for identifying one or more personal hierarchies (i.e., ladders) of the interviewee's perceptions of the particular object, wherein each such hierarchy includes interviewee responses identifying substantially each of the following (rungs of the ladder):
  (i) An attribute of the particular object (or of a competing object);
  (ii) One or more consequences related to activities with the particular object, wherein the consequences are perceived as attributable to the attribute identified in (i) immediately above; e.g., such consequences may be one or more perceived functional consequences resulting from use/preference of the particular object due to the attribute, and/or one or more perceived psychosocial consequences resulting from use/preference of the particular object due the attribute.
  (iii) One or more interviewee personal values reinforced by the use of (or preference for) the particular object, and/or personal goals perceived to be advanced by the use of (or preference for) the particular object.

Once the interview structure and content is determined (including constructing the questions of step 1004), in step 1008, interviews are conducted with individuals of the target customer population, wherein responses to the questions developed in step 1004 are obtained. In one embodiment, +equity and −equity questions are asked the interviewees. Alternatively/additionally, laddering questions may be asked interviewees. Then, in step 1012, the question responses are analyzed according to the novel techniques and methodologies described hereinbelow (and in FIGS. 11A and 11B) for determining one or more of the following: (a) the perceptual framework of how the target group perceives the particular object being researched, (b) the relative importance of a change in various aspects of the particular object being researched, and/or (c) the relative importance of a change in various marketing aspects (e.g., advertising) of the particular object being researched.

Finally, in step 1016, strategic decisions can be made by those responsible for proposing how to address the problem/issue.

Thus, by determining the values of a target population group, marketing and/or advertising presentations may be developed that take existing features of the object and present them in a way that emphasizes their positive relationship to the values of this target group. Optionally, the perceptual framework of the target population group also may be used to determine how to most cost effectively enhance or modify the object (or alleviate the problem/issue) so that it appeals more to the target population group (i.e., is more consistent with the decision chains of the target population group).

(1.1) Market Research Examples

The six market research examples hereinbelow illustrate (a) how to develop interview questions for use in interviewing members of a target population group according to various embodiments of the market research system disclosed herein, and (b) how to analyze the interview responses therefrom according to the steps of the flowchart from FIGS. 10 and 11A-B. Note that the following first two examples (i.e., a resort market research example, and a museum market research example) illustrate how the market research method and system of the market research method (and corresponding market analysis system) can be used to determine the key underlying decision elements within the decision structures of customers/clients that have the highest potential to increase customer/client satisfaction and thereby increase loyalty.

(1.1.1) Resort Market Analysis Example.

A marketing manager at a golf and country club in an exclusive mountain resort area with little or no competition is confronted with the situation that several new private and semi-private golf courses are in the planning stages, with two already under construction. The manager is worried about the competitive forces in the relatively small marketplace, that will be created by the new competitions' price points, both below and above his current pricing level (recall the initial market evolution diagram in FIG. 1).

Problem framing. The manager first defines the business problem in terms of answering the four framing questions:

1. Who are the relevant customers?

Answer: Current members.

2. What are the relevant behaviors (and attitudes) of interest?

Answer: Understanding what key elements drive the level of satisfaction with current resort facilities, which necessarily underlies loyalty, thereby minimizing the likelihood of switching.

3. What is the relevant context (customer environment)?

Answer: The resort membership is comprised of 85% non-resident members who come for the summer to play golf. Their financial means are quite significant and price would have little barrier to switching memberships or joining another club.

4. What are the (future) competing choice alternatives?

Answer: Five clubs are coming on line in the next four years. The first two will open within one year and will have initiation fees (price points) that are both higher and lower than the existing club's fee structure. Of the three new clubs in the planning stages, two will be at a significantly higher price point.

From the answers to the above framing questions, the market research problem is stated as follows:

For purposes of planning and budgeting for the next year, what key marketing elements, programs, and facilities of the resort should be focused upon to improve the satisfaction level of the current membership, thereby minimizing the likelihood of member switching when the new clubs open?

Note: The phrases in italics within the above problem statement are taken directly from the answers to the framing questions above.

The specificity of the problem statement above provides the manager (and/or an interview question designer) with the needed subject matter and focus to generate interview questions accordingly to the present invention. In particular, the following questions are representative of interview questions according to the present invention.

1. EXPECTATION question: Why did you initially join the club?
2. USAGE question: In an average week in the summer, about how much do you utilize each of the club's facilities?
3. ANCHOR question:

Overall, how satisfied are you with the club on the following scale?

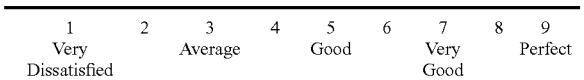

Note: This question could additionally be made specific to each area of the club, if desired (e.g. dining, golf, tennis, pool, etc.).

4. +EQUITY question: What is the single most important positive aspect of that club that is the basis for you to rate satisfaction the way you did? More specifically, what is the one thing that caused you to rate it a (X) and not (X−1)?
5. −EQUITY question: What is the single most important change the club could make to increase your satisfaction level one scale point?

By asking questions such as the five listed above, the members provide direct insight into what specifically is important to them for increasing their level of satisfaction, which is the essence of the management question. The member's answers, when summarized, reflect the most leverageable aspects of the club, in terms of increasing the overall member satisfaction level.

Data Analysis Steps.

Once a statistically significant number of club member responses are obtained, the following data analysis steps are performed.

Step 1. Prepare a statistical summary of the USAGE and ANCHOR questions. Note FIG. 12 is illustrative of such a summary.

Step 2. Content analysis. All customer responses for the three qualitative questions (1, 4 and 5) are grouped into homogeneous categories of meaning (Reynolds and Gutman, 1988, Ref. 24 of the "References" section); i.e., coded. Summary frequencies and percentages corresponding to each set of content codes are computed for each question.

Step 3. For question 4 (+EQUITY, perform StrEAM™ Equity Leverage Analysis (ELA) which translates the equity questions into an attitude research framework (e.g., Importance and Beliefs as described in the Definition and Description of Terms section hereinabove), which additionally permits the computation of potential leverage gained if specific changes are made in, e.g., operation of the club. Equity Leverage Analysis, as used herein, is a methodology that assigns weights to key attitudinal elements that underlie dimensions of interviewee interest, e.g. satisfaction. By using the precepts of attitude theory, analysis of question responses can be used to impute: (i) "Importance" and Belief (e.g., indicative of a percentage representing the overall proportion of positive mentions) rescaled to, e.g., a 0 to 10 range. Using these measurements as a basis, the potential improvement gained from addressing the negative barriers to increase the assessment of the dimension of interest can be estimated. Importantly, the ELA measurement system avoids violations of the latent assumptions underlying traditional attitude measurement.

The ELA performs the following substeps:

a. Determine a classification or content code for classifying object attributes (i.e., club attributes in the present context) mentioned by respondents; e.g., such a classification is determined from the frequency of mentions by the interview respondents as one skilled in the art will understand. In the present example, the content codes are shown in FIG. 13 grouped in higher level categories of: GOLF, ENVIRONMENT, DINING, TENNIS, and OTHER, such higher level categories may be determined by reviewing the content codes, and grouping such content codes according to functional relationship, preferably as perceived by the respondents. Note that such higher level categories may be identified by the respondents as higher level content codes.

b. Determine the percentage that each content code is mentioned from the responses to both of the two equity questions 4 and 5 hereinabove. Such percentages provide quantitative measurements of the relative importance (I) of each of the content codes. For example, the content code of "Service" was mentioned 12 (=3+9) times with 3 mentions being positive. So, since the total number of mentions is 200 (=100+EQUITY mentions+100−EQUITY mentions) the relative importance is 6% as shown in FIG. 14.

c. Determine a relative importance (I) for each of the higher level categories. Note that the category of "Member activities" of FIG. 12 is subdivided into the categories of "ENVIRONMENT", "DINING", and "OTHER" in FIGS. 13 and 14. Note, various computations can used to compute relative importance. For example, instead of relative importance being linear with the number of mentions, positive may be computed as a monotonically increasing function such as sigmoid function, or a logarithmic function. Moreover, the mentions used can be obtained from interviewee responses to questions other than the +Equity and −Equity responses. For example, questions such as: "What characteristics of the club are worth listing? Please list them.".

d. For each content code, compute a belief (B) by, e.g., determining a percentage of the number of positive mentions relative to the total number of mentions for the high level category containing the content code; i.e., determine the number of code mentions obtained as responses from the +Equity question. Then divide the percentage result by 10 and round to the nearest decimal integer to obtain the value for Belief in the range of 0 to 10. For example, for the "course condition" content code, FIG. 13 shows that there was 21 positive mentions out of 35 total mentions for the GOLF higher level category, thus, resulting in the percentage 60%, which is then divided by ten to obtain the value 6 shown in FIG. 14. Note, various computations can used to compute Belief. For example, instead of Belief being linear with the number of positive mentions, Belief may be computed as a non-decreasing function such as sigmoid function, or a logarithmic function.

e. For each content code, compute an Equity Attitude (EA) measurement by multiplying the content code's importance (I) by its corresponding Belief (B) to obtain a raw equity attitude. Then determine a total of the raw equity attitude values over all content codes, and then for each individual content code compute an Equity Attitude as a percentage of the total of the raw equity attitude values. For example, the total raw equity attitude from FIG. 14 is 518 (=(17*6)+(13*0)+(10*7)+(21*8)+(15*6)+(7*5)+(6*3)+(3*0)+(2*10)+(3*5)+(5*0)=102+70+168+90+35+18+20+15).

Thus, a percentage can be obtained for each content code by dividing its raw equity attitude by the total raw equity attitude, multiplying by 100, and then rounding to the nearest integer value. For example, for the course condition content code, the resulting Equity Attitude is determined as follows: [(17*6)/518]*100=19.69 which rounded off to the nearest integer gives 20.

f. Compute a leverage value ($\Delta L$) for each content code by assuming that it is generally reasonable that the corresponding Belief value (B) can be increased by one half of the difference of 10−B. Note that the rationale for one half the difference is based upon the idea that if management focuses on one specific area, such an increase in the Equity Attitude is achievable. Said another way, the units of incremental gain across dimensions are assumed to be defined as one half of the difference to 10 (i.e., the maximum Belief value). However, alternative computations for $\Delta L$ are within the scope of the present disclosure. For example, other functions that do not decrease as importance increases, and do not increase as Belief increases may be used. In particular, it is preferred that such a function monotonically increases with importance increases, and monotonically increases as Belief decreases. Thus, the following alternative leverage values may be computed:

I*([max Belief value]−B)/K, where K>0;

I*(1−[1/[1+e$^{(-B)}$]];

Etc.

g. Rank the Leverage values (ΔL), and have management focus their efforts on increasing customer satisfaction in those functional areas having the highest Leverage values.

Thus, review of the output from ELA permits management to see how well each functional area is perceived by the respondents via the Equity Attitude values, and to focus upon the key tactical and strategic issues that will raise the average level of satisfaction, for example, one level (ΔL).

If importances were asked directly, general member activities would appear as the highest scoring reason, with golf being second (FIG. 12). The USAGE split at 3+ occasions per week, indicates that the "Light Users: (1-3)" are primarily golfers. FIG. 13 presents the sub-codes (i.e., subcategories) with their respective percentages developed from the equity question responses for the two USAGE groups. Noteworthy is that for the "Light Users" (in the golf category), the largest negative is the "Pace of Play," and for any category, the largest positive equity is the staff and level of service (i.e., ENVIRONMENT), in particular, for the "Heavy Users."

It is important to note that although the present example refers to the subcategories that make up each content code as a "functional area", it is within the scope of the present disclosure that such subcategories can be determined by other criteria than function. For instance, the description and steps for performing the ELA are equally well suited to identifying the characteristics of a political candidate that if changed would yield the most favorable response from voters.

Management Direction.

The management problem is determining which areas to focus upon in order to create more loyalty with the membership, thereby minimizing the likelihood of switching. Based upon the Leverage Analysis (e.g., FIG. 14), the three areas of change are (Note: the specific directions come from the qualitative comments obtained from customers):

Pace of play:

Increase spacing of tee times.

Develop rigorous course marshal schedule.

Provide fore caddies for each group.

Course condition (taken from qualitative responses):

Redo tee boxes, sod where needed.

Adjust watering system to minimize wet spots.

Initiate ball mark repair program, including total repair function for crew every evening.

Facilities (taken from qualitative responses):

Repaint walls with "warm" colors.

Add "warm" accessories, like rugs and art work.

(1.1.2) Museum Market Analysis Example.

A marketing manager for a national museum is concerned about reduced member participation over the last year (−15%) in sponsored events and exhibitions. The manager knows how vital membership "donations" are to the museum. In fact, such donations account for 50% of the gross operating budget with the remaining monies coming primarily from admission fees. As member participation falls, the manager fears donations will also fall, resulting in severe financial problems. A related concern of the manager is: What is the most effective manner in which to communicate with the membership?

Problem framing. The manager first defines the business problem in terms of answering four general framing questions.

Who are the relevant customers?

Current members that have at least maintained their level of participation and say they will continue to do so. (SAME)

Current members that have decreased their level of participation or anticipate they will do so in the future. (DECREASE)

What are the relevant behaviors (and attitudes) of interest?

Understanding why the loyal group within the membership continues to participate at the same or higher levels (EQUITY), and the reasons underlying why the decreasing loyalty group is participating less (DIS-EQUITY).

What is the relevant context (customer environment)?

The local economy is experiencing a downturn, leading to a moderate decrease in philanthropic activity.

What are the (future) competing choice alternatives?

Primarily, other museums both within and outside the geographic area. Second are other philanthropic activities.

The management problem is stated as follows:

For the purpose of developing next year's activity and event schedule, identify what areas, activities and communications, should be focused upon to arrest and reverse the downward trend in member participation levels by the current membership.

Note: The key phrases (in italics) within the management problem statement are derived from the answers to the relevant framing questions.

The specificity of the problem statement provides the manager with the needed focus to answer the management question, as opposed to a standard attitudinal survey gathering attitudes (beliefs and importances) toward a predetermined set of current and potential museum activities. In addition, by conducting the research in this format, much of the bias common to standard attitude research is avoided, in particular, the social demand influences.

Research Questions.

1. EXPECTATION question: Why did you initially join the museum's Circle of Friends?

2. USAGE question: Last year about how many museum activities and events did you attend?

3. PAST TREND ANCHOR question:

| Over the past 12 months, to what degree has your participation level in the activities at the museum changed? | | | | |
|---|---|---|---|---|
| A LOT LESS | A LITTLE LESS | ABOUT THE SAME | A LITTLE MORE | A LOT MORE |
| − − | − | = | + | ++ |

4. FUTURE TREND ANCHOR question:

| In the next 12 months, what do you anticipate will be the change in your level of participation in museum activities? | | | | |
|---|---|---|---|---|
| A LOT LESS | A LITTLE LESS | ABOUT THE SAME | A LITTLE MORE | A LOT MORE |
| − − | − | = | + | ++ |

5. +EQUITY question: What is the most important reason for your participation in museum activities?

6. −EQUITY question: What is the most important single change you would like to see in the activities offered by the museum that would result in your increased participation?

7. How do you learn about the offerings, events and activities of the museum?

By asking the questions in this manner, the members provide direct insight into what specifically is important to them, with regard to their current participation level, and what changes or additions they would like to see to increase their participation level (satisfaction).

When these customer inputs are contrasted by the two loyalty groups, SAME versus DECREASE, the strategic equities (+ and −) underlying participation can be identified and used to develop the design of future museum activities. In addition, the amount of participation question (USAGE) also permits another set of analysis contrasts to determine if there are differences between these groups.

Data Analysis Steps.

Step 1. Statistical summary of the USAGE and TREND ANCHOR questions.

Step 2. Content analysis. All customer responses for the four qualitative questions (1, 5, 6 and 7) are grouped into homogeneous categories of meaning (Reynolds and Gutman, 1988, Ref. 24 of the "References" section). Summary frequencies and percentages corresponding to each set of content codes are computed for each question.

Step 3. Conduct Equity Leverage Analysis (ELA) (see resort example above).

Summary Charts.

FIG. 15 summarizes the reasons for joining the donor group for the museum. According to this figure, the most important reason for joining, especially for those that are "Heavy Users" (events $\geqq 2$), the programs and education offered.

FIG. 16 presents the summary contrast of the PAST and FUTURE TREND questions. Viewing the marginal sums of PAST, the downward level of participation appears. And, looking at the self-reported FUTURE TREND responses suggests the reduced level of activity is likely to continue (i.e., in both the past and future years, there are more members indicating a lower level of participation than an equal or increased participation).

The management question, then, is why people are reducing their participation, and, secondarily, what can be done to better satisfy the members, thereby increasing their participation level. The summary results provided by the present invention are presented in FIG. 17.

Review of the ELA results suggests focusing on two key areas to improve member satisfaction: Tutorials, which is consistent with the earlier reasons for joining (Programs and education), and improving the art works in the Collection. FIG. 18 summarizes the responses to the communication question.

Management Direction.

Review all tutorials and educational activities, with a focus on how to improve the content. Enlarge the scope of tutorials by adding a continuing series of informative programs.

Improving the Collection is the second area of focus. Plans to rotate in visiting collections, as well as future acquisition plans, are to be developed.

Modify the marketing communications schedule to reflect the cost efficiency of postcards and newsletters. Investigate alternative communications venues, including a website.

Summary.

By framing the business problem in terms of satisfaction with key customer groups (defined by Loyalty and Usage), a research framework methodology disclosed herein identifies the most leverageable equities and disequities. Computation of the Leverage index provides a direct measure of the areas of potential changes that will have the largest effect on improving satisfaction with customer segments. Accordingly, the Leverage index may be used to take cost effective steps for increasing positive perceptions in a target population of the object (e.g., museum) whose market is being analyzed, i.e., increasing the object's "strategic equity" as described in the Definitions and Description of Terms section hereinabove.

(1.1.3) Healthcare Market Analysis Example.

The following healthcare example illustrates how the market research method and system of the present disclosure can be used to provide a research methodology that permits computation of statistical summary indices, which can be used to track the changes in satisfaction by sub-units within a business organization over time.

A hospital administrator for a healthcare provider in a relatively geographically isolated city, with few competitors, has noticed a decrease over time in the number of patients served, in particular, those undergoing surgical procedures. From her interactions with competitive healthcare administrators in the area, it is her understanding that the number of patients and procedures at the competitive hospitals is increasing. She wants to design a "satisfaction barometer" that:

Identifies the key "levers" that drive customer satisfaction for each functional group within the hospital.

Provides a feedback system, using both qualitative and quantitative dimensions, on a regular basis that can serve as a framework to focus the respective functional units on their performance and provide them specific areas of focus in an ongoing manner to continually improve satisfaction.

Problem framing. The administrator organizes a meeting with her staff, with the goal of defining the business problem, and they answer the four general framing questions.

Who are the relevant customers?

Primarily, all existing patients (first time and repeat).

Secondarily, previous patients who have not returned after some reasonable period of time. [Instead of directly researching this group immediately, it was decided to begin tracking these from the time of initiation of the "satisfaction barometer" project. The satisfaction assessment will provide the appropriate sample of "dissatisfied" customers to estimate their likelihood of repeat usage of the hospital facilities.]

What are the relevant behaviors (and attitudes) of interest?

Understanding the key dimensions of hospital treatment and staff interaction, by functional area, that underlie satisfaction (realizing these will change over time as changes are implemented by staff), which lead to repeat usage and loyalty.

What is the relevant context?

Reason for visit: Elective and non-elective treatment.

What are the competing choice alternatives?

Two competing hospitals with virtually identical facilities.

The management problem is stated as follows:

For the purpose of providing ongoing feedback from patients (for elective and non-elective procedures) to the functional areas of the hospital staff, develop a management tool, a "satisfaction barometer," that will identify the key dimensions and defining facets underlying patient satisfaction, which will serve to focus the functional units on key areas of patient treatment to facilitate continual improvement in their level of satisfaction with the hospital.

Note: The key italicized phrases in the management problem statement immediately above refer to the primary framing aspects presented in the answers to the questions, with additional focus on the methodological tracking requirement for ongoing feedback.

There are three differences incorporated into this example scenario. First, the need to design an ongoing data-gathering and analysis system is called for because the sub-dimensions or facets of satisfaction that can optimally affect improvement in satisfaction levels will change over time. Second, there is a need to break down the responses into the sub-group areas so the information can be used as a management tool for each functional area. And third, there is a need to develop quantitative indices to track performance.

Research Format and Questions.

Various options can be considered as to the timing of the research administration of the "satisfaction barometer." At "time of check out" was considered to be the most appropriate due to its immediacy with regard to the hospital stay experience. This decision necessarily requires the questions to be few in number and easily presented by the current hospital staff.

1. ANCHOR question: (The interviewer hands the card with the scale to the patient.) How would you rate your overall treatment in the hospital on the following 1-9 scale?

| 1 | 2 | 3 | 4 | 5 | 6 | 7 | 8 | 9 |
|---|---|---|---|---|---|---|---|---|
| Very Dissatisfied | | Average | | Good | | Very Good | | Perfect |

2. +EQUITY question: (Using the scale rating response as a basis, the interviewer asks the following question.)
   What was the primary reason you rated your overall treatment as highly as you did on the scale? (That is, why an X and not X-1?)

3. −EQUITY question. (Using the scale rating as a basis, the interviewer asks the following question.)
   What was the primary reason you did not rate the treatment you received higher on the scale? (That is, why an X and not X+1)?
   Note: The interviewers are trained to get the specific functional area and personnel involved, relevant to the + and −EQUITY questions.

The interviewer records each patient's identifying information (ID) (where more detailed questions as to treatments received, number of prior visits, background demographics, etc. can be added to the file later), as well as each patient's ANCHOR satisfaction rating, and the two qualitative responses (EQUITIES).

By asking only three short satisfaction questions in less than two minutes, at the time in which memories of their experience are the most fresh, plus no additional cost to gathering the data, the research process proves very efficient. The present analysis framework (i.e., format and questions) demonstrates the power of the present methodology.

Data Analysis Steps.

After constructing a data file merging in relevant patient background information:

1. Obtains statistical summary of ANCHOR ratings by key patient information classifications. That is, tally the number of interviewee responses for each of the values of the 1-9 scale for question 1.

2. Content analysis. Code all patient comments by (a) reference context (functional area) and (b) satisfaction element mentioned for both qualitative questions (2 and 3). That is, first determine the categories of responses to the equity questions 2 and 3 (i.e., "nurses", "staff", "personal" (pain, stress, etc.), "MDs", and "facilities"). Then, for each satisfaction value of question 1, determine the interviewees that responded with this value, and then tally the corresponding responses to the equity questions by these interviewees (e.g., if an interviewee responded with VERY DISSATISFIED, and with "Nurses" for the +EQUITY question, and with "Facilities" for the −EQUITY question, then increment to the tally value in the summary cell corresponding to (VERY DISSATISFIED, +EQUITY) by one, and add one increment to the tally value in the summary cell corresponding to (VERY DISSATISFIED, −EQUITY) by one.

3. Develop a new summary code for the ANCHOR rating, dividing the scale into three parts, Below Average (−), Average (0) and Above Average (+). For the 9-point scale used in this example, the three new summary recodes would be for 1-4, 5-6, and 7-9, respectively. Compute a $T_s$ statistic (based upon the rationale of Kendall's tau (Kendall, 1975, Ref. 15 of the "References" section) and extended by Reynolds and Sutrick, 1986 Ref. 30 of the "References" section), as follows:

$$T_s = [((n+)-(n-))+\tfrac{1}{2}*(n0)]/N$$

where, "n+" is the number of Above Average (7-9) ratings, "n0" is the number of middle or Average ratings (4-6), and "n−" is the number of Below Average ratings, and N represents the number of total ratings.

The $T_s$ satisfaction index ranges from −1 to +1 and can be applied to each functional area as well as to overall satisfaction.

Note: The average "middle" level of satisfaction (Poor<0<Very Good) has a positive bias, which is suggested because the goal is to understand how to achieve the higher levels of satisfaction, and a "Good" rating is at best average.

Summary Charts.

The ANCHOR scale numbers serve as the basis to elicit specific reasons as to the positive and negative equities with regard to satisfaction. The first step of the analysis determines the major code categories (see Definitions and Descriptions of Terms section hereinabove). In the hospital example scenario, the categories are Nurses (attending), Staff (departments), Personal (pain, stress), MD's, and Facilities (environment). The (I) importances for each category of customer responses are computed. The nine-point satisfaction scale is recoded into three classifications: [−] (1-4), [0] (5-6) and [+] (7-9).

FIG. 19 summarizes the satisfaction data. In addition, the percentages of positive comments and negative comments by each major code category for the recoded satisfaction ratings are summarized.

Review of the equity data reflects significant differences in what is important by level of satisfaction. For example, the [−] satisfaction group focuses on Personal (pain, stress) as the dominant negative that, if addressed, would increase their level of satisfaction. At the upper end of the satisfaction, i.e., the [+] satisfaction group, one of the most significant barriers to satisfaction is MD's. The difference in importance by level of satisfaction detailed here corresponds to the violation of Assumption 6: Importances are assumed to be independent of beliefs (the "Attitudinal Research Framework Descriptions" section hereinabove). Therefore, without the methodology of the present invention, one would not be able to identify what the equities are that should be focused upon.

FIG. 20 summarizes an example breakdown for one of the major code categories, Nurses. Three sub-codes emerge from the content analysis, namely, Information, Manners and Empathy. The importance of the sub-code, $I_c$, is presented, as is the Belief (B) for each sub-code. The summary measure of satisfaction, $T_s$, for the major category of Nurses is computed.

Management Tool.

Review of the response data for Nurses provides a framework for management to prepare nurse training material. Moreover, by detailing the qualitative input that comprises each code, specific areas of focus that translate into customer satisfaction can be highlighted for use in periodic performance-improvement meetings. This, of course, should be done within each organizational unit.

Beyond the qualitative input and the summary statistics of importances and beliefs, a single measure, $T_s$, for each major code can be computed for purposes of tracking "satisfaction performance" over time. Note that this measure is relative, in the sense that the sum of all $T_s$'s across the operational units will be about zero. As the dynamics of the service component of the hospital improve (leading to increased customer satisfaction), the relative importance of the sub-codes will change, providing a management framework for focusing on constant improvement.

The following two examples illustrate how the market research method and system of the present invention can be used to identify the differentiating decision "equity" elements within and between Loyal×Usage customer population segments that have the most potential to drive loyalty and/or increase consumption.

(1.1.4) Direct Selling Market Analysis Example.

A preeminent direct selling company of cosmetics, which has experienced steady sales growth for 20 years, sees its sales significantly decline over the course of a year, greatly reducing its market value (reduction in stock price of 80%). Because the perception of growth and financial opportunity is critical to maintaining and recruiting new sales associates, the decline in stock price causes the company to begin the "death spiral" to financial ruin. The fact that direct selling organizations commonly experience turnover of 100% of their sales force per year exacerbates this problem. Market research reports that the beauty products and their packaging sold by the company have an older, out of date look that is not appealing to either their existing, as well as potential, end-users. Management must make a decision immediately as to which strategic issues to address, before the company loses critical mass necessary to fund the overhead cost of operations and its debt load, and cannot continue to operate.

Problem framing. Senior management meets to first define the business problem in terms of the four framing questions.

Who are the relevant customers?

Management is divided in their points of view. Marketing believes it is the end-users who buy the product who are the key customers. This group uses market research data that says the product line is old-fashioned and must be updated. The sales faction believes it is the sales associates who sell to the end users that are the key customers. This group presents an analysis that demonstrates that sales are nearly perfectly correlated (0.99) with the number of sales associates. The position that directly selling is a push (sales associate), not a pull (end-user) business is decided upon, yielding the relevant customer target of:

Sales associates.

What are the relevant behaviors (and attitudes) of interest?

Why do sales associates join?

Why do sales associates stay? (What satisfies them about their work?)

Why do sales associates leave? (What dissatisfies them about their work?)

To understand these behaviors, three types of sales associates are relevant, namely, NEW: Recently joined the sales force, EXPERIENCED: Continues to remain active, and FORMER: Recently left the sales force.

What is the relevant context (for considering a direct selling opportunity)?

Additional income is needed to supplement the family income.

There is a realization that hourly jobs are a dead end, and they want a career opportunity.

What are the competitive choice alternatives?

Other direct sellers, e.g. Amway, Avon, etc.

Secretarial positions.

Retail sales.

The management problem is stated as follows:

Develop a marketing and sales strategy that assures long-term growth by focusing on the superior business and life experiences that can be attained by joining the company as a sales associate versus alternative career/job options that will motivate the recruitment of new sales people, while at the same time maximize their expected time in the sales organization (minimizing the rate of turnover).

Note, the key phrases (in italics) in the immediately above paragraph are grounded in the strategic nature of the problem facing management and come from the answers to the framing questions.

The interesting, new aspect in this management problem example is the need to define the basis of motivation of the sales force. This means designing research to gain an understanding of decision structures, in particular, with respect to the differences between the types of decisions (e.g., joining, staying and leaving).

To understand the decision structures, two more framing questions are necessary:

What choice criteria do customers use to distinguish among competitive choices?

Why are the choice criteria personally relevant to the customer? (What is their mean-end chain that reflects personal relevance?)

The research problem, then, can be defined as delineating the common decision structures underlying the three decisions central to the direct selling business, and determining the equities and disequities associated with this specific type of direct sales experience. The development of an optimal strategy, with regard to recruiting and retention, involves leveraging equities and supplanting disequities.

Research Questions.
1. EXPECTATION question: Why did you join?
2. +EQUITY question: What are the most positive aspects of being a sales associate? What is the most positive aspect (choice criteria).
3. LADDER question: What is the single most important positive aspect (reason)? This question is used to obtain a complete ladder having elements at all four ladder levels. Note the multiple choice criteria could serve as the basis of the development of multiple means-end chains representing customers' decision structures, if desired.
4. −EQUITY question: What are the most negative aspects of being a sales associate? What is the single most negative aspect? (choice criteria)
5. LADDER question: For the customer's most negative aspect, what is the driving personal value for obtaining a corresponding means-end chain?

The ability to contrast the differences between the means-end chains across the three sample groups, representing the basis of their respective decisions that underlie their key behaviors, should provide an understanding of what to leverage (and supplant) in the recruiting process. The development of strategy, again, is based upon leveraging one's equities and, at the same time, supplanting one's disequities.

Figure 39:
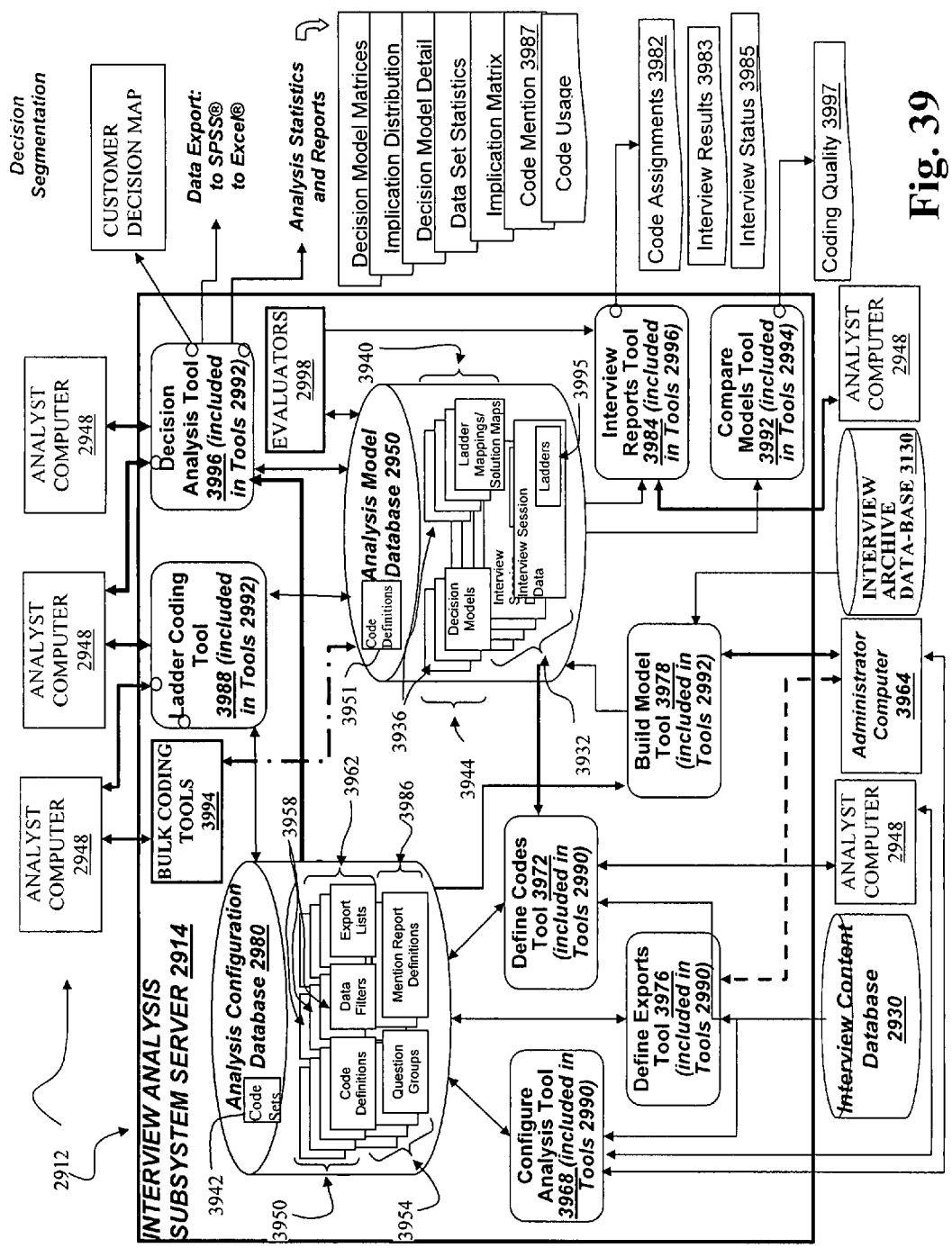
FIG. 39 shows a more detailed block diagram of the components of the StrEAM*analysis subsystem 2912, and in particular, the interview analysis subsystem server 2914, wherein these components are used when analyzing interview data obtained using the interview subsystem 2908. In particular, this figure shows several software programs and data structures that are used by, e.g., market research analysts.

Data Analysis Steps.
1. Content code EXPECTATIONS and summarize by behavioral group.
2. Content code all elements from questions 2-5, developing a lexicon for each level of abstraction (attributes, functional consequences, psycho-social consequences and personal values) (Reynolds and Gutman, 1988, Ref. 24 in the References Section hereinabove). Note, in one embodiment, the present step is performed by the analysis subsystem 2912 (FIG. 29) described hereinbelow, and more particularly, by the define code tool 3972 (FIG. 39) described in section (4.2) hereinbelow.
3. Construct the Customer Decision Map (CDM, also referred to as a decision model 3944 as shown in FIGS. 9, and 39 described hereinbelow) (Reynolds and Gutman, 1988). Note, in one embodiment, the present step is performed by the decision segmentation analysis process (DSA) such as is described in the section (4.4.1) titled "Decision Segmentation Analysis (Step 3424, FIG. 43)" hereinbelow.
4. Determine equities and disequities; that is for each code identified in the CDM (such codes referred to as "decision elements"); more precisely, determine the number of times each decision element is mentioned in the +EQUITY question responses, and determine the number of times the decision element is each decision element is mentioned in the −EQUITY question responses.
5. Compute an overall summary equity index for each of the decision element, and for each group in the sample customer population. From this the summary equity index can be computed for each decision element (e.g., the decision element being one of the laddering rungs: attribute through value of a means-end chain) as a ratio of the positive equities to all equities for the decision element (i.e., the ratio of the number of mentions of the decision element in responses to the +EQUITY question(s) to the total mentions of the decision element in responses to both +EQUITY and −EQUITY decision questions). Plot each of the ratios on a graph such as that of FIG. 21 as described further hereinbelow.
6. Map the equities of the respective sample groups on the CDM.

To illustrate the equity analysis framework, consider FIG. 21. In this figure, the location of the decision elements (according to their corresponding equity ratios from (4) immediately above) on the graph/model of loyal versus non-loyal customers (in other embodiments, any other contrast between segments or groups of a population, e.g., Loyal Heavy USERS versus Loyal Light USERS, or in the case of direct selling, STAY versus LEAVE) can be visually contrasted with the locations of other decision elements on the graph/model. For each of the decision elements, the projection of its location on the graph/model onto each axis represents the positive equity ratio for the group or classification identified by the axis.

Still referring to FIG. 21, in the upper right-hand corner of this general graph/model are "common equity" associations (e.g., decision elements) that are primarily positive for both groups (e.g., both loyal customers/buyers, and non-loyal customers/buyers see the decision elements here as positively associated with the company, brand, et cetera). In the lower left-hand corner of the graph/model are associations that are primarily negative for both groups. These are called "common disequities." In the upper left-hand quadrant of the graph/model are leverageable equities. They are aspects of the company (more generally object), that customers/buyers loyal to the company perceive as positively associated with the company, but that are not seen in so positive a light by non-loyal customers/buyers. In the lower right-hand quadrant of the graph/model are competitive equities, which are aspects of the company that non-loyal customers/buyers perceive as positive for someone else (e.g., a competitor or some alternative option), but that customers/buyers loyal to the company perceive less favorably. In this direct selling example, the competitive equities reflect the STAY versus LEAVE contrast, i.e., both the customers/buyers loyal to the company and the non-loyal customers/buyers put "STAY WITH THE COMPANY" in the leverageable category, and both the customers/buyers loyal to the company and the non-loyal customers/buyers put "LEAVE THE COMPANY" in the competitive equity category.

Summary Charts.
1. EXPECTATIONS. The analysis of the "Reasons for Joining" question (i.e., question (1) in the "Research questions" section immediately above) is dominated by financial expectations, nearly 90%.
2. Customer Decision Map (CDM).
    The results of the laddering interviews were summarized in a decision-making map (CDM) that provides insight for strategy formulation. Note that the process for generating such a decision-making map is described in Ref. 24 cited in the References Section hereinabove. Moreover, the simplified version of such a map (FIG. 22) shows, some of the chains of direct selling aspects are lengthy (e.g., up to 12 in length). Note that there are several primary orientations that originated in the career attributes EARN MONEY, BE MY OWN BOSS, and PEOPLE ORIENTATION. EARN MONEY was the source of the greatest number of mentions. And, with no further analysis, the message "JOIN THIS DIRECT SELLER" and "EARN MONEY" would have been the obvious choice for a message strategy. The Earn Money positioning, however, is non-differentiating with respect to competitive work options. This was currently the recruiting message and given the company's situation, this strategy is incorrect.

Note that, on this map, "GOOD MOM" appears at a relatively lower level than, say, "INDEPENDENCE." This is an artifact of the map's construction, essentially trying to fit in all elements and their implicative relationships without crossing lines. "GOOD MOM" is a very high-level need, indeed, for most mothers.

This leads to some serious questions about the interpretation of standard "laddering" output. The value of the output to this point is in its articulation of the structure itself, and the unique pathways defining the decision structures. What is required is further insight to discover ways the manager can develop and optimize strategic options to tap into and increase equity.

3. Equity/Disequity Grid for contrasting the STAY vs. LEAVE sales associates.

The contrast is between those who stayed with the company (loyal), and those who had just left (non-loyal). The reasons that people joined the direct selling company were, in fact, the reasons that the company talked about in its current communications: Make money, Contribute to household, Be your own boss, and Work your own hours.

FIG. 22 contrasts the decision elements for people who left the company versus people who stayed with the company, were loyal, though, they were either different kinds of people with different motivations (evidence of a self-selection process), or they had learned over time to value some things in addition to flexibility and self-directedness: A "PERSONAL GROWTH" orientation, SHARING, LEARNING, ACCOMPLISHMENT, and BROADENS HORIZONS. As mentioned above, FIG. 22 shows a customer decision map (CDM) obtained from interviews of direct salespersons of the cosmetic company, and FIG. 23 shows the corresponding equity/disequity grid.

It is now possible to see that, if the goal is not only to get people to join, but also to stay with the company, one cannot put emphasis solely on the message "you can make lots of money." A more powerful pathway makes use of the teaching and learning component of the direct selling experience, explicitly highlighting the opportunity for personal growth and development that many loyal sales associates have found appealing over time. People work for money, and that is a given. What is the "value-added", in the present example, is the personal growth component offered by this direct selling company.

The StrEAM™ methods that led to this strategic insight, in this example scenario, were twofold. First, framing the marketing problem in terms of understanding human decision-making with regard to specific customer groups provided a research framework to focus precisely on the key issue at hand. Second, by using the classification of FIG. 21, decision structures of loyal and non-loyal customer populations can be contrasted, thereby enabling management to develop a strategy that utilizes the differential leverages that represent the basis of loyalty. Thus, the present disclosure describes a method and system for coding (i.e., categorizing interviewee responses into a common set of semantic categories), determining perceptual relationships between the categories (e.g., by laddering), determining the significance of each of the categories (and/or ladders), and contrasting various customer population groups for identifying significant attitudinal and/or perceptual differences between the group that is loyal and the group that is not loyal.

Management Decisions.

1. Develop a training program for recruiters that focus on this higher-level message of personal growth, connecting the relevant choice criteria into a cohesive decision orientation, which represents the strategic positioning.

2. Develop collateral materials, including a training tape that can be used by the sales associates recruiting in the field, which personalizes the personal growth story—strategy in a consistent manner. Note that in the case from which this example scenario was taken, these actions resulted in unprecedented growth brought about by enormous gains in recruiting new sales associates (Reynolds, Rochon and Westberg, 2001, Ref. 29 of the "References" section).

Summary.

The direct selling example scenario illustrates the value of being able to contrast decision structures of different segments within a customer population in order to develop a marketing strategy (in this case, recruiting) using a computed Equity/Disequity grid based on the decision structures presented in the CDM.

(1.1.5) Automobile Market Analysis Example.

The management of an American automobile nameplate (i.e., manufacturer) is very troubled by their declining sales figures. Increased advertising expenditures and promotional events are not driving sales. Management concludes their positioning strategy is not effective. Market research using, e.g., the present invention, to determine joint distribution of price sensitivity and conditional beliefs framework (e.g., as shown in FIG. 5) indicates, not surprisingly, a significant decline in their "superior" belief column, and in particular, to the cells of the "superior belief column where price is "not a barrier" or a "minor barrier". Further analysis of market research ratings on automobile attributes, such as handling, engine performance, safety features, convenience features, seating comfort, comfortable ride, and gas mileage, indicates that these differences do not account for understanding what drives the superiority belief. Additional analyses contrasting their nameplate with others from their self-defined competitive set reveal, in general, very few differences. The one attribute that does appear to be a significant negative for their nameplate is exterior styling. Uncovered in the market analysis is the fact that their loyal buyers are significantly older and that their sales decline is a combination of a very small number of younger buyers being attracted to their nameplate and their loyal faithful dying off. Management decides they need to understand other "image" aspects of their product that underlie customer decision-making.

Problem framing. Management defines the business problem by answering the four framing questions.

Who are the relevant customers (with an equal emphasis on potential customers)?

Current loyal customers (two or more purchases, consecutively).

First time car buyers of their nameplate.

With regard to their nameplate, potential customers that:

"Considered" but rejected, recent car buyers.

"Not considered" recent buyers of a price competitive set of alternative cars.

What are the relevant behaviors (attitudes) of interest?

Understanding of key elements that drive perception of the nameplate (ultimately decision-making) that influence (a) whether it is considered as a viable choice, (b) if considered, why it was selected (equity), or rejected (disequity), and (c) what is the basis of loyalty.

What is the relevant context?

The automotive technology across nameplates is virtually identical (except for styling features). Customers know the features are substitutable and are available on a wide set of competitive offerings, so the only real difference is the imagery of the nameplate and the appeal of the car's styling features.

What are the competing choice options?

Discussion of this question evolves into two different points of view. The classic, manufacturer's perspective, is that a hierarchically-tiered segmentation of foreign/domestic, size and price points serves to define the competitive set. That is, auto makers, as do substantially all manufacturers, have a functional view of their products (e.g., for autos, size, number of passengers that can be accommodated, and price). Such manufacturers segment their market by these measurable features (also referred to as "descriptors"). However, another way to think about it is with respect to the competitive set of products that consumers perceive. For instance, in response to the question: what cars are you considering? Suppose a (potential) consumer said, "Jeep and Jaguar". When asked what their criteria is, or what is in common between these, if the consumer were to say, "I want to stand out, be different." Subsequently, if asked, "How so?", the consumer might reply: "Well, in the case of Jeep, it is not like a regular car, I am different. Same with the Jag". Thus, knowing what the consumer's criteria is, and why it is relevant (e.g., via laddering) consumer-based segmentation systems can be developed which should lead to better ways to view the marketplace.

The management problem is stated as follows:

For the purpose of developing a new positioning for the nameplate, identify the current competitive set and what are the bases of imagery that drive customer decision-making with respect to three distinct choice outcomes: namely, remaining loyal, becoming a first time buyer, or actively considering the nameplate as a serious automobile purchasing option.

Note: The phrases (in italics) within the management problem statement immediately above are derived directly from the answers to the four framing questions.

The specificity of the problem statement provides the research group with the needed focus to design a research project that answers the question.

Research Questions.

For an appropriately screened sampling of the four sample groups of recent car buyers noted above, the following interview questions are constructed according to the present invention:

1. PURCHASE question: What car did you buy last?
2. CONSIDERATION SET question: What other cars did you actively consider prior to purchasing your last car?
3. TOP OF MIND questions: Typically at least a pair of questions, such as (3a) and (3b) following:

3a. EGOSODIC VALENCED DECISION STRUCTURE (EVDS) question: For each car mentioned (from Question 2), plus nameplate of interest if not mentioned, sequentially ask:

What comes to mind when you think of "Car Brand X"?

After all TOM responses (i.e., "top of mind" responses) are obtained for all cars, review all of them with the respondent and ask for the most representative one or more descriptors (also denoted "image descriptors" herein).

3b. VALENCE question: For each of the image descriptors obtained ask: Is (your response) for a (corresponding car) a positive (+) or a negative (−) to you? Why?

Note, each positive or negative response is referred to as a "valence" response herein, and the corresponding response(s) to the "Why?" question are referred to "choice criteria" responses.

Figure 24:
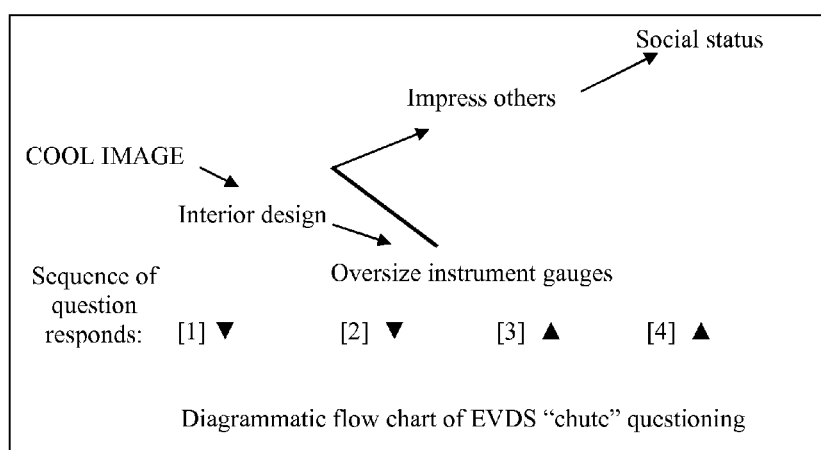
FIG. 24 diagrammatically shows the results from a sequence of interview questions for generating a ladder, wherein the first response was not the first rung of the ladder (i.e., an object attribute).

4. LADDERING questions: After the response(s) for (3b) are obtained, a laddering portion of the interview commences for at least one (and preferably each) of the choice criteria provided. That is, for such choice criteria, one or more laddering questions are presented to the respondent for obtaining responses from which, a four-rung ladder of the respondent's decision structure may be constructed. However, it may be the case that the respondent's answers to the "Why?" question of (3b) are not sufficiently specific regarding an attribute of the object to which the question is directed. Accordingly, prior to asking these laddering questions, further questions may be presented to the respondent to obtain the specific object attribute(s) related to the corresponding choice criteria. That is, in order to obtain what are typically higher-level respondent decision characteristics related to an object, the interview questions must initially "go down" one or more levels of specificity until an object attribute descriptor is mentioned by the respondent. This technique, termed "chutes" herein, ensures that a complete means-end chain is subsequently elicited from the respondent. For example, referring to FIG. 24, if a respondent mentions the TOM characteristic of "cool image" and indicates that this is a positive (+) to him, this psycho-social consequence would then be probed to uncover the lower-level functional consequence that defines it. This is obtained by asking a question like, "What is it about the car that makes you think it has a 'cool image'?" The respondent then must think about what specific characteristics cause or lead to this image perception, with regard to the specific car being discussed. In this example, the respondent might reply, "superior interior design." Using this as the next level to probe lower as to what specifically about interior design is important to yielding a "cool image," this respondent might reply, "oversize instrument gauges" as illustrated in FIG. 24.

Once the attribute descriptor (i.e., "oversize instrument gauges") is obtained, the data for the entire means-end chain is linked together in the next set of questions that move toward related personal values of the respondent. That is, continuing with this example, the respondent could be asked, "Considering that 'oversize instrument gauges' are important because they help define your idea of 'superior interior design' and that translates to 'cool image,' why is this important to you?" Moving up the ladder in this way, using laddering probes, could yield responses such as "impress others" and then "enhanced social status" as indicated in FIG. 24. Thus, the entire means-end chain may be provided as a chain having five levels as follows: "oversize instrument gauges"→"superior interior design"→"cool image"→"impress others"→"enhanced social status". However, since "cool image" and "impress others" are both psycho-social consequences, a more typical four level chain may be generated by combining these two levels as described further herein, in particular, in the "StrEAM Ladder Coding" section hereinbelow.

Data Analysis Steps.
  Step 1. Summarize the consideration set mentions (percentages by sample group). In addition, a joint multidimensional space of the objects and the descriptors can be constructed, wherein the closer the (object, descriptor) pairs are in such a space, the more alike the objects are, and the corresponding descriptors can be used for interpreting or understanding consumer perceptions. Thus, for an automobile manufacturer, a multidimensional graphical representation of the nameplates and the descriptors obtained from interviews with sample groups (along with each group's respective demographic characteristics) can be used to define points in such a space (Carroll, Green and Schaefer, 1986, Ref. 4 in the References Section hereinabove).
  Step 2. Content code the TOM responses, and compute Equity/Disequity grids for the following three pairs of customers:
    (a) Current loyal customers versus First time car buyers (of their nameplate).
    (b) First time buyers versus "Considered" but rejected recent car buyers.
    (c) "Considered" recent buyers versus "Not considered" recent buyers.
  Step 3. Content code the ladders representing decision structures (Reynolds and Gutman, 1988, Ref. 24 of the "References" section), and construct a CDM for frequent TOM codes.
  Step 4. Using the Equity/Disequity grid methodology for the respective sample groups, summarize the equities and disequities across the decision elements and contrast key decision segments.

Summary Charts.

FIG. 25 details the five prototypical decision orientations obtained from the TOM questions for the competitive set of automobiles (including, of course, the nameplate of interest). The primary TOM defining characteristic is capitalized in FIG. 25. The attribute element (identified by the label, "(a) "), and the value element (identified by the label" (v)", in italics), are labeled for each decision network shown in FIG. 25. The combination of associated elements from attributes to values (i.e., a chain) may be interpreted as a decision orientation related to purchasing (or not purchasing) the nameplate automobile. The combination of all the decision orientations may be referred to as a decision map or solution map (also referred to as a Customer Decision-making Map, CDM and "ladder mappings").

For example, the COOL IMAGE orientation discussed earlier is a function of three possible decision pathways, namely: convertible, interior and exterior styling, each representing a segment. The common higher-level reason COOL IMAGE is important for customers is because of their perception of the automobile's ability to "impress others," which leads to "social status."

The management question, then, is "what do current customers believe that potential customers do not?" The research to answer this question, as noted, involves contrasting buyer segments to determine their respective equities and disequities. To illustrate, FIG. 26 contrasts "First time buyers" of the nameplate of interest with "Considered, but rejected" potential customers using the Equity/Disequity grid methodology.

The representation produced, using the TOM-derived segments as the basis, provides significant advantages over standard multi-dimensional representation methods. Standard analytical procedures place the characteristics in the space, assuming no connection or structural relationships between them (independence). The methods presented here have two significant advantages. First, by virtue of the sampling frame, key equity contrasts can be made, which leads directly into the strategy development process. Second, the a priori knowledge of the underlying decision structures allows for a more comprehensive interpretation, by providing a clustering or grouping basis for connecting the defining decision elements.

FIG. 26 is constructed by taking the TOM comments for the respective automobiles to be contrasted and computing the positive ratios using the StrEAM Equity Grid™ methodology. In this example, the "First time buyers" group data is based upon the TOM responses to the nameplate of interest. The "Considered, but rejected" data is taken from the automobiles they recently purchased.

Management Interpretation.

The dominant reason "First time buyers" decide to choose the nameplate of interest is because it HOLDS VALUE. As can be seen in FIG. 26 with the connecting arrows, the positions of the elements that are part of this decision network all have positive equities. In contrast, the dominant orientation for the "Considered, but rejected" segment is COOL IMAGE.

The challenge management faces is how to position their nameplate so as to appeal to this modern, style-driven decision segment. Two options emerge. One, change the design features. This is obviously too costly, takes many years to implement, and therefore is not practical in the short term. Second, change the perceptions of the target customer population regarding the social status that can be gained from being secure in one's (investment) decision to buy the nameplate of interest. The decision orientation to be developed is:
  Social status
  Secure in decision
  Good investment
  Holds value
  Low depreciation (resale value)

The underlying premise of this redefining of social status is that social status drives the importance of the lower-level elements in the current COOL IMAGE decision orientation. And, if it can be communicated to the potential customers that there is another facet of status, one that is defined in terms of recognizing the value of a good investment, there is an increased likelihood of purchase by this target segment.

It is worth noting that different population groups have different equities and disequities. Thus, such population groups can be prioritized according to which are believed most important for developing a marketing strategy. Additionally/alternatively, a marketing strategy may be developed based on common or shared equities and/or disequities between different potential customer population groups. So, if it were determined that single men age 50 to 55 who "Considered, but rejected" the automobile nameplate also did so because of a desire for a more
  COOL IMAGE, then a common marketing strategy that appeals to both the above-identified COOL IMAGE first time buyers and single men age 50 to 55 may be determined.

Summary.

The Equity/Disequity grid methodology, for identifying which decision data provide the most potential leverage to be incorporated into a positioning strategy, is detailed.

A second methodology, which avoids some of the limitations of laddering, is developed. Traditional laddering, beginning at the attribute level and moving up the "levels of abstraction" to personal values, does not necessarily capture the decision constructs that typically serve as the centerpiece of choice for more high-image categories. By initializing the laddering process through Egosodic Valenced Decision Structure (EVDS) questions, the general decision construct can be obtained. Then, by going "down" to what features of the product/service are used to define the presence of the construct ("chutes") and then going back up to values, a complete ladder can be developed. These decision networks can be developed individually for common TOM descriptors yielding specific CDMs, which represent decision segments.

The application of the StrEAM Equity Grid™ methodology "contrasts" to relevant customer groups provides the ability to identify differentiating decision "equity" elements that have the most potential to drive purchase for these high-image categories. Management prioritization of these contrasts leads to the development of optimal strategy.

(1.2) Marketplace Tracking

The general management problem common to substantially all businesses is to develop a market research tracking framework: (i) to identify features of the business' marketplace that affect the business' competitiveness therein, (ii) to provide for ongoing measurements on a periodic basis of such features, (iii) to identify, and quantify the changes in the marketplace, and (iv) adjust their marketing activities to cost effectively address the features.

Examples of the types of strategic questions that a tracking framework must address are:
1. Who is my competition? What effect does context have on defining my competitive set?
2. What is "my" brand share contribution by context, as well as for the relevant competitors?
3. What percentage of my sales comes from loyal customers (as well as for the competition)? How much non-loyal switching is taking place in the marketplace? What are the dominant switching patterns?
4. What decision elements drive loyalty, the basis of equity, for "my" brand as well as that for the competitors?
5. What effect do "my" marketing activities have with regard to the decision elements underlying equity?
6. What are the customers' perceptions of their consumption trends in the marketplace, both past and future?

A central feature of a market research tracking process is the identification of the key differentiating and leverageable decision elements (e.g., Equity/Disequity grid methods) that define the "equity" segments by the StrEAM™ joint distribution of price sensitivity and conditional beliefs classifications (e.g., as in FIG. 5). In addition, this research framework can encompass other StrEAM™ methodologies, plus measures of marketing activities variables, to quantify their effects with regard to increasing superiority perceptions that drive loyalty.

There are four primary tasks of a process for tracking strategic equity of a particular object: (1) identify the competitors for the particular object, (2) identify the drivers of consumer choice and/or consumption (including corporate image) related to the object, (3) evaluate current marketing activities related to the object, and (4) identify marketing trends and their underlying causes related to the object.

Each of the above-identified four tasks for tracking strategic equity is further described hereinbelow.

(1.2.1) Identify the Competition.

Competitive alternatives to using or preferring a particular object may not be readily apparent without investigation into possible competitors at a high level of abstraction. For example, to identify competitors to a particular object, an investigation into what consumers or customers view as such competitive alternatives may identify alternatives that are beyond the category of competitors that, e.g., provide a competing product or service that is substantially similar to the particular object. That is, such an investigation must at least initially broaden to encompass higher level categories (i.e., meta-categories).

Choice is context-dependent, so the meta-category definition depends on context. This means the choice context drives who is defined as the competition, in particular for frequently purchased consumer goods. For example, in 11 of 12 countries in the Eastern hemisphere, the number one competitor for a certain carbonated soft drink brand is not a carbonated soft drink—but "CSDs (Carbonated Soft Drinks)" are only what the company tracks that distributes the carbonated soft drink brand. Brand usage information, correspondingly, is gathered by consumption occasion where relevant, along with demographic information. Brand share should first be thought of in a consumption occasion context. Of course, for consumer durables this distinction is not nearly as relevant. However, for most consumer goods the concept of occasion-specific decision-making is critical to understanding the equities in the marketplace.

The central point here is that one gains a complete strategic picture only by examining the buyer beliefs that drive choice (brand usage) in different contexts, where context can be defined by the behavior of interest (purchase or consumption, for example), or by time of day, location, or significant others present. Not taking into account context differences, and not grounding the respondent in this way, results in ambiguity and error in terms of each individual respondent's interpretation of the research questions. People do not behave or think in general terms; they seek satisfaction, think and behave in specific situations. And these situations determine the decision structures that will be utilized by the consumer.

From the product usage information obtained, brand loyalty for all brands can be computed in various ways, which serves as a primary classification for the StrEAM Equity Grid™ contrasting analysis (depending on the management issue).

(1.2.2) Identify the Elements that Drive Consumer Choice.

Which strategic elements drive choice? Again, in the case of frequently purchased consumer goods, one needs to measure the relevance of the strategic decision elements (product features or attributes, consequences of consumption, and psycho-social imagery) in each context to determine which specific strategic elements are the key drivers of equity for each consumption occasion. Again, consumption contexts need to be analyzed individually to identify the decision structures that drive the equities and disequities of the respective competition.

In addition, elements of corporate image, defined as leadership traits, should also be measured. Note that image research (Reynolds, Westberg and Olson, 1997, Ref. 33 of the "References" section) indicates that characteristics comprising the concept of a "leader" parallel the psycho-social consequences for consumer brands, which also holds for political candidates. These key leadership traits, and their respective definitions, that define corporate (and political) image are: Trustworthy: Honest and worthy of trust; Effective: Capable, Gets things done; Popular: Number one; Lots of people like it; Traditional: Has strong heritage and tradition; Caring: Cares and concerned about people; Efficient: Uses resources wisely; and Innovative: Comes up with creative new ideas. The measurement of corporate image is important because many marketing activities, as detailed below, are intended to drive corporate image. Therefore, the ability to measure their effect on these key dimensions must be provided. Note that corporations can be considered leaders in society because they fit key leadership-role criteria: They can exert influence in order to affect the performance of society. Because one needs to measure the linking of elements of strategic equity with marketing mix elements, one must also be sure to examine the relationship between the kind and degree of sponsorship participation and the strategic elements, particularly those that comprise the leadership/corporate image dimensions. Companies' ability to profit, in the sense of increasing strategic equity from sponsorship of events or causes, varies greatly. The reason is that some of their sponsorship efforts are "on strategy," and some are not. If the corporate philanthropy efforts are focused not only on being a leading corporate citizen, but also on building the image of a leading corporate citizen, then the community, but as well as the employees, customers, and other stakeholders, will benefit.

(1.2.3) Evaluate Current Marketing Activities.

Which marketing elements are working and what are they affecting? One should measure awareness and recall by key demographic and behavioral variables. And, one should be able to measure the effects of company messages on the beliefs and salience of the strategic elements (the attributes, functional consequences, and psycho-social consequences) that are the decision elements of one's target equity segments of customers. And, as mentioned, some types of promotional activities are intended to affect corporate image, so these measures should also be analyzed for differences resulting from exposure or participation in sponsored events. Perhaps most telling is the longitudinal aspects of measuring pre- and post-differences corresponding to before and after a marketing activity. And, to carry this a bit further, the possibility of correlating the co-relation of gains in equity directly to these marketing activities becomes possible.

(1.2.4) Identify Trends and their Underlying Causes.

By asking a panel of consumers to explain trends in their consumption behaviors (i.e., FUTURE TREND ANCHOR), one can get insight into the reasons that changes have occurred in a particular market, as well as insights into the likely future competitive environment in which an object competes. This is accomplished by asking the consumers how their behavior is different today as compared to some product-relevant time frame (e.g. one year ago), and how it will likely change, for example, in the next year. Understanding the "Why?" of these customer-perceived changes provides management with the ability to substantiate the reasons for changes in sales, as well as the ability to understand future trends that are likely to influence their sales. Tracking changes in sales, share, entry, or exit data will give an after-the-fact trend line, whereas the StrEAM™ methodology will give another, superior one that explains trends from a customer's point of view. The value of an "early warning system" such as this for management cannot be overstated.

(1.2.5) Steps of a Market Research Tracking Process.

The steps of such a market research tracking process involves computer-aided interviewing software for adaptively asking relevant questions to individual interview respondents. The computer-aided interviewing software tailors questions to each particular dialog during an interview thereby greatly reducing the number of questions asked of each respondent, and thus providing greater overall efficiency to the market research process. To illustrate, consider the following steps of a computer-driven interview. (This research platform assumes, like all such market research tracking models, that an appropriate sampling of a target population group is identified.) The categories of questions are:

1. Sample characteristics, corresponding to demographics and psychographics, and any relevant background information.
2. Identification of brands consumed by consumption context/occasion, including average amount of consumption for a pre-specified time period (e.g. one week). Note that consumption information can also be collected by using consumer diaries, then using this input as a basis for the brand usage data. This method typically provides more accurate usage data.
3. Rating equity classifications on the two dimensions of price sensitivity and conditional beliefs, e.g., as shown in the StrEAM™ joint distribution of user beliefs and price sensitivity of FIG. 5.
4. Salience of decision elements (e.g., attributes, functional consequences and psycho-social consequences) for each decision occasion. These importances are assigned on the basis of "point allocation" by level of the means-end decision hierarchy. Note that point allocation refers to providing the respondent with a pre-specified number of points, corresponding to their beliefs or importances, and having them allocate these points, corresponding to the dimension of interest (importance, beliefs or corporate image) to a pre-specified set of representative statements. Decision elements that do not exceed an expected allocation level (meaning the number of elements in that level divided by the total points allocated) will not be used to assess brand beliefs, thereby greatly reducing the number of questions required.
5. The beliefs of decision elements (e.g., attributes, functional consequences and psycho-social consequences), again using a point allocation system for normalization. In one embodiment, only the brands that are consumed in one of the occasional contexts are rated (further reducing the number of questions for an individual respondent).
6. Information on marketing activities, including advertising and promotions, are gathered by traditional measures such as recall or slogan identification, and for promotions, knowledge of and level of participation. The appropriate sequencing of these questions also serves to minimize the number of questions asked to an individual respondent.)
7. Corporate image ratings (i.e., leadership traits) are obtained for relevant brands, again using the point allocation methods.
8. Trend questions, past and future, allowing for qualitative explanatory input. Of course such tracking is not limited to consumer products and/or services. For example, the market research tracking steps immediately above can also be applied to other objects such political candidate rating, voter opinions, etc.

(1.2.6) Market Tracking Example for Non-Alcoholic Beverage.

Consider the case where management of a carbonated soft drink company, with several products in their portfolio, including non-carbonated beverages such as juices and water, would like to understand the interactions across their products and their respective competitors. Only by defining the competitive set in the broadest possible terms, i.e., a meta-category for their products, can these interactions be understood.

The meta-category competition framing question for this example is, "What is your share of the commercial non-alcoholic beverage market?" which necessarily includes defining competition across non-alcoholic beverages.

For the market analysis of the non-alcoholic beverage company's product portfolio, the inputs that are required for the market research computer-aided interviewing system disclosed herein to implement the market research tracking process (i.e., also denoted "StrEAM™ STRATEGIC EQUITY TRACKING") are:

(i) Background information. Demographic and psychographic questions and response categories for each.

(ii) Consumption contexts, occasions. In this case, time of day: Breakfast, Mid-morning, Lunch, Afternoon, Dinner, and After Dinner.

(iii) (Optional) Brands by functional category. A list of the major competition by category to be used as stimuli. Alternatively, respondents can enter their own brand information in an open-ended manner.

(iv) Decision elements by level. Note that these decision elements are developed from decision structure studies (laddering) across all relevant non-alcoholic beverages. The labels of the decision elements presented here reflect these concepts. In practice, the exact wording of each involves a complete descriptive phase. (Attributes: carbonation, ingredients, sweet taste, strong taste, special taste, light taste, natural taste and aroma; Functional consequences: thirst quenching, refreshing, provides energy, maintain weight, complements food, and body effect; Psycho-social consequences: mood effect, maintain routine, reflection, health, modern/trendy, concentration, and comfortable). Also note that values are not used for direct assessment by consumers because they are too abstract, with unclear meanings, if not dealt with in a more personal manner, like laddering. The fact is that the laddering process causes consumers to "discover" values and how they underpin choice behavior.

(v) Point allocation sizes. Number of points to be allocated for each component (importances, beliefs and leadership dimensions of corporate image).

(vi) Marketing activities and corresponding labels. Descriptions of marketing activities of interest, advertising and promotions that will be used, along with their relevant slogans, et cetera.

(vii) Time period to be used for TREND questions.

Strategic Analysis.

When a representative sample of consumers is obtained, a decision as to the definition of loyalty is required. This can be done in several ways, including overall percentage of consumption by occasion (time of day) and/or by functional subcategory (e.g. diet colas). Once this decision is made, the types of analyses used to understand equity is almost limitless. The framing of these analyses, however, is centered on understanding the (loyal) classification categories output in a StrEAM™ joint distribution graph (e.g., FIG. 5) of price sensitivity and conditional beliefs. Understanding what drives the "superiority" classification underlying loyalty, combined with either one or two levels of the price sensitivity classification ("not a barrier" and/or "minor barrier"), with respect to all of the marketing questions detailed earlier, is a critical research output for providing to management. And, being able to track these differences over time, especially with regard to the (positive or negative) differences in equity resulting from marketing activities, is of great value to future management decision-making.

(1.3) StrEAM™ Advertising Strategy Assessment

The StrEAM™ ADVERTISING STRATEGY ASSESSMENT provides the fifth of the "Five Aspects" briefly described in the Summary section hereinabove. In particular, this aspect of the present disclosure provides a methodology to quantify the contribution of key perceptual associations, corresponding to customer decision structures, caused by communications that drive affect for the product/service.

(1.3.1) Communications Strategy Specification: A Management Perspective

Communication or positioning strategy is the process of specifying how consumers in a target population will meaningfully differentiate an object (e.g., a brand, company, idea, or candidate) from its competitors (Reynolds and Rochon, 1991, Ref. 27 of the "References" section). The phrases "specifying" and "meaningfully differentiate" are noteworthy.

Several benefits accrue when management clearly articulates and specifies the basis for positioning strategy. First, company management retains control of the process. Strategy is, after all, the responsibility of the company, not the copywriter or agency account manager. Next, the strategy articulation provides a basis for the discussion of alternative executions, based in a common lexicon. Finally, managers and agency personnel can assess advertising executions and their delivery against desired product positions objectively. This benefits both the agency and the manager, since it keeps the agency on strategy and protects the agency from arbitrary second-guessing.

The phrase "meaningfully differentiate" refers to the goal that advertising strategy must be in the consumer's own language and follow decision pathways that ensure that the message is personally relevant. Thus, by understanding what are the leverageable strategic elements, through the StrEAM™ family of research methodologies, that drive satisfaction and/or loyalty, that in turn define strategy, the MECCAS framework (Reynolds and Gutman, 1984, Ref. 23 of the References section hereinabove), to be defined below, permits a direct translation to advertising strategy specification.

To facilitate the specification process, a manager can use the MECCAS strategy model, where the components of the model are isomorphic to the decision structures developed through means-end theory. MECCAS is an acronym for Means-End Conceptualization of the Components of Advertising Strategy. This framework helps, e.g., a manager translate the understanding of consumer decision making into advertising language. The MECCAS framework is usually presented as a hierarchical sequence of levels of object evaluation, wherein "Message Elements" are at the bottom or lowest level of the hierarchy, and "Driving Forces" are at the top level of the hierarchy. In particular, these levels directly correspond to the means-end decision structure generated from means-end data. That is, the correspondence is as follows:

i. "Attributes" of the means-end framework are called "Message Elements" in MECCAS. These are the differentiating physical attributes of the product explicitly communicated in a commercial message (e.g., an advertisement).

ii. "Functional Consequences" of the means-end framework are referred to as "Consumer Benefits" in MECCAS. These are direct consequences, usually performance outcomes, which result from the product's attributes.

iii. "Psycho-Social Consequences" of the means-end framework are referred to as "Leverage Points" in MECCAS. These are the ways in which the MECCA "message elements" activate or "tap into" an individual's personal value system.

iv. "Personal Values" of the means-end framework are referred to as "Driving Forces" in MECCAS. These constitute the motivating personal value orientations of the MECCAS strategy, i.e., the end-level focus of the message. The values here may be explicitly communicated, or may be inferred.

v. The final component of MECCAS, the "Executional Framework", is the "delivery vehicle" for the four fundamental strategic components and, as such, is not considered part of strategy specification per se. It is instead, the tone, the scene, the action scenario, or the Gestalt of the plot of the commercial. Note that the ZMET methodology noted earlier (Christensen and Olson, 2002, Ref. 7 of the "References" section), with its focus on metaphors and their experiential meanings relevant to the product category, is particularly useful in the development of the "Executional Framework".

Implementation.

Once management decides what is to be communicated or linked (i.e., the positioning strategy), it is the job of the creative team to create three "bridges" linking the product to the self. The product bridge, linking message elements and functional or performance benefits, the personal relevance bridge, linking consumer benefits with the leverage point; and the values bridge, linking the leverage point to the driving force. An illustration may make the process easier to understand.

In most product classes, decisions are made, not at the level of values, but at a lower, psycho-social consequence level, e.g., the level corresponding to concepts such as "coping" or "caring." Note that Reynolds and Trivedi 1989, Ref. 31 of the "References" section, found that the highest correlations for product (more generally, object) preference were obtained from marketing statements directed to the "Leverage Point", which corresponds to the psycho-social consequence level of means-end decision structures rather than the value level. Moreover, within the concept of "coping," one can imagine: (i) people who are coping by hanging-on-by-their-fingernails-and-hoping-to-get-through-unscarred (i.e., need for Peace of Mind), and (ii) people who are coping by I-have-lots-to-do-and-I-can-do-more-and-get-that-corner-office (i.e., need for Accomplishment). These two types of coping are defined by their respective higher-level goals or end-states, represented by their personal values. But, it is coping that is the "leverage" to activate corresponding end values. Thus, a marketing an image of a product/service as providing or facilitating a better way to cope with a potential customer's circumstances can be the most meaningful driver for affecting a favorable response to the product/service. To illustrate this point, FIG. 28 shows is what one might communicate with the less secure holders-on target.

Indeed, the message to such a decision segment (Accomplishment driven) is different than the message directed at a target segment motivated by "holding on," with an orientation to just get through the day (Peace of Mind driven). Understanding this difference that is grounded in meanings, which are defined by the connections between the respective levels, is the focus for the new research methods that will be introduced in the following section.

Multidimensional Analysis Model.

The research problems addressed by the analysis model includes identifying, which decision networks best predict Affect. This can be accomplished by a stepwise regression analysis optimizing the selection of pairwise connections for each of the three types. This analysis requires that equal weights be applied to the three sets of predictor connections, thereby not capitalizing on the bias often created by least squares optimization (Cliff, 1987, p. 182, Ref. 6 of the "References" section). This means a simple summary composite index can be computed for each combination of the three bridges between decision elements. Note that the independent measures for each decision network range from 0 to 8, which is computed from adding the connection scores, which has a maximum of two for each. In this regression analysis, the summaries of the three-way combinations (across four decision element levels in MECCAS), representing the three connections, are evaluated as to how well the combination predicts Affect (resulting $R^2$). Note that the dependent measure in the regression has five integer scores, 0-4, representing the sum of the two Affect statements. The statistical significance of the multiple correlations for the decision networks provides the order of contribution and thereby identifies what possible other decision structures, representing positioning strategies, are activated by the communication. To obtain a measure of overall fit, or predictability accounted for by the respective decision networks included, another regression analysis, permitting least squares weights to be computed, can be done. The $R^2$ output provides an upper bound estimate of how much affect is explained.

There are two sub-models of this analysis, which result from the assumption regarding common elements in the decision network. Model I does not allow any common elements in any levels, essentially yielding statistically independent dimensions. Of course, true independence is unlikely, due to the commonality of meanings (which translates to dependence) between and across of the decision elements. Model II permits common elements to be used in the different decision networks.

Research Methods.

There are two primary inputs to the computer program that administers the communication strategy assessment: affect questions, for both product and the advertising, and statements that correspond to the decision elements by means-end level. The program has flexibility to accommodate statements for the Executional Framework and qualitative responses, as well, but these are optional and as such are not an integral part of the strategic analysis.

There are three types of strategic questions presented. For the first type, the computer program presents Affect statements using a standard scale format, anchored by the degree of agreement with the specific statement. Note that Affect statements are a combination of two statements. For example, Affect for the Product/Service is a composite summary score of "increase liking" and "more likely to buy (intent)." The second type, the decision element statements, phrased appropriately to the level they represent, are presented in a two-step process. The first question asks if it the concept is "CLEARLY" communicated (YES or NO). The second question is asked only in the case of a YES response, and it focuses on the strength, "CLEARLY" or "PERFECTLY." This two-step process is key in that it permits the program to adaptively only ask the relevant questions of the third type. This final type focuses on the degree of connection or association between the decision elements caused by the advertisement. The three-point scale used to represent connectivity is presented in a Venn diagram format, with approximately 15%, 50% and 85% overlaps, respectively.

The weighting system utilized to assign weights to the responses for the NOT CLEARLY, CLEARLY and PERFECTLY response categories for the statements are 0, 62.5 and 100, respectively. Note that these weights were derived from a series of studies contrasting different scale markers on 100-point scales. The strength of connections is scored 0, 1 and 2, respectively. A multiplicative composite score for a connection is computed using the relevant ends (the statements scored 0, 1 and 2) multiplied by the connection strength between them (0, 1 and 2), which yields a range of scores from 0 to 8 (2×2×2). The resulting product is then assigned a number ranging from 0 to 9. These equal distance ranges of outcomes for each assigned number are defined by the probabilities of random occurrence of the possible combinations of connection product scores (0, 1, 2, 4 and 8).

The resulting numbers output by the computer program reflect the (mean) strength of communication of a statement (decision element) caused by the advertisement on a 0-100 scale, and the (mean) connection strength for all pairs of statements on a 0-9 scale.

Conceptually, the strategy assessment process mirrors the strategic goal of advertising, namely, linking the product (defined by its attributes) to the person (defined by personal values) using the (differentiating) decision structure that drives choice. The interpretation of the strength of a decision network created by the advertisement is the evaluative criteria as to how effective it is in communicating the positioning strategy represented by the entire network of meanings.

Research Findings.

Analysis of over 100 advertisements using the StrEAM™ ADVERTISING STRATEGY ASSESSMENT methodology across product classes using advertisements from different countries reveals that a single composite score of the three levels of connections (composite summative scores range from 0-27) correlates 0.71 ($r^2$=0.50) with Affect for the respective product/service. This one-dimensional solution strongly supports the theory that creating connections between decision elements drives the creation of Affect for the product/service. Note that contrasting structural models comprised of the strategic elements to models comprised of only the connections across LOYALS and COMPETITIVE LOYALS reveals significant differences in the basis of how Affect is created and reinforced (see Reynolds, Gengler and Howard, 1995, Ref. 22 of the "References" section).

Management Application.

The application of the StrEAM™ ADVERTISING STRATEGY ASSESSMENT methodology to an a priori defined marketing strategy provides a common framework to assess how well advertising of the marketing strategy delivers the desired positioning. That is, what is needed is the development of an analysis frame that permits additional learning by quantifying the correlational relationship of both the strategic elements and their connections to both Affect for the product and Affect for the advertisement. This new analysis should provide management additional insight, beyond simply assessing their one predetermined strategy, by identifying other strategic elements that have the potential to drive product/service affect, which is the basis of the superiority belief. This application will be of particular value in assessing the competition's advertising communications, as well as gaining a better understanding of their own current and past advertising (which could be related to sales trends at the time it was on air).

The translation of understanding the decision networks that drive satisfaction and loyalty into positioning strategy can be readily accomplished using the MECCAS model. This evaluation of how well a pre-specified strategy is communicated by a given advertising execution can be assessed by the strength of the levels of the key statements corresponding to the decision elements and their respective levels of connectivity.

By developing a research methodology to investigate advertisements where there is a general understanding that there is no a priori knowledge as to strategy, or one assumes no a priori knowledge, management has the ability to determine which driving elements are creating Affect. This understanding is particularly useful when studying the competitive communications environment. When results from studying the competitive communications environment is combined with the equity analysis derived from the Equity/Disequity grid (e.g., as in FIG. 5), a more comprehensive perspective on developing optimal competitive positioning options is provided to management.

(1.4) StrEAM™ Methodology Summary

Strategic equity serves to insulate a brand, company, or service. It provides protection from the competitive forces in the marketplace. Conversely, a store of strategic equity makes one's marketing programs more effective, precisely because one has a base upon which to attract competitive customers (shift their beliefs underlying brand choice).

The logic equation that underlies the StrEAM™ research framework for identifying and quantifying the basis of strategic equity is as follows:

$$\text{Equity} = f_1(\text{likelihood of repeat purchase})$$
$$= f_2(\text{loyalty})$$
$$= f_3(\text{satisfaction})$$
$$= f_4(\text{beliefs, importances})$$

This general equation can be applied to frame marketing problems into research problems that focus on defining the relationships between and across these key functional relationships.

The fundamental grounding of the research process requires gaining an understanding of the customers' decision elements that drive choice. This understanding provides the foundation for the development of optimal strategic options.

There are five interrelated components of the StrEAM™ Process Model, each with their own combinations of research methodologies that define the management problem framing task specific to optimizing strategic equity. These requirements, along with their respective research solutions, are (1) through (5) following:

1. Provide a research methodology to identify and prioritize equity segments for analysis.

This framework also permits assessing the equity segments with respect to their relative contribution to, e.g., an organization's sales.

The construction of a StrEAM™ joint distribution graph (e.g., FIG. 5) of price sensitivity vs. conditional beliefs provides management the basis to quantify and assess their equity in the marketplace in contrast to that of each of their competitors. Moreover, it provides management the metric that can serve as the orienting frame for development and communication of strategy across business units. As such, this analytic equity summary permits the assessment of longitudinal changes resulting from marketing activities, from a competitive perspective, within the marketplace.

2. Determine the key underlying decision elements within the decision structures that have the highest potential to increase customer satisfaction underlying loyalty.

Focused problem specification permits the framing of research in terms of increasing customer satisfaction. The application of the methods of the present invention for eliciting customer decision criteria, both avoids the pitfalls of traditional attitude measurement techniques and obtains the strategic equities, both positive and negative, that when considered jointly, define how to optimally improve customer satisfaction. Optimally refers to defining the priorities to provide the maximal increase in customer satisfaction.

Utilization of the StrEAM™ Equity Leverage Analysis methodology yields highly focused and precise measures of the attitude model components of beliefs and importances, without the limitations inherent to traditional assessment techniques. The additional advantage of being able to quantify potential gains in satisfaction (leverage) by changing elements of the marketing mix (both tactical and strategic) provides management concrete direction as to the solution to their customer-defined satisfaction problem.

3. Provide a research methodology that permits computation of statistical summary indices that can be used to track the changes in satisfaction by sub-units within the business organization over time.

The extension of the StrEAM™ Equity Leverage Analysis methodology—to provide dynamic output use as a management tool to increase customer satisfaction for functional units within an organization—is developed. Central to the dynamic nature of the management problem is the identification of the leverageable aspects of service at a given point in time and the ability to quantify and track relative performance of the functional units over time.

4. Identify the differentiating decision "equity" elements of a customer population, wherein each such "equity" element corresponds to a predetermined perception of the object being researched by at least some members of the customer population. In one embodiment, this is performed by identifying perceptual distinctions between relevant segments of the customer population. For example, perceptual distinctions may be identified between loyal and non-loyal object consumers, object buyers, object employees, and/or object users, etc. Note that identification of such distinctions is generally necessary to determine a marketing strategy for increasing the proportion of the customer population that can be considered loyal to the object, i.e., increasing the customers that are less likely to purchase, use, or consider other competing objects. In particular, the present disclosure uses the following (A and B):

A. A means-end method and corresponding computational model to identify the structural components of decision-making in a customer population, wherein, e.g., such structural components may be: (i) various categories relating to customer perception of the object being researched, and/or (ii) the customer perceived relationships between such categories (as is obtained by laddering). That is, by interviewing a sampling of problem-appropriate customer population segments for a marketplace (such segments identified, in one embodiment, by a combination of object loyalty and usage level classifications), analysis of interview responses for the segment respective perception valences (i.e., positive or negative responses) yields an index reflecting the degree of positive differentiation power for each decision element. When these indices are computed for relevant customer population segments (e.g., Loyal "Y" vs. Non-Loyal, or Loyal Heavy vs. Loyal Light Users, or Loyal "Y" vs. Loyal "Z"), the contrasting of these indices permits the identification of decision elements that have the most strategic potential to move customers from one equity segment to a more advantageous and desirable equity segment. When these strategic elements with the most potential are then put in context of the overall decision structure (Customer Decision Map), strategic options that incorporate these high-potential leverageable decision elements can be integrated, producing an optimal strategy.

B. A general marketing research tracking model that permits strategic analysis of the marketplace. Using the input obtained from identifying the decision elements (from the CDM), measures of belief and importance are obtained for the customer-specific relevant set of competitive products/services, defined in a meta-category context. Beliefs are considered stable for the products/services. Importances are considered to vary by relevant consumption context. These measures, when used as the basis to understand the different equity segments in the StrEAM™ joint distribution of price sensitivity and conditional beliefs matrix, yield statistical indices reflecting their degree of differentiation power.

Tracking in this way permits the measurement of differences over time of these key explanatory decision variables.

The other components of the market research tracking process include corporate image and marketing activities and events. Measurements of these corporate image constructs can be related directly to the equity segments, providing the ability to measure and contrast their respective equity effects (over time) with the StrEAM™ joint distribution graph of price sensitivity and conditional beliefs segments. The measures of marketing activities, comprised of awareness and participation, can be used in a predictive sense to assess their impact on decision elements and usage, by equity classification. These general analyses represent only the most rudimentary ones to understanding and quantifying equity. Given the multi-component aspect of this market research tracking process, virtually a limitless number of analyses could be undertaken to answer specific problems or questions management could pose.

5. Provide a methodology to quantify the contribution of key perceptual associations that correspond to customer decision structures caused by communications that drive affect for the product/service.

The MECCAS translation (Reynolds and Gutman, 1984, Ref. 23 of the "References" section, Reynolds and Craddock, 1988, Ref. 20 of the "References" section of communication and advertising strategy to customer decision elements, reflecting the means-end network, is used as a framework to assess communications. The StrEAM™ assessment framework obtains measures of the strength of the strategic elements (decision nodes) and the strength of their respective connections between elements at different levels of the model. Management review of these communication measures reveals the extent to which the communication is "on strategy," meaning the degree to which it communicates the a priori positioning strategy.

StrEAM™ also presents a methodology to assess advertising communications without an a priori strategy specification. Using Affect as a dependent criterion variable, the optimal predictive set of decision structures (using the three connection bridges as a composite independent variable) can be identified and ordered by degree of explanatory contribution. This methodology provides management with the ability to specify what decision networks are being developed or impacted by advertising, which is relevant to analysis of competitive advertising.

The StrEAM™ family of research methodologies is applicable to solving a wide variety of marketing problems, both tactical and strategic in nature. The basic key to their successful implementation is the framing of the marketing problem in customer satisfaction and/or loyalty terms. This is critical because these constructs represent the operational components of strategic equity of the product/service, which management uses as the guiding metric to their decision-making.

The entire set of StrEAM™ research methodologies is designed to be implemented via computer interfaces with electronic communications. In many cases, the adaptive questioning procedures embedded in the programming are necessitated due to the branching required to select the most appropriate question for the individual respondent. That is, questions are asked (i.e., presented) using the respondent's prior answer as a basis to frame the subsequent question, or using relevant criteria obtained for a respondent. Additionally, because graphical scales and other stimuli are standard to the research methods of the market research system disclosed herein (and referred to hereinbelow as the market research analysis method and system 2902), the ability to present these images and work with them in real time, to focus the respondent on the distinctions of interest, is required.

(2) Subsystems of the Market Research System 2902

Figure 30:
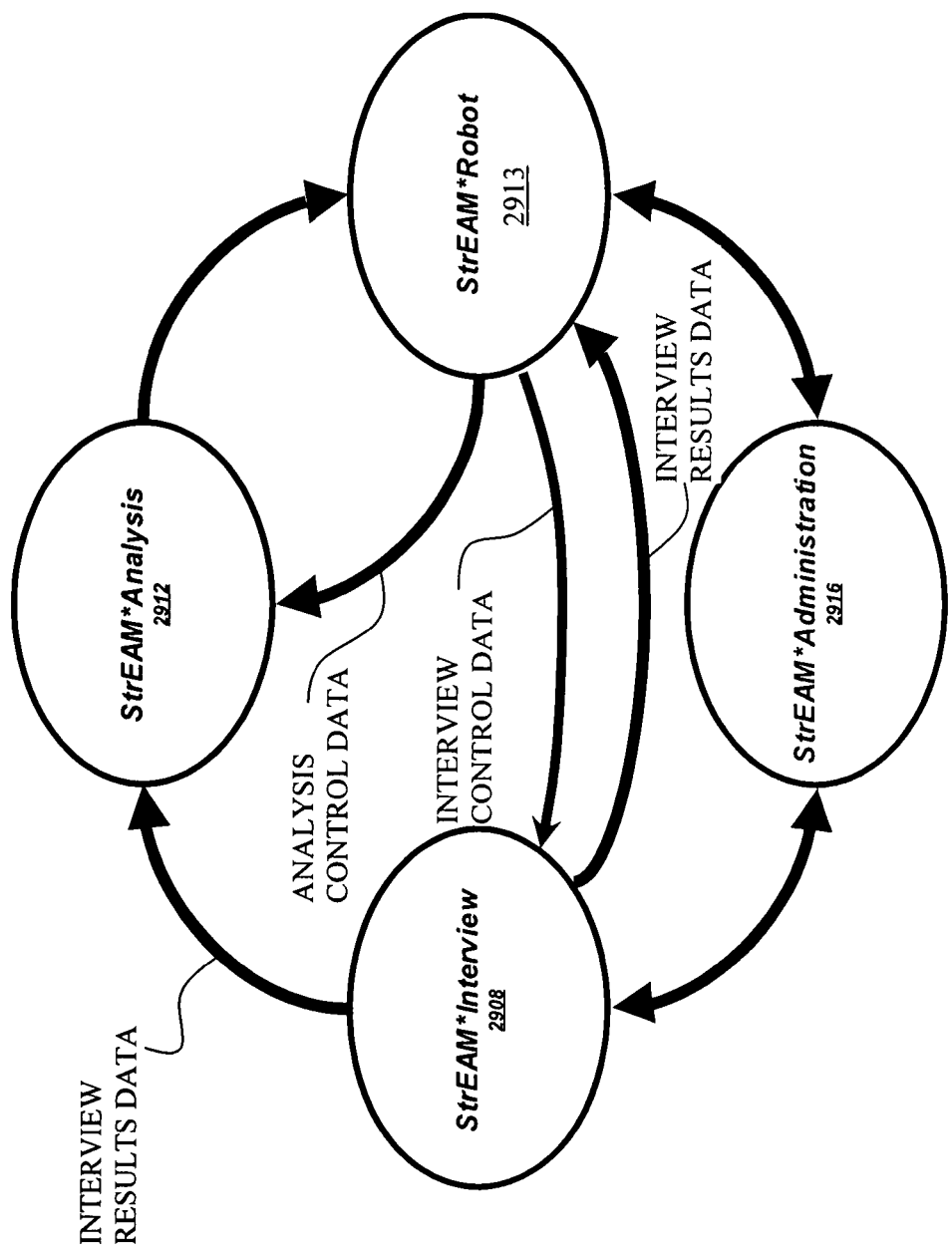
FIG. 30 is another block diagram of the invention showing how the major subsystems are dependent upon one another.

FIG. 30 shows a subsystem decomposition of the market research analysis method and system 2902 which is shown in more detail in FIG. 29. In particular, the market analysis method and system 2902 includes the following four subsystems:
- (i) Regarding step 1008 (FIG. 10), a computed-aided interview subsystem 2908 (also denoted herein as StrEAM*Interview) is provided for composition and presentation of market research interviews to interviewees, e.g., selected from a particular target population. Note that the interview subsystem 2908 is particularly applicable to interactively conducting such interviews on the Internet. Moreover, as will be described further hereinbelow, such interviews may be conducted interactively via Internet communications between an interviewer and an interviewee, or in some embodiments, such interviews may be conducted substantially automatically (e.g., without active continuous participation by a human interviewer for providing and/or responding to substantially every interview question presented to an interviewee). Furthermore, in some embodiments, such interviews may be conducted substantially or completely without intervention by a human interviewer.
- (ii) Regarding step 1012 (FIG. 10), a computed-aided interview data analysis subsystem 2912 (also denoted herein as StrEAM*analysis subsystem) is provided for analyzing interview results data obtained interviews conducted, e.g., via the interview subsystem 2908.
- (iii) An intelligent control subsystem 2913 (also denoted herein as StrEAM*Robot) for substantially automatically conducting market research interviews and analyzing the interview results therefrom.
- (iv) An administration subsystem 2916 (also denoted herein as StrEAM*Administration) for providing services for organizing market research projects that, in turn, use the services of the subsystems 2908, 2912, 2913.

A more detailed block diagram of one embodiment of the market analysis method and system 2902 (denoted StrEAM herein) is presented in FIG. 29, wherein the high level functional components and interactions therebetween are shown. In particular, this embodiment is an Internet based embodiment of the market analysis system 2902. However, it is within the scope of the market analysis system disclosed herein that other communication networks may also be used such as a virtual private network, a telephony network, a local area network (e.g., a local area network for a particular building), a wide area network (e.g., a corporate network), etc. FIG. 29 shows that simultaneous one-on-one interviews between interviewers and respondents can be supported through a network server 2904. These interviews are conducted using standard browser-based components providing flexible, geography-independent participation by both respondents and (if any) interviewers. The network server 2904 additionally provides the ability for interviewee candidates to register and schedule their participation in interviews. Additionally, administrators of the market analysis system 2902 may also access the network server 2904 for scheduling market research projects (e.g., scheduling tasks associated therewith such as interview development), and screening candidate interviewees. In particular, Internet-accessible tools for project administration, configuration, and monitoring are available to such administrators, wherein such client-based tools may be used for off-line analysis and data processing.

Multiple, simultaneous, one-on-one interviews between interviewers and respondents (i.e., interviewees) are supported via the web server 2904. These interviews are conducted via Internet communications using standard (Internet) browser-based components on both the client and server sides of such communications. Thus, such interviews can be conducted while providing flexible, geography-independent participation (by both respondents and interviewers).

An interview administrative database 2939 (FIG. 29), which is a relational database (e.g., implemented using MySQL from MySQL Inc., Cupertino City Center, 20400 Stevens Creek Boulevard, Suite 700, Cupertino, Calif. 95014, USA as the database manager), stores administrative data associated with the interview process such as:
- (1) Information about interviewers (e.g., names, email addresses, and for each interviewer, an identification of each interview conducted or to be conducted, and interviewer evaluation data for evaluating the performance of the interviewer); and
- (2) Information about interview appointments for scheduling interviews (e.g., appointment data which may include information for identifying an interviewer, information for identifying a interviewee, a date and a time for the interview, information for identifying the interview to be conducted, etc.).

In particular, the interview administration database 2939 stores information about the status of market research projects (e.g., data indicative of: (1) the status of an interview design, the status of interviews, e.g., how many interviews have been performed, how many candidate interviewee's have been identified, whether interviewers reviewed the interview, etc., and (2) the status of respondent information, e.g., which respondents have completed which interviews, which respondents need to be (re)contacted, etc.).

(3) StrEAM*Interview Subsystem 2908

In one embodiment, the StrEAM*Interview subsystem 2908 provides a web-based framework in which an interviewer and an interview respondent can interact over the Internet (or another network as described hereinabove) to conduct a structured market research interview. The StrEAM*Interview subsystem 2908 serves up predefined presentations to each interview respondent and provides for open dialog between the interviewer and respondent during the interview. The results of these interviews are captured in a form facilitating both downstream analysis and preservation of the original verbatim dialog between the respondent and the interviewer.

The StrEAM*Interview subsystem 2908 is designed to support a Means-End analysis (cf. Definitions and Descriptions of Terms section hereinabove) to understanding consumer decision-making. This is achieved, not by gathering input from an exhaustive questionnaire, but rather by engaging in a multi-level dialog with individuals (i.e., respondents) about their decision-making process. Of interest are the relationships between, e.g., one or more product (or service) attributes and the perceptions of the respondent(s) regarding the product or service (more generally, object). In particular, such relationships are discovered and explored through an interview technique known as "Laddering" described further hereinabove (cf. Definitions and Descriptions of Terms section hereinabove).

The StrEAM*Interview subsystem 2908 (FIGS. 29 and 31) includes:

(a) The interview subsystem server 2910 for providing interview content to the interviewer applications 2934 (e.g., residing at the interviewer's computer 2936, FIG. 29), and respondent applications 2938 (residing at the respondent's computer 2937, FIG. 29) for capturing interview session data for subsequent analysis by the StrEAM*analysis subsystem 2912;

(b) One or more interviewer applications 2934, each being on a different computer (e.g., a personal computer), and provided at a site remote from and/or having a network address different from the server 2910. Each interview application 2934 may be a graphical program that provides the interviewer's interface to the interviewing subsystem 2904. Each interview application 2934 will display interview presentations to the respondent, from which interview responses are being gathered, and control the interview communications at the respondent's computer 2937.

In the Internet-based embodiment of the market analysis system 2902, the interviewer application 2934 reads interview definition data 3110 (FIG. 31) of the interview content database 2930, and uses the data therein to provide the structure and content of an interview session. The interviewer application 2934 sends control messages to the respondent's application 2938 and gathers answers from it as well. When final responses are available (e.g., the interview session is complete), the interviewer application 2934 requests that such responses be transmitted to the interview manager 3126 (described hereinbelow) on the StrEAM market research network server 2904. The interview definition file 3110 provides the following:

(a) Control and sequencing of presentations to interviewees; and (b) The content of questions asked the interviewees, e.g., the question types illustrated in the examples (1.1.1) through (1.1.5) hereinabove.

In the internet-based embodiment of the market analysis system 2902, the interviewer application 2934 is a browser-based program that is automatically downloaded to the interviewer's computer from the StrEAM interview subsystem server 2910 and is run in a browser extension. In one embodiment, the interviewer application 2934 is provided as a Flash "client" application providing real-time network communications between the interviewer and a respondent being interviewed. Note that in one embodiment, the browser extension implementations may be Flash® "movies" which are executed by the Flash® Player from Adobe Systems Incorporated 345 Park Avenue, San Jose, Calif. 95110-2704. This is a widely deployed browser extension that itself is automatically deployed to client systems when needed.

The interviewer application 2934 provides a display framework that the interviewer uses to conduct an interview with a respondent via, e.g., a telecommunications network such as the Internet (however, other networks such as private IP networks such as an enterprise-wide network of a corporation having numerous sites, or even a local area network such as a network for a single high rise building). The display framework is presented via an activation of a network browser at the interviewer computer (such browsers being, e.g., Internet Explorer by Microsoft, the Netscape browser by America On-Line, Firefox by Mozilla, or any number of other network browsers).

During an interview, the interviewer uses the interviewer application 2934 to control the interview, e.g., (i) according to a predetermined sequence of presentations presented to the respondent (e.g., questions and statements corresponding to a laddering chain as described above), (ii) for determining when to present to a respondent a summarization of a laddering chain, and/or (iii) for determining when to reply (e.g., an audio reply) to the respondent, e.g., requesting further clarification of a response by a respondent. Note that for conducting an interview, the interviewer application 2934 is provided with the contents of an interview definition data 3110 (FIG. 31) described further hereinbelow, wherein such a file contains interview data for conducting a particular interview. Additionally, the interviewer application 2934 communicates with an interview manager 3126 for coordinating communications between the interviewer and the respondent, as will be described further hereinbelow. The interviewer application 2934 also communicates with various flash intelligent graphics components (as provided by the Flash® Player from Adobe Systems Incorporated) for providing, e.g., pictorial, animated, and/or movie presentations to the respondent.

Since it is particularly important to obtain interviewee responses to all ladder questions (i.e., responses to each level of a ladder having corresponding interview questions), after posing a first ladder question to an interviewee, an interviewer is assisted by the interviewer application 2934 in following up with probing questions to get the interviewee to expand on his/her answer and explain his/her decision making process at all four levels of abstraction (i.e., the attribute level, the functional consequence level, the psychosocial consequence level, the value level). Such subsequent probing questions are designed to move the interviewee's responses "up" or "down" the corresponding ladder levels in order to capture the whole means-end chain of perception from the interviewee. Example follow-up probe questions (and their "direction") are as follows Why is that important to you? (up the ladder)
How does that help you out? (up the ladder)
What do you get from that? (up the ladder)
Why do you want that? (up the ladder)
What happens to you as a result of that? (up the ladder)
What caused you to feel this way? (down the ladder)
What about this product caused that to happen to you? (down the ladder)

(c) One or more respondent applications 2938, each being on a different computer (e.g., a personal computer) and provided at a site remote from and/or having a network address different from the server 2910, and preferably at a network site convenient for a respondent being interviewed (e.g., a personal computer at the respondent's home or work). Each of the respondent applications 2938 is a graphical program that provides the respondent's interface to the interviewing subsystem 2904. This program, under the direction of the interviewer application 2934, will display interview presentations to the respondent, gather respondent responses, and provide all of the network communications support for the respondent.

Figure 32:
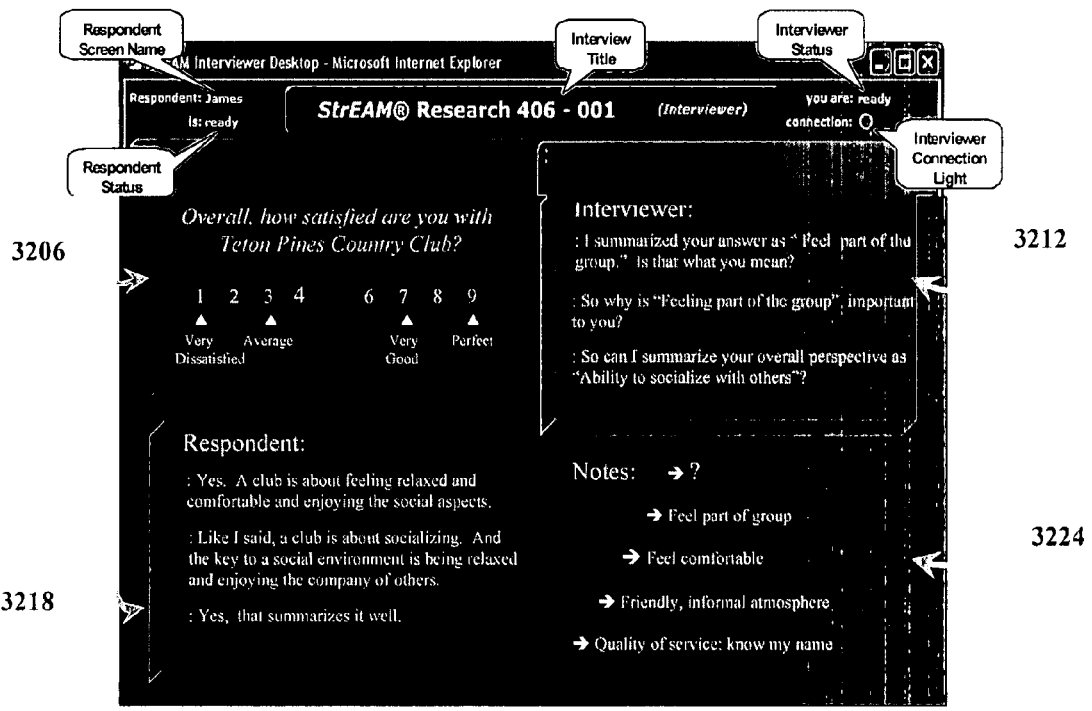
FIG. 32 shows a representative user interface display of the respondent application 2934.

In the Internet-based embodiment of the market analysis system 2902, the respondent application 2938 is a browser-based program that is automatically downloaded to the respondent's computer and is run in, e.g., a network browser extension. An example of the graphical display provided by one embodiment of the respondent application is shown in FIG. 32, and is described further below.

(d) An interview manager 3126 (FIGS. 29 and 31) which is an application, provided by the StrEAM*Interview subsystem server 2910, that manages communications between the interviewer application 2934 and the respondent application 2938. In particular, the interview manager 3126 may be a FlashComm application from Adobe Systems Incorporated that manages certain aspects of an interviewer/respondent session. For example, the interview manager 3126 takes care of various aspects of interviewing housekeeping such as the orderly storage of the interview results and the management of the network connections between the interviewer application 2934 and the respondent application 2938. In particular, the interview manager 3126 is responsible for establishing and maintaining the network connection between the interviewer and respondent applications. Additionally, the interview manager 3126 archives the interview transcript to the interview archive database 3130, and services requests on behalf of the interviewer application 2934 to write out interview results to the interview archive database 3130. In one embodiment, the interview manager 3126 may be provided by a Macromedia® Flash® communication server application (from Adobe Systems Incorporated as one of ordinary skill in the art will understand) that runs on the market research network server 2904.

Figure 31:
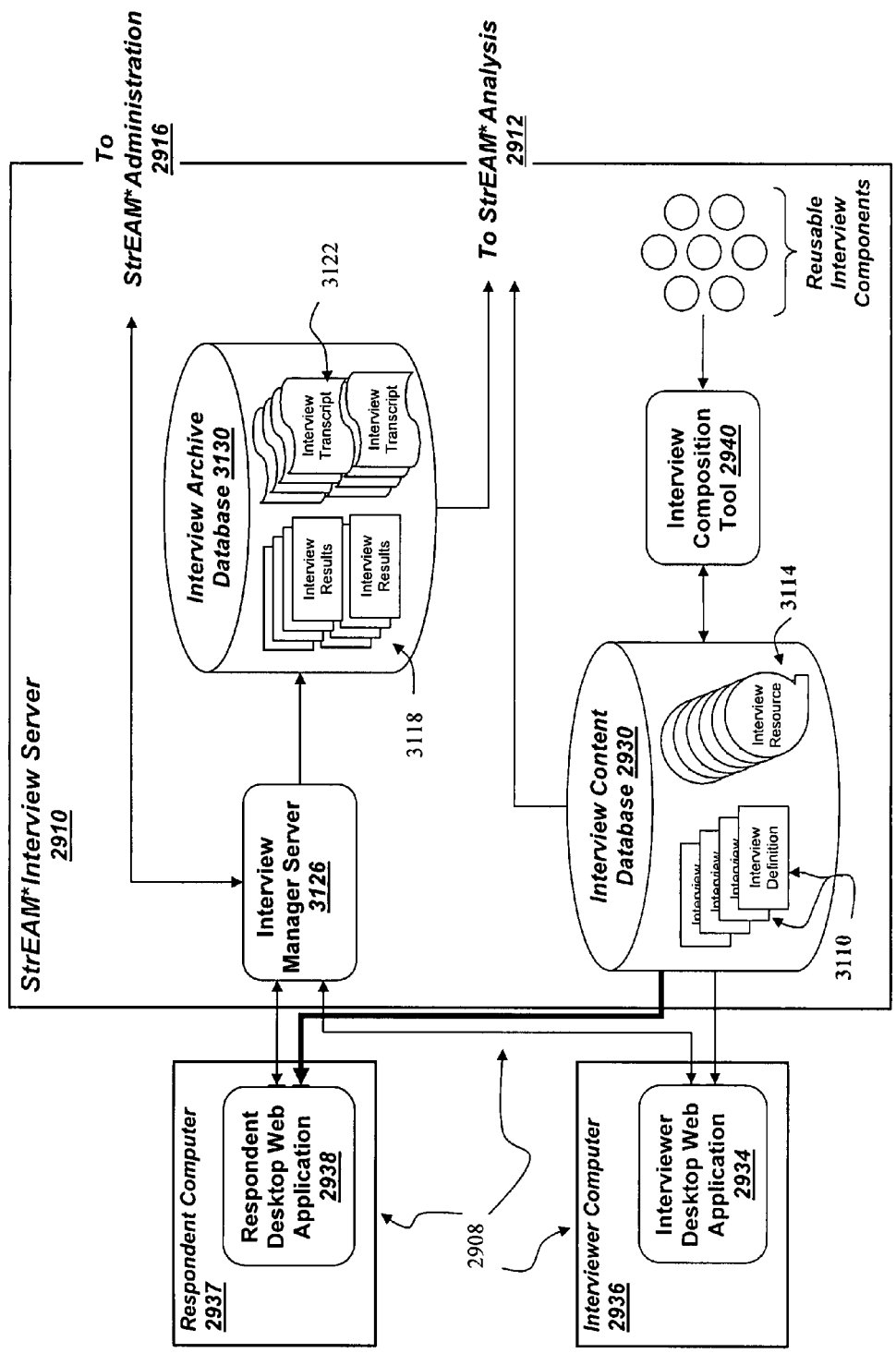
FIG. 31 is a flow diagram showing many of the data flows between components of the StrEAM*Interview subsystem 2908.

(e) An interview composition tool 2940 which is a graphical tool used by a StrEAM*Interview composer to generate an interview definition data 3110. The interview composition tool 2940 typically makes use of existing interviewing components as described hereinbelow, and provides a more user friendly interface for presenting and generating the contents of the XML-based interview definition data 3110 (FIG. 31).

(3.1) Question Types for Various Interviews

The following table provides descriptions of the types of interview questions provided by an embodiment of interview subsystem 2908.

| Question Type | Description |
| --- | --- |
| EXPECTATION | This type of question will be commonly asked to get an unstructured response about the respondent's expectations about a subject. The verbatim response will be captured and used later by picking out key words and phases. For the interviewer application it is a simple question and answer process. Ideally, the interviewer will play back, perhaps an edited version of the expectation response (in the Notes window) for approval before recording it. |
| PURCHASE | Each question of this type is used for questioning a respondent regarding a previous purchase, e.g., related to the object being researched. A respondent's reply is expected to be a simple unstructured response. The question might be about brands/models purchased, date of purchase, frequency, etc. The question may breakdown into a number of subcategories, thereby requiring a number of respondent inputs. A purchase question can start as a simple unstructured response (like expectation). |
| USAGE | Each question of this type is used to obtain an open-ended reply regarding the respondent's usage of some item, service, etc, e.g., the object being researched. Replies to Usage questions are expected to be simple, unstructured responses similar to purchase questions. However, Usage questions do lend themselves to being structured as well. There may be various types of Usage questions each with a structured (form) for query/response. |
| TOP-OF-MIND | Each question of this type asks for the respondent's top-of-mind (TOM) image regarding some object, person, or concept. Typically the response to an image question will be used in one or more follow-on questions. A top-of-mind question is generally an unstructured question/answer. If anything, the structure might be to limit the response to be brief (as befitting the concept). If the respondent's answer is not limited, the interviewer will want to play back a brief version of it (for approval) since it may be used in the composition of a follow-on question. |
| GENERAL | This is just a placeholder for questions that don't fit into one of the other categories. Each question of this type is used for general purpose, open-ended questions. The respondent is given a stimulus and responds with an arbitrary, unstructured textual response.<br>The verbatim response is captured and used later by categorizing the answer (coding it) and/or by picking out key words and phrases. For the interviewer application 2934, questions of this type are likely to have a single respondent reply as the answer. |

-continued

| Question Type | Description |
| --- | --- |
| OCCASION-SET | This is a "set" question, where the respondent is going to be giving a list of answers. That is, each occasion-set question requires a respondent to name one or more occasions (of a purchase or consumption, etc.) of, e.g., the object being researched. Each response is unstructured, but brief. Note that the StrEAM*Interview subsystem 2908 will actually collect each answer as part of a set, with the intention that a follow-on question will be asked for each member of that set. |
| CONSIDERATION-SET | Each question of this type is expected to generate a set of one or more respondent answers. For example, a question of this type may ask a respondent to name items (brands, models, etc.) considered for purchase, wherein such items are competitors to the object being researched. |
| PLUS-EQUITY (+Equity) | An Equity question is one of the main techniques for developing a ladder.. It is a pointed "Why?" kind of question that will engage the interviewer and respondent in a dialog that results in the development of a ladder. The Plus-Equity question is the one that is asking why something is as positive as it is. To be clear, the answer to any Equity question is a ladder. See the discussion below about the ladder. In at least some embodiments, an Equity question i may be best asked with the display of a prior slide (like a rating scale question). |
| MINUS-EQUITY (−Equity) | A Minus-Equity question is the same as described above for Plus-Equity except that it is asking why something is not more positive than it is. |
| LADDER | In general a Ladder question is one that allows an interviewer to build (at least part of) a Ladder from interviewee responses to Ladder questions. This is typically done via a dialog between the interviewer and the interviewee, wherein the interviewer probes the interviewee to get responses for all levels of a desired ladder via a sequence of ladder questions.<br>In general, the display for such a ladder question on the interviewee's computer 2937 (FIG. 29) is text entered (or selected) by an interviewer during an interview session. Such a ladder question may be in response to one or more previous responses by the interviewee. In particular, the presentation of a ladder question may be to a follow on question to some previous interviewee answer (or series of answers) with the ladder question intended to probe the reasons for the earlier response(s). A Ladder may be built as an "answer" to an Equity question. |
| CHUTE | A Chute is virtually the same as a Ladder, except that the interviewer is typically starting in the middle of the ladder rather than at the bottom (i.e., at the "attribute" rung). This does not necessarily have any impact on how the overall question is asked, structured, or ultimately answered. It may, however, affect any assistance given by the interviewer along the way. |
| EQUITY QUESTIONS (I.E., PLUS-EQUITY-RATING QUESTION, PLUS-EQUITY-TREND QUESTION, PLUS-EQUITY-PREFERENCE QUESTION) | Often ladder questions are specifically designed to probe the underlying reasons for a respondent's choice on some form of "scale" question (e.g., rating-scale question described below). Each equity question seeks to obtain a response as to why an interviewee respondent has provided a particular rating of, e.g., an object being researched, rather than one increment of the rating scale below or above the respondent's response. In such equity questions, the original scale is displayed as the stimulus set to the answer previously given for that scale. In the case of a "plus" equity question, the interviewer seeks to build a ladder explaining why the respondent chose as he/she did, and not the immediately lower option on the scale. Therefore a response provides an explanation of what the respondent views as "positive" equity. Note that for a plus equity question, if the respondent provides the extreme negative rating to the referenced scale, the equity question is automatically skipped (since there is no positive equity). As noted, the respondent's display for equity questions includes the referenced scale question, and the answer previously given by the respondent, e.g., with an added visual clue highlighting the rating increment being discussed. |
| MINUS-EQUITY-RATING MINUS-EQUITY-TREND MINUS-EQUITY-PREFERENCE | The flip side of a plus equity question is a "minus equity" ladder question. Here the question will be about why the respondent had not given a rating one higher. Thus the response will be a ladder about what negative aspect kept the respondent from giving a rating that was more positive.<br>A minus equity rating question will not be asked if the answer to the referenced scale question was the highest possible (positive) rating. |
| RATING-SCALE | A Rating scale question presents a range (e.g., from 1 to 9, where 1 indicates very dissatisfied, and 9 indicates perfect) for the respondent to choose a rating related to, e.g., an object being researched. An example of a rating-scale question is shown in the subwindows 3206 of FIG. 32. Respondent replies may input via a mouse or other selection device. |
| TREND-SCALE | A Trend Scale question is another interactive question very much like the Rating Scale question. Each Trend Scale question presents a trend scale related to, e.g., an object being researched, wherein the question is about a trend, and a response may be in a range from "a lot less" to a |

Figure 37A:
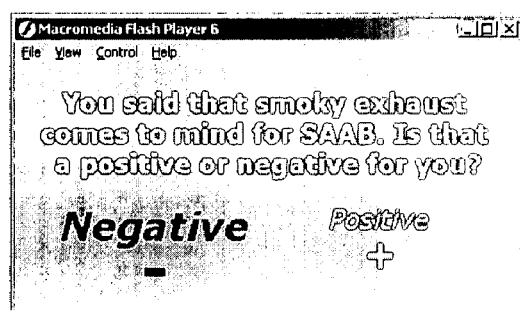
Figure 37B:
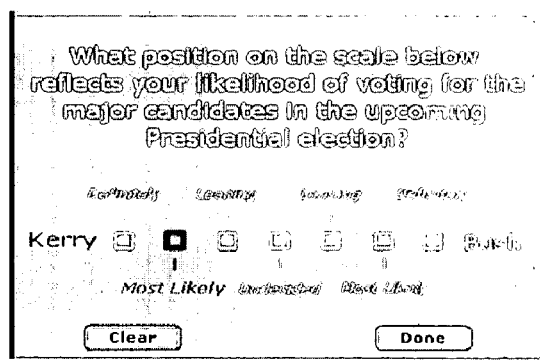

| Question Type | Description |
|---|---|
| | "lot more". Examples of such questions are provided in the museum market analysis example hereinabove, and in particular, the past trend anchor question and the future trend anchor question illustrated in the museum example. Such trend questions may be presented with, e.g., a five point scale. However, other scales may be also used, e.g., a seven (or larger) point scale. The respondent typically responds by selecting one of the points on the scale with, e.g., a mouse or other selection input device. |
| VALENCE | A question of this type asks for a simple positive or negative typically on a question composed from one or more previous respondent responses. This also has a simple interactivity wherein the respondent can select Positive or Negative. An example of a rating scale question is shown in FIG. 37A. |
| PREFERENCE-SCALE | Each question of this type presents a preference scale related to, e.g., an object being researched, wherein the question is about a preference between two objects (e.g., political candidates). The answers may range from, e.g., "definitely" at each extreme to "undecided" in the middle. Selection is interactive by the respondent with visual feedback/clues. An example of a preference scale question (with a respondent's selection shown as "most likely" for Kerry) is shown in FIG. 37B: |
| CHIP-ALLOCATION | This form of question prompts the user to allocate a predefined number of "chips" or tokens to some number of options. This type of question is used as a means of expressing relative importance (in the view of the respondent) of a number of related (or competing) items. An example of a chip allocation question is: "Please divide 10 chips among each of the following LEADERSHIP TRAITS according to your degree of liking and importance for each trait with respect to who you would vote for to be the next President of the United States. Trustworthy: Honest and worthy of trust Effective: Capable; get things done Popular: Number one; popular with people |
| RADIO-QUESTION | This is a simple multiple-choice question where the user is required to select one (and only one) of some number of options. An example of a radio question is: "What is your marital status?" Single Married Widowed Divorced/Separated |

StrEAM Ladder Probe Questions

As noted for a given interview, providing probe questions during the course of an interview session can be repetitive from interview session to interview session. Therefore it is possible to create a substantially uniform list of probe questions that might reasonably be used in most of the sessions for the interview. Ladder probe questions in a StrEAM interview take the form of "moving" through a respondent's thought process "from" one level of the ladder "to" another. For instance when a respondent states that "high price" (an attribute) is an issue, the interviewer might ask: "What is the biggest problem that this causes for you?" in order to probe for a functional consequence. A response pointing out "difficulty staying within monthly budget" might cause the interviewer to next ask: "How does that make you feel?" in order probe for a psychosocial consequence.

Figure 45:
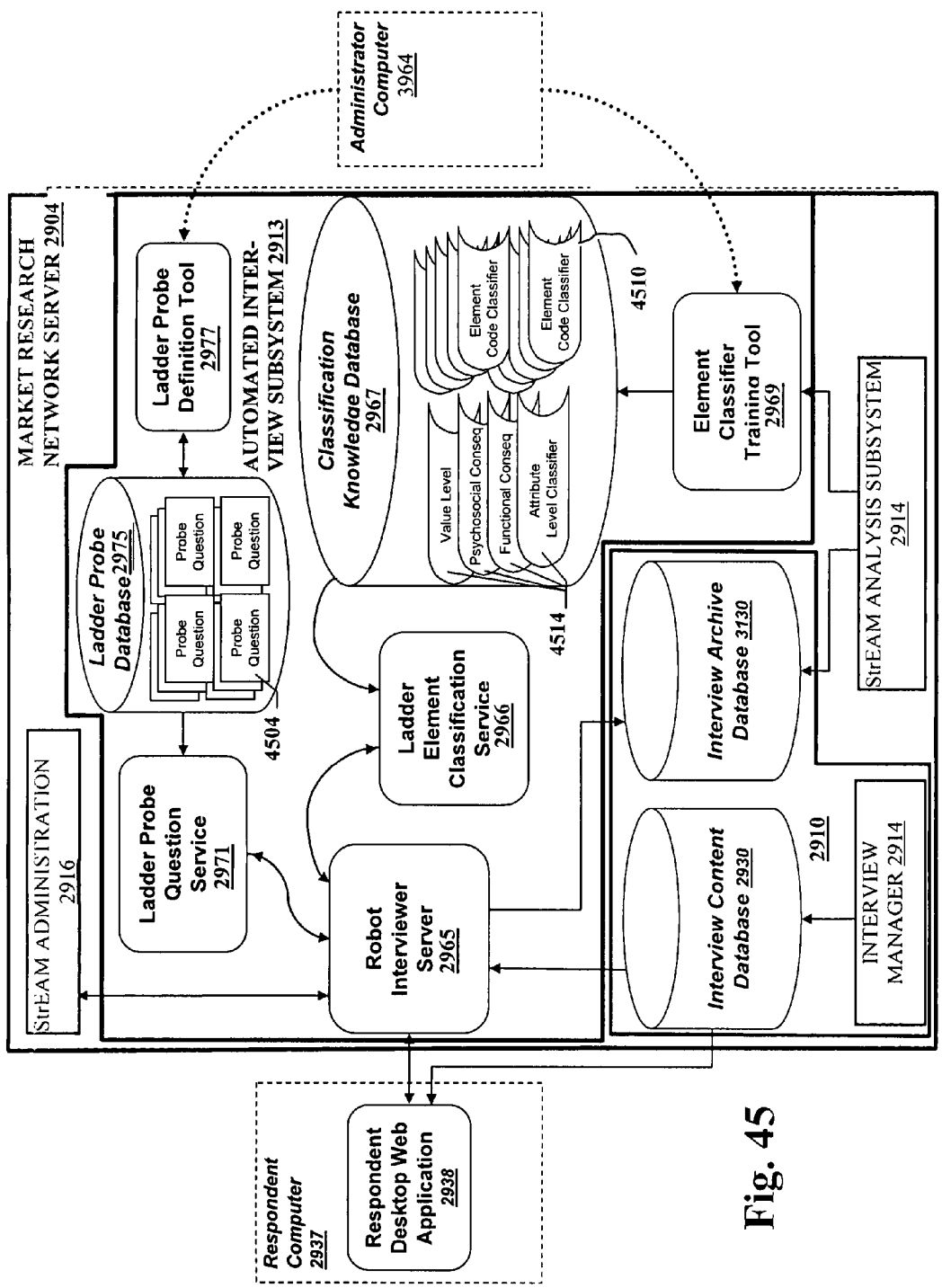
FIG. 45 shows a block diagram of the components for automating the interview subsystem 2913.

The market research analysis method and system 2902 includes a StrEAM Ladder Probe Question service 2971 (FIGS. 29 and 45) for determining probe questions 4504 (FIG. 45) to be presented during an interview session. Such probe questions 4504 are determined in terms of the transition to be made (from one ladder element to another). Although both FIGS. 29 and 45 show the ladder probe question service 2971 included in the StrEAM Automated Interview subsystem 2913 wherein the ladder probe question service provides question probes 4504 for use in an interview session that is conducted without an interviewer, the ladder probe question service and its corresponding data may be provided as part of an interviewer application 2934 for assisting an interviewer in conducting an interview. In one embodiment, the ladder probe question service 2971 uses a simple set of "if-then" rules to specify when a particular probe question 4504 is eligible for presentation to an interviewee. A schema for a collection of such rules is shown in the PROBE SCHEMA EXAMPLE immediately below, wherein the rules are provided in a simple XML syntax.

```
<probe from-level="level" to="level"> text of probe question </probe>
<probe from-level="level" to="level"> text of probe question </probe>
<probe from-level="level" to="level"> text of probe question </probe>
<probe from-code="code" to="level"> text of probe question </probe>
<probe from-code="code" to="level"> text of probe question </probe>
<probe from-code="code" to="level"> text of probe question </probe>
    Where:
        "level" is one of:    "attribute"
                              "functional"
                              "psychosocial"
                              "value"
        "code" is any valid ladder element code category
    Also:
        A <probe> element may also have an optional attribute:
            ladder-id= "question-id"
        This constrains the probe to be used only for the ladder question
        specified. When not specified, the probe question is valid for any
        ladder in the interview.
```

Probe Schema Example

Referring to the above PROBE SCHEMA EXAMPLE, instances of probe questions 4504 are asked when particular interview session status conditions are satisfied. For example, each of the first three lines of the above example is illustrative of an "if-then" rule for presenting a corresponding probe question 4504. Thus, if a particular interview session status occurs (e.g., an interviewee response has been categorized as belonging to a certain ladder level, and it is determined that a response for a lower or higher level of the ladder is needed), then the text of the "probe question" is presented to the interviewee. Alternatively, each of the fourth through sixth lines of the above example is illustrative of an "if-then" rule for presenting a probe question, wherein if the interview session status is such that a response from the interviewee has been identified as identifying a particular predetermined code (e.g., a word or a phrase), and it is desirable to obtain a response from the interviewee about a ladder level above or below the identified code, then a corresponding probe question may be presented to the interviewee. Note, such a circumstance may occur when two different ladders have a level identified (by an interview composer) for a common predetermined code.

It should be noted that while the syntax of the above probe question schemas does not require the corresponding probe questions 4504 to be only one level above or below a currently identified ladder level, each probe question 4504, e.g., stored in the ladder probe database 2975 (FIGS. 29 and 45) or stored on the interviewer computer 2936, preferably involves a single ladder level transition from a currently known ladder level. In a simple embodiment, the ladder probe database 2975 may be a file (referred to as a "configuration file 2975") which lists the probe questions to be used when going "up" or "down" from a ladder level. The Functional Consequence and Psychosocial Consequence ladder levels will each have at least one "up" question and one "down" question. The Attribute level will have at least one "up" question, and the Value level will have at least one "down" question. There may, of course, be additional probe questions for each ladder level.

Note that a same set of interview session circumstances may satisfy the conditions for more than one probe question presentation rule. Accordingly, if an interviewer is conducting an interview, the interviewer can select an appropriate probe question 4504 to present to the interviewee. However, during automated interview sessions if multiple probe questions are identified as candidates for presentation, the one to be presented may be chosen according to one of the following criteria: (i) chosen randomly, (ii) chosen to complete a particular ladder, and/or (iii) chosen to obtain a particularly important (high priority) ladder level (e.g., a ladder level that is common to many ladders, but whose response can affect the efficiency with which an automated interview session is conducted). Note, such strategies may correspond to the manual interviewing process disclosed hereinabove in that probe question suggestions may be presented to an interviewer during manual interviews, and the interviewer may choose from among the suggested questions to present to the interviewee.

(3.2) StrEAM*Interview Respondent Application 2938

A representative user interface display of the respondent application 2934 is shown in FIG. 32. As indicated, there are four (4) main areas (or windows) where interview interaction takes place. The interview display area window 3206, the interviewer instant message window 3212, the respondent instant message window 3218, and the notes and playback area window 3224.

The interview display area window 3206 is generally for presenting formal stimuli (e.g., a question and/or scenario) to the respondent and receiving a response from the respondent. Such formal stimuli may be presented as a series of "slides" (some of which can be animated) that are controlled by the interviewer conducting the interview. In certain cases, the respondent will interact with the interview display area window 3206, such as answering a multiple-choice question and/or inputting a rating of an object or characteristic thereof. In such cases, the selection among the presented alternatives may be performed with a mouse, trackball or another computational selection device. However, it is within the scope of the StrEAM*Interview subsystem 2908 to obtain such respondent selection via voice input and/or use of a touch screen.

The area interviewer instant message window 3212 is generally for presenting unstructured text entered by the interviewer (e.g., feedback, comments, and/or further information such as explanation or clarification) to the respondent. In FIG. 32, the interviewer instant message window 3212 has recorded messages sent by the interviewer to elicit responses for a ladder being constructed about the respondent's image of the Teton Pines Country Club. Note that on the respondent's visual display device, the window 3212 is typically a display-only region. Note, however, that on the interviewer's visual display device, there is a corresponding window into which the interviewer is able type messages for presenting in the respondent's window 3212.

The display area 3218 (also identified as respondent instant message window 3218) is where a respondent can input unstructured text at any time during an interview session with the respondent. Previously sent messages can be displayed (and scrolled if necessary with window 3218). Note that on the interviewer's display (e.g., computer "desktop"), the corresponding window 3218 is typically display only, and responsive text from the interviewer is entered in the interviewer instant message window 3212.

The fourth area, denoted the notes and playback area window 3224, is used for presenting formal responses (i.e., responses recorded by the interviewer) to the respondent for his/her approval. The content of this window is built by the interviewer and when appropriate (e.g., approved by the respondent), is recorded as the formal response to a currently presented interview question or scenario. In particular, the window 3224 is used, for instance, in building a ladder, one such ladder being shown in this window in FIG. 32.

The respondent application 2938 also includes several items that display information about the current interview session. These are:

| Desktop Component | Description |
| --- | --- |
| Interview Title | This simply displays the title of the interview/study. It comes from the StrEAM*Interview Definition data 3110 (the <interview-title> element). |
| Interviewer Screen Name | This displays the screen name of the interviewer who is expected to conduct this interview session. |
| Interviewer Status | The current status of the interviewer is displayed here (offline [red] - or ready [green]). This is detected by the handshake between the interviewer and respondent desktop applications through the StrEAM*Interview manager 3126. |
| Respondent Status | The current status of the respondent is displayed (offline [red] - or ready [green]). It is possible to have the application running but not (yet) connected to the interview manager. In this case the respondent's status will be offline. As soon as all of the |

-continued

| Desktop Component | Description |
|---|---|
| | respondent's connections have occurred, his/her status will become ready. |
| Respondent Connection Light | This component monitors the quality of the respondent's connection to the interview subsystem server 2910 and displays the connection's status with a green, yellow, or red light. If clicked, this will toggle to display a more detailed display that gives a few more details about the quality of the connection. |

Buttons/Controls

In addition, there are several items on the respondent's computer that provide some control over the respondent application 2934 or can be used to help respond to the interviewer.

| Desktop Component | Description |
|---|---|
| Audio Volume Control | This is a 'slider' control that can be used by the Respondent to adjust the volume of the audio (if on). The Respondent clicks and holds the slider and moves it right and left to increase and decrease (respectively) the volume of the audio. |
| Audio On/Off (not pictured) | This button is available to the respondent to turn on (default) or off the audio input from the Interviewer. Note that the change of state of this button is communicated to the interviewer so he/she will not use the microphone if the respondent has turned the sound off. |
| Yes Button | This button is a convenience for the respondent. Clicking this will put 'Yes' into the Respondent Instant Message Typing Area 3218 (FIG. 32) and send it to the interviewer. |
| No Button | This button is a convenience for the respondent. Clicking this will put 'No' into the Respondent Instant Message Typing Area 3218 and send it to the interviewer. |
| Pause Interview (not pictured) | This button is available to the respondent to allow him/her to signal to the interviewer a desire to pause the interview. The button has no effect other than to send this message. The interviewer will be required to take action to both respond to the request, and to either just wait for the respondent to continue, or to actually suspend the interview for restart some time in the future. |

Note that the table above does not include the user interface controls that are provided to the respondent for interactive interview questions. Such controls are specific to each form of interview question and are provided within the interview display area window 3206.

(3.3) Interviewer Application 2934 User Interface

Figure 33:
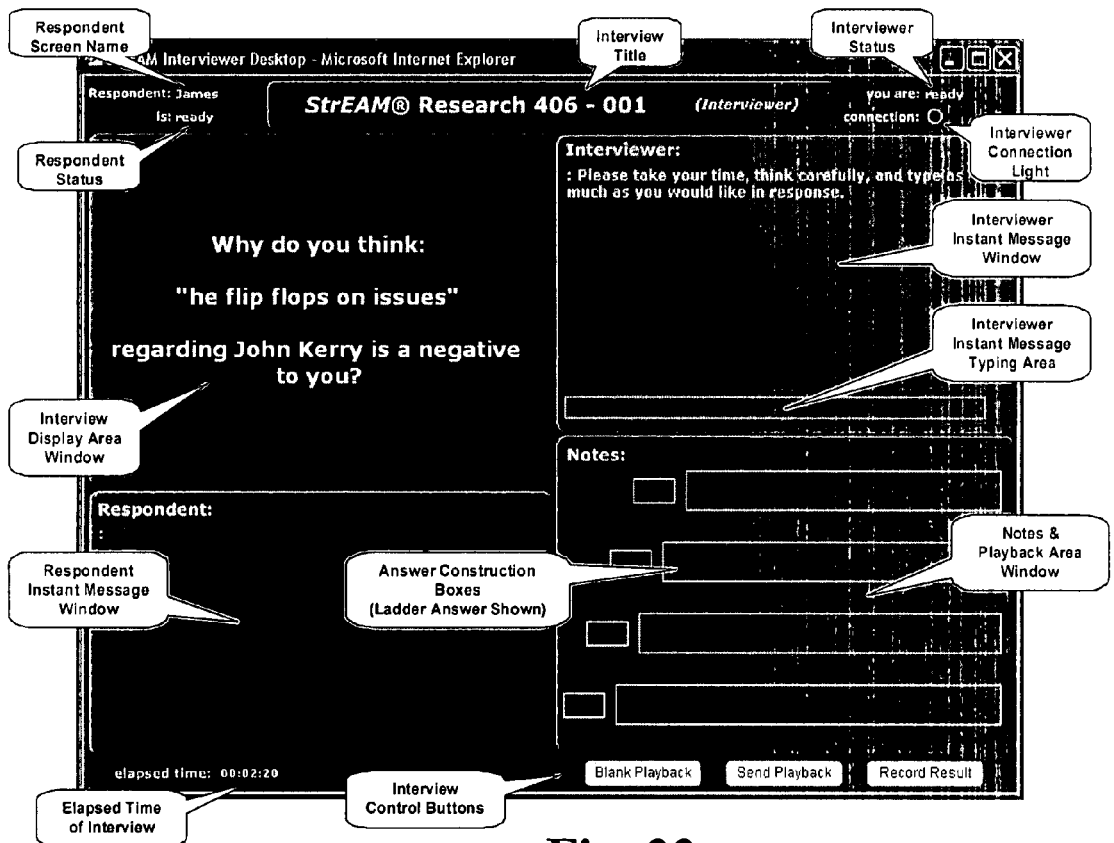
FIG. 33 shows an annotated sample of the StrEAM*Interview 2908 interviewer desktop application 2934.

An annotated sample of the StrEAM*Interview interviewer desktop application 2934 is shown in FIG. 33.

Below is a list of the display items provided by an embodiment of the interviewer application 2934 (FIG. 29). Each of these presentation items provides information about the current interview session. None of these items, however, can be used to change settings or cause any change in the interviewer application's behavior. Note, that most of the items identified in the table immediately below are identified in FIG. 33 by a callout.

| Desktop Component | Description |
|---|---|
| Interview Title | This simply displays the title of the interview/study. It comes from the corresponding interview definition data 3110 (i.e., the <interview-title> element). |
| Respondent Screen Name | This displays the screen name of the respondent with whom this interview session is being conducted. |
| Respondent Status | The current status of the respondent (more precisely, the respondent application 2938) is displayed here via color (offline by red, and ready by green). The status of the respondent application 2938 is detected by a network handshake between the interviewer and respondent applications through the StrEAM*Interview manager 3126 (FIG. 29). |
| Interviewer Status | The current status of the interviewer application 2934 is displayed via color (offline by red, and ready by green). It is possible to have the interviewer application 2934 running but not (yet) connected to the interview manager 3126. In this case the interviewer's status will be offline. As soon as all of the interviewer's network connections have occurred, the status of the interview application will become ready. |
| Interviewer Connection Light | This display item monitors the quality of the interviewer's connection to the interview subsystem server 2910, and displays the connection's status with its green (when the connection quality is effective for conducting an interview session), yellow (when the connection quality is only marginally effective for conducting an interview session), or red (when the connection quality is not effective for conducting an interview session). If this item is selected (e.g., clicked on) by the interviewer, this item will toggle to display more details about the quality of the connection. |
| Elapsed Time | This display item displays the total time that has elapsed since an interview session began. This displays the time since the "Start Interview" button was pressed, not the beginning of the connections. |
| Respondent Audio Status (not shown) | This display item displays whether the respondent's audio is on or off. If it is off, the interviewer can not rely on audio communication to communicate with the respondent. |

In addition, the interviewer application 2934 provides several items that provide user control over various features. These items are given in the table below.

Most of these items are buttons that appear in the location indicated by interview control buttons in FIG. 33. These buttons enable the interviewer to control the flow of the interview. They are context dependent and only permit an action that is appropriate. For example, a question may not be bypassed until the respondent has given an appropriate answer. This ensures that the interview session is conducted according to the interview design specified in the corresponding interview definition data 3110.

| Desktop Component | Description |
| --- | --- |
| Start Interview | This button is available only at the beginning of the interview, and only when both the interviewer and the respondent have connected properly (through the Interview Manager). The initial interview state is that a Welcome slide is displayed and the conversational windows are available for dialog. Typically the Interviewer might have a message like: "Welcome. Please let me know when you are ready" in the Interviewer Instant Message Window.<br>Once the Interviewer decides the time is appropriate he/she presses the Start Interview button to begin the structured part of the interview. Note that as soon as the respondent and interviewer connect to the StrEAM Web Server the Interview Transcript is started. However, the actual interview session doesn't begin until the Start Interview button is pressed (by the Interviewer). When the Start Interview button is pressed, the header of the StrEAM*Interview Results File for the session is written and the application proceeds to the first topic of the interview session. The Elapsed Time clock also begins at this time. |
| Quit Interview | This is available as an alternative to the Start Interview button. This enables the interviewer to shut down the interview session before ever beginning it. This option is only available at the beginning of an interview. No interview results are recorded. |
| Finish Interview | This button is available only at the end of the interview. When the interview has concluded processing the final interview topic, the application will await interviewer action to conclude the session. Pressing the Finish Interview button will cause the interviewer application to write out the footer to the StrEAM*Interview Results file for this session. All further interaction between the interviewer and respondent will cease (including instant messaging) and both sides (respondent and interviewer) will be disconnected from the StrEAM Interview Manager.<br>The Finish Interview button is used to conclude a fully executed interview session and records an appropriate status to that effect. |
| Send Playback | This button is active when the respondent and interviewer are constructing an answer to a non-interactive question. For instance, this might be during construction of a general open-ended answer or a ladder, etc. In order to provide feedback to the respondent and elicit additional detail or clarification, the interviewer may send a copy of the answer currently being constructed by way of the Notes & Playback Area Window. The Send Playback button will cause the current contents (on the interviewer side) to be sent (to the respondent). No other action will take place. |
| Blank Playback | In order to simplify the respondent's visual stimulation, the interviewer may occasionally wish to clear the Notes & Playback Area Window. Pressing this Blank Playback button will cause any existing content in that window (only the respondent's side) to be cleared. Note that it has no effect on the content of the interviewer's side where an answer may be under construction. |
| Record Results | This button is active any time a valid response to an interview question is available. In the case of an interactive question (where the answer has been fully developed on the respondent's side) that is when an answer has been sent from the respondent. In the case of non-interactive questions (such as ladders or open-ended questions), that is when a valid answer has been constructed on the interviewer's side based on his/her dialog with the respondent.<br>When this button is pressed, the available response is permanently recorded to the StrEAM*Interview Result file as the answer to the interview question. Processing of this interview question topic is now concluded. |
| Next Topic | This button is active any time the previous topic has been completed (answered in the case of a question or displayed in the case of an information-only topic). Clicking the Next Topic button will cause the interviewer application to proceed to the next topic in the StrEAM*Interview Definition file 3110. The display for that next topic will occur and the control information will be transmitted to the respondent's desktop to cause the same to happen there.<br>If the next topic is a question, the interviewer and respondent will enter the appropriate question answering mode. |

| Desktop Component | Description |
| --- | --- |
| Suspend Interview | In between the presentation of interview topics, the Suspend Interview button allows the current interview session to be suspended and shut down in an orderly fashion. This would typically be used at the behest of the respondent. The interview is suspended in a manner that enables it to be resumed in the future. |
| Microphone On/Off Toggle (not pictured) | This button is always available and allows the interviewer to toggle the status of his/her microphone. When it is ON, the interviewer may speak through a microphone and the respondent's speakers. When it is OFF, the microphone is deactivated.<br>Typically the interviewer will want to keep the microphone on to use voice to elaborate the discussion. However there may be reasons (including the respondent's preference) to not use voice, and just text dialog. |

Context Menus (Right Button)

In one embodiment, there are context-dependent pop-up (right-click) browser menus for assisting the interviewer by, e.g., providing "hints". Basically, the function of any of these Interviewer application context menu pop-ups is to offer a piece of text to be input to the applicable text entry buffer for transmitting to the respondent application. The text will not be automatically sent; the Interviewer must activate the sending (by hitting return). This way the Interviewer is able to edit (if desired) such text prior to it being transmitted to the Respondent.

Note that if there is any text in the chosen buffer prior to the menu choice it will be overwritten by the menu choice.

Interviewer Area (window)

If a right-click is detected over the interviewer's text box (or in one embodiment, the whole Interviewer dialog window) any interviewer hints (as described in the section "Interviewer Hints" hereinbelow) that are available are displayed.

The options that are available for use with the interviewer hints may be:
  (i) Paste the last line of text from the Respondent's dialog (if anything); or
  (ii) Paste whatever is in the paste buffer (if anything);
And then any <interviewer-hints> (for that topic context).

Notes Area 3224 (Window)

There are three different Notes area 3224 modes depending on what kind of input is being constructed by the interviewer. These modes are represented by: (1) ladder building result boxes, (2) set building result boxes, and (3) simple response boxes. Each of these is described immediately below.

Ladder Building Result Boxes

When a ladder is being constructed as the official interviewee response, there are four text boxes in the Notes area 3224 (i.e., one for each of: a value response, a psychosocial consequence response, a functional consequence response, and an attribute response).

Right-clicking over any of these boxes will offer the following options:
  (i) Paste the last line of text from the Respondent's dialog (if anything); or
  (ii) Paste whatever is in the paste buffer (if anything)
  And then any <ladder-hints> (for that topic context) by category:
    (a) When over Values any <values><hint> elements;
    (b) When over either Consequence box any <consequences><hint> elements; and
    (c) When over Attributes any <attributes><hint> elements.

Set Building Result Boxes

When building a set as a result (this is both for a set generator and for a set elaborator), there will be several text boxes in the Notes Area 3224 (the number specified by the IDefML set-maximum attribute for the set producing topic, or the number of actual set members when doing a set elaboration). Each box will correspond to an answer. There is an unselected box border (thin white) for boxes not selected, and a selected box border (thick yellow) for selected boxes.

The right-click/pop up menu available is the same for all boxes. The box that is right-clicked over is the box that will be the target for whatever is pasted. The options are:
  (i) Paste the last line of text from the Respondent's dialog (if anything);
  (ii) Paste whatever is in the paste buffer (if anything); and
  (iii) And then any <response-hints> (for that topic context).

Simple Response Box

This is a text box in the Notes Area 3224 that will be used to construct and/or replay any other kind of response. When a user right-clicks over this box the options available are:
  (i) Paste the last line of text from the Respondent's dialog; or
  (ii) Paste whatever is in the paste buffer;
and then any <response-hints> (for that topic context).

(3.4) StrEAMInterview 2908 Data Definitions

StrEAM Interview data includes the data structures, data content for defining the behavior of interviews performed by the StrEAM*Interview subsystem 2908. The StrEAM Interview data may be specified in data repositories such as files (e.g., IDefML data definition 3110 files and resource data 3114 files, FIG. 31) stored in the interview content database 2930 (FIGS. 29 and 31) from which such data is provided by the interview subsystem server 2910 to each of the client desktop applications (i.e., the interviewer applications 2934 and respondent applications 2938, FIGS. 29 and 31) at interview time to drive interview sessions. This makes it possible for consistent interviewing to be conducted as prescribed by a StrEAM*Interview interview composer using an interview composer tool 2940 (FIG. 29) further described hereinbelow.

In at least one embodiment of the market research analysis method and system 2902, interview sessions are defined (and controlled) by above mentioned two types of data; i.e., IDefMS data 3110 (e.g., provided in a plain text file) for defining the structure of each interview, and resource data 3114 (e.g., provided by a Macromedia® Flash® player movie file that defines the graphics and interactive behaviors for the interviewer). Note that the interview definition data 3110 is also referred to herein as the "StrEAM*Interview Definition file", and the resource data 3114 is also referred to herein as the "Flash® Interview Resource file".

StrEAM interview sessions may be composed of a series of "slides" that are informational or ask for a response from the respondent. The sequence is ordered according to the interview definition data (file) 3110. However, note that such an ordering may include a random rotation of questions and groups of questions. Various branching and conditional interview session controls are also available based on respondent answers to previous questions. References and/or statements can be incorporated into the interview definition data 3110 between interview questions provided therein to control interview session flow, and also to amend the display. In addition to interview questions directed to completing various ladders, the interview definition data 3110 may additionally include interview questions (or imperative statements) directed to non-laddering questions such as the question types described in the examples of section (1.1) hereinabove. In particular, the following types of questions (or imperative statements) may be provided in the interview definition data 3110: anchor questions, +Equity questions, −Equity questions, top of mind questions (section 1.15), expectation questions (section 1.14), usage questions, trend anchor questions, valence questions (section 1.15), etc.

Practice questions can also be included in a StrEAM*Interview session in order for the respondent to become acquainted with the various mechanisms.

StrEAM*Interview subsystem 2908 interview data may be comprised of a series of "topics". Each topic presents its own graphical display on the interview desktop (for both the interviewer and respondent). In some cases, a topic graphical display can be static, and in others such a display supports interaction on the part of the respondent. Each interview topic may also cause messages to be sent from the interviewer to the respondent by way of the interviewer's instant messaging capability.

Some interview topics are only for informational purposes whereas others include one or more questions related, e.g., to an object being researched (such interview topics are referred to herein as "question topics"). In the case of question topics, the both the interviewer computer and the respondent computer enter a corresponding mode such that the respondent is substantially required to answer the question presented, and the interviewer application 2934 records the answer. The actual behavior of a question topic depends on its type.

The interviewer controls the pace of an interview session, and the interviewer is responsible for advancing from one topic to a next. In the case of question topics, the interviewer cannot generally proceed to a next topic until a satisfactory response has been gathered from the respondent for a present topic, and recorded. The following is a list of the form of questions that may be presented in an interview session:

(a) The most basic form of question topic for an interview is one that poses an open-ended question, and allows a respondent to provide an unstructured response (e.g., a response whose content is not one of a predetermined number of optional responses, such optional responses being, e.g., options of multiple choice questions, etc.).

(b) Several forms of multiple-choice questions also can be presented in an interview session. All of these multiple-choice questions present a series of choices. Typically, the respondent must select one (and only one) as the answer. In one embodiment, the options are presented in a standard "radio" multiple-choice question; however, such options can be presented in random order based on an interview definition directive.

(c) A chip allocation question presents the respondent with a series of options. The respondent is then required to distribute a set of chips (or another symbol) across those options in order to identify each option's relative weight (importance, affinity, etc.). All of the chips must be distributed, and any distribution is valid including all chips to one option. Note that the options in a chip allocation question may also be presented in random order if desired.

(d) Ladder questions are a key form of question topic supported by the StrEAM*Interview subsystem 2908. Several types of such ladder question are available, but all perform the same function of putting the interviewer and respondent in a mode where a two-way dialog is expected in order for the interviewer to elicit a ladder response to some question (typically in reference to a previous answer).

During a ladder question an interviewer dialogs (possibly iteratively) with the respondent and leads him/her up (or down) a means-end discussion. The interviewer is charged with ultimately constructing a complete means-end ladder with responses at all four ladder levels (Attribute, Functional Consequence, Psychosocial Consequence, and Value). That is done by asking probing questions and replaying the components of the ladder for comment (and stimulation) until the ladder is complete.

In at least one embodiment the data 3110 and 3114 are further described as follows.

| StrEAM*Interview Input File | Description and usage |
| --- | --- |
| Interview Definition XML File 3110 | This is a plain text file containing a special purpose XML-based language for defining StrEAM*Interview sessions. Here the StrEAM*Interview designer will specify which questions to ask, in what sequence, and using what form of questioning. The flow of control is also defined here with any conditional behavior defined. Note that only the StrEAM*Interview Interviewer Desktop application reads the interview definition data 3110. |
| Flash ® Interview Resource Movie 3114 | This is a Macromedia ® Flash ® "movie" file (as are the StrEAM*Interview desktop applications). This file contains the graphical user interface resources (e.g. movies, animations, pictures, stored audio and video, etc.) needed for conducting the corresponding interviews. Both the interviewer and respondent desktop applications load this file. It contains default display presentation (i.e., slide) mechanics for all of the different interview question types. It also can contain custom developed slide mechanisms. |

During the course of execution of a StrEAM*Interview for an interview being conducted, there is an output (e.g., a file) which is stored respectively in the interview archive database 3130 (e.g., as shown in FIGS. 29 and 31). Both are plain text files that are written to the file system on the market research network server 2904 (also referred to the "StrEAM network server" herein). One is an interview result file 3118 (FIG. 31) which is an XML-formatted file containing the results of the interview (the Interview Result XML file). The other interview output file is an interview transcript file 3122 which contains a recording the interactions between the interviewer and the respondent, particularly instant messaging traffic as described hereinbelow. The files 3118 and 3122 are further described as follows:

| StrEAM*Interview Output File | Description and usage |
| --- | --- |
| Interview Result XML File 3118 | This is a plain text file containing a special purpose information (in a XML-based language) for retaining the results of a market research interview session. Each interviewee response to each interview question is stored along with the question exactly as it appeared at interview time. The interview result file 3118 also includes information about the interview session itself such as the identities of the participants, the date & time it started and ended, etc. The Interview Result XML file 3118 is received and stored by the market research network server 2904 StrEAM network server. It is written at the request of the Interviewer's Desktop application, which passes the answers collected to that output. Note that the Interview Result XML file is written incrementally. As each interview question is answered, the response is written to the Interview Result file. Partial results are therefore recorded in the case of network failure. |
| Interview Transcript 3122 | The transcript file is also a plain text file that is saved behind the scenes (on the StrEAM network server) by the StrEAM*Interview Manager application. It contains a full transcript of the interactions between the interviewer and the respondent, including all of the messages passed via instant messaging. The transcript file is written without any interaction by either interviewer or respondent. It is kept for audit purposes only, not being used for any analysis. |

Interview communication interview dialogs conducted via the market analysis system 2902 may utilize multiple forms of network communication. In particular, substantially any combination of the audio, visual (video and/or graphs), and textual forms of communication may be used during an interview session for communicating between an interviewer and a respondent, depending upon the hardware communication capabilities of the interviewer and respondent computers. Note, however, that typically only a subset of such communication combinations will be utilized, particularly on the respondent side, in order to minimize the interview set up effort required on the respondent end.

More details of one embodiment of an XML language used for defining interviews are provided in Appendix A hereinbelow.

(3.4.1) Interview Resource Data 3114

As described hereinabove, one embodiment of the StrEAM*Interview subsystem 2908 uses interview resource data 3114 as part of the data for defining an interview. The interview resource data 3114 contains the information for specifying the behavior of, e.g., the interview questions/topics presented to an interviewee. For instance, the manner in which the StrEAM*Interview subsystem 2908 asks a multiple-choice question can be changed via the interview resource data 3114. Such resource data 3114 contains the graphical user interface resources for a corresponding interview. Both the interviewer application 2934 and the respondent applications 2938 load the resource data 3114 corresponding to an interview session. The resource data 3114 contains default presentation techniques for all of the different interview topic types. Such resource data 3114 also can contain custom developed presentations to be used for specific topics, as would be indicated in the corresponding interview definition data 3110. Such resource data 3114 may be provided in a format for execution by a Flash® Player from Macromedia Inc. as one skilled in the will understand. Hence, the resource data 3114 may be embodied as a Flash® interview resource file, as one skilled in the art will understand.

However, other types of resource data 3114 are within the scope of the present disclosure. For example, resources (e.g., movies, animations, graphics, audio clips, etc.) may be presented in interview presentations according to information in the interview resource data 3114.

Each instance of resource data 3114 is typically specific to a particular interview definition data 3110 (though a generic default resource may be used where no custom interview presentations are to be presented during an interview session). As with the interview definition data (file) 3110, the path to the flash interview resource data (file) 3114 is specified to the interviewer and respondent applications (2934 and 2938 respectively) at commencement of an interview session.

The resource data 3114 may include labeled Flash® movie "frames", as one skilled in the art will understand. The StrEAM*Interview applications 2934 and 2938 use the "goToAndPlay(label)" directive to cause the Flash® Player invoke one of these resources. Those frames can contain any combination of graphics and ActionScript. Multiple frames can be used if desired so long as the resource concludes with a "stop( )". For very complex effects, a resource may in turn load and play other Flash® movies. Through this mechanism, this embodiment of StrEAM*Interview can support interviews of unlimited complexity with respect to user interface.

Default Interview Resources

As implied above, it is possible to define an interview that makes no explicit references to custom interview resources. This is because the basic behavior is provided by a set of default interview resources that will always be available in each interview resource data instance 3114. These resources support the default functionality of all of the current interview topic types. The default resources are as follows:

| Resource Name | Interactive? | Purpose/Description |
|---|---|---|
| defaultDisplaySlide | No | Implements a display only (Information Topic) slide that simply displays a text string.<br>Parameters expected:<br>_global.displayAreaText - String |
| defaultBlankSlide | No | Provides a simple blank slide.<br>Parameters expected: <none> |
| defaultRatingSlide | Yes | Implements an animated, interactive, rating scale slide.<br>Parameters expected:<br>_global.displayAreaText - String<br>_global.currentScale - Object |
| defaultTrendSlide | Yes | Implements an animated, interactive, trend scale slide.<br>Parameters expected:<br>_global.displayAreaText - String<br>_global.currentScale - Object |
| defaultValenceSlide | Yes | Implements an animated, interactive valence choice (positive/negative) question slide.<br>Parameters expected:<br>_global.displayAreaText - String<br>_global.currentScale - Object |
| defaultPreferenceSlide | Yes | Implements an animated, interactive preference scale (two options and a range of preference options).<br>Parameters expected:<br>_global.displayAreaText - String<br>_global.preferenceScale - Object |
| defaultChipAllocationSlide | Yes | Implements an animated, interactive question slide that has the respondent distribute a set of chips across multiple options.<br>Parameters expected:<br>_global.displayAreaText - String<br>_global.chipAllocation - Object |
| defaultRadioQuestionSlide | Yes | Implements an animated, interactive multiple choice (select one) question.<br>Parameters expected:<br>_global.displayAreaText - String<br>_global.radioQuestion - Object |

Custom Interview Resources

Custom variations of the display slides may be created, typically to provide richer graphics for the display area. Slides can be defined with different and more complex text formatting than provided by the default mechanisms. Or they may be built to display more advanced graphics as part of the stimuli for an interview. This includes the delivery of full Flash movies and/or video.

If a custom resource is to be used in a context expecting some form of animation, care must be taken to make sure that the custom resources comply with the input/output requirements. Generally it is best to start with a copy of the applicable default resource and customize from there.

(3.4.2) StrEAM*Interview Results Data

The results of an interview session with an interviewee may be written to a plain text file (e.g., XML file 3118, FIG. 31) and stored in the interview archive database 3130 (FIG. 29 or 31) by the interviewer application 2934. This file (also referred to herein as the StrEAM*Interview result file, or merely interview result file) contains the responses to the interview questions asked during the interview session. The contents of each interview result file 3118 are formatted in a special XML-based data format. One such interview result file 3118 is written per interview session conducted. That is, each interview result file 3118 is for a single interview session.

Gathering Answers

Below is a summary of the interview question types from the perspective of how the "results" are formed and captured. Note that in cases where additional questions are asked for each member of a multi-valued answer ("set" or "ladder" elaboration), the result format for each responses to the additional questions is independent of the fact that the additional questions were generated as the result of an elaboration.

The result is that there are four (4) basic forms of result construction:
(i) Simple answers;
(ii) Interactive answers;
(iii) Set Generation answers;
(iv) Ladder answers.

Each of these is described in more detail below:

| | | |
|---|---|---|
| Simple | <general-question><br><expectation-question><br><usage-question><br><purchase-question><br><image-question> | This is the form when there is just a text response to be provided. The Notes area 3224 (FIG. 32) is just a simple text box. The completeness test will be to see if it is not blank. |
| Interactive | <rating-scale><br><trend-scale><br><valence-question><br><radio-question><br><chip-allocation><br><preference-question> | These are questions where an interactive slide provides the answer from the respondent (it may also come through the dialog). So there is a simple constrained set of responses that can be here. |
| Set Generation | <occasion-question><br><consideration-question> | These are questions that result in the creation of a list (set). The answer for these questions is actually a list of responses. The user interface has a text box for each possible set member (up to the limit declared in the IDefML file 3110). Note that there is at least one non-null box for an answer. But there is no requirement for more than that. |
| Ladder | <plus-equity><br><minus-equity><br><ladder-question> | Ladder questions are those where the "answer" is the construction of at least a 4-level ladder. There will be four text boxes containing (from the top): Values, Psychosocial Consequences, Functional Consequences, Attributes. Each of these boxes must contain something in order for the answer to be considered complete. |

Interview Sessions

Along with the responses to interview questions, information about the overall interview session itself is recorded in a corresponding StrEAM*Interview result file 3118. This file includes, e.g., the identifiers for identifying the interviewer and the respondent, the date and time the interview session began and finished, and other such information. Additionally, respondent responses to all questions are retained in the interview result file, and in the order such responses were provided by the respondent.

Note that for chip allocation questions, each allocation option is recorded (even those with no chips allocated) along with the number of chips that were allocated to it by the respondent. It should be noted that chip allocation options may be randomized for a given interview session.

For ladder questions, the results therefrom are recorded in the form of ordered ladder elements (cf. the Definitions and Descriptions of Terms section hereinabove).

More details of one embodiment of an XML language used for defining interview result data is provided in Appendix B hereinbelow.

(3.4.3) Interviewer Assistance

In one embodiment, the StrEAM*Interview subsystem 2908 is intended to support an interactive dialog between an interviewer and a respondent. The subsystem 2908 allows for unstructured dialog between the interviewer and the respondent. However, as an optimization, the StrEAM*Interview subsystem 2908 may provide some automated assistance to the interviewer for inputting dialog to be communicated to the respondent. The availability of such assistance, as well as some of its content, is controlled by entries in the interview definition data (IDefML) entities 3110 (FIG. 31). This way an interview designer can create controlled, context-specific assistance to aid the interviewer during an interview session.

Interviewer assistance is provided in the form of context-specific pop-up menus (e.g., FIGS. 35 and 36) that are displayed when, e.g., a computer pointing or selection device (e.g., a mouse, light pen, joystick, trackball, etc.) is used to identify a particular area of the interviewer's computer display. The options on these menus depend on the arrangement of the interviewer's computer screen, and more particularly, on the context or state of the interview session. For example, for obtaining appropriate interviewee responses to a particular ladder level, the interviewer may be provided with one or more questions from which the interviewer can select a question for presenting to the interviewee. In FIG. 35, the interviewer has summarized an interviewee response that likely corresponds to an Attributes ladder level. Thus, when the interviewer uses his/her selection device to select (alternatively, hover over) the question input area 3500 (i.e., also denoted the, the Interviewer Dialog box herein), a menu 3504 of candidate questions appears from which the interviewer can select one of the questions to present to the interviewee.

Additionally, convenient paste options are provided that allow the interviewer to select and copy, e.g., a display of respondent text input (if available) to another area for the interviewer display. Moreover, an interviewer may have access to various interview information agents (e.g., software programs reviewing the interview process) that can provide the interviewer with "hints" regarding how to proceed with the interview. In general, such hints may be pre-formed questions or statements (whole or partial) that can be used when probing a respondent or capturing a desired respondent response.

Interviewer Hints

Interviewer hints are aids for the interviewer during the interviewing process. For an instance of an interview question, an interview composer (also referred to as a designer herein) may include a set of interviewer hints. If such hints are provided, then during, e.g., a Question state or other appropriate context, a pop-up menu is displayed in (or near) an Interviewer Dialog box 3500 (FIG. 35), wherein the pop-up menu will contain each of the specified "hints" as selections. Choosing one of those hints will cause the selected hint text to be inserted into the Interviewer's Dialog text box. An example of such interviewer hints is shown in FIG. 35 described hereinabove.

An interviewer can either send selected hint text verbatim to the interviewee, or edit it to form, e.g., a more specific probe question for the interview.

An interviewer-hints element in the interview definition (IDefML) file 3110 has the following form:

```
<interviewer-hints>
    <hint> Why is that important to you? </hint>
    <hint> How does that help you out? </hint>
    <hint> What do you get from that? </hint>
    <hint> Why do you want that? </hint>
    <hint> What happens to you as a result of that? </hint>
    <hint> How does that make you feel? </hint>
</interviewer-hints>
```

Accordingly, activation of an IDefML interviewer-hints element by the interviewer clicking his/her mouse button in the Interviewer Dialog box 3500 results in a pop-up menu with the content of menu 3504 of FIG. 35.

Ladder Hints

An interview composer (FIG. 29) may further facilitate the laddering process by providing aids (hints) to be associated with each ladder level via the interviewer composer tools 2940 (FIG. 29). Words, phrases, statements, etc. can be defined by the interview composer and made available to an interviewer by bringing up a menu when the mouse (or other selection device) is moved over (or near) one of the ladder level text boxes 3604 through 3616 of FIG. 36. There are three possible categories of Ladder Hints: Values (corresponding to text box 3604), Consequences (corresponding to text boxes 3608 and 3612), and Attributes) corresponding to text box 3616). Value hints are associated with the top ladder level, and Attribute hints with the bottom. Items listed as Consequences are associated with either of the two middle Ladder boxes (i.e., functional consequences, and psychosocial consequences).

Figure 36:
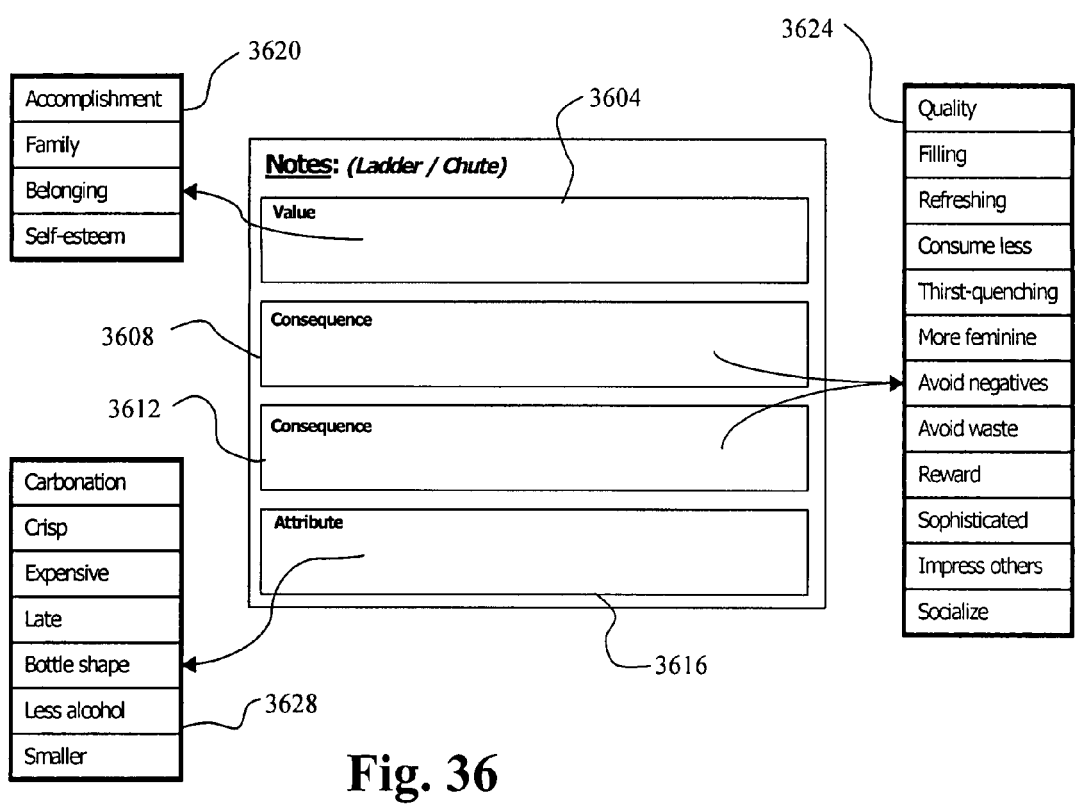
FIG. 36 shows another user interface popup menu available to the interviewer, wherein the menus of this figure assist the interviewer in obtaining laddering interview data from an interviewee.

Representative examples of the pop-up menus for hints are also shown in FIG. 36 (i.e., menu 3620 for values, menu 3624 for both functional and psychosocial consequences, and menu 3628 for attributes). Note, the hints shown in FIG. 36 are for an interview about a particular brand of wine.

An example of a data set for defining Ladder Hints is given immediately below:

```
<value-hints>
    <hint>Accomplishment</hint>
    <hint>Family</hint>
    <hint>Belonging</hint>
    <hint>Self-esteem</hint>
</value-hints>
<consequence-hints>
    <hint>Quality</hint>
    <hint>Filling</hint>
    <hint>Refreshing</hint>
    <hint>Consume less</hint>
    <hint>Thirst-quenching</hint>
    <hint>More feminine</hint>
    <hint>Avoid negatives</hint>
    <hint>Avoid waste</hint>
    <hint>Reward</hint>
    <hint>Sophisticated</hint>
    <hint>Impress others</hint>
    <hint>Socialize</hint>
</consequence-hints>
<attribute-hints>
    <hint>Carbonation</hint>
    <hint>Crisp</hint>
    <hint>Expensive</hint>
    <hint>Late</hint>
```

-continued

```
    <hint>Bottle shape</hint>
    <hint>Less alcohol</hint>
    <hint>Smaller</hint>
</attribute-hints>
```

(3.4.4) Operation of Interview Subsystem 2908

An interviewer proceeds sequentially through a series of presentations, continuing from one step to the next only as allowed by a predetermined interview framework as defined in a corresponding interview definition data 3110.

Since the interviewer application 2934 controls what happens on the respondent application 2938, the interview workflow may be described in terms of the state of the interviewer application.

Interviewer Application States

Interviewer application states may be described in terms of interview "presentations", wherein the term "presentation" refers herein to a semantically meaningful segment of the interview. Said another way, "presentation" refers to a collection of program elements for presenting interview information to the interviewer (and likely to the respondent as well), wherein the collection is either executed until a predetermined termination is reached, or, the collection is not activated at all. Accordingly, each such "presentation" corresponds with what is commonly referred to as a database transaction. There are four general types of presentations: OPENING, CLOSING, QUESTION, and INFO. The QUESTION type is where the interviewer causes a presentation, requiring a response from the respondent, to be presented to the respondent. In one embodiment, the interviewer may select such a presentation from thumbnail displays provided to the interviewer by the interviewer application. However, at least one preferred sequence of presentations is available to the interviewer for conducting the interview session. The OPENING and CLOSING presentations are special placeholder presentations at the beginning and end of an interview session, respectively. The collection of program elements for these states, respectively, initiates and terminates the capture of interview information. The INFO presentations are for presenting introductory information to the respondent, or help information to assist a respondent during an interview. No interviewer or respondent action may be required by an INFO presentation.

Given the above discussion of interview presentations, there are four basic states or modes that the interviewer application may be in during an interview session. They are:

OPENING This is an initial state for an interview session. Only one presentation in an interview session is presented in this state, and it is always the first presentation of the interview session.

QUESTION In this state the following occurs: (a) interview presentations are displayed to both the interviewer and the respondent, (b) the respondent's inputs are captured and provided to the interviewer, and/or (c) there is interactive (near) real-time dialog between the interviewer and the respondent. When in the Question state, the interactive interview subsystem either (i) progresses through the programmatic instructions that define the type of interview inquiry or question presentation currently being presented to both the interviewer (via the interviewer application) and the respondent (via the respondent application), or (ii) allows the interviewer to abandon the current presentation altogether. Other than when abandoning a presentation, the interviewer application may wait for a respondent input to a Question presentation so that such input can be recorded prior to allowing the Question presentation to terminate.

BETWEEN In order to allow the interviewer to control the pace of an interview session, the present state may entered between activating consecutive QUESTION presentations, or after an INFO slide has been displayed. In this state the interview may be paused to, e.g., answer an interviewee question, or continue the interview at a later time.

CLOSING This is a termination state for an interview session. Only one presentation in the interview session is presented in this state, and it will always be the last presentation of the interview session.

An interview, therefore, progresses from an OPENING presentation through any number of QUESTION and INFO presentations until reaching a CLOSING presentation.

FIG. 27: Processing Performed by the Interview Subsystem 2908

Figure 27A:
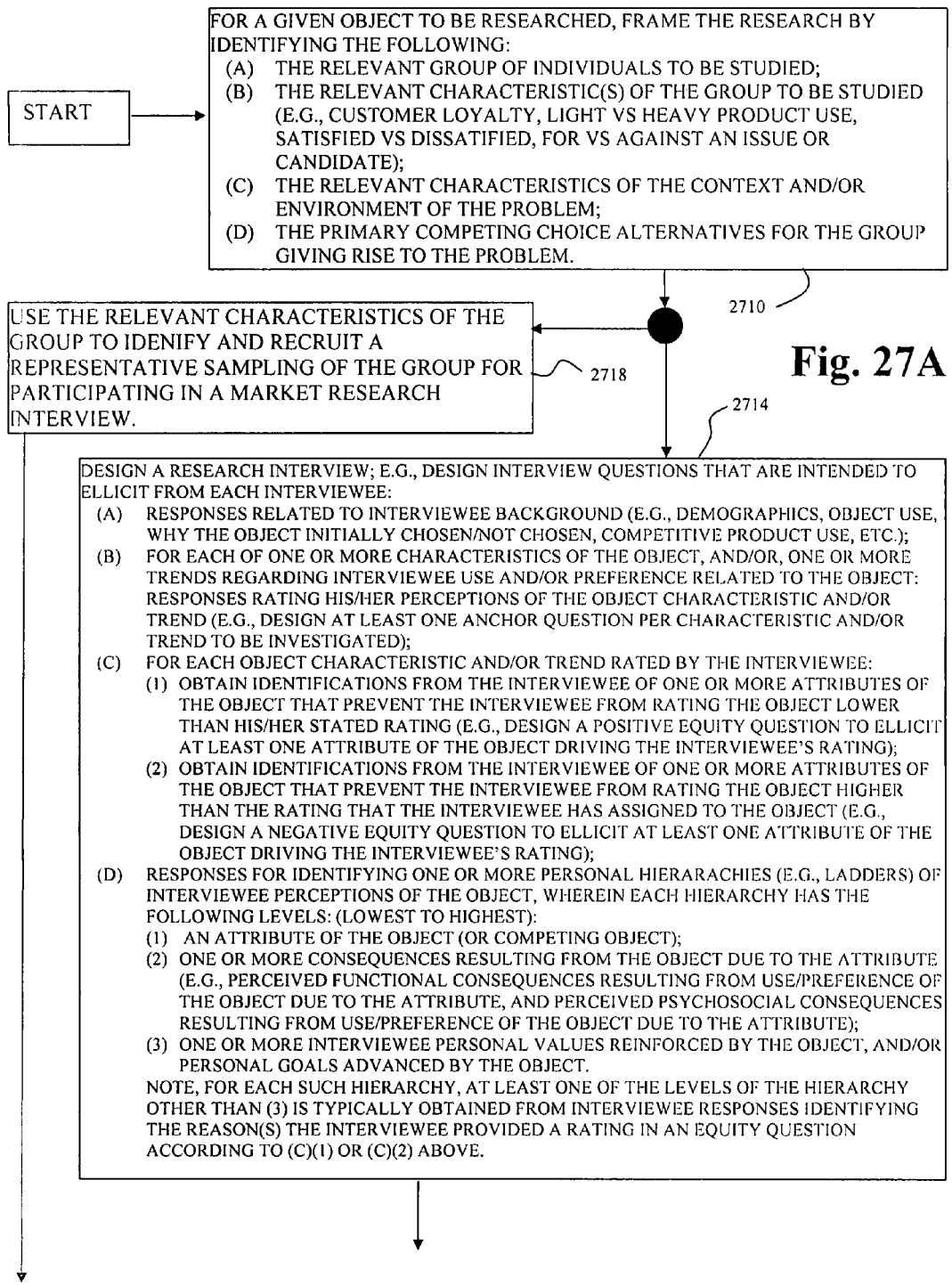
FIGS. 27A through 27C provide illustrative flowcharts of high level steps performed by the interview subsystem 2908 (FIG. 29) when, e.g., an issue or problem has been identified related to an object to be studied, and perceptions and/or decision making belief structures, within a population of interest, related to the object must be identified and/or modified.
Figure 27B:
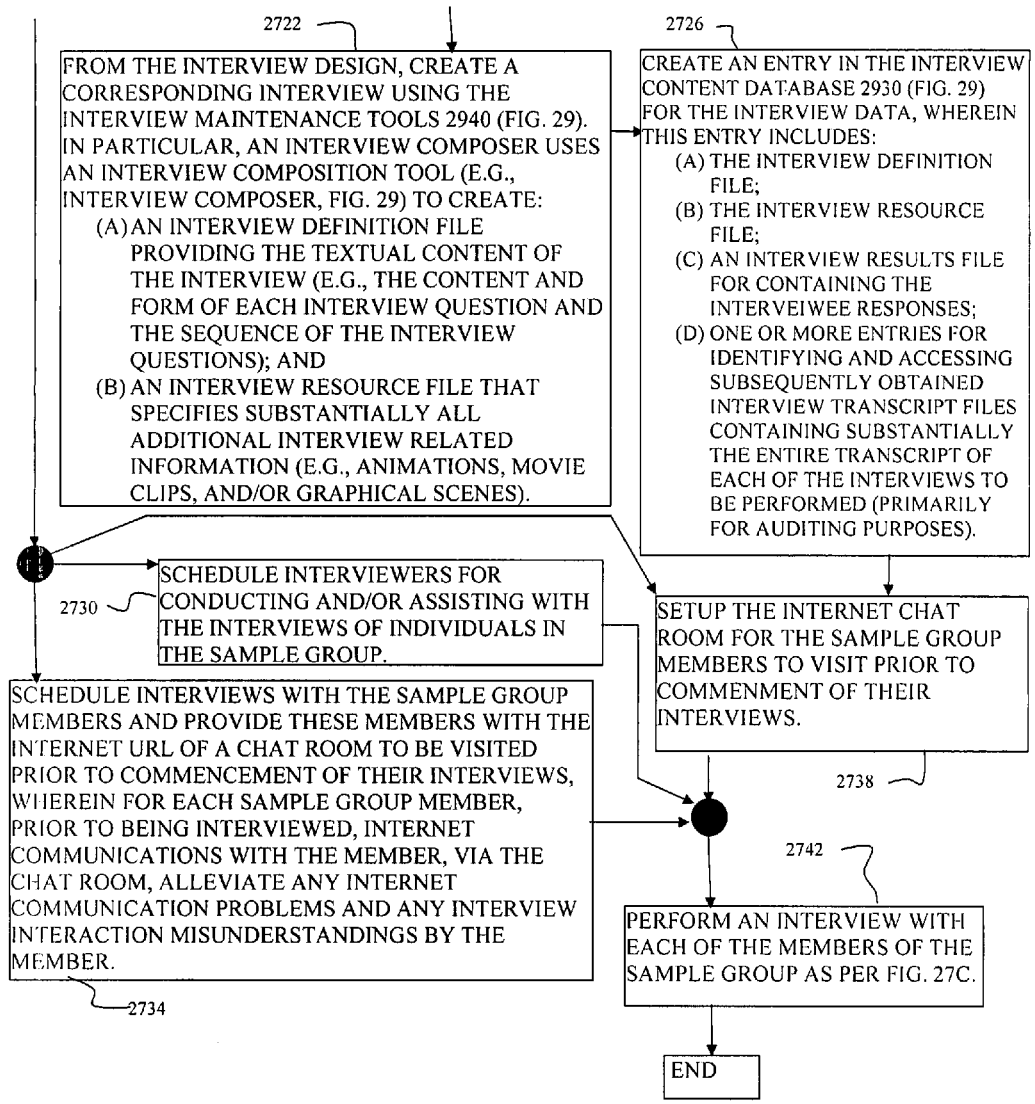
Figure 27C:
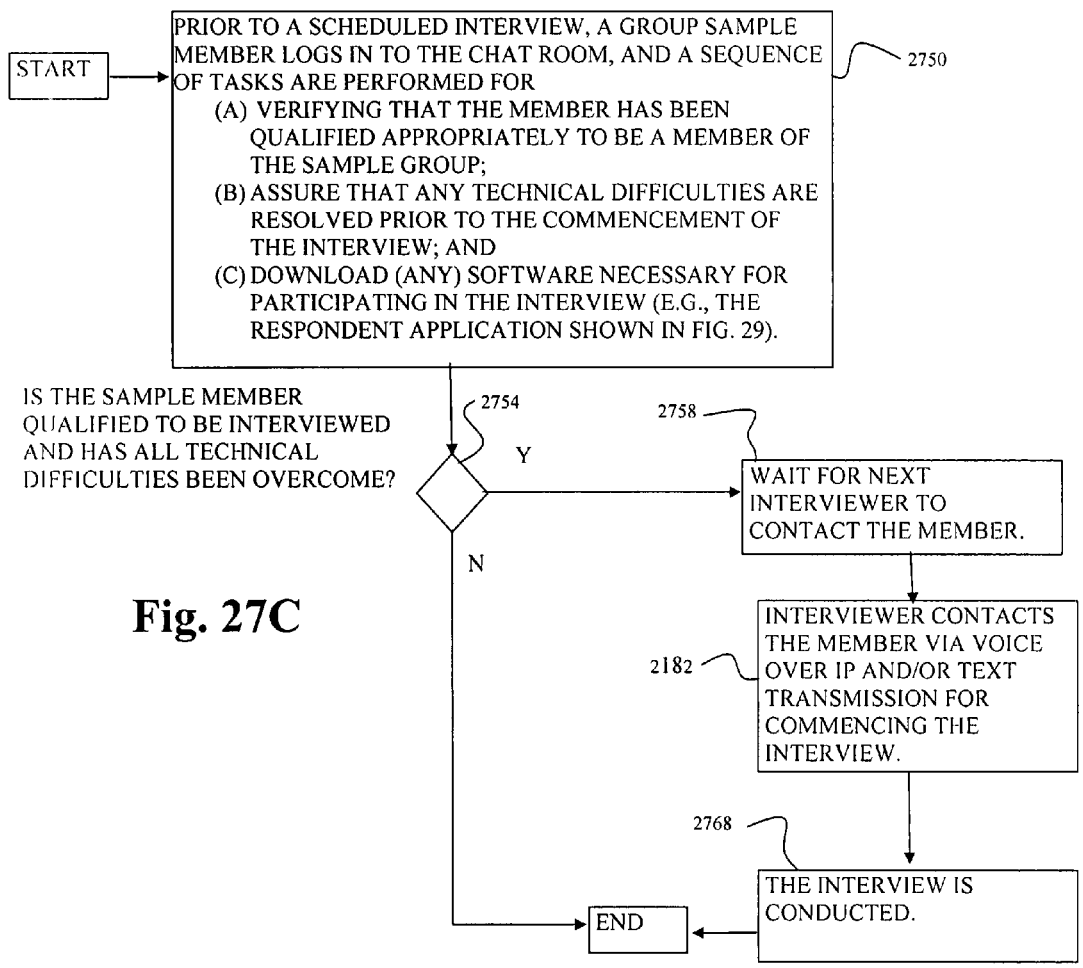

FIGS. 27A through 27C provide illustrative flowcharts of high level steps performed by the interview subsystem 2908 (FIG. 29) when, e.g., an issue or problem has been identified related to an object to be studied, and perceptions and/or decision making belief structures, within a population of interest, related to the object must be identified and/or modified. Accordingly, for such an object to be researched, in step 2710 (FIG. 27A), the research is framed by identifying the following:

(A) The relevant population group to be studied;
(B) The relevant characteristic(s) of the group to be studied (e.g., for the object being researched, such relevant characteristic(s) may be one or more of: customer loyalty, light vs. heavy use, satisfaction vs. dissatisfaction, and/or when the object is a political candidate or issue such relevant a characteristic(s) may be: for vs. against the candidate or issue);
(C) The relevant characteristic(s) of the context and/or environment of the problem to be addressed or analyzed by the research (e.g., the market research problems identified hereinabove);
(D) The primary competing choice alternatively for the population group giving rise to the problem.

Steps 2714 and 2718 may be performed substantially independently of one another; i.e., these steps may be performed serially in any order, or concurrently. In step 2714, a corresponding research interview is designed, wherein the research interview includes, e.g., design interview questions that are intended to elicit from each interviewee the following responses:

(A) Response related to interviewee background (e.g., demographics, object use, why the object initially has been chosen/not chosen by the interviewee, use of a competitive object, etc);
(B) For each of one or more characteristics of the object to be researched, and/or for one or more trends related to an interviewee's use and/or preference (or lack thereof) related to the object, interviewee responses that rate his/her perceptions of the object characteristic(s) and/or trend(s) (e.g., the interview design may include at least one anchor question per characteristic and/or trend to be investigated;
(C) For each object characteristic and/or trend rated by an interviewee:
(1) Obtain identifications from the interviewee of one or more attributes of the object that prevent the interviewee from rating the object lower than his/her stated rating (e.g., design a positive equity question to elicit at least one attribute of the object driving the interviewee's rating);
(2) Obtain identifications from the interviewee of one or more attributes of the object that prevent the interviewee from rating the object higher than the rating that the interviewee has assigned to the object (e.g., design a negative equity question to elicit at least one attribute of the object driving the interviewee's rating);
(D) Responses for identifying one or more personal hierarchies (e.g., ladders) indicative of the interviewee's perceptions of the object, wherein each hierarchy has the following levels (lowest to highest):
(1) An attribute of the object (or competing object);
(2) One or more consequences resulting from the object (or competing object) due to the attribute identified in (1) immediately above; e.g., perceived functional consequences resulting from a use/preference of the object (or competing object) due to the attribute, and perceived psycho-social consequences resulting from use/preference of the object (or competing object) due to the attribute;
(3) One or more interviewee personal values reinforced by the object (or competing object), and/or personal interviewee goals advanced by use of the object (or competing object).

Note, for each such hierarchy for which the interview is designed to elicit at least one of the levels (D)(1) through (D)(3), such a hierarchy is typically obtained from interviewee responses identifying the reason(s) the interviewee provided a rating in an equity question according to (C)(1) or (C)(2) above.

Subsequently, in step 2722 (following step 2714), the interview design is used to create the data structures and data files that define the interview. In particular, the interview composer tool 2940 (FIG. 29) is used to perform this task, wherein (a) interview definition data 3110 (FIG. 31) is created that provides the textual content of the interview such as the content and form of each interview question to be asked, and the sequence (or more generally, the directed graph) designating the order in which the interview questions are to be presented to interviewees, and (b) interview resource data 3114 (FIG. 31) that contains the graphical user interface resources (e.g. movies, animations, pictures, stored audio and video, etc.) needed for conducting the interview. Once this interview data is generated, it is output (in one embodiment, via the Internet as shown in FIG. 29; however, FIG. 31 illustrates a potentially different embodiment wherein communications between the interview subsystem server 2910 and one or more of the computers 2936, 2937 may be via, e.g., a local area network rather than the Internet) to the interview content database 2930. Then in step 2726, this interview data is stored in the interview content database 2930 together with additional data organization and access features for associating the interview data with at least one interview results file 3118 (FIG. 31), and with the data for one or more interview transcript files 3122 (FIG. 31), wherein each such transcript file contains substantially the entire transcript of an interview conducted using the interview data.

Returning to step 2718 mentioned above, the relevant characteristics of the group or population of individuals to be studied are used to identify and recruit a representative sampling of the group for being interviewed and capturing their responses to the research interview questions designed in steps 2714. Techniques and commercial enterprises for identifying such a population sampling are well known in the art.

Subsequently, steps 2730, 2734, and 2738 may be performed in substantially any order. In step 2730, interviewers may be scheduled for conducting and/or assisting with conducting interviews of members of the representative sampling. However, in one embodiment, the scheduling of interviewers may be unnecessary since the interview process may be automated so that interviews are conducted substantially without an interviewer being involved.

In step 2734, interviews are scheduled with members of the representative sampling. In particular, each such member is provided with an Internet uniform resource locator (URL) of a chat room 2972 (FIG. 29) to be visited prior to commencement of the interview. Communications with each sampling member, via the chat room 2973, may be used to assure that reliable Internet communications with the interviewee can be established, as is described further hereinbelow.

Referring to step 2738, the Internet chat room 2972 is configured (if necessary) to appropriately communicate with the prospective interviewees from the sample. In particular, the chat room 2972 may be configured to respond to a sample member's initial contact with a welcome message identifying the interview that the sample member is going to take, and when the interview is estimated to actually commence. Moreover, the message (and subsequent chat room communications) may be in a language previously designated by the sample member, e.g., in a language identified by the sample member in step 2734 as being preferred when the interview is presented to the sample member. Additionally, communications in the chat room 2972 may be used to assure that the sample member's computer 2937 (FIG. 29) is appropriately configured for the interview. For example, the interview may preferably require the sample member's computer 2937 to have certain applications available. In particular, in at least one embodiment, the respondent application 2938 (FIG. 29) typically does not require any software to be installed or loaded on the sample member's computer prior to commencement of the interview, since the respondent application may be Internet browser based. For example, any programmatic interview presentation instructions may be communicated to a network (Internet) browser on the respondent's computer 2937 as needed during the interview session. However, in other embodiments certain additional applications may also be required to be downloaded prior to commencement of an interview session, such as Adobe Shockwave, Adobe Flash Player, and Adobe Engagement Platform from Adobe Systems Incorporated, 345 Park Avenue San Jose, Calif. 95110-2704. Furthermore, the sample member's network data transmission rate (bandwidth) may be tested to determine if the interview can be appropriately presented at the sample member's computer 2937. Additionally, for sample members that have disabilities such as poor vision, hard of hearing, color blind, etc., communications in the chat room 2972 with, e.g., an interview setup technician can used to appropriately configure the sample member's computer 2937 so that, e.g., interview text font is of an appropriate size and color, interview background colors are appropriate, and the sound volume is adequate for the sample member to appropriately hear and comprehend auditory portions of the interview presentation. Note as indicated in FIG. 27B, the step 2938 is preferably performed after step 2726 as well as after step 2718.

Subsequently, once all of the above described steps of FIG. 27B have been performed, interviews with the interviewees obtained from the sample members are conducted (step 2742). That is, the steps of the flowchart of FIG. 27C may be performed. The steps of FIG. 27C can be described as follows. In step 2750, prior to a scheduled time for an sample member's interview, the sample member is requested to contact the chat room 2972 via the URL supplied in step 2734 (FIG. 27B). Note that for accessing the chat room 2972, the sample member may be required to provide one or more identifications such as a user name and/or a password. Additionally, in some embodiments, biometric data (e.g., fingerprint data) for identifying the sample member may be transmitted to the chat room 2972. Once the sample member's identity is verified, the following tasks are performed:

(A) A sample member verification process is performed for verifying that the sample member is qualified to take the interview. For example, the sample member may be asked to respond to one or more interviewee screening questions, wherein the responses to these questions may determine whether the sample member appears to be qualified to be interviewed. For example, such questions may be for determining whether the sample member has used a particular product, whether the sample member is contemplating purchasing a particular product/service, whether the sample member is in a particular demographic category, e.g., male/female, within a specified age range, and/or lives in a specified geographical region.

(B) The sample member's computer 2937 is checked and reconfigured as described above for assuring that the interview can be conducted as intended.

(C) Any software applications that must be provided on the sample member's computer 2937 are made available as indicated above.

In step 2754 a determination is made as to whether the sample member has qualified to be interviewed. Note that such qualification includes each of the tasks (A) through (C) immediately above are sufficiently satisfied so that appropriate and relevant interview data results. Assuming the sample member qualifies to be interviewed, in step 2758 the sample member (who now can be referred to as an "interviewee" or "respondent") waits for an interviewer to contact him/her. Alternatively, the interviewee may be instructed to contact a designated interviewer computer 2936 via the Internet. Alternatively, the interview manager 3126 (FIG. 29) may cause an Internet connection to be automatically established between the interviewee's computer 2927, and an interviewer's computer 2936 when the interview manager establishes that the interviewer (for the computer 2936) is available for conducting the interview. In one embodiment, an estimated wait time prior to commencement of the interview may be communicated to the interviewee. Additionally, if the waiting time is expected to be longer than, e.g., five minutes, the interviewee may have the option of being contacted via an Internet browser communication (e.g., a pop browser window), an instant messaging communication, an email, and/or a phone call notifying the interviewee that the interview can be commenced substantially immediately.

Assuming that the interviewee waits for an interviewer to contact him/her, and that the interviewer contacts the interviewee (in step 2762), in step 2768 the interview is conducted as is described further herein.

(4) StrEAM*analysis Subsystem 2912

The StrEAM*analysis subsystem 2912 (FIGS. 29, 30 and 39) includes a set of computer-based tools to analyze the data collected by the StrEAM*Interview subsystem 2908. The primary purpose of the StrEAM*analysis subsystem 2912 is to identify the important elements of the decision-making of a target population being researched. The StrEAM*analysis subsystem 2912 includes various computational tools to assist a human analyst (e.g., at an analyst computer 2948 connected to the interview analysis subsystem server 2914 via the Internet) in identifying codes, and chains/ladders (cf. "Chains and Ladders (a comparison)" description in the Definitions and Descriptions of Terms section hereinabove) within interview data. Additionally, in at least some embodiments, such computational tools may be automatically activated by an "intelligent" computational subsystem 2913 (also denoted herein as the StrEAM*Robot described hereinbelow) that substantially performs the tasks of an analyst without human intervention.

In FIG. 29 such computational tools of the StrEAM*analysis subsystem 2912 are grouped into the following general categories:

(a) Configuration tools 2990 are used for populating the configuration database 2980 with configuration data that is, in turn, used for manipulating and/or structuring interview data (obtained from interviews) prior to analysis of this data. Note, such configuration data may be used in generating models of how interviewees make decisions and/or perceive an object being researched. In particular, the following types of configuration data are provided: code definitions 3950 (FIG. 39), question groups 3954, data filters 3958, export lists 3962, and mention report definitions 3986 (each of these type of data are described hereinbelow). Moreover, note that in some embodiments, the configuration database 2980 can be a single file (for each type of interview conducted).

(b) Model development and analysis tools 2992 are used:
(i) for populating an analysis model database 2950 with selected interview result data 3118 (FIG. 31),
(ii) for assisting in the generation of ladder codes (cf. the Definitions and Description of Terms section hereinabove for a description of ladder codes) via the ladder coding tool 3988 (FIG. 39), and
(iii) for assisting in performing decision segmentation analysis (DSA, cf. Definitions and Descriptions of Terms section above) via the decision analysis tool 3996, wherein individual ladders are combined to generate the primary motivations/reasoning believed to be used by an interviewee population in responding to the object being researched.

Using the model development and analysis tools 2992 decision ladders or chains (and codes therefrom) contained in responses to laddering questions can be explored in the context of the other information collected during an interview. For instance, decision ladders or chains may vary in kind and importance based on demographics, and/or interviewee opinions on other issues.

The result from the use of such model development and analysis tools 2992 is, e.g., identification of the key interviewee response elements involved in decision-making for the object being researched. Note that an understanding of such interviewee decision-making may be represented in a "decision map" (also referred to as a Customer Decision-making Map or CDM or "ladder mappings") that shows how various codes derived from the interviewee response elements are related to one another, e.g., related according to a ladder decomposition of "attributes", "function consequences", "psychosocial consequences", and "values". An illustrative example of such a decision map is shown in FIG. 9, and on the right side of FIG. 38 having a label of 3820. Note that for each of the four ladder levels, there may be one or more interviewee response elements, and such interviewee response elements may be ordered or unordered within the ladder level.

(c) Quality assessment tools 2994 are used for assessing or determining an indication as to, e.g., the quality of the models of interviewee decision making that is has been generated. In one embodiment, such a tool may compare two or more such models resulting from the same interview derived data for identifying consistencies and/or inconsistencies between such models.

(d) Output/report generation tools 2996 are used for generating, e.g., desired market research analysis reports.

(e) Evaluators 2998 may be provided for performing the equity leverage analysis (ELA) described in the market research examples (1.1.1) through (1.1.5) hereinabove. In particular, such evaluators compute various statistics such as importance, belief, equity attitude, and equity leverage statistics as described in the market research examples hereinabove. In one embodiment, an analyst may activate one or more evaluators for accessing the interview data in the analysis model database 2950 and computing one or more of these statistics as part of a decision model 3944 (FIG. 39). In an alternative embodiment, such evaluators 2998 may be activated substantially automatically once appropriate coding of the interviewee response data has been performed. For example, once all interviewee response data has transferred from the interview archive database 3130 to the analysis model database 2950 (e.g., as interview session data 3932, FIG. 39), and appropriate coding of such data has been performed, then predetermined interview session data processing scripts may be performed for generating results analogous to the results illustrated in examples (1.1.1) through (1.1.5) hereinabove. In particular, evaluators may be provided for computing importances of codes, beliefs of codes, equity leverages, and equity leverage analysis.

(4.1) Analysis Subsystem 2912 Data

As with the StrEAM*Interview subsystem 2908, the StrEAM*analysis subsystem 2912 implements a document metaphor for persistent data. That is, the primary data unit for access, storage, and processing are collections of a single data organization referred to herein as a "document". By employing this document-centric view rather than a database-centric view of data, StrEAM*analysis subsystem 2912 provides enhanced support for iterative and team-based operation of the object research market research process disclosed herein.

Analysis of interview data (i.e., data obtained from interviewee responses) is accomplished by developing and applying a meaningful system of codes to interview data collected during a market research interview process.

Analysis Configuration Database 2980

Since each StrEAM*analysis configuration database 2980 includes information for a corresponding market research project conducted, there may be a plurality of such StrEAM*analysis configuration databases 2980, one for each distinct market research project conducted. To simplify the description herein, a single configuration database 2980 is shown in the figures and described hereinbelow. However, this simplification is not to be considered as a limitation of the present disclosure in that it is to be understood that the processing provided by the analysis subsystem 2912 described herein can be applied to each of a plurality of configuration databases 2980.

Figure 38:
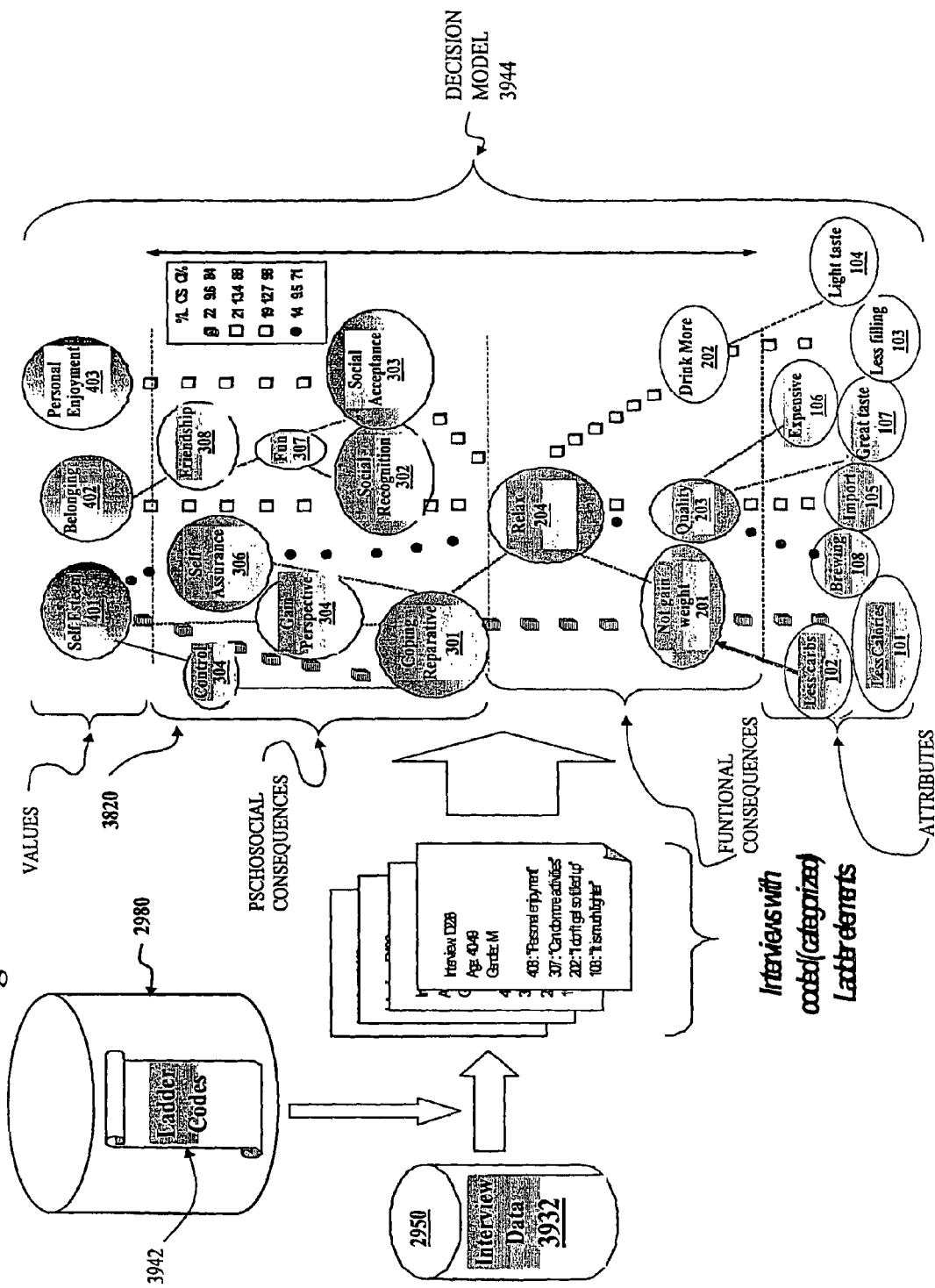
FIG. 38 shows how analysis of interview data is accomplished by developing and applying a meaningful system of codes to the qualitative respondent responses collected during the interview process.

Each StrEAM*analysis configuration database 2980 contains analysis configuration data for supporting analysis of the corresponding interview data. Each StrEAM*analysis configuration database 2980 contains a variety of elements that are used to code and manipulate the corresponding interview data provided in a corresponding analysis model database 2950 (FIGS. 29 and 39). In particular, each StrEAM*analysis configuration database 2980 document includes the following items (each described herein further below):

- Code definitions 3950 for ladders (i.e., also referred to as ladder codes) and other qualitative data, wherein such code definitions are the result of code definitions in the model database 2950 (more particularly, in the code definitions 3951) being identified as a sufficiently accurate coding of the interviewee responses in the interview session data 3932 so that these code definitions can be promoted to the code definitions 3950 in the configuration database 2980. Accordingly, once such code definitions from the analysis model database 2950 are promoted to become part of the code definitions 3950 of the analysis configuration database 2980, they are available to each analyst analyzing the interview session data 3932 for generating the ladder mappings 3940 (such ladder mappings are also referred to as a "decision map", a "solution map", and a "Customer Decision-making Map" or CDM; examples are shown in FIGS. 9, 22, 38). Note that such promotion of codes is performed by an analyst activation of the define codes tool 3972.
- Named question groups 3954 for manipulating ladder data, wherein each question group is a named set of ladder questions, the responses to which will be considered together. Each question group 3954 can contain one or more of the ladder questions in the interview.
- Data filters 3958 providing interview data selection criteria, i.e., each data filter 3958 specifies one or more criteria by which portions of the interview data are selected from the corresponding StrEAM*analysis model database 2950. Each data filter 3958 identifies one or more interview questions that may be used by in selecting interview session data from the collection 3932 of interview session data (FIG. 39). More specifically, for each data filter 3958, input to the data filter includes one or more interviewee responses (or codes therefor) for an interview question identified with the filter. Accordingly, when the filter 3958 receives such input, the filter selects, from the collection 3932, the interview session(s) having such input as the response to the interview question(s) identified with the filter. For example, for one or more interview questions, there may be data filters 3958 for selecting interviewee responses for each of the following criteria: (i) male interviewees 40 years old or younger, (ii) male interviewees over 40 years old, (iii) female interviewees 40 years old or younger, and (vi) female interviewees over 40 years old.
- Definitions of reports to reveal code usage, such definitions are used to generate the "code usage" reports shown in FIG. 39.
- Default parameters (not shown in figures) for the decision analysis tool 3996 (FIG. 39), wherein this tool automates discovery of major decision pathways contained within a set of ladder data as described in the section "StrEAM*analysis—Decision Segmentation" hereinbelow.
- One or more export lists 3962 providing specifications for exporting interview analysis data to other systems such as Microsoft Excel and SPSS.
- Bulk coding tools 3994 are provided to generate alternative views of interview data in a StrEAM*analysis model database 2950, and to provide an alternative mechanism for assigning ladder levels and codes to ladder elements.

Central to the analysis of such interview data is a process of grouping the textual responses given in response to, e.g., laddering questions and equity leverage questions. This grouping process is iterative and, in one embodiment is performed by an analyst who quantifies the qualitative (and subjective) interviewee responses in a meaningful way. To "discover" the (or, at least one) useful way to categorize such interview session responses, an analyst may need to study the results obtained from classifying (i.e., "coding") such responses according to various collections of classifications (i.e., codes). Accordingly, the StrEAM*analysis subsystem 2912 provides both convenient graphical visual tools for an analyst, and also tools for generating a data model that supports an iterative coding and analysis process for interview data.

In particular, the StrEAM*analysis subsystem 2912 allows for sets of codes (i.e., code sets 3942 in the analysis configuration database 2980) to be used to: (a) identify or categorize individual elements of interviewee responses to ladder questions, and (b) identify or categorize (any) open-ended, qualitative interview questions. Each such code set 3942 contains a list of codes (i.e., identifiers or descriptors, identified in FIG. 39 as code definitions 3950) for categorizing interviewee responses. More precisely, for each code of a code set 3942, there is at least one description (and preferably both a long description and a short descriptive title) which is used to represent the meaning or semantic content of the interview terms that are identified or associated with the code. A code set 3942 may contain an arbitrary number of codes 3950 (including, in a trivial instance, none).

Code sets 3942 for categorizing individual elements of interviewee responses, and in particular, responses to ladder questions, are provided. In one embodiment, each such ladder related code set 3942 must be identified with one of the four ladder levels: value, psychosocial consequence, functional consequence, or attribute. In one embodiment, the code sets 3942 for particular ladder questions may be provided may be provided in the analysis model database 2950.

For code sets 3942 that categorize open-ended interview questions, each of these "question" code sets 3942 may be, in one embodiment, provided in the StrEAM*analysis configuration database 2980 (however, this embodiment is not shown in the figures). In one embodiment, each such question code set 3942 is identified by (or associated with) an identifier of a corresponding open-ended question from the corresponding StrEAM*Interview definition data 3110 (FIGS. 29 and 31) that defines the interview whose interviewee responses are to be analyzed. Thus, each question code set 3942 is used to classify (i.e., "code") interviewee responses to the open-ended question with which the question code set is associated.

In one embodiment, the StrEAM*analysis configuration database 2980 includes the code sets 3942 that are the derived from code sets in the model database 2950. Note that the configuration database 2980 may include only one code set 3942 for each of the four ladder levels, and only one code set 3942 may be defined for each open-ended question. In order to have different code sets 3942 for the same ladder (or open-ended question), multiple StrEAM*analysis configuration databases 2980 can be created.

Additional description of the data in the configuration database 2980 follows.

StrEAM*analysis Code Definitions 3950

Qualitative interview data is coded to enable its analysis. Sets of codes are defined as part of the process to be used with the individual elements of Ladder answers, as well as any other open-ended, qualitative interview questions. Each code set 3942 contains a list of codes. A code is an arbitrary string and must be unique within the whole code model (not just a code set 3942). For each code, there is a long description and a short descriptive title for display purposes. A code-set may contain an arbitrary number of codes (including none).

Code sets 3942 can be one of two basic types (as indicated in the type attribute). They may either be for "ladder" coding, or for the coding of other unstructured, open-ended "questions". In the case of "ladder" code sets 3942, they must be targeted at one of the four ladder levels: Value, Psychosocial Consequence, Functional Consequence, or Attribute. That is indicated in the target attribute. In the case of "question" code sets 3942, the target specifies the question id from the StrEAM*Interview definition file 3110 that the codes in that set will be used for.

Note that in a given configuration database file 2980 only one set of codes 3942 may be defined for each of the four ladder levels and only one set may be defined for a question-id. In order to have different code sets 3942 for the same ladder (or question), multiple configuration databases/files 2980 can be created.

Figure 40:
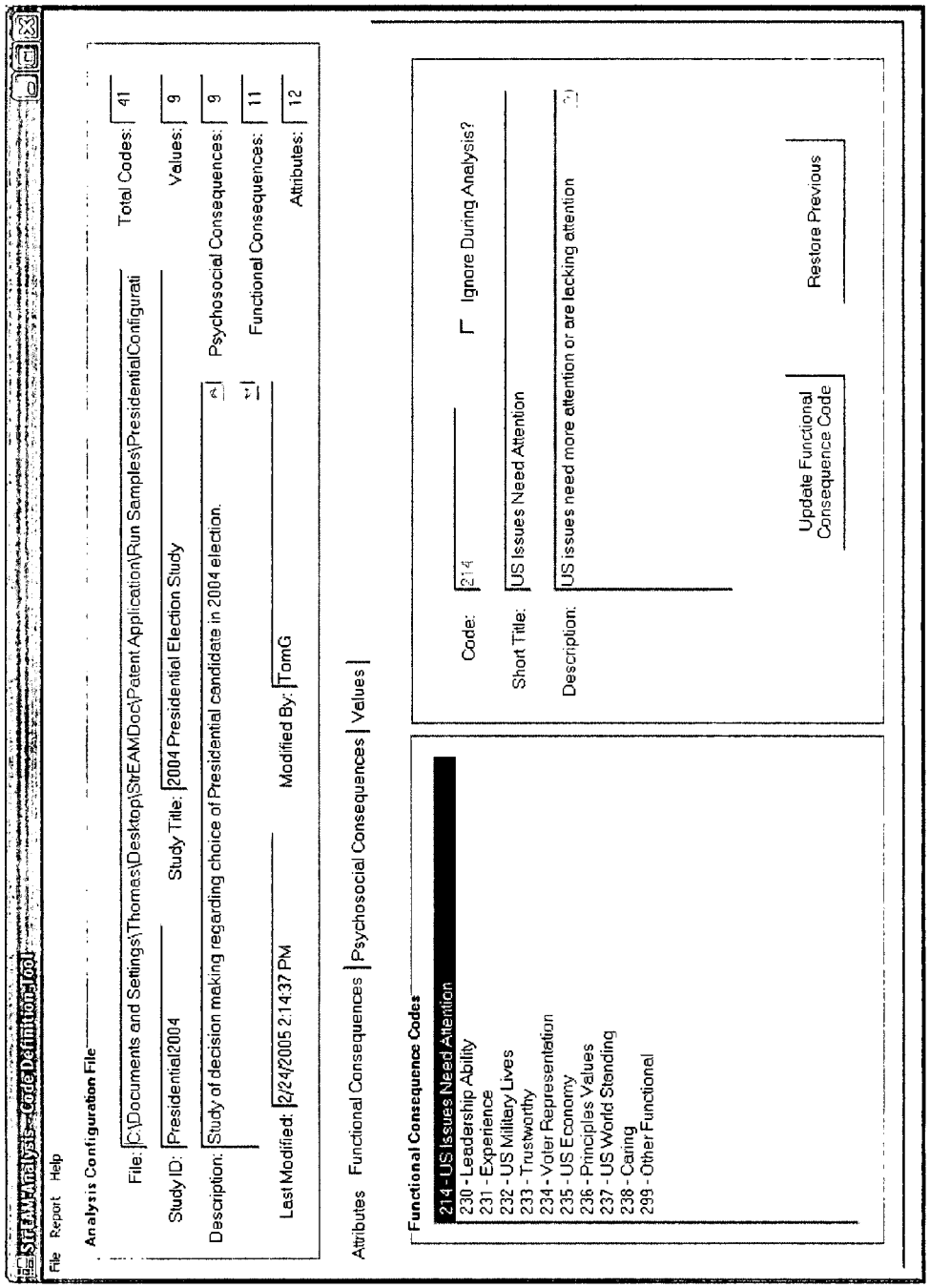
FIG. 40 shows a display screen for use by an analyst when selecting a data set.

Code definitions 3950 are created and maintained using the Define Codes tool 3972, an screenshot of the user interface for this tool is shown in FIG. 40.

It should also be noted that in order to support the iterative nature of code development and data coding, the tools for coding data (for instance Code Ladders 3988) can also be used to create/edit code definitions 3950 on the fly.

Question Groups 3954

Analysis of decision making often requires analysis of responses to more than one ladder question at the same time. This is supported by StrEAM*analysis subsystem 2912 with question groups 3954. Each question group is a named set of ladder questions, the responses to which will be considered together. Each question group 3954 can contain one or more of the ladder questions in the interview. Each ladder question can appear in any number of question groups 3954, but must appear in at least one in order to be considered during interview analysis.

Figure 41:
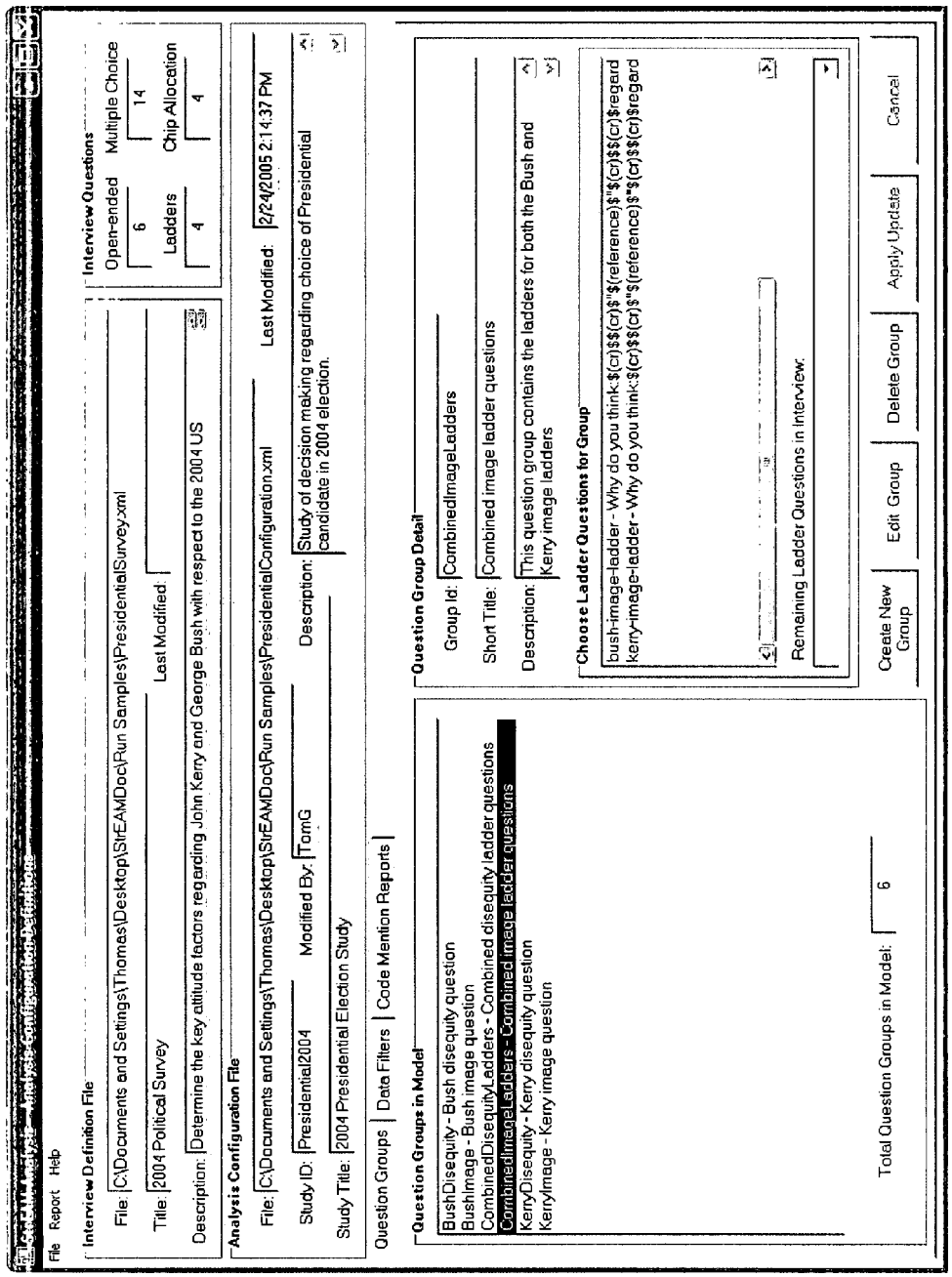
FIG. 41 shows a screenshot of the user interface for the Configure Analysis tool 3968.

Question groups 3954 are defined in the StrEAM*analysis configuration database 2980, and are maintained using the Configure Analysis tool 3968. A screenshot of the user interface for this tool is shown in FIG. 41. The items in FIG. 41 can be described as follows. The top of the screen displays information about the interview definition data 3110 and the analysis configuration database 2980 currently being analyzed. The lower part of the screen allows viewing and/or editing of question group 3954 definitions. On the left of the lower part of the screen is a list of all of the question groups 3954 in the current analysis configuration database 2980. When one of these question groups 3954 is selected by an operator/analyst (e.g., highlighted as shown), the detailed information for that question group is displayed in the fields on the right side. Buttons on the bottom of the screen allow the operator to initiate actions corresponding to the descriptions of the buttons. The fields in the Question Group Detail section include: (i) Group Id—a unique identifier for the selected question group; (ii) Short Title—an abbreviated label for the selected question group; (iii) Description—a complete, detailed description of the selected question group. Below these fields is a list of all of the ladder questions that are included in the selected question group 3954. Finally, below that is a list of all other ladder questions in the current interview definition data 3110 that have not yet been included in the selected question group 3954.

Data Filters 3958

Question groups 3954 provide one mechanism for partitioning interview data for analysis. Another mechanism is provided by data filters 3958. The data filters 3958 specify criteria by which portions of the interview data are selected from the corresponding StrEAM*analysis model database 2950. Each data filter 3958 identifies one or more interview questions that may be used by an analyst in selecting portions of the interview session data 3932. The specification of such data filters 3958 is similar to specifying database queries, e.g., for a relational database. However, an analyst may be provided with a graphical interface for creating such filters as one of ordinary skill in the art will understand. Moreover, at least some data filters 3932 may be specified when the interview is being composed.

Once a data filter 3958 has been specified, input to the filter includes one or more interviewee responses (or codes therefor) for an interview question identified with the filter. Accordingly, when the filter 3958 receives such input, the filter selects, from the interview session data 3932, the interview session(s) having such input as the response to the interview question(s) identified with the filter.

When multiple answers are listed for an interview question, there is a Boolean OR relationship between them (i.e., a selected interview session must have one of the OR'ed answers for that question). When there are multiple questions in a data filter 3958, there is a Boolean AND relationship between the questions. In such cases, a selected interview session must have one of the included answers to each of the questions in the data filter 3958.

Note that the combination of a question group 3954 and a data filter 3958 are used to select a set of data for study in the StrEAM*analysis tool set.

Figure 42:
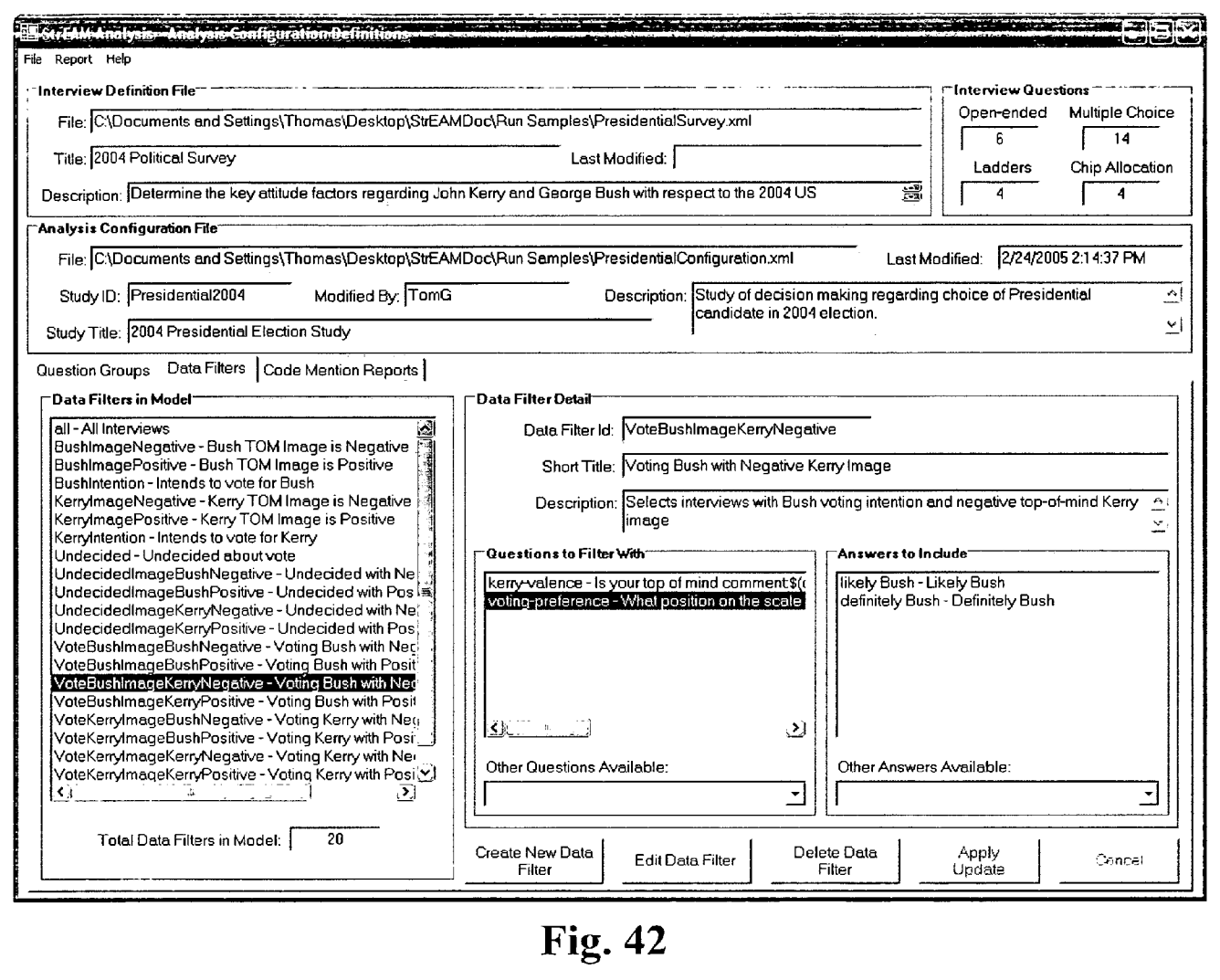

Data filters 3958 are specified and modified using the Configure Analysis 3968 tool as shown in FIG. 42. The items in FIG. 42 can be described as follows. The top of the screen displays information about the interview definition data 3110 and the analysis configuration database 2980 currently being analyzed. The lower part of the screen allows viewing and/or editing of data filter 3958 definitions. On the left is a list of all of the data filters 3958 in the current analysis configuration database 2980. When one of these data filters 3958 is selected by an operator/analyst (e.g., highlighted as shown), the detailed information for the selected data filter is displayed in the fields on the right side of the screen. Buttons on the bottom of the screen allow the operator to initiate actions corresponding to the descriptions of the buttons. The fields in the Date Filter Detail section include: (i) Data Filter Id—a unique identifier for the selected data filter; (ii) Short Title—an abbreviated label for the selected data filter; (iii) Description—a complete, detailed description of the selected data filter. Below these fields is, (iv) in the area (below and) identified as "Questions to Filter With", a list of all of the interview questions that are currently used by the selected data filter. When one of these interview questions is selected by the operator (e.g., highlighted as shown), all of the answers that are valid for the selected data filter are listed to the right in the area (below and) identified as "Answers to Include". Below the "Questions to Filter With" is a list (if any) of the remaining questions in the interview definition data 3110 that have not been included in the selected data filter 3958. Below the "Answers to Include" is a list of any other answers (in the case of multiple choice questions) that have not yet been included as filter values for the selected question.

Code Mention Report Definitions 3986

A common task during interview data analysis is to review the usage of ladder element codes (cf. the Definitions and Description of Terms section hereinabove for a description of ladder element codes) in various subsets of the interview data being analyzed. Although there is a standard report that provides a view of the overall assignment of ladder codes to ladder elements, the StrEAM*analysis subsystem 2912 also provides for the specification and generation of customized reports that can be used to examine ladder code assignment at a more detailed level. Code mention report definitions 3986 defined in the StrEAM*analysis configuration database (or file) 2980 are used for this purpose; i.e., each code mention report definition defines a corresponding code mention report 3987. In one embodiment, a code mention report 3987 provides a report row for each ladder code, wherein these rows are grouped together according to ladder level (e.g., the ladder levels: attributes, functional consequences, psychosocial consequences, and values). Each column may contain the frequency that each ladder code is used within the data selected by a given data filter 3958 (in addition to that used for the current analysis data set).

Below (in the "Example of a Code Mention Report" table) is a partial listing of a StrEAM code mention report 3987. This partial listing provides statistics for various ladder codes identified in the first column. In particular, the ladder codes shown are only for the "attributes" ladder level of ladders whose corresponding interview ladder question(s) relate to the U.S. presidential election of 2004. The full code mention report includes statistics for ladder codes for all ladder levels, e.g., attributes, functional consequences, psychosocial consequences, and values. The information in each of the partial listing's four boxed columns is defined by a corresponding data filter 3958. That is, there is a data filter 3958 for selecting the ladder codes for the attribute level of ladders whose interviewee responses were obtained from one of: (i) male respondents with ages 40 and under, (ii) male respondents over 40, (iii) females respondents 40 and under, and (iv) females respondents over 40. Each of the boxed columns includes two values per row. The first (leftmost) value of each row gives the number of times the corresponding ladder code (in the same row) identifies an interviewee response (a "mention") for the ladders selected by the corresponding data filter. The second (rightmost) value is the percentage of the first value relative to all the ladders selected by the corresponding data filter. For example, the ladder code "Average Citizen Orientation (108)" is mentioned in 2 of the 23 ladders completed by male respondents 40 years old and under (i.e., 8.7% of all selected ladders). Note that in cases where there is more than one ladder element at the "attribute" ladder level of a ladder, the number of mentions can exceed the number of actual ladders (though this is not the case in partial listing below).

Example of a Code Mention Report

| ATTRIBUTES | Males 40 and Under Ladders with code | | Males Over 40 Ladders with code | | Females 40 and Under Ladders with code | | Females Over 40 Ladders with code | |
|---|---|---|---|---|---|---|---|---|
| | # | Share | # | Share | # | Share | # | Share |
| Average Citizen Orientation (108) | 2 | 8.7% | 3 | 10.7% | 3 | 14.3% | 1 | 3.8% |
| Change in Office (122) | 0 | 0.0% | 0 | 0.0% | 0 | 0.0% | 0 | 0.0% |
| Aggressive Foreign Policy (132) | 5 | 21.7% | 12 | 42.9% | 6 | 28.6% | 14 | 53.8% |
| Lack of Clear Position (133) | 0 | 0.0% | 0 | 0.0% | 1 | 4.8% | 0 | 0.0% |
| Intelligence (134) | 5 | 21.7% | 3 | 10.7% | 5 | 23.8% | 2 | 7.7% |
| Military-Record (135) | 0 | 0.0% | 0 | 0.0% | 0 | 0.0% | 0 | 0.0% |
| Liberal-Democrat (136) | 0 | 0.0% | 0 | 0.0% | 0 | 0.0% | 0 | 0.0% |
| Individual-Rights (137) | 0 | 0.0% | 0 | 0.0% | 0 | 0.0% | 0 | 0.0% |
| Society-Rights (138) | 3 | 13.0% | 1 | 3.6% | 0 | 0.0% | 2 | 7.7% |
| Candidate-Image (139) | 4 | 17.4% | 6 | 21.4% | 4 | 19.0% | 6 | 23.1% |
| Conservative-Republican (140) | 2 | 8.7% | 3 | 10.7% | 0 | 0.0% | 1 | 3.8% |
| Other-Attribute (199) | 0 | 0.0% | 0 | 0.0% | 0 | 0.0% | 0 | 0.0% |
| NO ATTRIBUTE ELEMENT | 2 | 8.7% | 0 | 0.0% | 2 | 9.5% | 0 | 0.0% |
| | 23 | | 28 | | 21 | | 26 | |

Figure 43:
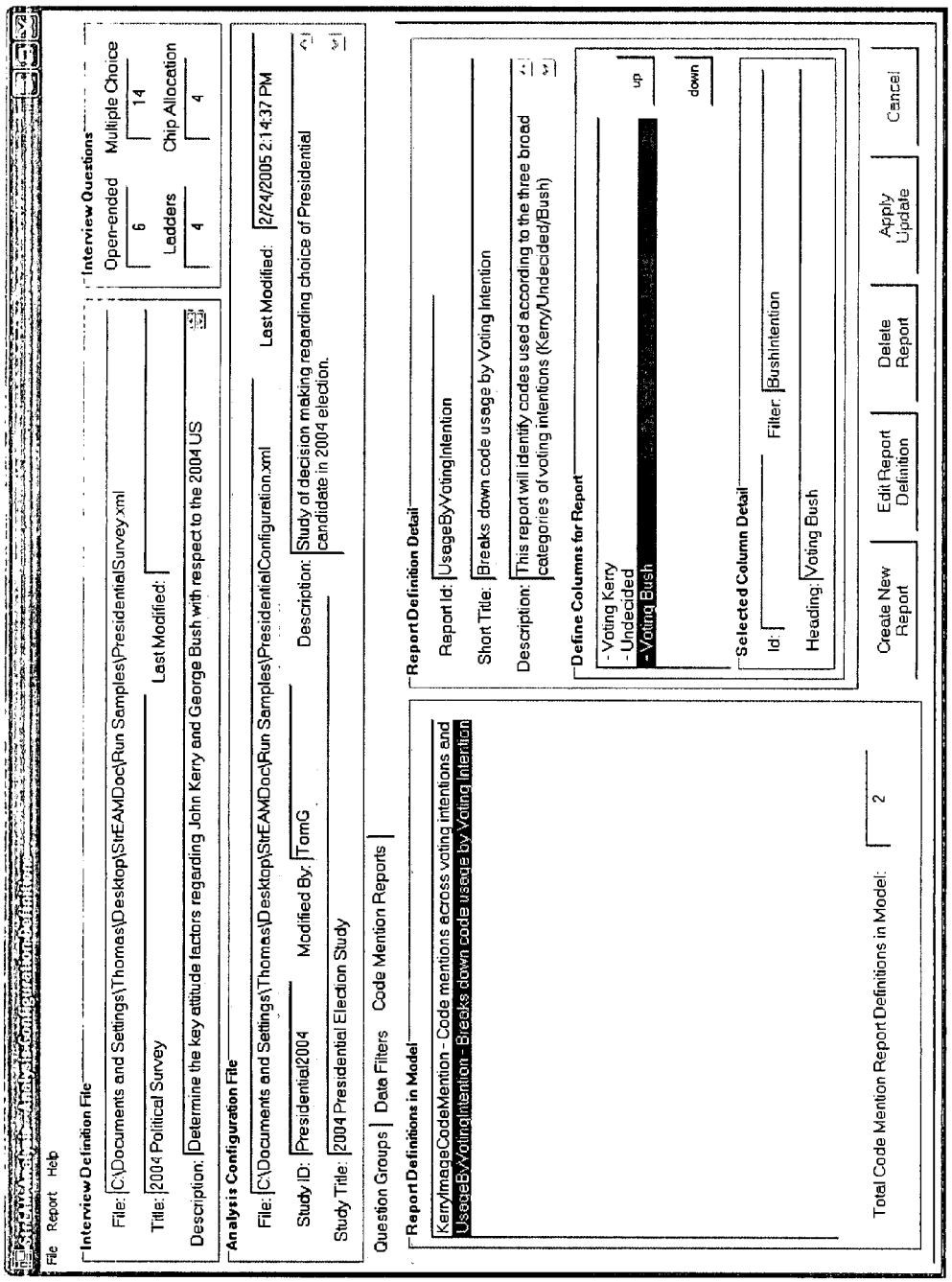
FIG. 43 shows another screenshot of the user interface for the Configure Analysis 3968 tool. In particular, this figure shows a screenshot of the user interface for this tool as it applies to Code Mention Reports 3986.

Multiple code mention report definitions may be specified in the StrEAM*analysis configuration database 2980. Each such definition can have any number of columns (each column corresponding to a Data Filter 3958). Code mention report definitions are maintained using the Configure Analysis tool 3968. A screenshot of the user interface for this tool as it applies to code mention reports 3986 is shown in FIG. 43.

Decision Segmentation Parameters

The decision analysis tool 3996 performs decision segmentation analysis (DSA, cf. Definitions and Descriptions of Terms section above) of the StrEAM*analysis subsystem 2912 for automating the discovery of major decision pathways contained within a set of ladder data. All of the parameters that control the automated decision segmentation analysis can have defaults specified in the StrEAM*analysis configuration database 2980. The parameters for the decision segmentation analysis process (via the decision analysis tool 3996), and their effect on decision analysis tool 3996 behavior are described in the section covering decision segmentation analysis (titled: StrEAM*analysis—Decision Segmentation) further below.

Export Lists 3962

The StrEAM*analysis subsystem 2912 has the ability to export interview analysis data to target applications such as the statistics package, SPSS® (from SPSS, Inc.) and Microsoft® Office Excel 2003. To control the data which gets exported, each StrEAM*analysis configuration database 2980 can include the definition(s) of named export lists 3962. Each such list contains a detailed list of the data items to export, as well as the sequence in which to export them.

Export lists 3962 include specifications of both interview question responses as well as general information about the interview session. Any combination of data can be listed in any order within an export list 3962.

Further description of the data residing in the analysis configuration database 2980 is provided in Appendix C.

StrEAM*analysis Model Database 2950

As shown in FIG. 39, each StrEAM*analysis model database 2950 includes the actual interview data (identified in FIG. 39 as the collection 3932 of "interview session data") resulting from the collection of interview sessions conducted, wherein each instance of the interview session data 3932 includes the interviewee responses for a single interview session. Note, there may be a plurality of such StrEAM*analysis model databases 2950, one for each distinct market research project conducted. To simplify the description herein, a single model database 2950 is shown in the figures and described hereinbelow. However, this simplification is not to be considered as a limitation of the present disclosure in that it is to be understood that the processing provided by the analysis subsystem 2912 described herein can be applied to each of a plurality of model databases 2950.

In addition to interview data 3932 resulting from interviewee responses, each StrEAM*analysis model database 2950 may also contain solution data 3936 output from the decision segmentation analysis tool 3996, wherein the solution data includes: ladder mappings 3940 and decision models 3944 as described in the Definitions and Descriptions of Terms section preceding the Summary section hereinabove (in particular, cf. "Decision Segmentation Analysis" description for "ladder mapping" description). Additionally, the analysis model database 2950 includes proposed and/or temporary definitions of codes (identified as code definitions 3951 in FIG. 39) used in coding interviewee responses. The code definitions 3951 may be provided as output from the ladder coding tool 3988. Once such code definitions 3951 are deemed to be reasonably stable and accurate, they may be copied into the code definitions 3950 of the analysis configuration database 2980 via the define codes tool 3972.

Each StrEAM*Analysis model database 2950, in one embodiment, may be implemented as a structured, plain text file that contains all of the desired interview response data and information identifying how a particular set of ladder codes has been applied. However, other data repository components are also within the scope of the analysis subsystem server 2914, such as relational and object-oriented databases as one skilled in the art will understand.

Multiple versions of the analysis model database 2950 can exist for the same set of interview data. In one embodiment, more than one analyst may code the same interview data wherein the results from one analyst may be compared with the results from another analyst (via, e.g., the quality assessment tool(s) 2994, and more precisely the compare models tool 3992 of FIG. 39, this tool being described further hereinbelow) to assess the quality/reliability of, e.g., the ladder coding of the corresponding interview data.

(4.2) Analysis Subsystem 2912 Tools/Programs

FIG. 39 shows several component of the StrEAM*analysis subsystem 2912. These include computational tools to configure interview data analysis activities, assemble the analysis data, code such data, produce reports, and perform detailed analysis. These programs are described hereinbelow.

Configure Analysis 3968 (Included in the Configuration Tools 2990 FIG. 29)

The configure analysis program 3968 is used by StrEAM project administrators (e.g., via an administrator computer 3964) and analysts (e.g., via an analyst computer 2948) to define several configuration settings of an analysis configuration database 2980 (FIGS. 29 and 39) for manipulating StrEAM interview data. Such configuration settings includes the definition of ladder question groups 3954, the definition of interview data filters 3958, the definition of code mention reports 3986, and the definition of export lists 3962. Accordingly, the configure analysis tool 3968:

Reads StrEAM*Interview definition data 3110 for obtaining the structure of the interview data; and
(i) Reads/writes StrEAM*analysis configuration database 2980 data entities (e.g., code sets 3942, code definitions 3950, ladder question groups 3954, data filters 3958, export lists 3962, and code mention reports 3986).

Define Codes Tool 3972

The define code tool 3972 (FIG. 39, included in the configuration tools 2990 of FIG. 29) is used by StrEAM analysts (e.g., via an analyst computer 2948) to define codes for use in categorizing qualitative interview data (such as ladder elements) so that such data may be analyzed quantitatively. Accordingly, the define codes tool 3972:

Reads StrEAM*Interview Definition data 3110 from the interview content database 2930 via the define exports tool 3976 (described following); and
Reads/writes StrEAM*analysis configuration database 2980 (e.g., code definitions 3950,
FIG. 39).

In particular, the define codes tool 3972 performs the following: (1) populates the code definitions 3950 of the analysis configuration database 2980 with the codes in the code definitions 3951 (such latter code definitions may be provided by an analyst using the ladder coding tool 3988 or provided by an interviewer(s) during interview sessions), and (2) allows an analyst to interactively add new codes, delete existing codes, and modify the names or descriptions of existing codes.

Define Exports Tool 3976

The exports tool 3976 (FIG. 39, and included in the configuration tools 2990 of FIG. 29) is used by StrEAM project administrators (e.g., via an administrator computer 3964) to create named export configurations that specify the data items to be exported from the StrEAM*analysis subsystem 2912 to other computational applications such as SPSS.

Accordingly, the define exports tool 3976:

Reads StrEAM*Interview Definition data 3110 from the interview content database 2930 (e.g., for determining the structure of interview data); and
Reads/writes the export list data entities 3962 in the StrEAM*analysis configuration database 2980 for exporting interview analysis data one or more of the reports identified on the right hand side of FIG. 39.

Figure 44:
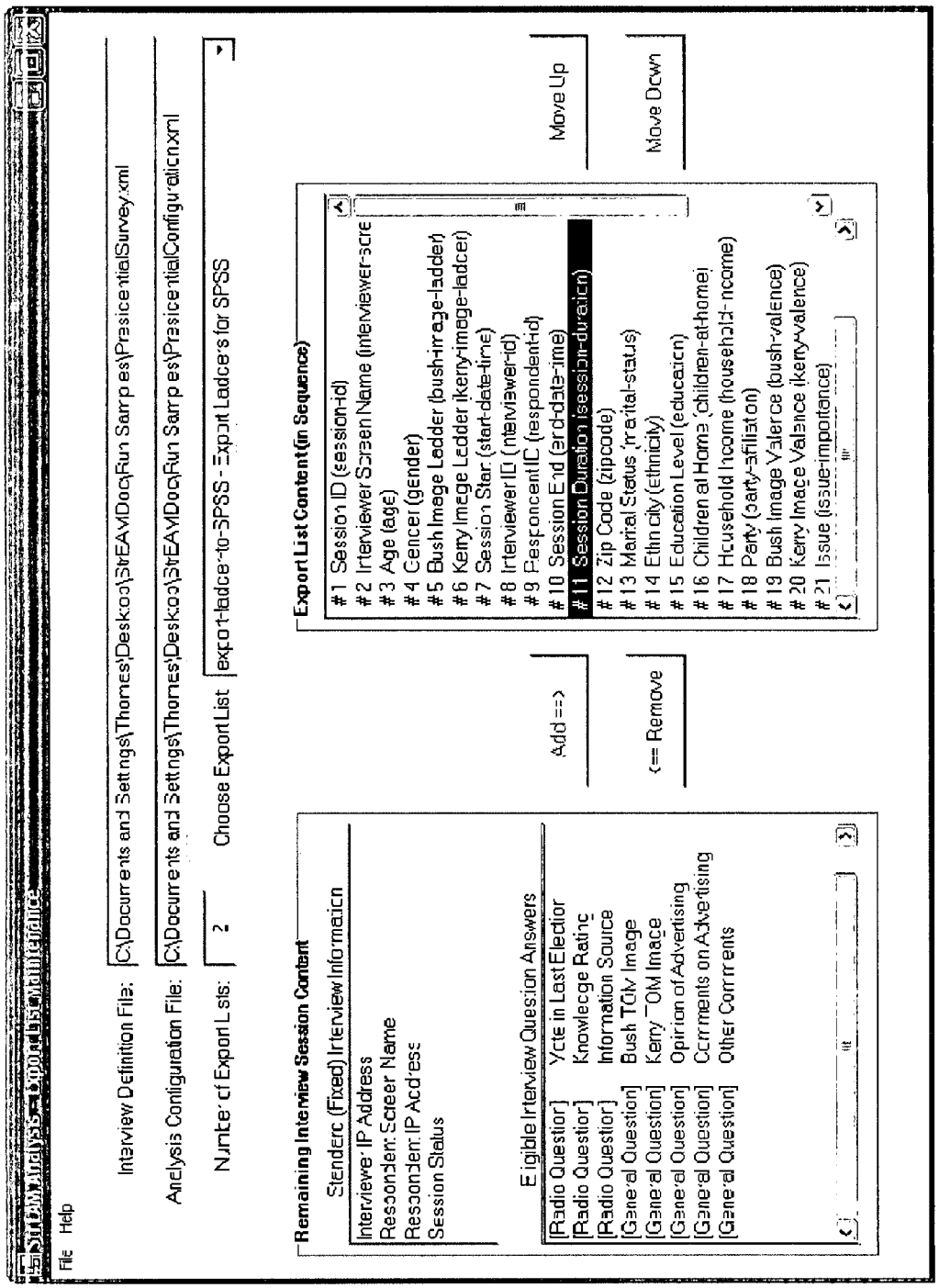
FIG. 44 shows a screenshot of the user interface for the Define Exports tool 3976. In particular, this figure shows a screenshot of the user interface for the Define Exports tool as it applies to code mention reports definitions 3986 (FIG. 39) for generating code mention reports.

Export lists 3962 include specifications of both interview question responses as well as general information about the interview session. Any combination of data can be listed in any order within an export list 3962. Export tools (in define exports tool 3976, FIG. 39) receive the name of an export list 3962 to use to control the export. Export lists 3962 are also kept up to date by the define exports tool 3976. A screenshot of the user interface for this tool as it applies to code mention reports 3986 is shown in FIG. 44. The items in FIG. 44 can be described as follows.

The top of the screen in FIG. 44 displays the file names of the StrEAM Interview definition file 3110, and the StrEAM Analysis configuration database 2980 for which the remainder of this screen applies. Immediately below the above described data repositories, there is (on the left) a field indicating the number (e.g., "2") of export lists 3962 available for selecting by, e.g., a user/analyst, and (on the left) a field for identifying a user/analyst selected export list 3962 (from a drop down list of available export lists, not show). Note, the collection of available export lists 3962 is obtained from the identified analysis configuration database 2980. Once one of these export lists 3962 is selected (or a new one is created), the details of the contents of the selected export list are displayed in the windows on the lower part of the screen. In particular, in the lower left portion of the screen (FIG. 44) are two windows. The lower window lists all of the interview questions that are not yet included in the selected export list 3962. The window immediately above, lists the other pieces of data associated with the interview (other than the interview questions themselves) that have not yet been included in the selected export list 3962. When one or more items from one or more of these latter two lists on the left are selected, the ADD button in the middle of the screen can be activated which causes the selected items to be: (i) added to the identified export list 3962, (ii) added in the window to the right, and (iii) removed from the window on the left.

On the lower right portion of the screen is a window that lists all of the data items that are currently part of the selected export list 3962. When one or more of the items in the "ExportListContent" are selected, the REMOVE button in the center can be activated to: (i) remove the selected item(s) from the selected export list 3962, (ii) move them out of the list on the right of the screen, and (iii) add them back to the window on the left. Alternatively/additionally, the user/analyst may use the MOVE UP or MOVE DOWN buttons on the far right to rearrange the order of the Export List items.

Build Model Tool 3978

The build model tool 3978 (FIG. 39, and included in the model development & analysis tools 2992 of FIG. 29) assembles and maintains the contents of a StrEAM*analysis model database 2950. This tool is used by a StrEAM project administrator (e.g., via an administrator computer 3964) to select StrEAM*Interview results and promote such results for inclusion in the StrEAM*analysis Model database 2950. This tool makes interview data available for subsequent analysis by, e.g., the decision analysis tool 3996 described hereinbelow. Regarding the maintenance of the analysis model database 2950, the build model tool 3978 allows a user/analyst to perform the following tasks: (a) add results from interviews to the analysis model database 2950, (b) remove interview results from the analysis model database, (c) view results of interviews contained in the analysis model database, and (d) view some overall statistics regarding the contents of the analysis model database.

Accordingly, the build model tool 3978:

Reads StrEAM*Interview Result data 3118 (FIG. 31); and
Reads/writes StrEAM*analysis model database 2950 (e.g., the interview session data 3932).

Using the build model tool 3978 an operator (or analyst) may open an existing StrEAM*analysis model database 2950 or create a new model database 2950, e.g., for analyzing recently obtained interview results (e.g., interview session data 3932). StrEAM*Interview result files 3118 in the interview archive database 3130 (FIGS. 29 and 31) are then opened either one at a time or in bulk. The Build Model tool 3978 loads the result files 3118, and lists a summary of each interview session contained in the Analysis Model database 2950 for display to the analyst, wherein each row displayed in an interview session summary window represents a unique interview session with a particular interviewee. The contents of an Analysis Model database 2950 may also be edited by the Build Model tool. An analyst may select interviews (rows) on the screen and remove those interviews from the Analysis Model 2950.

Ladder Coding Tool 3988

The ladder coding tool 3988 (FIG. 39, and included in the model development & analysis tools 2992 of FIG. 29) provides an intelligent user interface supporting a StrEAM analyst (e.g., via an analyst computer 2948) in the coding of ladder elements received in interviewee responses. The process of coding ladder elements includes the development of a set of ladder codes (cf., "Code Category", "Ladder Element" and "Ladder Codes" descriptions in the Definition and Descriptions of Terms preceding the Summary section above). In particular, such a set of ladder codes includes at least one ladder code (typically a plurality thereof) for each ladder level corresponding to an interview ladder question. The set of ladder codes depends on the subject matter of the corresponding interview ladder question. Using the ladder coding tool 3988, each instance of ladder element text (e.g., provided by the interviewees in responding to a corresponding ladder question during the interviews) is reviewed and assigned one of the ladder codes (for the corresponding ladder question). Note that this is often an iterative process since the set of ladder codes for one or more ladder levels may be modified and/or redefined as more ladder elements are reviewed (and coded). Thus, the ladder coding tool 3988 supports categorizing and (re)categorizing interviewee ladder element responses as well as iteratively modifying the ladder codes. Accordingly, the ladder coding tool 3988 directly supports the iterative nature of performing the tasks of: (i) developing codes, (ii) applying the codes to the corresponding interview data, and (iii) refining the codes (and recoding) according to the results obtained from (ii). To perform these tasks, the ladder coding tool 3988:

Reads StrEAM*analysis configuration database 2980 entries; and

Reads/writes entries of the StrEAM*analysis model database 2950, and in particular, reads and writes ladder data and ladder mappings 3940.

Figure 54:
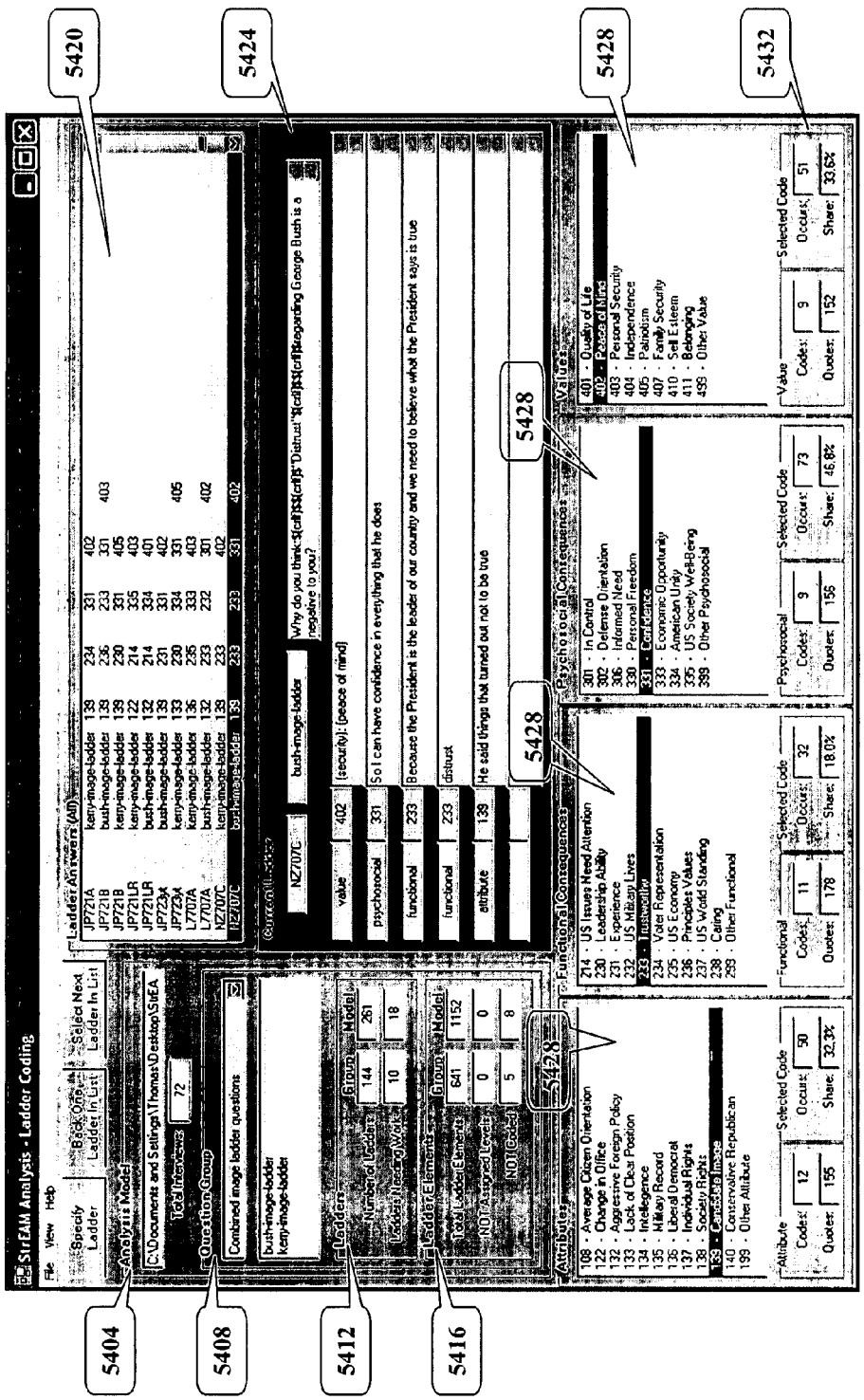
FIG. 54 shows a display of a screen 5404 for the ladder coding tool 3988.

A user interface 5404 for the ladder coding tool 3988 is shown in FIG. 54. The user interface 5404 allows an analyst to categorize ladder answers from interviewee responses and apply interview related codes thereto. The user interface of FIG. 54 provides, on the single screen shown: (i) a list of all of the ladders in the corresponding analysis model database 2950, (ii) a list of all of the codes (in the code definitions 3950) for the corresponding ladder elements in the analysis configuration database 2980, and (iii) convenient user interface action (including drag-and-drop) for assigning codes to the ladder elements.

In FIG. 54, the upper left of user interface 5404 displays the identity/location of the analysis model database 2950 (in the present embodiment, a file pathname under the title "Analysis Model"). Just below the analysis model database identity, a count of the number of interviews in the identified analysis model database 2950. At Question Group 5408, the user/analyst can select a question group 3954 to analyze (recall that a question group is a named set of ladder questions, the responses to which will be considered together; each question group 3954 can contain interview questions for one or more sets of questions for one or more ladders). Once a question group 3954 is selected, the sets of interview ladder question identifiers that make up the selected question group are displayed for reference. In FIG. 54, the selected question group is "Combined image ladder questions". Note that the sets of ladder questions corresponding to this question group are shown immediately below the selected question group identification. That is, there are two such sets: a first set "bush-image-ladder" having one or more interview questions for obtaining interviewee ladder responses (for all levels of a ladder) related to President Bush's image, and a second set "kerry-image-ladder" having one or more interview question for obtaining interviewee ladder responses (for all levels of a ladder) related to John Kerry's image. For example, the set of interview questions for this first set include a single initial question such as: "Why do you think an untrustworthy image regarding George Bush is a negative to you?" However, to obtain a complete collection of ladder responses from the interviewee, one or more follow on questions may be presented to the interviewee.

In order to aid the analyst in keeping track of how much coding work remains for the identified analysis model 2950, certain additional statistics are displayed. At 5412, the number of ladders obtained from the interviewee response data are displayed, and at 5416, the number ladder elements obtained from the interviewee response data are displayed. More precisely, for 5412 the following values are provided:

(i) in the left most field identified by "Number of Ladders", the number of ladders obtained from the interviewee response data for the selected question group, (ii) in the right most field identified by "Number of Ladders", the total number of ladders currently identified in the specified analysis model database 2950, (iii) in the left most field identified by "Ladders Needing Work", the number of ladders for the selected question group that are known to require additional analysis (e.g., ladders having no ladder elements and/or ladder codes), and (iv) in the right most field identified by "Ladders Needing Work", the total number of ladders currently identified in the specified analysis model database 2950 that need additional analysis.

Similarly, for 5416 the following values are provided:

(i) in the left most field identified by "Total Ladder Elements", the number of ladder elements obtained from the interviewee response data for the selected question group, (ii) in the right most field identified by "Total Ladder Elements", the total number of ladder elements currently identified in the corresponding analysis configuration database 2980, (iii) in the left most field identified by "NOT Assigned Levels", the number of ladder elements (obtained from interviewee responses to questions of the selected question group) that have not been assigned to a ladder level, (iv) in the right most field identified by "NOT Assigned Levels", the total number of ladder elements currently identified in the specified analysis configuration database 2980 that have not been assigned to a ladder level, (v) in the left most field identified by "NOT Coded", the number of ladder elements obtained from the interviewee response data for the selected question group that have not been coded, and (vi) in the right most field identified by "NOT Coded", the total number of ladder elements currently identified in the corresponding analysis configuration database 2980 that have not been coded.

In the upper right of the user interface 5404, there is a scrolling list 5420 that displays a summary of each instance of ladder data from interviewee responses to ladder questions in the selected question group 3954. Each instance of such ladder data is represented by one row in the scrolling list. Each of the rows includes the following items:

(i) an identification of the interview session from which the instance was obtained (e.g., the identifier "JP721A" in the first row of the scrolling list), (ii) an identifier (from the lower window at 5408) identifying a set of interview ladder questions presented to the interviewee of the interview session (e.g., "kerry-image-ladder" in the first row of the scrolling list), and (iii) the remainder of each row provides numbers identifying the codes (if any) for each ladder element in the interviewee's response. Note that there are typically four numbers, each number representing a code for a ladder element response for a different ladder level.

When a row of ladder data is selected in the scrolling list 5420, the corresponding details for the selected row are displayed in the fields in the "Current Ladder" window 5424. The first row of data in the window 5424 provides the ladder data ID (e.g., "NZ707C"), the description of the ladder (e.g., "bush-image-ladder"), and the initial ladder question for the selected ladder data (which in FIG. 54 corresponds to the question: "Why do you think an untrustworthy image regarding George Bush is a negative to you?"). Underneath these fields, the corresponding interviewee response(s) (i.e., ladder elements) for each ladder level of the identified ladder are displayed. The user/analyst can enter and/or change the code designations (i.e., the numbers: 402, 331, 233, 233, 139) for coding the interviewee's responses.

Across the lower part of the user interface 5404, there are four sections titled "Attributes", "Functional Consequences", "Psychosocial Consequences", and "Values". Each of these sections display a scrolling list 5428 of the current codes for the corresponding ladder level (e.g., attributes, functional consequences, psychosocial consequences, and values). For each of the corresponding ladder levels and its corresponding scrolling list 5428, there is a collection of corresponding statistics shown that apply thereto. Each collection of statistics has a field identifier and a corresponding value field. The field identifier and the corresponding value field are described as follows:

| Field Identifier | Value Field |
| --- | --- |
| Codes | The number of codes that are currently defined for the corresponding ladder level (and displayable in the corresponding scrolling list 5428 immediately above). |
| Quotes | The number of interviewee provided ladder elements for the corresponding ladder level, and for the question group 5408 for this ladder level. |
| Occurs | When a code is selected (from the scrolling list 5428 immediately above), this field displays the number ladder elements that have been assigned the selected code in the current question group 5408. |
| Share | When a code is selected (from the scrolling list 5428 immediately above), this field displays the percentage of ladder elements that have been assigned the selected code relative to the total number of ladder elements for the ladder level in the current question group 5408. |

Decision Analysis Tool 3996

The decision analysis tool 3996 (FIG. 39, and included in the model development & analysis tools 2992 of FIG. 29) provides advanced analysis features for exploring ladder data 3995 such as determining the primary or most significant clusters of ladders indicative interviewee perceptions. The decision analysis tool 3996 is used by an analyst to partition and explore ladders in a StrEAM*analysis model database 2950, and to generate one or more decision models 3944. This tool is also used to perform decision segmentation analysis (also referred to as DSA; cf. Definitions and Descriptions of Terms section above) described in more detail hereinbelow.

The decision analysis tool 3996:
  Reads StrEAM*Interview Definition data 3110.
  Reads StrEAM*analysis configuration database 2980.
  Reads/Writes analysis model database 2950.

The decision analysis tool 3996 also produces a variety of reports using the SpreadsheetML (XML) format for Microsoft® Office 2003. It can also write output for SPSS®. Further description of decision segmentation analysis (DSA) and the processing performed by the decision analysis tool 3996 are disclosed in the section hereinbelow titled Decision Segmentation Analysis (Step 3424, FIG. 43).

Interview Reports 3984

The interview report program 3984 (FIG. 39, and included in the output/report generation tools 2996 of FIG. 29) is used by StrEAM analysts (e.g., via an analyst computer 2948) and project administrators (e.g., via an administrator computer 3964) to produce various reports regarding the interview data contained within a StrEAM*analysis model database 2950.

Note that, in one embodiment, the reports produced by this tool are written in the SpreadsheetML (XML) language for formatting and presentation with Microsoft® Office Excel 2003. Accordingly, the interview reports tool 3984:
  Reads StrEAM*analysis configuration database 2980 (such reading not shown in FIG. 39), e.g., for obtaining ladder elements, code set 3942, code definitions 3950, data filters 3958, export lists 3962, question groups 3954, and mention reports definitions 3986;
  Reads StrEAM*analysis model database 2950 for obtaining market research data that models, e.g., the decision making dynamics of a sample population interviewed for a particular market research project; and
  Generates customized reports (e.g., "code mention reports" 3986 (FIG. 39) that can be used to examine code usage at a more detailed level. This is described in more detail hereinbelow). Additionally, the following reports are generated:
  (i) code assignment reports 3982 (FIG. 39) which lists the ladder elements (i.e., from the original interviewee responses) assigned to each code. The codes (and corresponding descriptive text) are grouped by ladder element. This provides a simple way to manually review the degree of consistency with which interviewee response text has been classified (i.e., coded);
  (ii) interview result reports 3983 (FIG. 39) which contain all of the results for each interview. That is, such a report provides a hard-copy of all the interview data. Such a report provides a convenient way to review the interview results; and
  (iii) interview status reports 3985 (FIG. 39) which contain a summary of the interviews that have been conducted and are used to track the status of interviewing for a corresponding market research study. Each interview session is summarized along with when it was conducted, who the interviewer was, and whether or not the interview was completed successfully.

Compare Models 3992

The compare models program 3992 (FIG. 39, and included in the quality assessment tools 2994 of FIG. 29) compares the contents of two StrEAM*analysis model databases 2950. Of particular interest in the comparison is comparing how common qualitative data is coded by different analysts. This tool is used to assess the consistency/quality of the coding process by comparing the code assignments 3982 made by multiple StrEAM analysts. Accordingly, the compare models tool 3992:
  Reads StrEAM*analysis configuration database 2980 (such reading not shown in FIG. 39);
  Reads each of a plurality of different analysis model databases 2950;
  Performs a comparison;
  Outputs a coding quality 3997 obtained from the comparison.

In the current embodiment, each StrEAM*analysis subsystem 2912 program listed in hereinabove may be implemented as a Microsoft® Windows application (using VB.NET, as one skilled in the art will understand). Such an implementation provides an analyst with a rich user interface to enhance several of the analysis-related tasks, such as coding data. Note that such user interface analysis tools 2954 (FIG. 29) may reside at the market research network server 2904, or at a separate analyst computer 2948 that communicates with the interview analysis subsystem server 2914 via, e.g., the Internet. Note that such a client-based implementation of the analysis tools, along with the XML-based distributed data model enables analysis activities while an analyst is at a site remote from the market research network server 2904, and disconnected from the from the Internet.

Bulk Coding Tools

Bulk coding tools 3994 (denoted herein as the tools Level Elements and Code Elements, not individually shown in the figures) are available to provide alternative views of interview data in a StrEAM*analysis model database 2950, and to provide an alternative mechanism for assigning ladder levels and codes to ladder elements. The tools Level Elements and Code Elements provide views of interviewee responses as independent verbatim quotes, linked only by the question they to which were in response. A convenient graphical user interface then allows the analyst to "drag-and-drop" interviewee responses to ladder questions into appropriate lists according to "ladder level" (via the Level Elements tool), and "code" (via the Code Elements tool).

These tools are designed for the rapid assignment of levels and codes to phrases simply on their own merit. Their typical use is to provide a cross-check of the levels and codes assigned to ladder elements through the use of the standard ladder coding tool 3988 (FIG. 39). Comparison of two versions (using the compare models tool 3992) of the same analysis model database 2950, one coded with the ladder coding tool 3988, and the other coded with the bulk coding tools, can identify questionable—or at least debatable—assignments that may warrant further study.

Note that as with the Code Ladders tool 3988, in support the iterative nature of the code development/data coding process, the Code Elements tool is also capable of modifying a code definitions (in the StrEAM*analysis configuration database (file) 2980) as well. Codes may be created, modified, deleted, and collapsed into one another.

(4.3) Operation of the Analysis Subsystem 2912

Figure 11B:
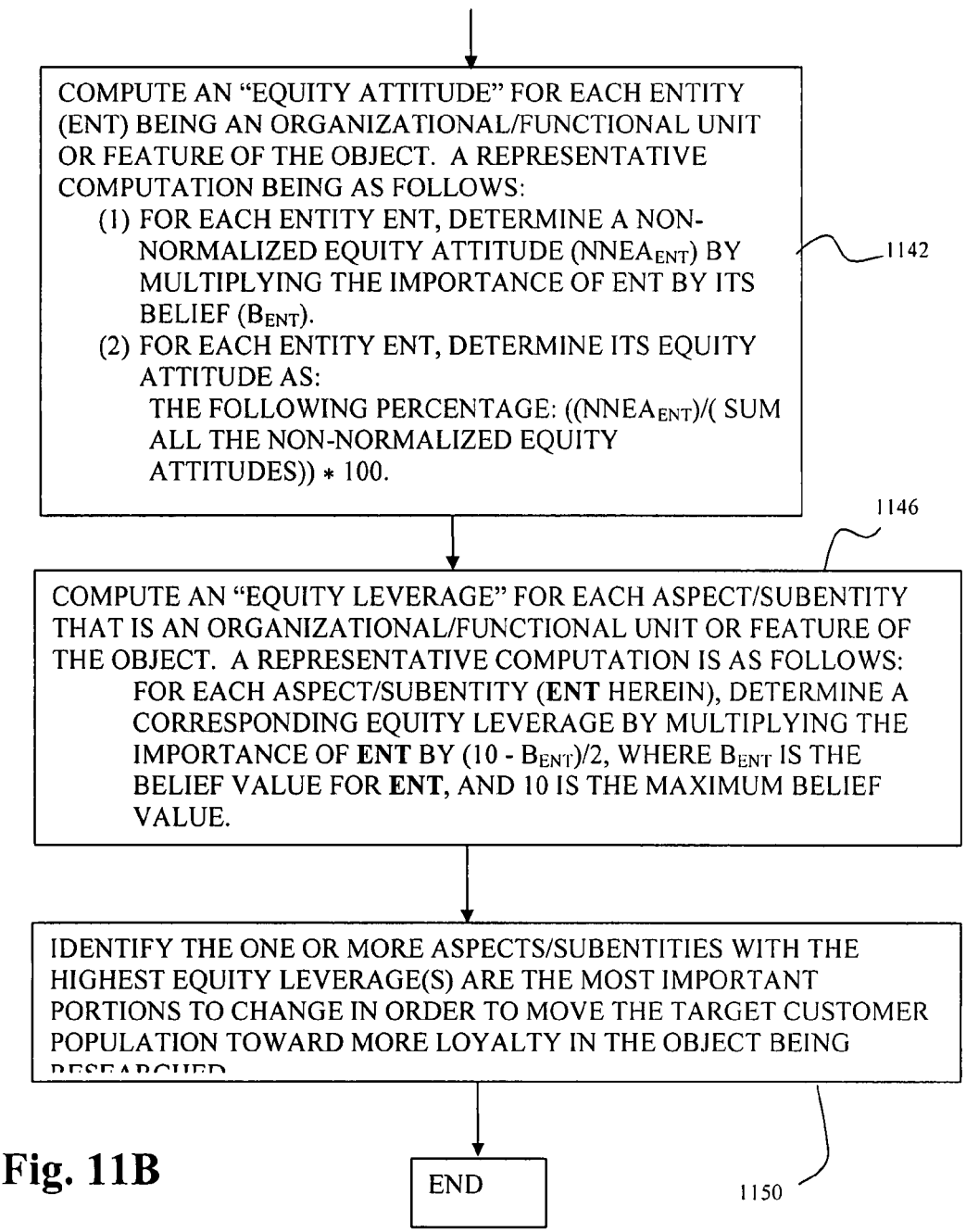

Regarding step 1012 (FIG. 10), a high level flowchart of the steps performed by the present market analysis method and system is illustrated in FIGS. 11A and 11B. Note, the steps of FIGS. 11A and 11B are generally performed by the interview analysis subsystem 2914 once the interviewee response data from the interview archived database 3130 has been transferred to an analysis model database 2950 as interview session data 3932 (FIG. 39). In step 1110, for each (any) anchor, expectation, usage, and/or top-of-mind interview question requiring quantitative (e.g., numerical or predetermined) responses, the evaluators 2998 are activated (either manually or automatically) to generate summary tables of the interviewee response values from such interview questions; e.g., tables identifying the frequencies with which each of the quantitative responses (or ranges thereof) was identified by interview respondents. In step 1114 (which may be performed prior to, or concurrently with step 1110), for each (any) anchor, expectation, usage, equity (positive or negative), laddering, and/or top-of-mind interview questions requiring non-quantitative responses (i.e., qualitative responses, e.g., responses without predetermined options from which an interview respondent must select), categorize the responses to such questions so that the responses that appear to be substantially synonymous are assigned to a same category; i.e., perform coding of such responses using one or more of the bulk coding tools 3994, and the define codes tool 3972. Note that such a categorization process is known in the art as "coding", and each such category is typically characterized by a corresponding distinct "content code" which may be a phrase representative of the meaning of the responses in the category. Thus, the term "code" herein may, in some cases, refer to a distinct corresponding category that is represented by the identifier referred to by the term "content code".

Accordingly, for an object being researched, such a coding process (as in step 1114) attempts to group interview responses from a plurality of interviewees into meaningful categories relative to the research being performed. For example, for an interview question requesting interviewees to describe a least desirable attribute of a particular beverage, one interviewee might reply that the beverage is too foamy, while another interviewee might reply that the beverage froths too easily. Such replies may be categorized into the same category identified by the content code "too easily foams".

In step 1118, the evaluators 2998 may be activated for each of the qualitative top-of-mind, and equity question responses, wherein there is a corresponding quantitative question whose response is associated with a rating of the qualitative question, generate summary data that classifies each interviewee's qualitative response according to the associated quantitative response. For example, an interviewee might respond to the question: "what comes to mind when you think of General Motors?" with the reply: "Big cars". Subsequently, the interviewee may be asked "Is that a positive or negative for you?". Note that an answer to this last question can be presented so that a quantitative response is requested (e.g., discrete values corresponding to a range from "very negative" to "very positive" on a scale of, e.g., 1 to 10). Accordingly, such quantitative responses from all interviewees responding to the interview questions may be summarized using codings of the responses to the first question. For example, categories may be created that are identified by the following code contents: "larger than average cars", "fast cars", "economical cars", "reliable cars", etc. Thus, the "Big cars" interviewee response above would likely be categorized or coded into the "larger than average cars" category, and for all similarly coded interviewee responses, the total number of interviewees indicating their response is a positive for them can be obtained, as well as the total number of interviewees indicating their response is a negative for them. Accordingly, such totals can be provided as part of the summary data.

Subsequently, in step 1122, a determination is made as to how to analyze the interview responses from the interviewees, i.e., the interview session data 3932 (FIG. 39). In particular, for each qualitative response that is identified as a level of a ladder, in step 1126 these responses (i.e., laddering data 3995) are analyzed according to the steps of FIG. 34 (described hereinbelow), and more particularly, according to the steps 3416 through 3428 of FIG. 34. In one embodiment, such laddering data 3995 is provided to an analyst who is also provided with access to various interactive interview analysis computational tools (e.g., referring to FIG. 39, the ladder coding tool 3988, and the decision analysis tool 3996 may be used). Such tools allow an analyst to, e.g., statistically evaluate the coded ladders (cf. the "Ladder Code" and "Coded Ladder" descriptions in the Definitions and Descriptions of Terms section above) provided in the analysis model database 2950 (but not shown in FIG. 39). In particular, such tools allow the analyst to determine the importance that interviewees appeared to ascribe to various ladders (step 3416, FIG. 34). Additionally (in step 3420, FIG. 34) such tools allow the analyst to partition the interview data into perceptional groupings or subsets related to the object being researched, wherein the groupings are believed to represent meaningful or important distinctions between the interviewees. For example, in the direct selling example (1.1.4) described above, at least one object being studied is the issue of loyalty of sales representatives. Accordingly, interviewee responses can be grouped into two groups, i.e., a first group provided by sales representatives that are identified as loyal to the direct sales company, and a second group provided by sales representatives that are identified as non-loyal to the company. Note, however, that such partitions of the interview data can be provided on virtually any topic being researched according to the disclosure herein. For instance, in the resort market analysis of (1.1.1) a partition of the corresponding interview data can be between such interview data from interviewees who are identified as satisfied with the resort, and interview data from interviewees who are identified as dissatisfied with the resort. Note that such partitions may be performed using the question groups 3954 and the data filters 3958 described hereinabove.

Subsequently (in steps 3424 and 3428, FIG. 34), the analyst is able to identify significant linkages between the perceptional groupings, and thereby determine the important linkage chains that are believed to result in various interviewee decisions related to the object being researched. FIG. 22 is an illustrative representation of such significant linkages between perceptional groupings for direct sales associates that are intending to stay with a direct sales company, and the direct sales associates that are considering leaving the company. Note that steps 3424 and 3428 may be performed using the decision analysis tool 3996 described briefly above in section (4.1), and in more detail in section (4.4.4) hereinbelow.

Alternatively, for interviewee responses (i.e., interview session data 3932) that were obtained from equity questions, steps 1130 through 1150 are performed using the evaluators 2998. In step 1130, for each category (C) of non-quantitative responses determined in step 1114 (wherein such responses are +Equity or −Equity responses), determine the importance (I) of the category according to the number of times that interviewee mentions (in the category C) were provided as responses to the equity questions (positive equity and negative equity question). Note that such categories may be functional and/or organizational units of a business enterprise as in the resort example of (1.1.1) above. Additionally/alternatively, such categories may correspond to more general attributes of the object being analyzed. For example, in the museum example (1.1.2) above there are categories identified as "variety" and "presentation". In general, such categories may be substantially any relevant attributes/features of the research object identified, e.g., by the responses to the framing questions as discussed in the examples of section (1).

In one embodiment, each such importance value may be computed as a percentage of the total number of mentions in responses to equity questions. However, it is within the scope of the present disclosure that other measurements indicative of importance may also be provided, such as for a term/phrase in the mentions, its importance may be determined relative to a particular subcollection of all the terms/phrases in the mentions. Thus, such an importance value may be a percentage (or other value, e.g., a fraction) indicative of the relative frequency of the term/phrase in comparison to other terms/phrases in the subcollection. Alternatively, such importances may be based on interviewee responses to only certain questions (e.g., only positive equity questions, or, only negative equity questions). However, a term/phrase may then have multiple importances; e.g., there may be different importances for different interview contexts. For simplicity below, it is assumed that there is a single importance for each term/phrase mention.

Subsequently, in step 1134, the categories are classified according to: the (higher level) organizational/functional units of the research object that are being analyzed, and/or the features of the research object that are being analyzed. Examples of such organizational/functional units being analyzed, and/or the features being analyzed are provided in the market research examples hereinabove (e.g., the higher level organizational/functional units shown in FIG. 12 are analyzed in the resort market analysis example described hereinabove). Then in step 1138, for each organizational/functional unit or attribute/feature of the object being researched, a belief value (B) for each category therein is computed, wherein this belief value is indicative of the positiveness with which the interviewees perceive the category for the object being researched. In one embodiment, each such belief value (for a corresponding category) is obtained by: (1) determining the percentage of the number of positive mentions associated with responses in the category relative to the total number of mentions associated with responses in the category; and (2) rounding this percentage to the nearest integer value. However, it is within the scope of the present disclosure that other computations may be used to determine such a belief value. For example, belief values may be computed according to a non-linear function such as a sigmoid function.

In step 1142, a value referred to herein as the "equity attitude" is computed for each of one or more aspects or subentities that are organizational/functional units or features of the object being researched. In particular, such an equity attitude value may be computed for each of the categories and/or the classifications of categories. Each such equity attitude value is a measurement indicative of the importance of a favorably perceived corresponding aspect (e.g., functional unit, feature or attribute) of the object being researched. In one embodiment, for each such object aspect, the corresponding equity attitude value is computed by: (1) multiplying together the importance (I) of the aspect and the belief (B) of the aspect to obtain what is denoted herein as a "non-normalized equity attitude"; and then (2) determining percentage of non-normalized equity attitude relative to the total of all non-normalized equity attitudes for all aspects of the object that are being analyzed.

Other examples of various are organizational/functional units or features of the object being researched follows. In a first example, if the object being researched is a hospital, then an organizational unit of the hospital may be its emergency care division. As another example, if the object being market researched is a particular automobile make (more precisely, the market therefor), then a functional unit that may be important for a target automobile buying population may be the maneuverability of the automobile make. Alternatively, if the object being researched is home exercise equipment, then a feature of such equipment might be its portability (or lack thereof).

Subsequently, in step 1146, a value referred to herein as the "equity leverage" is computed for each of one or more aspects or subentities that are organizational/functional units or features/attributes of the object being researched. Each such equity leverage value is a measurement indicative of a potential gain in favorable perception within a target population that can be obtained by changing the object's corresponding aspect or subentity to which the equity leverage value applies. In one embodiment, the equity leverage for an aspect or subentity (ENT herein) may be computed as:

$$I_{ENT}*(10-B_{ENT})/2$$

where $I_{ENT}$ is the importance value for ENT, $B_{ENT}$ is the belief value for ENT, and 10 is assumed to be the highest possible value for belief. Note that the rationale for the term $(10-B_{ENT})/2$ is based upon the assumption that if management for the object focuses on one specific aspect/subentity of the object being researched, such an increase is achievable. Said another way, the units of incremental gain across aspects/subentities of the object are assumed to be defined as one half of the difference to 10 (i.e., to the maximum belief value). However, it is within the scope of the present disclosure that other measurements indicative of equity leverage may also be provided, such as:

$$I_{ENT}*(\text{MaxBeliefVal}-B_{ENT})/\text{MngmtInertia}_{ENT},$$

Where MaxBeliefVal=the maximum belief value (10 hereinabove),

MngmtInertia$_{ENT}$=a measurement representative of the inertia or lack of resolve that management may have in changing the aspect/subentity ENT, wherein the higher this value, the less likely management will embark in new directions and institute new policies and procedures for obtaining greater increases in the target population's favorable perception of the object. less likely that changes are to be realized by management. equity leverage is likely to be realistically attainable in gaining greater favorability of the object in the target population. Note that this measurement may be determined by applying the technique for computing importances and beliefs to interviews of management rather than, e.g., customers of the object being researched.

It is believed that the aspect(s) or subentity(ies) having highest corresponding equity leverage values are the aspect(s) or subentity(ies) that should be focused on for changing the object's perception in the minds of the target population to a more favorable view of the object (e.g., greater loyalty to the object). So, in step 1150, one or more of the aspect(s) or subentity(ies) having the one or more highest corresponding equity leverage values are identified so that those responsible for modifying the object can focus resources on these aspect(s) or subentity(ies) rather than in other areas.

Figure 34:
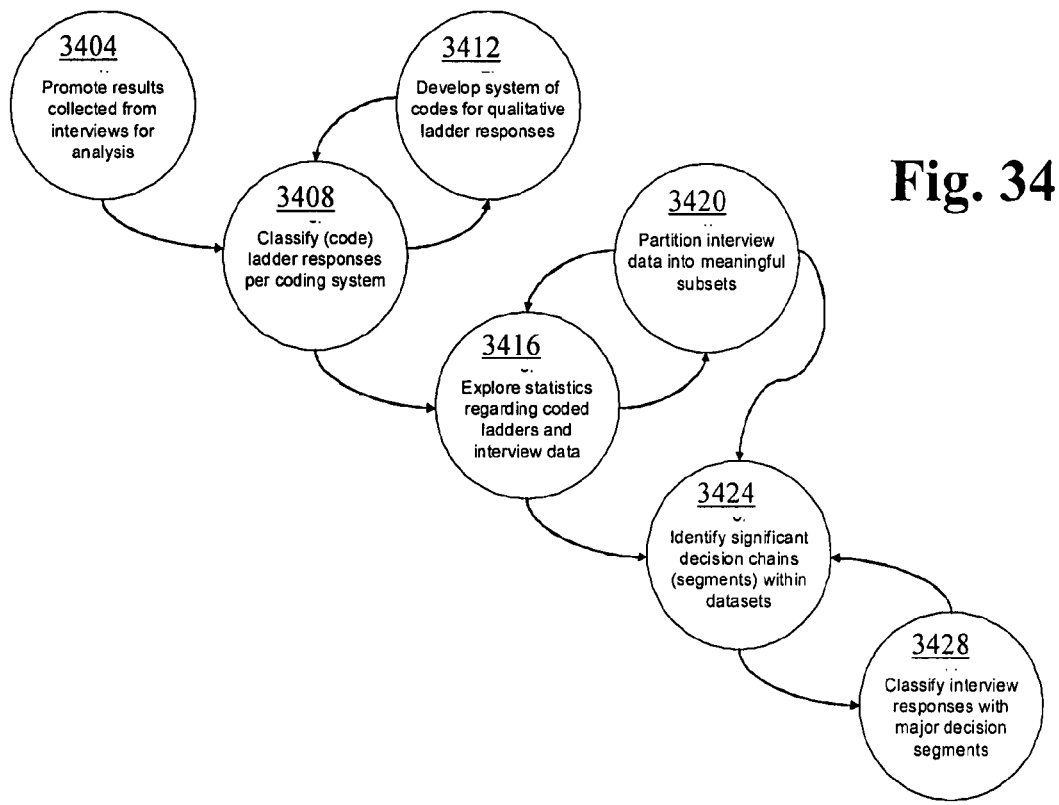
FIG. 34 shows an overview of the processes performed by the StrEAM*analysis subsystem 2912.

FIG. 34 shows in a high level flowchart of steps performed by the StrEAM*analysis subsystem 2912 for analysis of laddering interview data as per step 1126 (FIG. 11A). The flowchart commences with a step 3404 of an analyst populating the analysis model database 2950 with the corresponding interview data (residing in the interview archive database 3130, FIGS. 29 and 31) for study, and providing interview schema data (e.g., identifiers and descriptions of questions asked) from the interview content database 2930 to the configuration database 2980.

Moreover, the following additional data is provided in the initialization of the configuration database 2980 via the configuration tools 2990:

(a) An export list 3962 (described hereinbelow) via the define export tool 3976 (FIG. 39);
(b) Code definition entities 3950 for defining codes (as described hereinbelow) via the define codes tool 3972; and
(c) Configuration settings for: the definition of ladder question groups 3954, the interview data filters 3958, the code mention reports 3986, and the export lists 3962 (these data items being described more fully hereinbelow), wherein the configuration analysis tool 3968 is used by an analyst and/or system administrator to create such configuration settings.

Additionally, the following data is provided in the initialization of the analysis model database 2950 via the model development and analysis tools 2992: interview session data 3932 via the build model tool 3978.

Subsequently, in steps 3408 and 3412, codes are iteratively determined for classifying elements of interviewee ladder responses, and applying such codes to the interview data 3932 in the analysis model database 2950 to thereby generate ladders 3995, as one of ordinary skill in the art will understand. In particular, an analyst uses the define codes tool 3972, and the ladder coding tool 3988 (FIG. 39) to iteratively develop both code definitions 3950 for coding, e.g., interviewee obtained ladder elements in the interview session data 3932 of the corresponding analysis model database 2950, and generating coded ladders to be retained in the corresponding analysis model database 2950. Thus, one or more code sets 3942 may be used generate one or more ladder mappings 3940 (also referred to herein as a "decision map", a "solution map"), wherein such ladder mappings are believed to be indicative of interviewee perceptions related to the object being researched, and/or are believed to be indicative of interviewee decision making factors related to the object being researched.

One result from the steps 3408 and 3412 is the generation of statistics related to the coded ladders and interview data 3932 in the analysis model database 2950. In particular, the statistics generated are described in various sections hereinbelow in the context of the description of the following figures: FIG. 54 (section (4.2)), FIG. 55 (section (4.4.1)), and FIGS. 62 through 65 (section (5)).

In step 3416, the statistics related to the coded ladders and the interview session data 3932 provided by interviewees (for a given object being researched) are explored for determining an appropriate partitioning of the interview data into collections or subsets, wherein for each such collection, the coded ladders and the interview session data 3932 therein relate to and/or identify a single feature or characteristic of the object being researched. In particular, data filters 3958 are the primary mechanisms for partitioning the coded ladders and the interview session data 3932. An analyst may create data filters 3958 that can combine interview questions and their answers in arbitrary ways in order to partition the interview data. An example of such partitioning is described in the Code Mention Report Definition subsection of section (4.1) above. In particular, the Example of a Code Mention Report provided in the above Code Mention Report Definition subsection shows the partitioning of the interview session data 3932 into a combination of various age and gender partition, wherein the age and gender information was provided by interviewees in response to interview questions.

Note that partitioning of the coded ladders and the interview session data 3932 is also provided by allowing an analyst to specify question groups 3954, wherein such groups can be used for combining the answers to questions for different ladders as described in the Question Groups subsection of section (4.1) above. Note that the interview data may be also partitioned in ways that are significant to the decisions about the object being researched.

In step 3424, the most significant decision pathways (i.e., the ladders 3995 that are determined to be most important) are identified from the interview ladder data 3995 for obtaining instances of the decision models 3944. In particular, these pathways are determined by decision analysis tool 3996 (FIG. 39) described further hereinbelow. Subsequently, in step 3428, the interview responses from decision pathways (or decision segments of, e.g., one or more decision models 3940) identified as most significant can then be classified according to "primary decision patterns" (segmentation), thereby obtaining the ladder mappings 3940 Note that such primary decision patterns are also determined by the decision analysis tool 3996. Further details regarding steps 3424 and 3428 are provided hereinbelow in the section StrEAM*analysis—Decision Segmentation.

In some cases, e.g., the decision pathway determination step (i.e., step 3424) and the segmentation step (i.e., step 3428) are performed substantially without human intervention, e.g., various components of the StrEAM*analysis subsystem 2912 may be activated substantially (if not completely) automatically. In the steps 3404 through 3420, where investigation by an analyst is required, the StrEAM*analysis subsystem 2912 provides intelligent automated assistance. Note that such assistance streamlines the interview data analysis process and facilitates rigorous adherence to a predetermined interview data analysis methodology. Of particular note is the support StrEAM*analysis subsystem 2912 provides for the inherently iterative steps 3408 and 3412 of data coding, and the iterative steps 3416 and 3420 for partitioning.

(4.4) Decision Segmentation Analysis (Step 3424, FIG. 43)

The Decision Segmentation Analysis (DSA) process examines a set of ladder answers 3995 in the model database 2950 that have previously been coded and finds the primary decision paths (known as "cluster chains" in the art, cf. Definitions and Descriptions of Terms prior to the Summary section above) contained in that data. That is, DSA is a process for assigning (or mapping)) each coded ladder (cf. the "Coded Ladder" description in the Definitions and Descriptions of Terms section prior to the Summary section) to a cluster chain that best represents the coded ladder. The assignment of coded ladders to cluster chains is done in the context of what is known as a "solution map" (also denoted as a ladder mapping 3940, FIG. 39) that contains multiple cluster chains. Therefore, DSA assignment of a coded ladder involves deciding on whether the ladder is: (a) a good enough fit to one or more of the cluster chains in a solution map 3940 such that it can be assigned to the solution map, and then (b) determining which cluster chain (of potentially a plurality of such chains) is the best fit for the coded ladder. One result of the decision segmentation (DSA) process is a set of cluster chains that model the dominant decision paths in the data (i.e., a ladder mapping 3940). The DSA process typically involves the generation of several solution maps 3940, each one mapping the coded ladders to each of a plurality of different cluster chains.

As described in Ref. 24 of the References Section hereinabove, once the a solution map 3940 is generated, one or more decision models 3936 can be derived therefrom. In particular, each such decision model 3936 (referred as a "Hierarchical Value Map" or "HVM" in Ref. 24) is derived by connecting all the cluster chains by the following steps (A) through (C):

(A) Identifying common codes in different cluster chains.
(B) Inserting a directed edge in the decision model for each linkage of each cluster chain.
(C) Determining additional directed edges of the decision model being generated by using both the direct implications between codes of the coded ladders from which the cluster chains are derived (e.g., two codes have a direct implication therebetween when they have adjacent levels in at least one common coded ladder), and the indirect implications between codes of the coded ladders (e.g., two codes have an indirect implication therebetween when they are in at least one common coded ladder, but are not on adjacent levels of the coded ladder).

In using such (direct and indirect) implications for determining such directed edges, the most typical approach is to specify an implication threshold value, and then for each implication having a number of instances above the threshold, insert an edge in the (directed graph) decision model being generated, wherein the edge goes between the two nodes (or levels) of the cluster chains that identify the code elements in the implication. By performing this task for different implication thresholds (usually such threshold being in the range of 3 to 5, given a sample of 50 to 60 interviewees), permits the researcher to evaluate several decision models 3944, and thereby choose the one that appears to be the most informative. Note that it is typical that for 125 coded ladders from 50 interviewees, an implication threshold of 4 will account for as many as two-thirds of all implications among codes.

Note that FIG. 62 shows such implications for a research study of the U.S. presidential candidates of the 2004 election, wherein all ladder element codes are listed both as columns and as rows, and for each cell in the matrix of FIG. 62, the number of implication instances are reported for the two codes (column and row) of that cell. For each cell, the number of implication instances is given in one of two formats: (a) X.Y where X is the number of direct implication instances and Y is the number of indirect implication instances for that code pair; or (b) X.Y where X is the number of direct implication instances and Y is the total number of implication instances (direct and indirect) for that code pair.

(D) The preferred version of the decision model obtained in step (C) above is designated as the decision model 3936.

Further description of StrEAM*analysis Decision Segmentation Analysis is provided hereinbelow. Note that, as stated above, decision segmentation analysis is performed by an analyst interacting with the decision analysis tool 3996 (FIG. 39).

Prior to further description of the decision analysis tool 3996 some clarifying definitions are provided as follows.

(4.4.1) DSA Terms Defined

Some important terminology for StrEAM*analysis Decision Segmentation is defined here:

| DSA Term | Definition |
| --- | --- |
| Coded Ladder | During DSA processing a coded ladder is just the sequence of codes that were assigned to the elements of interviewee responses to ladder questions for a ladder. A coded ladder may include codes for any combination of levels: Attributes, Functional Consequences, Psychosocial Consequences, and Values.<br>To be treated as legitimate for DSA analysis, however, a coded ladder must include at least two different codes. In one embodiment, there cannot be more than 6 codes in a coded ladder. |
| Cluster Chain | A cluster chain is a sequence of codes that represents a decision path (e.g., a Means-End Chain). The objective of DSA processing is to find the cluster chains that best represent the decision making reflected in the aggregate interview response data set being analyzed. A cluster chain is a series of 4, 5, or 6 codes ordered generally according to the ordering of these codes in the corresponding ladder(s) from which the cluster chain is derived. |
| Solution Map | A solution map is a set of cluster chains that together represent (or map) the dominant decision making paths for the data set under review. Each solution map has a fixed number of cluster chains (or dimensions), and the DSA algorithms find the optimal cluster chains for the solution map given the number of dimensions desired. Typically multiple solution maps are generated (for 2, 3, 4, 5, 6, 7, 8, or 9 chains) for comparison in order to determine the number of dimensions that best solves the problem. |
| Implication | An implication is a pair of codes that appear in a coded ladder (or a cluster chain). That is, an implication may be an attribute code and a value code pair, two functional consequence codes, a psychosocial consequence code and a value code pair, or any other combination. The only requirement is that the two codes must be different. That is, an implication represents a connection between two elements in a decision-making process.<br>For example the coded ladder A->F->P->V contains 6 implications (or code pairs): AF, AP, AV, FP, FV, and PV. |
| Implication-instance | An implication-instance is an actual occurrence of a code pair (i.e., implication) in the data. There may be any number of implication-instances for a given implication.<br>For example, if we have three coded ladders:<br>A->B->C->D<br>A->B->C->X<br>A->B->Z->D |

-continued

| DSA Term | Definition |
| --- | --- |
| | Then we would have the following implication-instances:<br>3 instances of AB<br>2 instances each of AC, AD, BC, BD<br>1 instance each of AZ, AX, BZ, BX, CD, CX, ZD<br>It is important to distinguish between implications and their occurrences (implication-instances), since some statistics and parameters utilized during Decision Segmentation Analysis refer to implication-instances and others to implications. |
| Direct Implication | A direct implication is a code pair that is adjacent in the code sequence of a coded ladder or cluster chain. |
| Indirect Implication | An indirect implication is a code pair that is not adjacent in the code sequence of the ladder or cluster chain. |
| Specified Implications | The collection of all the implications (direct and indirect) that are represented (specified) by the code pairs in a corresponding "code sequence" as described in the "Definitions and Descriptions of Terms" section above (and more specifically, a corresponding cluster chain or coded ladder). It is simply all pairs of codes contained in the corresponding code sequence.<br>For example, the cluster chain (or coded ladder) A→B→C→D specifies 6 implications: AB, AC, AD, BC, BD, and CD. |
| Specified Implication-instances | These are the implication-instances (direct and indirect) that correspond to the code pairs in a corresponding code sequence (more specifically, a corresponding cluster chain or coded ladder). It is simply all pairs of codes in the chain (or ladder).<br>For example, the cluster chain A→B→C→D specifies instances of the following 6 implications: AB, AC, AD, BC, BD, and CD. |

FIGS. 55-58 are illustrative of presentations provided to an analyst for processing interview data 3932. In particular, the interview data for FIGS. 55-58 were obtained from interview sessions with registered voters just prior to the presidential election of 2004, wherein the interviewees were queried as to their perceptions of the two candidates George W. Bush, and John Kerry. The screen shots in each of the FIGS. 55-58 are described hereinbelow.

Figure 55:
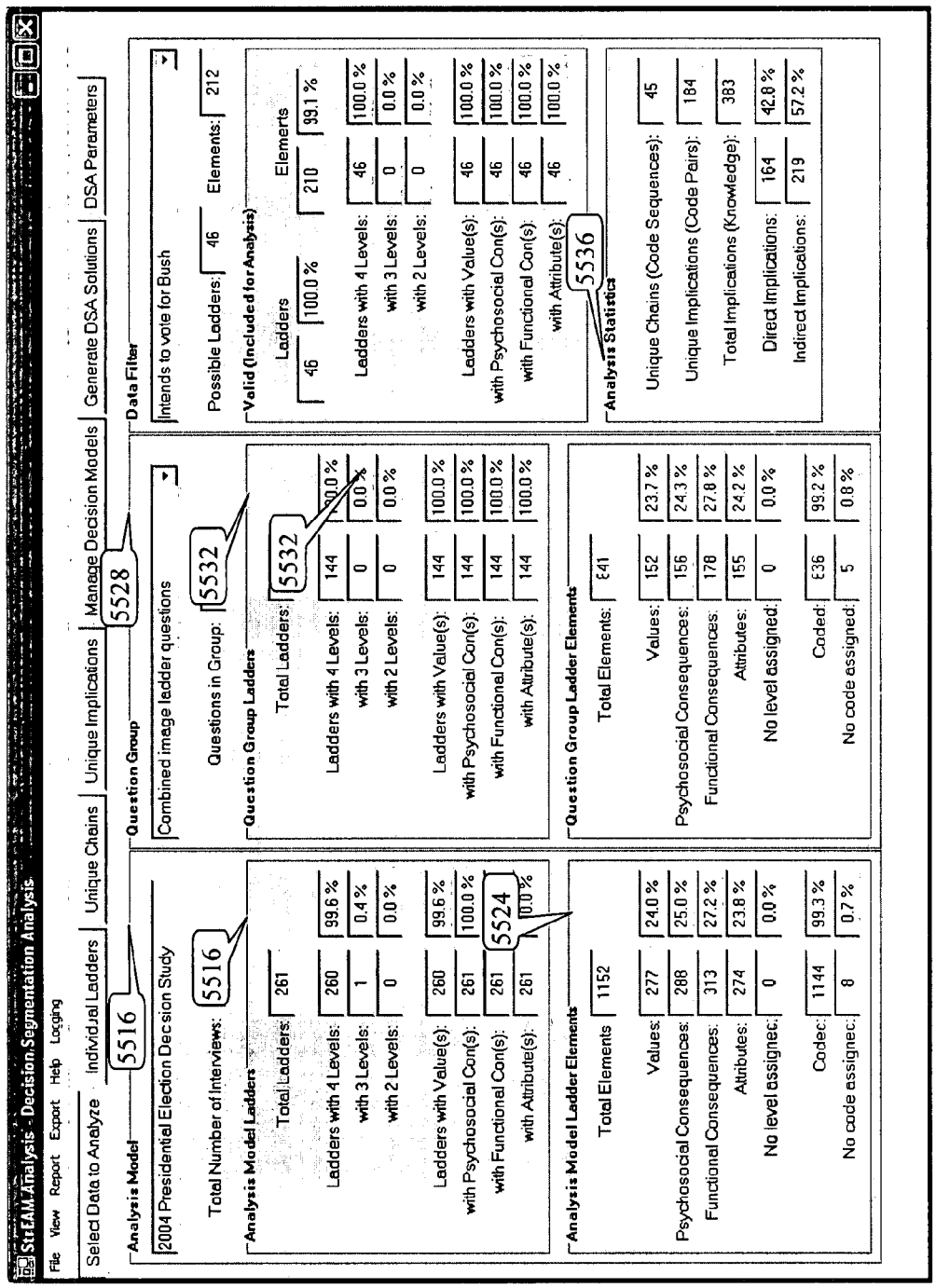
FIG. 55 shows an illustrative display provided to an analyst by the decision analysis tool 3966, wherein from this display the analyst is able to select an interview data set for generating solution maps 3940 (also referred to as "ladder mappings", FIG. 39), and from such solution maps then deriving decision models 3944.

An illustrative display provided to an analyst by the decision analysis tool 3966 is shown in FIG. 55, wherein from this display the analyst is able to select an interview data set 3932 for generating corresponding decision models 3944 and solution maps 3940. The display of FIG. 55 is illustrative of the user interface used by an analyst to select the data set (of ladders 3995) to analyze. FIG. 55 also displays a complete set of statistics regarding that data set of ladders 3995. In particular, FIG. 55 shows the user interface displaying interview data for a research study related to the U.S. presidential election of 2004.

FIG. 55 includes three major sections. On the left, the first of these sections is the Analysis Model information 5504. This first section displays the title of the current analysis model database 2950 open in the decision analysis tool 3966, along with the number of interviews that this analysis model database 2950 contains in its interview session data 3932. Below these two fields (commencing generally at 5508) is a summary of the ladders 3995, and (at 5512) the corresponding ladder elements in the interview session data 3932. In addition to the total number of ladders and ladder elements, a number of statistics are provided in this first (left most) section as follows:

Ladders with 4 Levels The number of ladders that have at least one ladder element at all four of the possible ladder levels is displayed. Also displayed is the percentage of the total number of ladders that this represents.

Ladders with 3 Levels The number of ladders that have at least one ladder element at exactly three of the four possible ladder levels is displayed. Also displayed is the percentage of the total number of ladders that this represents.

Ladders with 2 Levels The number of ladders that have at least one ladder element at exactly two of the four possible ladder levels is displayed. Also displayed is the percentage of the total number of ladders that this represents.

Ladders with Values A count is displayed of the ladders that have at least one ladder element that has been classified as a value. Also displayed is the percentage of all of the ladders that this represents.

Ladders with Psychosocial Consequences A count is displayed of the ladders that have at least one ladder element that has been classified as a psychosocial consequence. Also displayed is the percentage of all of the ladders that this represents.

Ladders with Functional Consequences A count is displayed of the ladders that have at least one ladder element that has been classified as a functional consequence. Also displayed is the percentage of all of the ladders that this represents.

Ladders with Attributes A count is displayed of the ladders that have at least one ladder element that has been classified as an attribute. Also displayed is the percentage of all of the ladders that this represents.

Values This displays a count of the number of ladder elements that have been classified as values and the percentage of all ladder elements that this represents.

Psychosocial Consequences This displays a count of the number of ladder elements that have been classified as psychosocial consequences and the percentage of all ladder elements that this represents.

Functional Consequences This displays a count of the number of ladder elements that have been classified as functional consequences and the percentage of all ladder elements that this represents.

Attributes This displays a count of the number of ladder elements that have been classified as attributes and the percentage of all ladder elements that this represents.

No level assigned This is the number of ladder elements that have NOT been classified with regards to ladder level. Also displayed is the percentage of all ladder elements that this represents.

Coded This is the number of ladder elements that have been assigned a code. Also displayed is the percentage of all ladder elements that this represents.

No code assigned This is the number of ladder elements that have NOT been assigned a code. Also displayed is the percentage of all ladder elements that this represents.

In the middle section (at 5516) of FIG. 55 is the section with Question Group information. At the top is a scrollable list that allows the user to choose the question group 3954 to use in order to choose a subset of the ladders 3995 in the analysis model database 2950. The title of the chosen question group is displayed (for the present example, the chosen question group is identified as "Combined image ladder questions" having two questions in the group as shown immediately below). Further below are sub-sections titled "Question Group Ladders" (5520) and "Question Group Ladder Elements" (5524). These include statistics regarding ladders and ladder elements (respectively) that are identical to those described above for the interview session data 3932 as a whole, except that the statistics in 5520 and 5524 refer to the subset of ladders and ladder elements within the chosen question group 3954. Additionally, the percentages shown in these subsection are also with respect to the total number of ladders and ladder elements in the chosen question group 3932.

At the right of the display (at 5528) is the third section providing information on an analyst chosen data filter 3958. A scrollable list at the top of this section is used by the analyst to choose a data filter 3958 to apply to the interview session data 3932 corresponding to the chosen question group 3954. The interview data resulting from using the chosen question group and data filter is the subset of the interview data 3932 to be used by the decision analysis tool 3996 to perform decision segmentation analysis. Note that for the present example (FIG. 55), the title of the data filter 3958 is "Intends to vote for Bush", and the number of potential ladders and ladder elements in the data set is displayed immediately below.

After a data filter 3958 is chosen, the DSA tool 3996 examines the ladders and ladder elements in the resulting data set. If a ladder does not have at least two valid, coded ladder elements, then it is not useful for DSA processing, and accordingly is eliminated from further DSA processing. In addition, specific codes may be marked as 'Not for Analysis' (e.g., typically reserved for ladder element text that cannot be classified). Such codes are also not useful for further treatment by the DSA tool 3996, and accordingly are also eliminated. As a result, it is possible that after such elimination, the DSA tool 3996 may have eliminated some of the potential ladders (and their corresponding ladder elements) from further analysis. The results of this 'weeding' process are shown in the sub-section titled "Valid (Included for Analysis)" (at 5532). This subsection gives the number of various ladder classifications and ladder element classifications that will actually be used for (DSA) analysis along with the percentage each number represents out of the total for the corresponding ladder classification or ladder element classification, wherein each total corresponds to the corresponding interview data 3932 that satisfies the chosen data filter 3958. The statistics at 5532 are defined as above for the field at 5508, except—of course—that they represent the count and percentages relative to the valid items in the selected data set.

Finally the section labeled "Analysis Statistics" (at 5536), displays statistics about the interview data to be analyzed by the DSA tool 3996, in the terminology used by DSA. The statistics displayed are:

| | |
|---|---|
| Unique Chains (Code Sequences) | The total number of unique sequences of codes in the data set being analyzed. The coding of interviewee responses for a ladder results in a code sequence, however some of the code sequence may be identical, in which case they would be instances of the same unique chain. |
| Unique Implications (Code Pairs) | The total number of unique implications (as defined in 4.4.1) in the data set being analyzed. |
| Total Implications (Knowledge) | The total number of implication-instances (as defined in 4.4.1) in the data set being analyzed. |
| Direct Implications | The total number of direct implications (as defined in 4.4.1) in the data set, along with the percentage this represents of the total number of implication-instances in the data set being analyzed. |
| Indirect Implications | The total number of Indirect Implications (as defined in 4.4.1) in the data set, along with the percentage this represents of the total number of implication-instances in the data set being analyzed. |

An illustrative display provided to an analyst by the decision analysis tool 3966 is shown in FIG. 56, wherein from this display the analyst is able to view an interview data set for generating decision models 3944 and solution maps 3940. In particular, FIG. 56 shows such a display for the research study related to voter perceptions of the candidates in the 2004 U.S. presidential election (i.e., Bush vs. Kerry). The display of FIG. 56 is used by an analyst to review all of the ladders 3995 (chain instances) that are present in the data set selected for DSA processing. At the top of the screen (5604) the current Analysis Model, Question Group, and Data Filter titles are displayed to identify the data set being reviewed. The lower part of the screen (commencing at 5608 and continuing to the bottom of FIG. 56) lists all of the ladders 3995 in the data set. For each of the ladders 3995 in the data set, there is a row in the scrollable window constituting most of the area of 5608. For each ladder row shown, there is an identifier for the interview session from which the ladder data was obtained (under the heading "Session ID"), an identifier for identifying the corresponding primary (and initial) ladder question for the ladder (under the heading "Question"), and for each of the ladder's levels, the code(s) that have been assigned to the interviewee's ladder element response for the level. Also listed (under the heading "Occurrence") is the number of times corresponding sequence of codes is present in the data set. Buttons are available (generally at the horizontal portion of the display at 5612) that can be used by the analyst to sort the list of ladder rows in different ways as identified by the text on the buttons.

Note also that whenever a ladder row (chain instance) is selected in from the display of FIG. 56, the analyst may use a pop-up menu to view the description of the codes in the row. An example of this form (5616) is also shown in FIG. 56.

Figure 57:
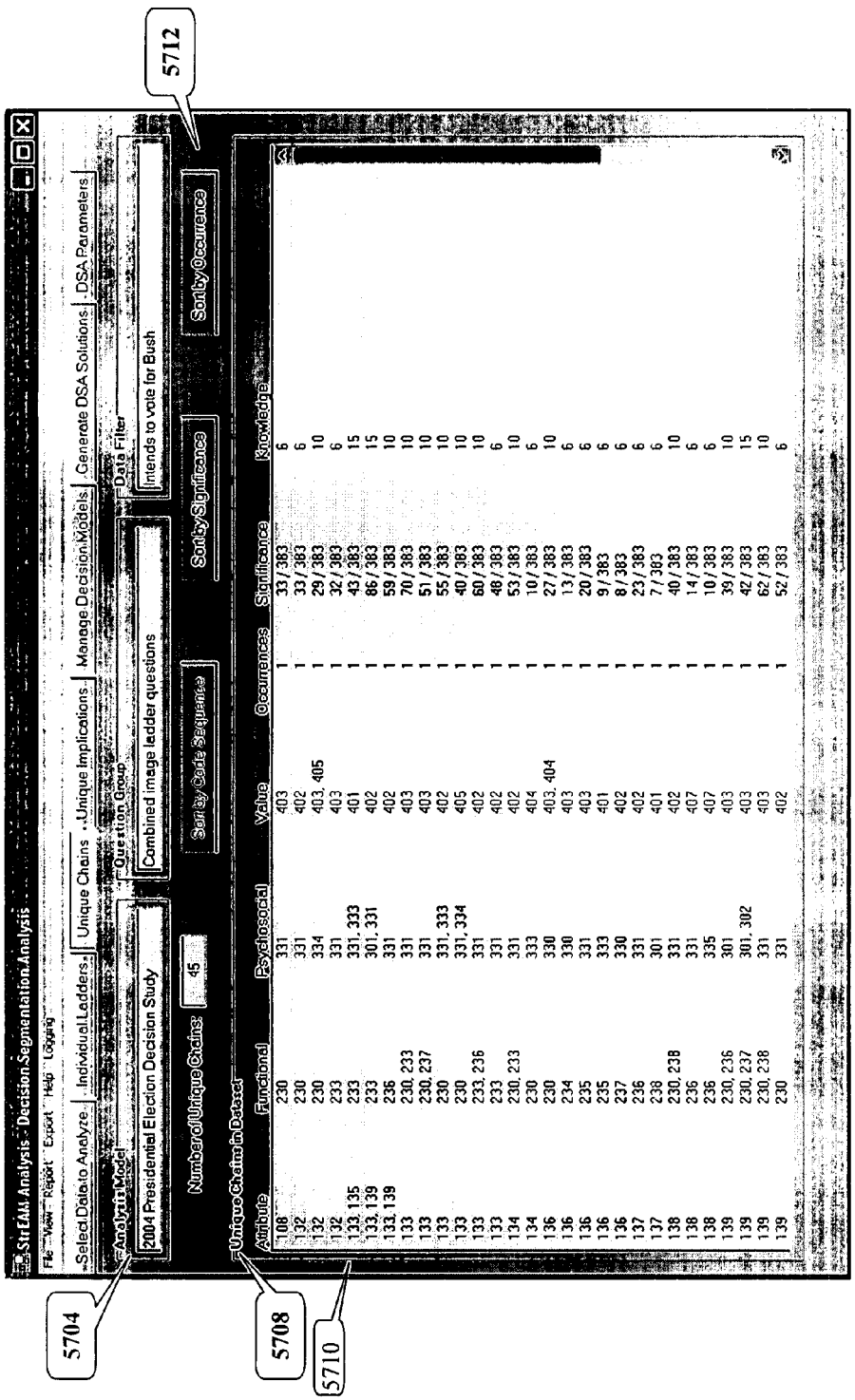
FIG. 57 shows another illustrative display provided to an analyst by the decision analysis tool 3966, wherein from this display the analyst is able to view chains (e.g., ladders or perceptual levels longer than the four levels of a ladder, wherein there may be two or more chain levels within, e.g., the functional consequence ladder level), and/or a segment of chain or ladder (e.g., having less than four levels).

An illustrative display provided to an analyst by the decision analysis tool 3966 is shown in FIG. 57, wherein from this display the analyst is able to view chains (e.g., ladders or hierarchical perceptual levels longer than the four levels of a typical ladder disclosed herein, wherein there may be two or more chain levels within, e.g., the functional consequence ladder level), and/or a segment of a chain or ladder (e.g., having less than four levels). The display of FIG. 57 is used by an analyst to review the unique chains (i.e., hierarchical sequences of codes corresponding to interviewee perceptions) that are present in the data set selected for DSA processing. At the top of the display (5704) the current analysis model database 2950, question group 3954, and data filter 3958 are displayed for identifying the data set being reviewed. The lower part of the display (commencing generally at 5708 and below) lists all of the unique chains in the data set, one unique chain per row in the scrollable data window of 5708. In each unique chain row displayed, the code sequence (i.e., the codes applied to ladder elements) is shown along with the number of times (under the heading "Occurrences") that sequence of codes appears in ladders 3995 of the data set (such ladders also referred to as chain instances). Note that the unique chain row 5710 has two sublevel codes at the attribute level (i.e., 133, 135), and two sublevel codes at the psychosocial level (i.e., 331 and 333). So the corresponding unique chain has a total of six coded hierarchical levels of interviewee perception; i.e., the hierarchy of codes (from lowest attribute to values) is: 133, 135, 233, 331, 333, and 401. Also, for each unique chain row, significance and knowledge statistics are shown respectively, under the headings "Significance" and Knowledge". The significance statistic is the same as is defined in Section (4.4.3) for cluster chains hereinbelow (also, cf. Definitions and Descriptions of Terms prior to the Summary section above for brief description of cluster chains). More precisely, for each unique chain, its significance is presented as a ratio with the total number of implications in the data set from the interview session data 3932 (i.e., significance is the fraction XX/YY where) XX is the implications in the data set for the unique chain, and YY is the total number of implications in the data set). The knowledge statistic is the same as the implication count also defined in Section (4.4.3). Buttons are available (at the horizontal portion of FIG. 57 indicated at 5712) that can be used by the analyst to sort the list of unique chain in different ways (e.g., sort by code sequence, by significance, or by occurrence).

Note that when a unique chain is selected from FIG. 57 (or a corresponding display for any other research study), the details of the code sequence can be displayed as shown by 5616 in FIG. 56.

Figure 58:
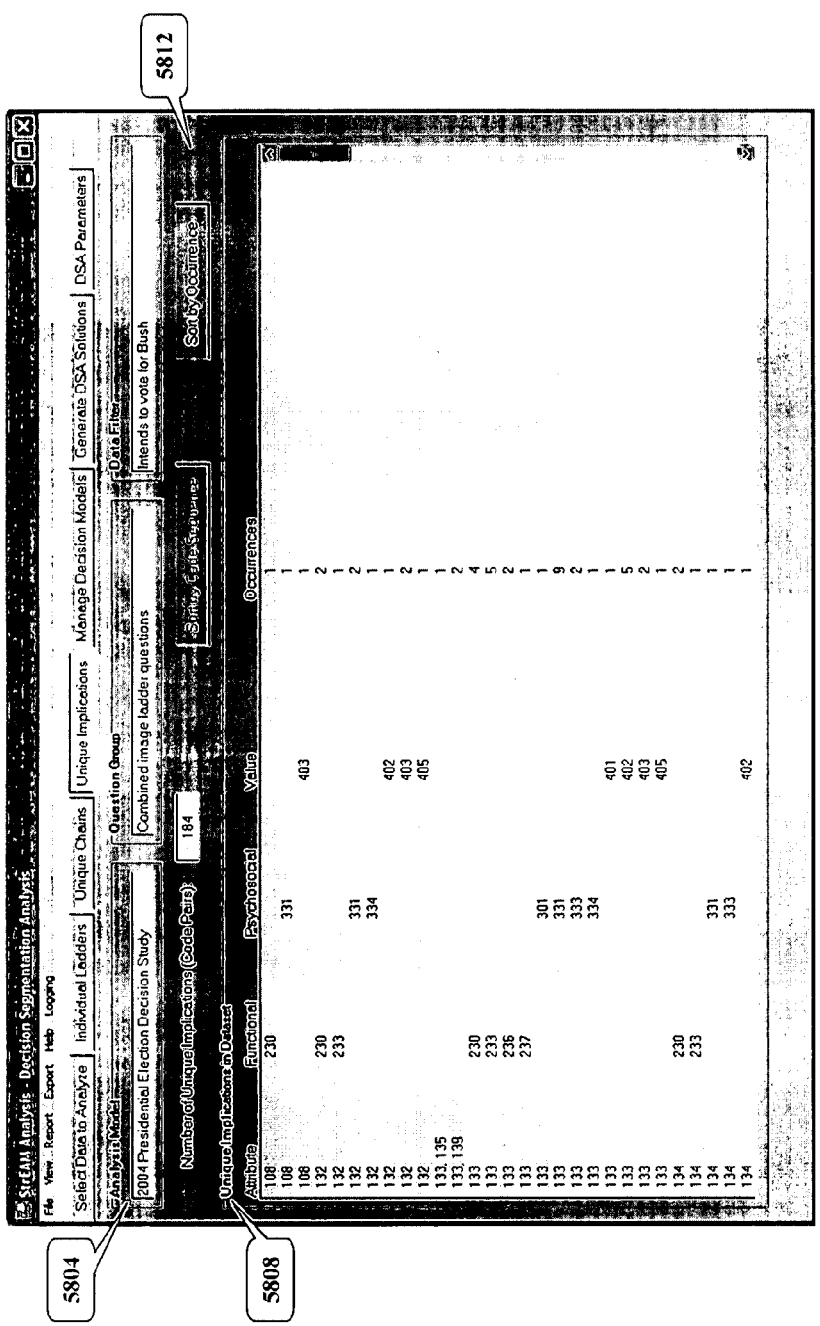
FIG. 58 shows another illustrative display provided to an analyst by the decision analysis tool 3966, wherein from this display the analyst is able to view implications.

An illustrative display provided to an analyst by the decision analysis tool 3966 is shown in FIG. 58 (for the same 2004 voter presidential election research study), wherein from this display the analyst is able to view implications. The display of FIG. 58 is used by an analyst to review the implications (i.e., code pairs) that are present in the coded ladders obtained from the data set (a subset of the interview session data 3932) chosen for DSA processing. At the top of the display (5804) the current analysis model database 2950, question group 3954, and data filter 3958 are displayed for identifying the data set being reviewed. The lower part of the display (commencing generally at 5808 and below) lists all of the unique implications derived from the chosen data set, one implication per row in the scrollable data window encompassing most of the display for FIG. 58. For each implication, the pair of codes therefor is listed along with the number of times the implication appears in coded ladders derived from the data set. Buttons are available (at the horizontal portion of FIG. 58 indicated at 5812) that can be used by the analyst to sort the list of implications in different ways (e.g., sort by code sequence, or by occurrence).

Note that when an implication is selected, the details of the code descriptions can be displayed in a pop-up form (5616) as shown by 5616 in FIG. 56.

(4.4.2) Assignment of Coded Ladders to Cluster Chains

A concept central to Decision Segmentation Analysis (DSA) is that of assigning (or mapping) each of one or more coded ladders to a cluster chain (and subsequently determining one or more decision models 3944) that best represents the coded ladder. The assignments of coded ladders is done in the context of a solution map 3940 containing multiple cluster chains. Therefore assignment involves deciding on whether a coded ladder is: (a) a good enough fit to one or more of the cluster chains in the solution map 3940 such that the ladder can be assigned, and then (b) determining which cluster chain is the best fit for the coded ladder.

In order for a coded ladder to be considered potentially assignable to a cluster chain, the coded ladder needs to satisfy one of the following two (2) conditions:

a. Three or more codes in the ladder match codes found in the cluster chain; and b. Two codes match between the ladder and the cluster chain involving either a functional consequence and a psychosocial consequence, or an attribute and a psychosocial consequence.

In the event that the coded ladder (L) being inspected is assignable to more than one cluster chain under consideration (for a given solution map 3940), then the ladder L is assigned to the best cluster chain fit based on the following steps (applied in the sequence given):

Step 1. The cluster chain(s) with code matches at the most ladder levels of L;

Step 2. The cluster chain(s) with the most matching codes of L (regardless of ladder level assignments);

Step 3. The cluster chain(s) which has the matches with L giving the highest point value (where points are given as follows: 1 point for one or more Value level code match, 2 for one or more Attribute level match, 3 for one or more match at the Functional Consequence level; and 4 points for Psychosocial Consequence level);

Step 4. The cluster chain(s) where the segments of each such cluster chain that match a segment the ladder L have a highest total sum of their Segment Strengths (cf. the Cluster Chain Statistics Defined section hereinbelow, and in particular, the chain strength description);

Step 5. The cluster chain with the highest chain strength value (cf. the section titled, "Cluster Chain Statistics Defined" hereinbelow, and in particular, the chain strength description);

Step 6. The cluster chain with the fewest codes.

Accordingly, each of the steps 1 through 6 immediately above are performed in order until a single (or no) cluster chain is identified for assigning the ladder L. If after the steps 1 through 6 above have been performed, multiple cluster chains (for a single solution map 3940) still remain as possible candidates for assignment of the ladder L, the algorithm will examine the places where the ladder L, and the cluster chains do not match, and award the ladder assignment to the cluster chain that represents more data in the interview session data 3932.

It should be noted that it is possible for a ladder 3995 to not be assignable to any cluster chain in a given solution map 3940. In that case the ladder 3995 is identified as unassigned.

(4.4.3) DSA Statistics

During the course of Decision Segmentation Analysis various statistics are computed for display and to direct the analysis computations. These statistics are computed for cluster chains as well as for solution maps 3940 as one of ordinary skill in the will understand.

Cluster Chain Statistics Defined
    The statistics below apply to cluster chains.

| Cluster Chain Statistic | Definition |
| --- | --- |
| Implication Count | This is a count of the number of specified implication-instances (cf. DSA Terms Defined section above, and section (4.4.1) above) for the cluster chain. That is, the implication count is a fixed number depending on how many codes are in the chain (each at a different level of the chain): <br> 2 codes = 1 implication <br> 3 codes = 3 implications <br> 4 codes = 6 implications <br> 5 codes = 10 implications <br> 6 codes = 15 implications |
| Significance | This is a measure of how prevalent the specified implications (cf. section (4.4.1) for "implication" definition) in a cluster chain (or code sequence) are represented in the chosen interview data set used for DSA processing. That is, significance for a cluster chain (or code sequence) is the sum of the number of occurrences within the current interview data set of each implication-instance specified by an implication in the cluster chain (or code sequence). Significance may be expressed as the total count of such occurrences, and/or as a percentage of the total number of implication-instances in the interview data set, and/or as a fraction of the total number of implication-instances in the interview data. |
| Remaining-Significance | During the selection of cluster chains for a solution map 3940, this metric is calculated. In particular, the remaining-significance is the significance of a corresponding cluster chain (or code sequence), wherein only the implication-instances for implications of this corresponding cluster chain (or code sequence) are used to that do not belong to a predetermined collection of one or more cluster chains (or code sequences). For example, for a particular collection of code sequences (e.g., the collection referred to as a "pseudo-solution map" in section (4.4.4) hereinbelow), the remaining significance for a code sequence NOT in the particular collection is determined by computing the significance for the code sequence using only the implication-instances not represented by an implication in one of the code sequences in the particular collection. |
| Chain Strength | This metric is calculated by dividing the significance (as a count of implication-instances) for a sequence of codes (e.g., a cluster chain) by the implications count for the cluster chain. For a first cluster chain having a higher chain strength than a second cluster chain, the specified implications in the first cluster chain occur more frequently in the interview data set (relative to the number of codes in the first cluster chain) than the specified implications in the second cluster chain (relative to the number of codes in the second cluster chain). Note, a similar metric to chain strength can be similarly defined for segments of cluster chains (denoted Segment Strength). Thus, for a cluster chain: <A, B, C, D, E>, a segment strength may be determined for a segment of the cluster chain <B, C, D> in a similar as described for the entire cluster chain. |
| Ladders Assigned | The number of ladders 3995 represented in the current dataset that get assigned to a cluster chain. The ladders assigned statistic is expressed both as a count of the number of ladders assigned and as the percentage that represents of the total number of ladders in the current dataset. |
| Implications Assigned | This is the count of the implication-instances contained in those ladders 3995 considered assigned. It is the total implications considered mapped by the cluster chain. This is expressed either as a count (of implication-instances) or by the percentage (of total implication-instances) that this represents of the current dataset. |
| Assignable Ladders | This is the number of ladders 3995 that could be assigned to the cluster chain. This is expressed both as a count of ladders and as a percentage of ladders in the current data set. Not all of those may be assigned to the cluster chain if there are better fits with other cluster chains in the solution map. |
| Ladders Matching 3 Codes | This is the number of ladders 3995 that have 3 or more codes that match codes in the cluster chain. The ladders matching 3 codes statistic is expressed both as a count (of ladders) and as a percentage of the ladders in the current data set. Note that this will always be less than (or equal to) the assignable ladders metric for the cluster chain since all ladders that match 3 codes in the cluster chain are considered assignable. It gives a little extra insight about how well the cluster chain fits the data. |

Solution Map 3940 Statistics

The statistics in the table below apply to solution maps 3940.

| Solution Map Statistic | Definition |
|---|---|
| Ladders Assigned | This is a count of all of the coded ladders that have been assigned to some cluster chain in the solution map 3940. This statistic may be expressed both as a count (of the coded ladders) or as a percentage of the coded ladders derived from the current interview data set includes in the interview session data 3932. |
| Implications Assigned | The count of all of the specified implication-instances for each coded ladder that is assigned (mapped) to a cluster chain in this Solution Map. Implications Assigned is expressed both as an implication count and as a percentage of implications (in the dataset). This is the same as the sum of the Implications Assigned of each cluster chain in the solution map. |
| Ladders Matching 3 Codes | This is a count of all of the ladders that have matches of 3 or more codes with at least one cluster chain in the solution map. This is expressed both as a count (of ladders) and as the percentage that represents of all of the ladders in the current dataset.<br>Note that this is not the same as the sum of the Ladders Matching 3 Codes statistic of the solution map's cluster chains, since a ladder could have a 3 code match with more than one cluster chain in the solution map. |
| Total Significance | This is a count of all of the occurrences of the specified implications that appear at least once in the cluster chains of the solution map. This is expressed as both a count (of implication-instances) and as a percentage (of all the implication-instances in the data set).<br>Note that this is not always the same as the sum of the significance statistic for each of the cluster chains in the solution map since an implication can be specified by more than one cluster chain (when code overlaps are allowed between cluster chains). |

(4.4.4) Decision Segmentation Analysis Solution Map 3940 Generation

Decision segmentation solution maps 3940 are generated through a series of automated steps where generated code sequences (referred to as "potential seed cluster chains" herein) are: (i) created for ultimately generating a decision model 3944, (ii) the potential seed cluster chains are tested against the interview session data 3932 being analyzed, and then (iii) chosen as part of a solution map 3940. The behavior of the StrEAM*analysis DSA process as provided by the decision analysis tool 3996 is highly configurable, and it assists an analyst in performing the following steps:

(A) Determine Implication-Threshold. In order to constrain DSA processing to the implications whose implication-instances occur most often in the coded ladders for the chosen interview data set, a minimum threshold (i.e., the "implication-threshold") is determined for identifying such implications. In particular, such an implication-threshold is a positive integer specifying the minimum number of implication-instances (as defined in section (4.4.1) above) that must be used in the process of generating of the cluster chains for a resulting solution map 3940. Accordingly, the higher the implication-threshold, the fewer implications are used for generating the cluster chains.

It is possible that an implication-threshold will simply be retrieved from the DSA configuration parameters provided in the analysis configuration database 2980. If so, no computation is required since the implication-threshold is available. More typically, however, the implication-threshold value is not retrieved, and is computed instead. In this latter case, the DSA tool 3996 determines the largest implication-threshold value that will still account for, e.g., a predetermined (or analyst specified) minimum percentage of the total implications derived from the chosen interview data set. This minimum percentage (which defaults to 50%) may be provided in the analysis configuration database 2980.

(B) Determine Potential Seed Cluster Chains. Using the implications that meet or exceed the implication-threshold, one or more "potential seed cluster chains" are determined, wherein each potential seed cluster chain is a candidate for being a cluster chain in a resulting solution map 3940, or is a segment of a candidate for being a cluster chain in a resulting solution map 3940. The procedure for generating potential seed cluster chains is described in the section "Step (B): Determine Potential Seed Cluster Chains" hereinbelow.

(C) Identify Seed Cluster Chains. The present step receives the results of step (B) above (i.e., the collection E from the more detailed description of step (B) hereinbelow) as input, and identifies the potential seed cluster chain(s) therein that are believed to model one or more decision paths that actually occur in the data set chosen from the interview session data 3932. Each resulting identified potential seed cluster chain is referred to herein as a "seed cluster chain". That is, upon receiving the collection E of potential seed chains generated in the step (B), the present step identifies the members of E that best represents the knowledge in the chosen data set (from the interview session data 3932) while constraining the amount of overlap of codes (i.e., common codes) between the identified potential seed cluster chain(s) of E. Further description of this step is provided in the section "Step (C): Identifying Seed Cluster Chains" hereinbelow.

(D) Filter Seed Cluster Chains. The list of seed cluster chains from the previous step may be filtered in order to reduce a large list of seed cluster chains to a more manageable set of seed cluster chains, by eliminating seed cluster chains not worth further analysis. The filtering may be done according to several parameters specified by the analyst or calculated automatically by the StrEAM*analysis DSA algorithms. Further description of this step is provided below in the section "Step (D): Filter Seed Cluster Chains".

(E) Generate Solution Maps 3940. Solution maps are determined automatically by examining each combination of seed cluster chains (from above) and choosing those combinations that best represent the data.

(F) Elaborate on the seed cluster chains of each solution map 3940. For each of one or more of the generated solution maps 3940, an additional code(s) may be added to the seed cluster chains from which the solution map was generated if they significantly add to the value of the mapping Each of these steps is described in more detail below.

Step (B): Determine Potential Seed Cluster Chains

The creation of a collection of code sequences to be considered as potential seed cluster chains. is determined, in one embodiment, by the following steps:

(I) First determine a collection all of the implications (i.e., code pairs from coded ladders derived from the chosen interview data set of the interview session data 3932) that have met the implication-threshold; and (II) Combine the implications in the collection (C) obtained in step (a)(I) to create a collection of initial code sequences, wherein each of the initial code sequences is of three or four codes in length. In one embodiment, the generation of each initial code sequence may be performed by the following substeps (i) through (vii):

(i) Select a first (next) implication from the collection C (i.e., select an implication A→B where A and B are codes, and A is for a lower ladder level than B);

(ii) Iteratively select an unselected second implication, X→Y, from C, and perform the following substeps:
 (ii-1) Mark this second implication as selected; and
 (ii-2) If X is B (and X and B are for the same ladder level), then {
  generate the initial code sequence is <A, B, Y>;
  if Y is A (and Y and A are for the same ladder level), then generate the initial code sequence is <X, A, B>;
  if there is an unselected implication in C, then continue iteratively selecting by selecting another unselected second implication from C}

(iii) Remove the first implication from C;

(iv) If there are additional implications in C, then {
  unselect all selected implications in C;
  go to substep (i) above}

(v) For the collection (D) of all initial code sequences generated above, apply steps corresponding to the steps (i) through (iii) above for generating all unique code sequences of four codes in length, wherein the implication A→B is replaced with an initial code sequence <A, $B_1$, B>, the implication X→Y is replaced with an initial code sequence <X, $Y_1$, Y>, the collection C is replaced with the collection D, and substep (ii-2) becomes:
 If X is $B_1$ (and X and $B_1$ are for the same ladder level) AND ($Y_1$ is B (and $Y_1$ and B are for the same ladder level) then {generate the initial code sequence is <A, $B_1$, B, Y>;
 if $Y_1$ is A (and $Y_1$ and A are for the same ladder level) AND (Y is $B_1$ (and Y and $B_1$ are for the same ladder level), then
  generate the initial code sequence is <X, A, B, $B_1$>;
  if there is an unselected initial code sequence in D, then continue iteratively selecting by selecting another unselected second implication from D}

(vi) The resulting collection (E) of initial code sequences is the union of all generated code sequences of length 3 with all code sequence of length 4. Although in another embodiment, all initial code sequences of length 3 that have been extended to one or more initial code sequences of length 4 are removed from the collection E.

(vii) For each (if any) remaining initial code sequence (S) of E that has just 3 codes, extend the sequence 5 to 4 codes by adding a code to S (between codes of S or on to an end of S) that adds the most chain strength (cf. section (4.4.3) above). If multiple codes contribute the most to chain strength for extending the sequence S, then for each code (F) of the multiple codes, generate an initial code sequence from F and S that is of length 4. Finally, any new duplicates produced by this process are also removed. Thus, the resulting collection E may include only initial code sequences of length 4.

The collection of potential seed cluster chains is the collection E; i.e., each of the initial code sequences in the collection E is referred to as a potential seed cluster chain hereinbelow. Note that each potential seed cluster chain of the collection E includes at most one code per ladder level, and no codes or levels are repeated in the initial code sequence. Further note that the resulting collection E of potential seed cluster chains has no duplicate potential seed cluster chains therein.

The collection E may be quite large. However many of the potential seed cluster chains therein may be combinations that do not represent interviewee decision paths that actually occur in the data set chosen from the interview session data 3932.

Step (C): Identify Seed Cluster Chains

To start the identification process of step (C) above, a potential seed cluster chain from the collection E is selected having the highest significance in the chosen interview data set. In one embodiment, the selected member of E is becomes the first member of a collection referred to herein as a "pseudo-solution map". This pseudo-solution map is now applied to the interview data set (chosen from the interview session data 3932) in order to determine the remaining-significance (as defined in section (4.4.3) above) of the remaining potential cluster chains. The next potential cluster chain chosen is the one with the highest remaining-significance that does not exceed the limit on overlapping codes with the seed cluster chain already in the pseudo-solution map. This process is repeated until no more potential cluster chains can be chosen.

The next step is to review the collection E of generated potential seed cluster chains and pick out those most worthy of being considered as seed cluster chains. This is done by building a pseudo-solution map of the seed cluster chains, using the significance and remaining-significance metrics for the potential seed cluster chains. Also used is a configuration parameter (in the analysis configuration database 2980) that specifies a limit on the amount of overlap the seed cluster chains may have.

Step (D): Filter Seed Cluster Chains

In some cases, particularly when there is substantial overlap of codes between the seed cluster chains identified in Step B (e.g., when an overlap limit parameter is set to a high value), an excessive number of seed cluster chains may be produced by Step B. Configuration parameters (in the analysis configuration database 2980) can define the maximum (and minimum) number of seed cluster chains allowed, e.g., such parameters may constrain the number of seed cluster chains. If the number of seed cluster chains is greater than the maximum, then the DSA algorithm can apply various filters on the seed cluster chains to eliminate those least likely to be important in modeling interviewee perceptions of the object being researched (e.g., via a derived solution map 3940).

The filtering metrics/parameters are described in the cluster chain statistic definitions of section (4.4.5) hereinabove. That is, for each of the cluster chain statistics described in section (4.4.3) there may be a corresponding parameter whose value can be set by, e.g., an analyst. For example, an analyst may assign a value to chain strength parameter so that only seed cluster chains having at least this value are given further consideration. Thus, there may be parameters for the following metrics, wherein values for these parameters can be used to trim the list of seed cluster chains until it reaches a manageable length:

Chain Strength (cf. section (4.4.3))
Ladders Assigned (cf. section (4.4.3))
Implications Assigned (cf. section (4.4.3))
Assignable Ladders (cf. section (4.4.3))
Ladders Matching 3 Codes (cf. section (4.4.3))
Implications in 3 Code Match Ladders.

Step (E): Generate Solution Maps 3940

Actual solution maps 3940 are now chosen by examination of each possible combination of the seed cluster chains, e.g., up to a predetermined maximum number of seed cluster chains in each combination. For example, the DSA tool 3996 may produce solution maps 3940 that have anywhere from 2 to 9 seed cluster chains. More particularly, when generating, the 4-dimension solution map 3940 (i.e., a solution map 3940 generated from a combination of four of the seed cluster chains), the DSA tool 3996 determines which combination of 4 seed cluster chains from the seed cluster chain list represent the most ladders (or ladder instances) from the current data set.

When this step is finished, each requested solution map 3940, of a given dimension, is populated by the corresponding number of 4-code seed cluster chains that provide the best solution for the given dimension. Note that production of an n-dimension solution map depends on there being at least n seed cluster chains. Note that the seed cluster chains of the resulting solution maps 3940 are referred to as "cluster chains".

Step (F): Elaborate on the Seed Cluster Chains of Each Solution Map 3940

The final step taken during the Decision Segmentation Analysis process is the review of each cluster chain in each solution map 3940 for the possible addition of another code to the cluster chain. All codes not already in the cluster chain are considered with regards to the impact on chain strength of the cluster chain. If the incremental contribution to chain strength of any code exceeds a given threshold (specified as a configuration parameter in the analysis configuration database 2980), then that code may be added to the cluster chain. If no code exceeds the threshold, then no code is added.

This elaboration of cluster chains is subject to a DSA tool 3996 configuration parameter that constrains cluster chain length (to a predetermined number, e.g., 4, 5, or 6 codes). If constrained to 4 codes, no elaboration takes place. If constrained to 5 codes, then only one code will be added (if any). In one embodiment, two codes are the maximum that can be added, and then only if 6 code chains are allowed.

Each resulting solution map 3940 (output by the DSA tool 3996) is a representation of its collection of cluster chains that may be displayed as, e.g., a directed acyclic graph similar to those of FIGS. 9, 22, 23, and 25.

(4.4.5) Decision Segmentation Analysis Parameters

As noted above, the behavior of the Decision Segmentation Analysis algorithms is determined by settings included in the StrEAM*analysis configuration database (file) 2980, wherein these settings are values for the DSA parameters described in the following table.

| DSA Parameter | Description |
| --- | --- |
| implication-threshold | A positive integer (>0) specifying the minimum number of occurrences an implication (i.e., minimum number of implication-instances) that must be used in the process of manufacturing of seed cluster chains. If this parameter is set to the value 'AUTO', an implication-threshold value will be calculated as the minimum necessary to include the percentage of implications specified by the implications-included parameter (described below). |
| implications-included | A floating point number (between 0.0 and 100.0) specifying the percentage of implication occurrences (i.e., implication-instances) that should be included by the implication-threshold computed when set to 'AUTO'. If the implication-threshold is not set to 'AUTO' then the present DSA parameter setting (if any) is ignored. |
| ladders-threshold | A positive floating point number specifying the threshold value (as a percentage) for coded ladders assigned to a cluster chain in order for the cluster chain to be considered further as a potential seed cluster chain. If this is set to 'NONE', or this parameter is not specified, then no threshold is applied. If this is set to 'NONZERO' then the threshold requires any value that is greater than zero. |
| knowledge-threshold | A floating point number specifying the threshold value (as a percentage) for knowledge assigned to a chain (by virtue of ladders being assigned) in order for that chain to be considered further as a potential seed chain |

-continued

| DSA Parameter | Description |
|---|---|
| | If this is set to 'NONE', or this parameter is not specified, then no threshold is applied<br>If this is set to 'NONZERO' then the threshold requires any value that is greater than zero. |
| matching3-threshold | A floating point number specifying the threshold value (as a percentage) for the ladders that match 3 or more codes in a chain in order for that chain to be considered further as a potential seed chain<br>If this is set to 'NONE', or this parameter is not specified, then no threshold is applied<br>If this is set to 'NONZERO' then the threshold requires any value that is greater than zero. |
| strength-threshold | A floating point number specifying the minimum Chain Strength needed for a chain to be considered further as a potential seed chain.<br>If this is set to 'NONE', or this parameter is not specified, then no threshold is applied<br>If this is set to 'NONZERO' then the threshold requires some value greater than zero. |
| assignable-threshold | A floating point number specifying the minimum percentage of ladders that could be assigned to a chain in order for it to be considered further as a seed chain.<br>If set to 'AUTO' the assignable-threshold value will be raised — from zero - (by increments of assignable-increment) until enough candidate seed chains have been filtered out to meet the maximum-seeds constraint.<br>If this is set to 'NONE', or this parameter is not specified, then no threshold is applied<br>If this is set to 'NONZERO' then the threshold requires some value greater than zero. |
| assignable-increment | A positive floating point number that specifies the increment to be used when the assignable-threshold parameter is being calculated automatically ('AUTO'). The assignable-increment is the amount by which the assignable-threshold filter value will be raised to find a point at which the number of seed chains drops below the maximum-seeds parameter.<br>Note that since the assignable-threshold parameter is expressed as a percentage, the assignable-increment is a percentage as well.<br>If this parameter is not specified, then the default minimum is 1.0.<br>If assignable-threshold is not set to 'AUTO' then any assignable-increment parameter is ignored. |
| assignable-limit | A floating point number that specifies the maximum percentage that the assignable-threshold parameter can be set to when it is being incremented by the 'AUTO' option. This simply prevents unreasonable attempts to meet the maximum-seeds restriction.<br>If the assignable-limit is reached and the maximum-seeds value has still not been reached, the DSA analysis will stop.<br>If this is set to 'NONE', or the parameter is not specified, it will default to 50%<br>Note that if the assignable-threshold parameter is not set to 'AUTO' then any assignable-limit setting is ignored. |
| minimum-seeds | An integer value (1 or greater) that specifies the minimum seed chains that must be result from the manufacture & filtering process. If the number of seeds specified by the minimum-seeds parameter is not generated then DSA analysis ends.<br>If this parameter is not specified, then a minimum of 1 seed must be produced. (Note that 1 seed chain will not result in any actual solutions. There must be at least 2). |
| maximum-seeds | An integer value (1 or greater) that specifies the maximum umber of seed chains to be generated (and evaluated) during the DSA process. This is used to prevent long lists of seeds from causing extremely long periods of calculation.<br>There are various mechanisms used by the DSA process to reduce the number of seed chains in order to meet the maximum-seeds specification, if these all fail to get the seed chain list to meet the ceiling specified by the maximum-seeds parameter then DSA processing ends.<br>If this parameter is not set, a default value of 30 will be used |
| max-chain-length | An integer value between 4 and 6 (inclusive) that specifies the maximum length (in codes) of cluster chains produced during DSA solution generation.<br>If this value is 5 or 6 then 1 or 2 (respectively) codes may be added to the cluster chains in a solution map if any meet the selection criteria. |
| max-seed-overlap | An integer value between 1 and 6 (inclusive) that specifies the maximum number of codes that a prospective seed cluster |

-continued

| DSA Parameter | Description |
| --- | --- |
| | chain may have in common with cluster chains that have already been selected.<br>This is used during the process of seed cluster chain selection to increase (or reduce) the sameness allowed in cluster chains selected for DSA solution consideration. |
| max-allowed-decrease | A floating point value that specifies the maximum decrease in Chain Strength (expressed as a percentage) allowed when adding a $5^{th}$ (or $6^{th}$) code to a 4 code cluster chain during the DSA processing.<br>If not specified, or set to 'NONE" then there is no limit to the strength decrease adding an additional code may cause. |
| map-2-chains | A Boolean value ('TRUE' or 'FALSE') that instructs the DSA process to generate a "best" 2 chain solution map.<br>If no parameter is specified, then the 2 chain solution map will not be generated. |
| map-3-chains | A Boolean value ('TRUE' or 'FALSE') that instructs the DSA process to generate a "best" 3 chain solution map.<br>If no parameter is specified, then the 3 chain solution map will not be generated |
| map-4-chains | A Boolean value ('TRUE' or 'FALSE') that instructs the DSA process to generate a "best" 4 chain solution map.<br>If no parameter is specified, then the 4 chain solution map will not be generated |
| map-5-chains | A Boolean value ('TRUE' or 'FALSE') that instructs the DSA process to generate a "best" 5 chain solution map.<br>If no parameter is specified, then the 5 chain solution map will not be generated |
| map-6-chains | A Boolean value ('TRUE' or 'FALSE') that instructs the DSA process to generate a "best" 6 chain solution map.<br>If no parameter is specified, then the 6 chain solution map will not be generated |
| map-7-chains | A Boolean value ('TRUE' or 'FALSE') that instructs the DSA process to generate a "best" 7 chain solution map.<br>If no parameter is specified, then the 7 chain solution map will not be generated |
| map-8-chains | A Boolean value ('TRUE' or 'FALSE') that instructs the DSA process to generate a "best" 8 chain solution map.<br>If no parameter is specified, then the 8 chain solution map will not be generated |
| map-9-chains | A Boolean value ('TRUE' or 'FALSE') that instructs the DSA process to generate a "best" 9 chain solution map.<br>If no parameter is specified, then the 9 chain solution map will not be generated |
| warn-too-many-combinations | This is a Boolean value (True/False) that indicates whether the DSA solution user interface should warn about having a large number of combinations of Cluster Chains to assess for finding a solution.<br>If this is set to True and a warning is generated then the program will wait for operator confirmation before proceeding. The operator is also given an option to quit. |
| too-many-combinations | This is an integer value (greater than 0) that indicates what, in fact, is to be considered "too many combinations". |
| SPSS-interview-export-list | This is the name of the StrEAM Export List that will be used when exporting interview data to SPSS. This Export List determines what fields are actually included in the export. |
| SPSS-ladder-export-list | This is the name of the StrEAM Export List that will be used when exporting ladder data to SPSS. This Export List determines what interview data (other than the ladders) is to be included in the output for SPSS. |

Each analysis configuration database file 2980 contains a section of modeling parameters as in the following example:

```
<decision-modeling>
   <implication-threshold>AUTO</implication-threshold>
   <implications-included>50.0</implications-included>
   <ladders-threshold>3.0</ladders-threshold>
   <knowledge-threshold>3.0</knowledge-threshold>
   <matching3-threshold>3.0</matching3-threshold>
   <strength-threshold>NONZERO</strength-threshold>
   <assignable-threshold>NONE</assignable-threshold>
   <assignable-increment>1.0</assignable-increment>
   <assignable-limit>50.0</assignable-limit>
```

-continued

```
   <minimum-seeds>5</minimum-seeds>
   <maximum-seeds>30</maximum-seeds>
   <max-chain-length>6</max-chain-length>
   <max-seed-overlap>1</max-seed-overlap>
   <max-strength-decrease>20.0</max-strength-decrease>
   <map-2-chains>True</map-2-chains>
   <map-3-chains>True</map-3-chains>
   <map-4-chains>True</map-4-chains>
   <map-5-chains>True</map-5-chains>
   <map-6-chains>True</map-6-chains>
   <map-7-chains>True</map-7-chains>
   <map-8-chains>False</map-8-chains>
   <map-9-chains>False</map-9-chains>
```

```
<warn-too-many-combinations>True</warn-too-many-combinations>
<too-many-combinations>10000</too-many-combinations>
<SPSS-interview-export-list>export-interview-to-SPSS</
  SPSS-interview-export-list>
<SPSS-ladder-export-list>export-ladder-to-SPSS</
  SPSS-ladder-export-list>
</decision-modeling>
```

As this example demonstrates, certain actions are specified to be taken during the Decision Segmentation Analysis and provides parameters to be used.

(5) Creating Analysis Reports

Various reports are available to the analyst using the StrEAM*analysis system 2914 when using the analyze decisions tool 3996. Some of these reports are generated from specific data sets (where a specific question group 3954 and data filter 3958 are in use). Other reports operate on decision models 3944, and select data based on the decision model specifications. All reports require the availability of an appropriate StrEAM*analysis configuration database (file) 2980.

In one embodiment, all reports produce XML files targeted specifically at Microsoft® Office Excel, using the "SpreadsheetML" language.

FIGS. 59 through 66 show illustrative reports that can be generated by the analyze decisions tool 3996. Note, the reports shown in FIGS. 59 through 66 are for interview data obtained from interview sessions with registered voters just prior to the presidential election of 2004, wherein the interviewees were queried as to their perceptions of the two candidates George W. Bush, and John Kerry.

Data Set Statistics Report (FIGS. 59 Through 61)

Each of the data set statistics reports of FIGS. 59 through 61 provide a hard-copy version of the statistics displayed on the analysts screen in the decision segmentation analysis tool 3996. All of these statistics are defined, in detail, in the discussion of FIG. 55 in section 4.4.1. Implication Matrix (FIG. 62)

FIG. 62 provides a representative example of the implication matrix report. Such a report is a commonly used view of coded laddering data. It consists of a full matrix where all ladder element codes are listed both as columns and as rows. Each cell in the matrix reports the number of implication instances for the two codes (column and row) of that cell. The number of implication instances is given in one of two formats: (a) X.Y where X is the number of direct implication instances and Y is the number of indirect implication instances for that code pair; or (b) X.Y where X is the number of direct implication instances and Y is the total number of implication instances (direct and indirect) for that code pair.

Figure 63:
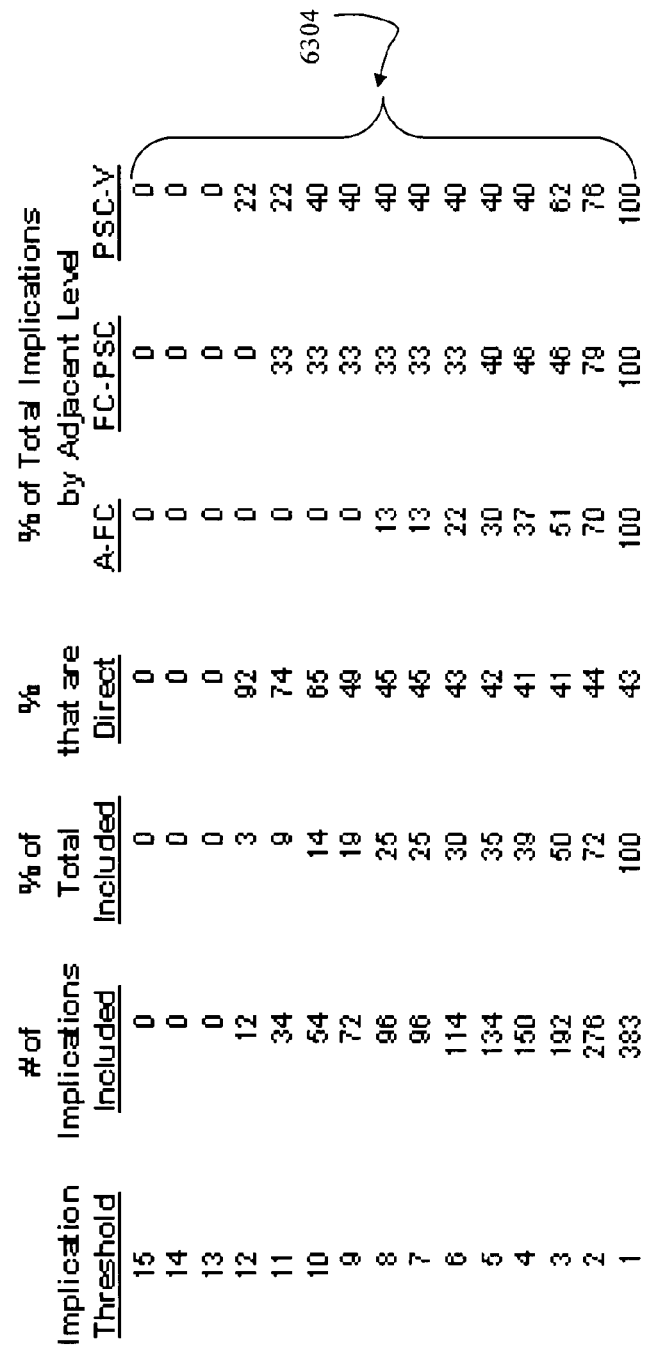

Implication Distribution (FIG. 63)

The implication distribution report presents a view of the effect of using alternative values for the implication threshold during decision segmentation analysis. This report summarizes how many implication instances will be utilized for each possible setting of the implication threshold analysis parameter.

The report of FIG. 63 is representative of such implication distribution reports. The heading of FIG. 63 identifies the chosen data set by way of the title of the analysis model (which is a subset of the interview session data 3932 for the study of voter presidential perceptions prior to the U.S. presidential election of 2004). That is, the subset represents the interview responses for the question group 3954 identified as "Combined image ladder questions", and wherein the responses also satisfy the data filter 3958 identified as "Intends to vote for Bush". Each row in the matrix 6304 of the report is indicative of a possible setting for the implication threshold (listed in the leftmost column). For each value of the implication threshold (i.e., each row of the matrix 6304), the following statistics are reported (from left to right).

| | |
|---|---|
| # of Implications Included | Number of implication instances included at the implication threshold setting for the row. |
| % of Total Included | The percentage of the total implication instances in the data set included at this implication threshold setting. |
| % that are Direct | Of the implication instances included at this implication threshold setting, the percentage that are direct. |
| % of Total Implications by Adjacent Levels A-FC | The percentage of the total number of Attribute -to- Functional Consequence implication instances that are in the chosen data set that are included at this implication threshold setting. |
| % of Total Implications by Adjacent Levels FC-PSC | The percentage of the total number of Functional Consequence -to- Psychosocial Consequence implication instances that are in the chosen data set that are included at this implication threshold setting. |
| % of Total Implications by Adjacent Levels PSC-V | The percentage of the total number of Psychosocial Consequence -to- Value implication instances that are in the data set that are included at this implication threshold setting. |

Note that the bottom row (where the implication threshold is 1) represents the totals for the chosen data set given that all implication instances would be included at an implication threshold value of 1.

Code Usage Summary (FIG. 64)

A code usage summary report gives a breakdown of how often codes appear in the ladders 3995 in a chosen interview data set. An example of a code usage summary report is shown in FIG. 64 for the same chosen interview data subset as used in generating the implication distribution report of FIG. 63. As in FIG. 63, the header of this report identifies the data set in terms of the title of the analysis model being inspected and the question group 3954 and data filter 3958 in effect. Each of the ladder element codes defined in the analysis configuration database 2980 are listed as rows in the report, grouped by ladder level (with sub-totals accordingly). For each row in the report identifying a ladder element code, the code is identified by number and a title. Then for each such row there are four (4) columns as defined below (from left to right):

# of Mentions The total number of times that the ladder element code (in the same row) is used in the ladders identified in the chosen data set. This is the total number of ladder elements in the chosen data set that have been assigned this ladder element code.

% Used Overall The percentage of the total number of ladder elements in the chosen data set that include the ladder element code (in the same row).

% Used in Level The percentage of the total ladder elements at the corresponding ladder level (i.e., attributes, functional consequences, psychosocial consequences, or values) in the chosen data set that have the ladder element code (in the same row) assigned.

Level Index A ratio of the percentage of mentions versus the 'expected' number of mentions for this code, where 'expected' number is as if the ladder element codes were evenly distributed.

Decision Model Detail (FIG. 65)

Each decision model detail report contains the details regarding a decision segmentation analysis decision model 3944 (i.e., "decision model" as described in the Definitions and Descriptions of Terms section hereinabove) output by the DSA tool 3996. Since each decision model 3944 includes of one or more solution maps 3940, each solution map is listed in this report along with its constituent cluster chains and associated statistics.

FIG. 65 is a representative decision model detail report. In the heading of each page of a decision model detail report the chosen data set is indicated by the title of the analysis model 2950 along with the question group 3954, and the data filter 3958 in effect for selecting the chosen data set of the interview session data 3932 used for generating the decision model report. Each solution map 3940 of the decision model 3936 is listed in the report. In FIG. 65, the detailed report for one such solution map 3940 (identified as "Bush Voters—Combined Image Ladders—4 ChainSolution") is shown. Following the identification of this solution map 3940, overall statistics for this solution map are shown, i.e.,

- The ladders 3995 assigned to the solution map (the number of ladder assigned: 29, and the percentage of total ladders 3995: 63%),
- The implications assigned to the solution map (the number of implications assigned: 253, and the percentage of the total number of implications: 66%),
- The ladders 3995 matching 3 codes in the solution map (the number of ladders matching 3 codes: 23, and the percentage of the total number of ladders matching 3 codes: 67%), and
- The implications in 3 code match ladders of the solution map (the number of such implications: 257, and the percentage of the total number implications: 67%).

Note that all of the above statistics are defined in previous sections hereinabove.

Following the solution map over all statistics, the four cluster chains identified, each such cluster chain is identified by one of the following labels: "Seed-1", "Seed-2", "Seed-3", and "Seed-4". Thus, the cluster chain identified by "Seed-1" has: (i) a "value" ladder level of "Peace of Mind", (ii) a "psychosocial consequences" ladder level of "Confidence", (iii) a "functional consequences" ladder level of "Trustworthy", and (iv) an "attributes" ladder level of "Candidate Image". To the right of each cluster chain, there are corresponding statistics. In particular, the following statistics are shown in FIG. 65 (from left to right):

- chain strength (described the DSA Statistics section hereinabove),
- chain quality (i.e., given the implications specified in the cluster chain, chain quality may be represented as the percentage of the instances of these implications (in the currently chosen data set) that actually have been assigned to the cluster chain by virtue of the coded ladders that have been assigned to the cluster chain. The higher the percentage, the better the 'quality' of the coded ladder assignments to the cluster chain (for instance, the assignments may have been made because of a larger number of matching codes).
- , the number of ladders 3995 assigned to the cluster chain,
- the percentage of the total number of ladders 3995 that have been assigned to the cluster chain,
- the number of implications assigned to the cluster chain,
- the percentage of the total number of implications that have been assigned to the cluster chain,
- the number of ladders 3995 whose coded version matches at least three codes of the cluster chain, and
- the percentage of the total number of ladders 3995 whose coded version matches at least three code of the cluster chain.

Decision Model Matrices (FIG. 66)

The decision model matrix report presents an alternative view of the details of solution maps 3940. For a given analysis model database 2950, this report lists each solution map 3940 and details about the implications defined by the constituent cluster chains within the solution map.

FIG. 66 is a representative example of a page from a decision model matrix report generated from the interview session data 3932 for determining voter U.S. presidential perceptions of the candidates for the 2004 U.S. presidential election. In the heading of each page of the decision model matrix report, the chosen data set of the interview session data 3932 is indicated by the title of the analysis model 2950, and the question group 3954, and the data filter 3958 in effect for selecting the interview data from which the report was generated. Each solution map 3940 in the decision model 2950 is presented in the report. For each solution map 3940, the cluster chains included in the solution map are listed. The report page of FIG. 66 is for a solution map 3940 composed of four cluster chains. The identifier of each of the cluster chains is given on the left in FIG. 66 (i.e., the identifiers: "Seed-1", "Seed-4", "Seed-2", and "Seed-5"). Immediately below each cluster chain identifier are the statistics for the cluster chain, wherein 'Strength'=chain strength, 'Quality'=chain quality, 'L %'=percentage of ladders 3995 assigned to the cluster chain, and "IMP %'=percentage of implication instances assigned to the cluster chain. Each of these statistics has been defined in previous sections.

To the right of each collection of cluster chain statistics is a list of the code titles and corresponding code that comprise the cluster chain. For example, the first code title for the Seed-1 cluster chain is "Candidate Image", and its corresponding code is "139". The codes are also duplicated as the heading of columns of a 4-by-4 matrix having entries in only above the main diagonal of the matrix. Both rows and columns of what resembles a miniature "implication matrix". Each cell of such a matrix contains the number of implication instances (for the corresponding row/column code pair) that have been assigned to the cluster chain (by virtue of ladders 3995 that have been assigned to that cluster chain). As with a normal implication matrix report (e.g., FIG. 62), the implication instance count is presented in one of two formats: (a) "X.Y" where X is the number of direct implication instances and Y is the number of indirect implication instances; or (b) "X.Y" where X is, again, the number of direct implication instances but Y is the total number of implication instances (direct and indirect). In the report of FIG. 66, format (a) above is used.

(6) StrEAM*Robot Subsystem 2913 (FIGS. 29, 30 and 45)

Interview session data for StrEAM research studies can be collected from respondent interview sessions through both manual interviews (i.e., having a human interviewer), and automated interviews (i.e., computerized interviews having substantially reduced or no human intervention during an interview session). The StrEAM*Interview subsystem 2908 described hereinabove, provides the tools for conducting manual interviews between human interviewers and respondents. The StrEAM*Robot subsystem 2913 (FIG. 29) makes it possible for interview sessions to be conducted with respondents without human interviewers. In particular, the automated interview subsystem 2913 may be considered as a controller for automating the use of the interview subsystem 2908. Accordingly, the StrEAM*Robot subsystem 2913 can greatly increase the efficiency of a research study in collecting a large set of research interview data. As will be described below, once an initial or pilot interview data set from a plurality of interview sessions (e.g., using the StrEAM interview subsystem 2908) has been collected for a particular market research study, and this initial interview data set is believed to be representative of the variety of interviewee responses, then the automated interview subsystem 2913 can be trained to appropriately conduct subsequent interview sessions. Thus, an arbitrary number of automated interviews (e.g., substantially or entirely without intervention by an interviewer) may be conducted for gathering additional interview data for the market research study being conducted.

To automate the interviewing process, an essential capability is the automation of the actions that would otherwise be performed by a human interviewer when attempting to solicit ladder responses from interviewees. For example, appropriately obtaining, in an open-ended manner (e.g., not having respondents choose from pre-defined ladder answers), ladder responses without a human interviewer, is a key aspect of the present disclosure.

(6.1) Ladder Questioning

It is important to obtain from each interview session, an interviewee ladder response to each level of each ladder of the interview. Although laddering interviews are, by definition, intimate and one-on-one, the interview interactions by the interviewer, when obtaining a ladder response, may be highly repetitive. In practice, there may be a fairly small set of follow-up probe questions that are presented to an interviewee for obtaining appropriate interviewee responses to all the levels of a ladder. For a given response from an interviewee, choosing the appropriate follow-up probe question to present requires the interviewer to do several tasks, including:

LQ-1. Recognize when the interviewee's statement is actually appropriate for classifying as a ladder element response;

LQ-2. Decide which ladder level (attribute, functional consequence, psychosocial consequence, or value) the interviewee's response is to be entered;

LQ-3. Determine the next ladder level that needs input from the interviewee; and LQ-4. Understand enough about the meaning of the interviewee's response to aid the choice of a probe question for eliciting the next desired ladder level response.

For a human StrEAM interviewer, the choice and wording of follow-up probe questions becomes more and more well-defined as more and more interview sessions (for a given interview) are conducted during a given market research project. As interview response data is collected, the responses fall into the categories that will later (in StrEAM*analysis via the analysis subsystem 2912) be used for coding.

The probe question to ask an interviewee when "moving" the interviewee from a given category (or ladder level) of response to another ladder level is generally straightforward for an interviewer (with experience in conducting the interview session) to determine. For example, such probe questions may be determined according to patterns learned during an initial one or more interview sessions. Moreover, such patterns can be learned and/or provided to an automated interviewing system 2913 (FIG. 29) also identified herein as the StrEAM*Robot system 2913. To be more precise, the StrEAM*Robot system 2913 is able to effectively conduct interview sessions substantially or entirely without human intervention during interview sessions.

(6.2) Ladder Automation Overview

An embodiment of the StrEAM*Robot subsystem 2913 is depicted in both FIGS. 29 and 45. Each of these figures show the high level components comprising the StrEAM*Robot 2913, as well as an indication of how this subsystem interacts with the StrEAM subsystems 2908, 2912 and 2916 (FIG. 30).

Regarding the embodiment of the StrEAM*Robot subsystem in FIGS. 29 and 45, a brief description of each of the StrEAM*Robot subsystem's high level components is presented in the table immediately below.

| Component Name | Component Description |
| --- | --- |
| Robot Interviewer Server 2965 | This component is a server program that replaces a human interviewer and conducts a StrEAM interview with an interviewee. This server executes on the StrEAM network server 2904, and interacts with the same StrEAM Respondent (Desktop Web) Application 2938 (FIG. 29) that is used for manual interviews.<br>The robot interview server 2965 uses the same interview definition information as the manual Interviewer uses (e.g., from the interview content database 2930). |
| Ladder Element Classification Service 2966 | This component aids in the automation of ladder questioning by reviewing interviewee responsive ladder element input, and classifying this input in terms of: (i) its level in a ladder (attribute, functional consequence, psychosocial consequence, or value) if any, and (ii) the analysis code category in which the input is to be classified. The classification of ladder elements is described in detail in sections to follow. |
| Classification Knowledge Database 2967 | This component is a persistent data store including the "knowledge" of how ladder element interviewee input (e.g., text) should be classified. The database 2967 is accessed by the ladder element classification service 2966 for determining a ladder level and code categorization of each interviewee ladder response obtained from an interview conducted via the StrEAM automated interview subsystem 2913.<br>Note that the classification database 2967 includes: (a) the knowledge to determine an appropriate ladder level to be assigned to an interviewee response, and (b) the knowledge required to choose an analysis code that is the best match for an interviewee ladder element response.<br>The database 2967 can take many forms, depending on the type of interviewee input classification mechanism in use. The "knowledge" can be stored in forms ranging from traditional relational databases, to XML definition files, to actual programming source code. |
| Element Classifier Training Tool 2969 | This is component is a program that builds the classification knowledge database 2967 from previously classified (leveled and coded) ladder data, e.g., obtained from a plurality of manually conducted interview sessions. This component and the processing performed are described in detail further hereinbelow. |
| Ladder Probe Question Service 2971 | This component enables the robot interviewer server 2965 to automate the interaction required for ladder questioning. The service 2971 is a server program that runs on the StrEAM network server 2904 The service 2971 is responsible for determining an appropriate follow-up probe question (if any) to be asked for completing a partially complete ladder. The ladder probe question service 2971 performs this task by looking up a next interview question (to be asked) in the ladder probe database 2975 (described immediately below). The next question is determined according to a next level in the ladder (currently designated to be filled in) for which an interviewee response is needed. The selection process for determining the next ladder level and corresponding question to ask the interviewee is described in detail in sections below. |

-continued

| Component Name | Component Description |
| --- | --- |
| Ladder Probe Database 2975 | This component is a data-store that contains a definition of the interview questions to use as follow-up interview probes during ladder question dialogs. The contents of this database are described in detail below. In brief, probe questions are always worded as "transitions" from one completed part of a ladder to a yet-to-be completed level in that ladder. So probe questions are defined wherein there may be a probe question for each ladder and each possible ladder element code for a level of the ladder. In particular, each probe question is associated with a currently filled in ladder level, and a ladder level to be filled in. Thus, each probe question can be considered a transition question from a previously provided ladder level response, and to a target ladder level for eliciting a response for the target ladder level. |
| Ladder Probe Definition Tool 2977 | This component is an administrative tool that provides the ability to maintain (create, read, update, and delete) definitions for ladder probe questions in the ladder probe database 2975 through a graphical user interface. In particular, the tool 2977 allows a user (e.g., a system administrator) to associate a ladder probe question with the ladder levels to which it corresponds (i.e., "from" and the "to" ladder levels described in the ladder probe database description immediately above) so that appropriate ladder probe questions can be retrieved by, e.g., the ladder probe question service 2971. |

The sections that follow describe, in more detail, the process of ladder element classification and the ladder probe question look-up for enabling the automation of ladder interviews by the StrEAM*Robot Subsystem 2913

(6.3) Ladder Element Classification

In order to computationally understand enough about an interviewee's response during a ladder question dialog to be able: (a) to classify the response as identifying (or not) a particular ladder level of the ladder being constructed, and (b) to subsequently generate an appropriate follow-up probe question (if needed), the StrEAM*Robot subsystem 2913 uses one or more text classification processes. In particular, the ladder element classification service 2966 described above may use one or more such text classification processes to classify each interviewee response in terms of:

(i) its level in a ladder (attribute, functional consequence, psychosocial consequence, or value), and
(ii) the analysis code category in which it is to be categorized. (For example, for an interviewee response in an interview session for determining distinctions between first time buyers of a particular car model and potential buyers that rejected buying the particular car model, an interviewee response such as "easy to read dash board" may be categorized in the category "oversize instrument gauges" as identified in FIG. 26).

Additionally, the ladder probe question service 2971 may use each such text classification process to select an appropriate follow up probe question. In general, each such text classification process (also referred to as a "text classifier") is a software component that is calibrated or trained to recognize and respond appropriately to various interviewee responses. In particular, each (or at least most) potential ladder element responses will have been previously categorized (by ladder level and potential analysis code) by one or more of the text classifiers. Further description regarding text classification and how it is used in the classification of ladder elements is provided below.

(6.3.1) Text Classifiers

The categorization of text documents is a well-studied topic in computer science, and has been applied in various domains, e.g., the filtering and organization of email, and medical diagnostics. However, the inventors of the present disclosure have applied processes for performing such categorization to the analysis of market research interview data.

In the most general case, a classifier is a function that maps an input attribute vector:

$$\dot{x}=(x_1,x_2,x_3,\ldots x_n)$$

to some measure of confidence that the input belongs to a class:

$$f(\dot{x})=\text{confidence(class)}$$

For the classification of text, the attributes of the input vector are words from the text. A text classifier, therefore, is a module (e.g., software component) that determines the likelihood that a text string (or document) should be assigned to a predefined category.

In a system to categorize text (or documents), categories are defined, then a text classifier is implemented for each of those categories. As text strings are processed by such a categorization system, each (or one or more) text classifier(s) may be asked to assess the likelihood that the input belongs to its associated category.

It should be noted that classifiers come in two basic forms: binary and multi-class. A binary classifier decides whether an input should (or should not) be assigned to a particular category, whereas a multi-class classifier chooses among several categories for the best assignment. However a series of binary classifiers (for multiple categories) can be used to the same effect as a multi-class classifier, as one skilled in the will understand.

(6.3.2) Inductive Learning

At least some of the text classifiers (e.g., identified in FIG. 45 by the labels 4510 and 4514 in the classification knowledge database 2967) may be configured or trained through a process of inductive learning. Some of the text classifiers may be generated by categorization methods of a type that are supervised "learn-by-example" methods, wherein each text classifier (based on one of theses methods) is provided with "training data" (i.e., example text strings) that are designated as belonging to (or not belonging to) a particular category represented or known by the classifier. From these "training" examples such a text classifier creates a categorization model to be used to judge whether a future input text string is likely to belong to a particular category or categories.

The training of a text classifier used in StrEAM*Robot 2913 (and more particularly used by the element classifier training tool 2969 shown in FIG. 45) is accomplished through a programming interface like the following:

textClassifier=New StrEAMTextClassifier( )
    textClassifier.AddPositive(text-string$_a$)
    textClassifier.AddPositive(text-string$_b$)
    textClassifier.AddPositive(text-string$_x$)
    . . .
    textClassifier.AddNegative(text-string$_x$)
    textClassifier.AddNegative(text-string$_y$)
    textClassifier.AddNegative(text-string$_z$)

The training of each text classifier is accomplished by supplying examples of text that are appropriate for the corresponding one or more categories that the classifier can classify text into. Further training may also be accomplished by supplying examples of text that should not be assigned to a particular category or categories, as one skilled in the art will understand.

Once trained, each text classifier is activated by supplying an input text string for which the classifier determines a likelihood (e.g., a probability value in the range 0.0 to 1.0) that the input text string should be assigned to each of one or more categories. An example of this is given in the fragment of pseudo code as follows:

```
likelihood = textClassifier.Classify(text-string_n)
if (likelihood > threshold) then
    Console.WriteLine("classified")
end if
```

Potential assignment of a text string to a category is determined by determining whether a classification likelihood value is greater than some threshold value (predetermined or dynamically determined). Typically such threshold values are established through the by use of some additional test data (of known categories) after the initial training classifiers. Note that an input text string may qualify for membership in more than one category.

(6.3.3) Text Classification Approaches

Numerous methods exist to provide automated text categorization using text classifiers as described above. As one skilled in the art will understand, below is a sampling of some well-known text classification approaches that can be applied by the StrEAM*Robot 2913 (and more particularly by the ladder element classification service 2966) in processing interviewee responses. The list of classification techniques following is meant to be illustrative, and by no means meant to be exhaustive of the techniques that can be used with various embodiments of the StrEAM*Robot 2913. Note that each classification "technique" hereinbelow includes an inductive learning methodology combined with a classification model, as one skilled in the art will understand.

Naïve Bayesian Classifiers—This classification technique is probably the most commonly used (and studied) approach for text classification. Bayes classifiers use the joint probabilities of words and categories to estimate the probabilities of categories given an input document. Naïve Bayes makes the simplifying assumption that the conditional probability of a word being in a category is independent from the conditional probabilities of other words being in that category. Further description naïve Bayes is provided in Appendix E hereinbelow.

Support Vector Machine (SVM) Classifiers—This is a binary classification scheme wherein the hyper-plane that separates the positive and negative training examples with the maximum margin is determined. Where the training points are not linearly separable, multi-dimensional space is used.

Note that a description of the Support Vector Machine approach is disclosed in the following U.S. Patents fully incorporated herein by reference: U.S. Pat. No. 6,658,395 filed May 24, 2000; U.S. Pat. No. 6,898,737 filed Man 24, 2001; U.S. Pat. No. 6,192,360 filed Jun. 23, 1998.

Decision Tree Classifiers—This classification technique is a symbolic (non-numeric) approach where a tree is created in which internal nodes are labeled by text terms. Branches departing from those nodes are labeled by tests on the weight that the term has in the input document. Leafs are labeled by final categories.

Decision Rule Classifiers—This classification technique is another symbolic (non-numeric) approach where the classifier consists of a conditional rule with a premise in disjunctive normal form (DNF). The literals in the premise denote the presence or absence of the keyword in the input document, while the clause head denotes the classification decision. Note that decision lists (if-then-else clauses) are sometimes used instead of DNF rules.

Linear Least Squares Fit Classifiers—This classification technique is a statistical regression method for classification. A single regression model is used for ranking multiple categories given a test document. The input variables in the model are unique terms in the training documents, and the output variables are unique categories of the training documents.

k-Nearest Neighbor (kNN) Classifiers—This classification technique is an example-based approach where an explicit, declarative representation for categories is not built up front. Rather, training/example documents are referenced directly when input is tested. Given an arbitrary input document, the system ranks its nearest neighbors among training documents, and uses the categories of the k top-ranking neighbors to predict the categories of the input document. The similarity score of each neighbor document is used as the weight of its categories, and the sum of category weights over the k nearest neighbors are used for category ranking.

Rocchio Classifiers—This classification technique uses variants of the Rocchio method for relevance feedback, used in information retrieval applications for expanding on-line queries on the basis of relevance judgments. Generally this is when the weight assigned to a term is a combination of its weight in the initial query and the documents judged relevant and irrelevant. Adaptations of this approach using "term frequency/inverse document frequency" (TFIDF) statistics are common in text classifiers.

Neural Network Classifiers—This classification technique implements a network of units, where the input units represent document terms, the output unit(s) represents the category or categories of interest and the weights on the edges connecting units represent dependence relations. Neural Networks have been used with linear and non-linear mappings from input terms to categories.

The "perceptron" algorithm has been used in neural network text classifiers, as well as variants in implementations such as POSITIVE WINNOW, BALANCED WINNOW, and SLEEPING EXPERTS.

Classifier Committees—This classification technique uses multiple classifiers (and/or technologies) which are used in tandem to make classification decisions. These "committees" combine judgments made by several (often simple) classifiers. Various combinations of classifiers have been researched as well as various algorithms for making collaborative decisions, such as: Boosting, Majority Voting, Weighted Linear Combination, Dynamic Classifier Selection, and Adaptive Classifier Combination.

Note that examples of available implementations of some of the above listed technologies are given in Appendix F herein.

The StrEAM*Robot Subsystem 2913 (and in particular, the element classifier training tool 2969) applies test classification methods such as those listed above (individually or in combination) to create ladder element classifiers 4510 and 4514 (FIG. 45). The operation of such ladder element classifiers 4510 and 4514 are described in the sections to follow. Sets of ladder element classifiers 4510 and/or 4514 are created for each ladder question in a StrEAM*Interview definition 3110 (FIG. 31).

(6.3.4) Ladder Element Classifiers

The StrEAM*Robot Ladder Element Classification Service 2966 uses text classifiers 4510 and 4514 to determine the ladder level and analysis code of a piece of interview response text that is intended or targeted as a ladder element. That is, potential ladder element text is classified for both ladder level and the analysis code. In one embodiment, there can be two sets of "binary classifiers". One set includes one or more element code classifiers 4510 (FIG. 45), wherein there is one such classifier for each of the predetermined analysis codes (e.g., such codes as are represented in FIG. 26). The other set includes one or more level classifiers 4514 (FIG. 45), wherein there is one such classifier for each of the four ladder levels (attribute, functional consequence, psychosocial consequence and value) for each ladder. Thus, each of the binary classifiers classifies text inputs by scoring them according to the degree that such inputs satisfy the criteria of the binary classifier for classification into a corresponding unique category (i.e., either a code category, or a ladder level category) for which the binary classifier is designed to selectively classify such text inputs. In the present embodiment, for each of the binary classifiers that score such inputs sufficiently highly (e.g., both according to an absolute threshold, and according to a comparison with other binary classifier scores), such inputs are identified as belonging to the unique corresponding category for the binary classifier.

In the pseudo-code following, each of the binary classifiers 4510 and 4514 (identified by the identifier "textClassifier" in the pseudo-code below) determines whether an input text element ("element-text" in the pseudo-code below) should be classified as belonging to the corresponding category for the binary classifier. In particular, when one or more of the binary classifiers scores the input text element high enough, it is assumed that the input element should be categorized in the category corresponding to the binary classifier. Note, there are two configuration parameters ("thresholdScore" and "scoreMargin") which control behavior regarding what constitutes a sufficiently high score for a text input.

```
thresholdScore    \\ minimum score needed to consider the
                  \\ text classifiable
scoreMargin       \\ margin within which two scores will be
                  \\ considered essentially equal
maxScore = 0;
bestClassifierList.Clear( ); \\ clear the list identifying the
                  \\ best classifiers
for each textClassifier in classifierList DO {
    \\ determine the classifiers having high scores for "element-text"
    score = textClassifier.Classify(element-text); \\ get classifier score
    if score >= thresholdScore then
        if (score − maxScore) > scoreMargin then {
            \\ new classifier has a clearly better score
            bestClassifierList.Clear( );\\ clear the best classifier list
            \\ retain identity of new classifier
            bestClassifierList.Push(textClassifier);
            maxScore = score;
        }
        else if |score − maxScore| < scoreMargin then
            \\ keep previous high scoring classifier(s), and add new one
            bestClassifierList.Push(textClassifier)
        end if
    end if
}
for each textClassifier in bestClassifierList DO
    \\ add "element-text" to the list for the category represented by
    "textClassifier" textClassifier.add_to_list(element-text);
```

If the list of "best" classifiers that result from the above pseudo-code contains only one classifier, then the assignment is clear (either for ladder level or for analysis code). In the case of ladder level classification, if there is no "best" classifier—or multiple level classifiers are deemed "best", then in one embodiment, the input will be rejected as invalid, and the automated interview subsystem 2913 may ask the interviewee to restate or clarify the response. On the other hand, in the case of analysis code classification ambiguity, the respondent may be asked to choose the code that is best suited from among those in the "best" list. If no such code is judged "best", then a new code category may be created as is described hereinbelow in reference to FIG. 46.

(6.3.5) Ladder Element Classifier Training

Figure 47:
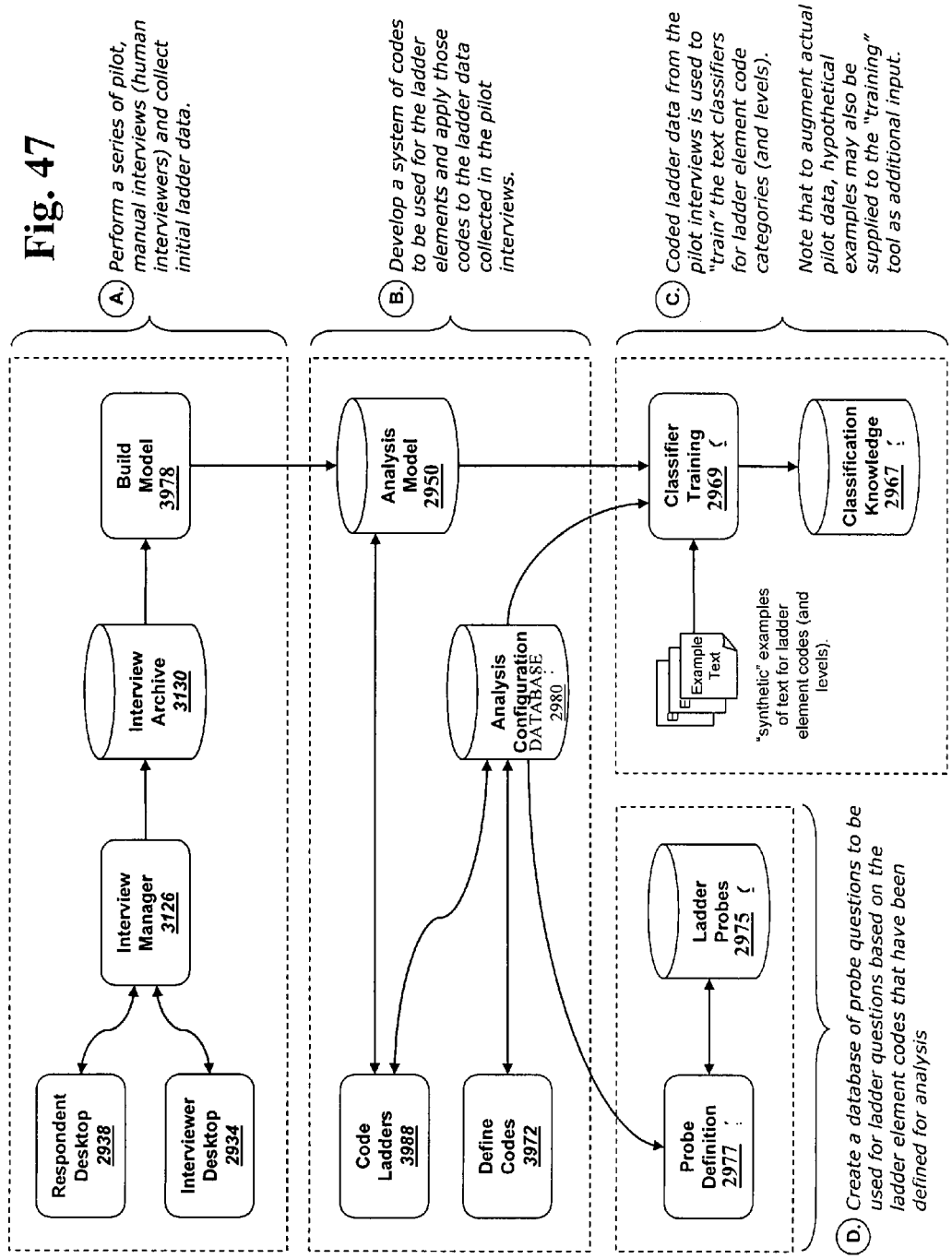
FIG. 47 shows an embodiment of the high level steps performed in training the text classifiers 4510 and 4514.

The Ladder Element Classifiers 4514 for StrEAM*Robot 2913 are trained by first conducting standard manual StrEAM*Interview interviews (with human interviewers using the interview subsystem 2908) with an appropriate (e.g., statistically significant) sample of respondents. The ladder data collected from these initial or pilot interviews is used to: (i) determine and populate ladder levels, and (ii) manually determine codes (i.e., semantic categories) that group together interview responses that appear to have been the result of substantially common perceptions by the interviewees. In particular, the processes (i) and (ii) are performed by market research analysts using the market research analysis capabilities of the StrEAM*analysis subsystem 2912. Accordingly, the resulting ladder leveled and coded data is then provided as input to "train" the classifiers 4510 and 4514 (FIG. 45). An overview of this process is depicted in FIG. 47. As shown in this figure, the major steps are:

Step A: A pilot interviewing process is conducted, wherein pilot (i.e., calibration) interviews are conducted between interviewees (via their corresponding respondent desktop applications 2938) and interviewers (via their corresponding interviewer desktop applications 2934) substantially as described hereinabove (i.e., manually interviewing respondents). The resulting interview data (also referred to as "calibration interview data" or simply "calibration data" herein) is provided to the interview archive database 3130 (FIGS. 29 and 31) as described hereinabove. However, this calibration interview data is identified or marked as pilot or calibration interview data. The calibration interview data is made available to the StrEAM*analysis subsystem 2912 by incorporating this data into an instance of the analysis model database 2950 using the build model tool 3978 (FIG. 39).

Step B: Since the calibration interview data is now in an instance of the analysis model database 2950, code categories for ladder elements are manually defined by an analyst(s) using the define codes tool 3972 and stored in the analysis configuration database 2980 (FIGS. 29 and 39). These codes are then applied to ladder elements in the calibration interview data by use of the ladder coding tool 3988. Note that since these codes are applied to actual interview data, the code definitions typically require refinement. Thus, this manual process of developing a system of codes and applying it to the calibration interview data is an iterative process. Once the code definitions are finalized, they are stored in the analysis configuration database 2980 and the ladders (with one or more of the codes identified for each ladder level) derived from the calibration interview data are stored in the analysis model database 2950.

Step C: After the manual effort of Step B immediately above is believed to have substantially established a consistent collection of analysis code categories when applied to the calibration interview data, the resulting codes and ladders are used to train the ladder element classifiers 4510 and 4514. The classifier training tool 2969 uses the text terms of the calibration interview data that have been:
(a) classified into a code(s) (i.e., coded), and
(b) identified as belonging to a particular ladder and level therefor, as examples to "train" the classifiers 4510 for each analysis code, and the classifiers 4514 for identifying ladder level responses as described hereinabove. Each text segment in the calibration interview data that has been identified as representing a particular ladder level (of a particular ladder) is used as a "positive" example of its ladder level and its assigned analysis code. Each such text segment may be also used as a "negative" example of the other three ladder levels and all other analysis codes. The "trained" element classifiers 4510 and 4514 are stored in the classification knowledge database 2967. There is, in at least some embodiments, (a) at least one classifier 4510 for each classification code (sometimes referred to as an "analysis code") derived from the calibration interview data, and (b) for each ladder, four other classifiers, i.e., one classifier 4514 for each ladder level (attribute, functional consequence, psychosocial consequence, and value).

It should be noted that as indicated in FIG. 47, hypothetical examples of interview response text for obtaining analysis codes (and ladders with their corresponding levels) may also be used for training. Such hypothetical examples may be simple made-up training examples (positive or negative, but typically positive) of coded (and/or leveled) text. Accordingly, training examples may be created that do not come from actual calibration interviews.

Step D: The final step in preparing StrEAM*Robot 2913 for operation—though not actually a classifier training step—is creating the ladder probe database 2975. The ladder probe database 2975 is accessed by the ladder probe question service 2971 as shown in FIGS. 29 and 45 for accessing ladder probe questions that are appropriate for the current state of an interview session. Further description is provided immediately below. Note that in order to enable StrEAM*Robot 2913, the ladder probe database 2975 is populated by means of the interactive ladder probe definition tool 2977.

(6.4) Ladder Probe Question Look-Up

As discussed earlier, for a given market research interview, generating probe questions to solicit appropriate interviewee ladder responses is substantially similar from interview session to interview session. Therefore it is possible to create a substantially uniform collection of probe questions and related data structures so that an automated process of ladder probe question selection can be performed. The list of probe questions for an automated interview is stored in the ladder probe database 2975 as depicted in FIGS. 29 and 45.

An effective way to prompt a respondent to provide responses that fill in each of the four levels of a ladder (attribute, functional consequence, psychosocial consequence, and value) is to ask probing, follow-up questions that "move" the respondent through his/her thought process "from" one level of abstraction (i.e., ladder level) that has been elicited, "to" another level of abstraction (i.e., ladder level) that has not yet been elicited. For instance, when a respondent states that "high price" (an attribute) is an issue, the interviewer might ask: "What is the biggest problem that this causes for you?" in order to probe for a functional consequence. A response pointing out "difficulty staying within monthly budget" might cause the interviewer to next ask: "How does that make you feel?" in order probe for a psychosocial consequence.

The ladder probe question service 2971 maintains information regarding the state of an interview session such as which ladders have been completed, which ladder level(s) of which ladder(s) remain incomplete, which ladder (the "current ladder") is the interview session currently attempting to complete, which level of the current ladder is targeted for completion, and which (if any) transition probe question has been selected for "moving" the interviewee from a ladder level for which an appropriate response has been obtained to another ladder level that requires a response to be entered. Such interview state information determines the ladder probe database 2975 access parameters for accessing this database and retrieving an appropriate ladder probe question for the current state of the interview session.

More particularly, the ladder probe question service 2971 (FIGS. 29 and 45) looks up an appropriate follow-up probe question based on the current state of a ladder being filled-in during an interview session. The probe question is identified according to the interview state transition to be made (e.g., from one ladder element to another). In one embodiment, a simple set of "if-then" rules can be used to specify when a particular probe question is to be eligible for presentation to an interviewee. An example form for such rules is shown below in the Ladder Probe Definition Example. Here the probe questions and the rules for their use are provided in a simple XML-based syntax.

---

```
<probe from-level="level" to="level"> text of probe question </probe>
<probe from-level="level" to="level"> text of probe question </probe>
<probe from-level="level" to="level"> text of probe question </probe>
<probe from-code="code" to="level"> text of probe question </probe>
<probe from-code="code" to="level"> text of probe question </probe>
<probe from-code="code" to="level"> text of probe question </probe>
    Where:
        "level" is one of:   "attribute"
                             "functional"
                             "psychosocial"
                             "value"
        "code" is any valid ladder element code category
    Also:
        A <probe> element may also have an optional attribute:
            ladder-id= "question-id"
        This constrains the probe to be used only for the ladder question
        specified. When not specified, the probe question is valid for any
        ladder in the interview.
```

---

Ladder Probe Definition Example

As this Ladder Probe Definition Example above indicates, probe question rules include a "from" field (i.e., a "from-level" field, or a "from-code" field) which is either a ladder level, or a ladder element code. Accordingly, for a particular interviewee response (e.g., a most recent response), one or more codes may be determined from the response, and additionally, for a current ladder (if any), a ladder level (if any) of the current ladder having an interviewee response therein may be determined. The results of such determinations are used to identify the next probe question rule to select so that its corresponding value for the text of the next probe question ("text of probe question" in the Ladder Probe Definition Example above) can be presented to the interviewee.

Since the probe questions having ladder element codes in the "from" field of their probe question rules may correspond to very specific probe questions (identified by the "text of probe question" field in each such probe), such probe question rules are examined first for determining a next probe question. For a particular code (C), if there is no probe question rule, wherein C is the value for the from-code field, then a probe question rule may be selected having a "from-level" field for the current ladder instead.

Note that the intended classification for an interviewee response is also defined in each probe question rule. That is, in response to the presentation of the text of the probe question (for a selected one of the probe question rules), the "to" field identifies the ladder level to which the interviewee response may be assigned. That is, the "to =" designation for a probe question is always a ladder level. Note that the interview session transition defined by a probe question may be "up" (e.g., from attribute to functional, or from functional to psychosocial consequences, or from psychosocial consequences to values), or "down" a ladder (e.g., from values to psychosocial consequences, or from psychosocial consequences to functional, or from functional to attribute). Thus, associated with each probe question in the ladder probe database 2975 is a direction field indicating whether the associated probe question is for going up a ladder level(s), or going down a ladder level(s). It should also be noted that while the syntax of these probe question definitions does not require such interview transitions to be only one level up or down a ladder, in one embodiment, the ladder probe question service 2971 will typically seek to retrieve a ladder probe question that involves a single level of transition in ladder levels.

Each potential probe question is explicitly associated in the ladder probe database 2975 with the data identifying the interview session circumstances in which it might be appropriate for the probe question to be presented to the interviewee. For example, if an interviewee indicates that expensive electricity was a primary (negative) attribute when discussing satisfaction regarding a local utility, then an appropriate probe question to elicit the functional consequence of that attribute might be:

"What problem does the high cost of electricity cause for you?"

If the attribute "expensive" had a code of "117", then the ladder probe can be defined as follows:

<probe from-code="117" to ="functional"> What problem does the high cost of electricity cause for you?</probe>

Note that the same set of circumstances may yield more than one potential latter probe question from the database 2975. During automated interviews if multiple probe questions are identified as candidates, the one to be used may be chosen by various techniques, including: (i) randomly, (ii) a confidence value indicative of past performance in the probe question eliciting the desired interviewee response, (iii) a probe question that is most dissimilar from (any) other ladder probe questions previously presented, (iv) a probe question for a ladder or ladder level that is identified as more important to the completed than ladders or ladder levels of other candidate probe questions.

Ladder Probe Question Transition

There is no guarantee that the respondent will provide a response corresponding to the ladder level to which a corresponding probe question (or even an initial ladder question) is directed. Accordingly, to conduct an effective interview laddering session, the automated interview subsystem 2913 (more specifically, the ladder probe question service 2971) must review the state of ladder completion each time an element (i.e., interviewee response) is added to a level of the ladder, and then choose which level needs to be filled in next (e.g., the "to" field in the Ladder Probe Definition Example hereinabove, and also referred as the "target level"). More specifically, the ladder probe question service 2971 determines:

(a) "from" ladder level data that identifies both a ladder level that has already been filled in with an interviewee response, and the response itself, and (b) "to" ladder level data that identifies a ladder level that has not, as yet, been filled in.

Then the ladder probe question service 2971 retrieves an appropriate probe question template from the ladder probe database 2975, constructs the next ladder probe question to present to the interviewee by incorporating the interviewee response element(s) of the "from" ladder level data into the question template, and then outputting the newly generated ladder probe question to the robot interview server 2965.

The ladder probe question service 2971 takes into account a preferred transition to fill in a designated target (ladder) level. For example, if both the attribute level of a particular ladder has been filled in during an interview session, and the psychosocial consequence level has also been filled in, then the ladder probe question service 2971 will, in most such circumstances, select a ladder probe question that is directed from the known attribute interviewee response to the unknown functional consequence level of the ladder. Thus, a probe question such as "Given that you like the prompt delivery service of company X, what functional benefit is that for you?" (i.e., a probe question from a previously identified object attribute ladder level to a functional consequence ladder level) is generally preferred over a question such as "Given that you feel less pressure from your boss when packages are not sitting in your office, what benefit does company X provide in reducing this pressure?" (i.e., a probe question from a previously identified object psychosocial consequence level to a functional consequence level).

Figure 48:
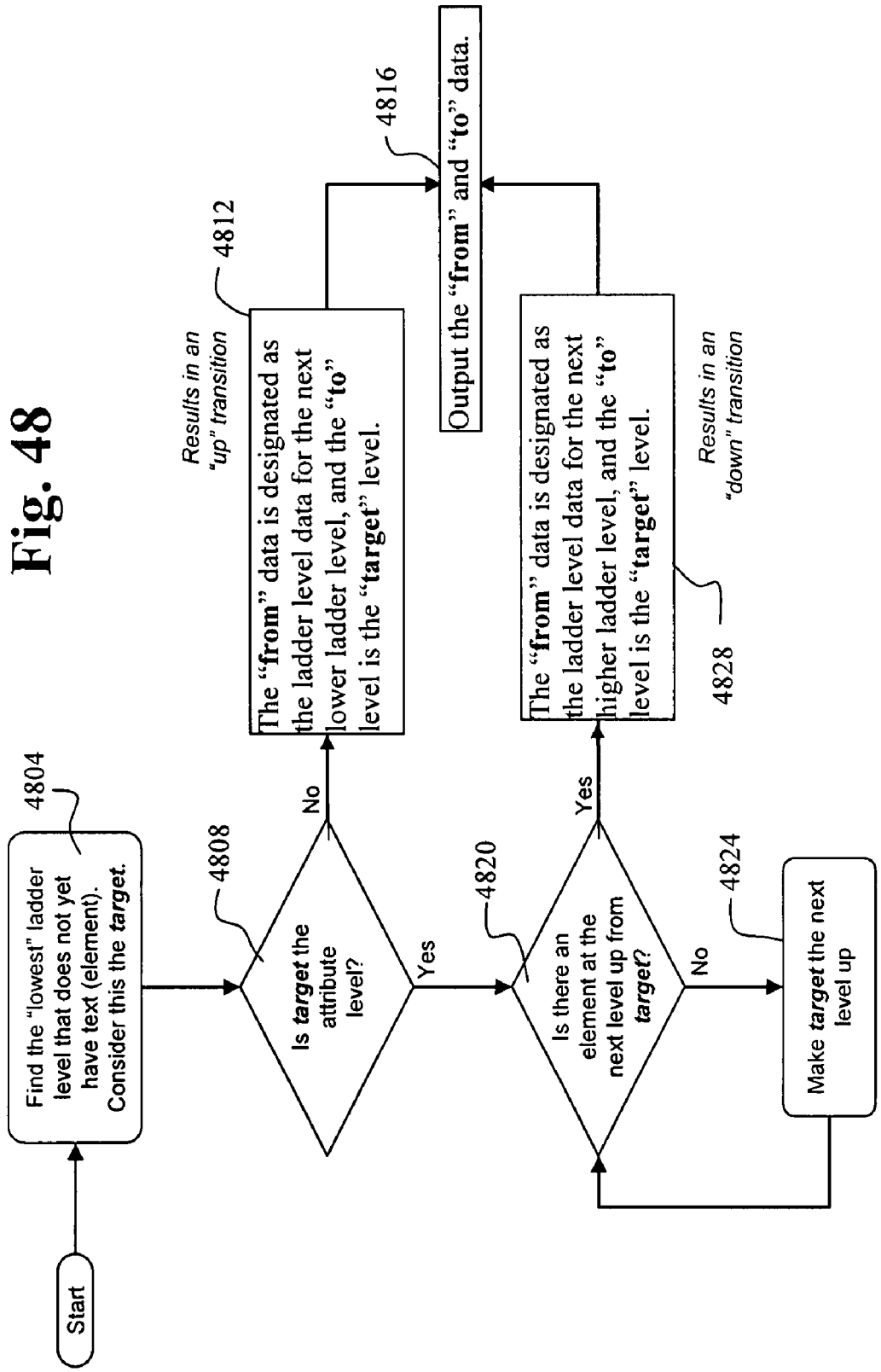
FIG. 48 shows a flowchart for selecting a target ladder level for determining the next probe question.

A representative flowchart for selecting the target level for presenting the next probe question is shown in FIG. 48. Assuming at least a first ladder response has been filled in with an interviewee response for a ladder (L), in step 4804, the lowest ladder level that does not as yet have a response from the interviewee is determined and assigned to the identifier "target". In step 4808, a determination is made as to whether the identifier "target" identifies the lowest ladder level, attribute. If not, then there is a ladder level filled in that is below the "target" level. Thus, step 4812 is performed, wherein the "from" ladder level data is designated as the next lower ladder level data (from that of the "target" level), and the "to" ladder level data is designated as the "target" level. Subsequently, the identified "from" and "to" data are output (step 4816) for generation of the next ladder probe question.

Alternatively, if in step 4808, the "target" level is the attribute level, then in step 4820, a determination is made as to whether there is at least one interviewee response element that has been filled in for the ladder L immediately above the attribute level. If not, then step 4824 is performed wherein the identifier "target" is assigned ladder level data for the next higher ladder level. Subsequently, step 4820 is again performed. However, since at least one of the levels of the ladder L is filed in, a performance of step 4820 will eventually yield a positive result, and accordingly, step 4828 is performed, wherein the "from" ladder level data is designated as the next higher ladder level data (from that of the "target" level), and the "to" ladder level data is designated as the "target" level. Subsequently, the identified "from" and "to" data are output (step 4816) for generation of the next ladder probe question.

It should be noted that in some cases ladder probe questions are considered "chutes", wherein the preferred direction of discussions is moving a respondent "down" through the ladder levels, starting at the value level. In these cases, the algorithm for determining the context or interview state for the next ladder probe question is substantially the inverse of the steps illustrated in FIG. 48 described hereinbelow. For example, a flowchart for chutes can be provided by making the following word changes in FIG. 48: "lowest" to "highest", "attribute" to "value", "up" to "down", "lower" to "upper", and "higher" to "lower".

(6.5) Automated Interview Subsystem (StrEAM*Robot) 2913 Operation

Figure 46:
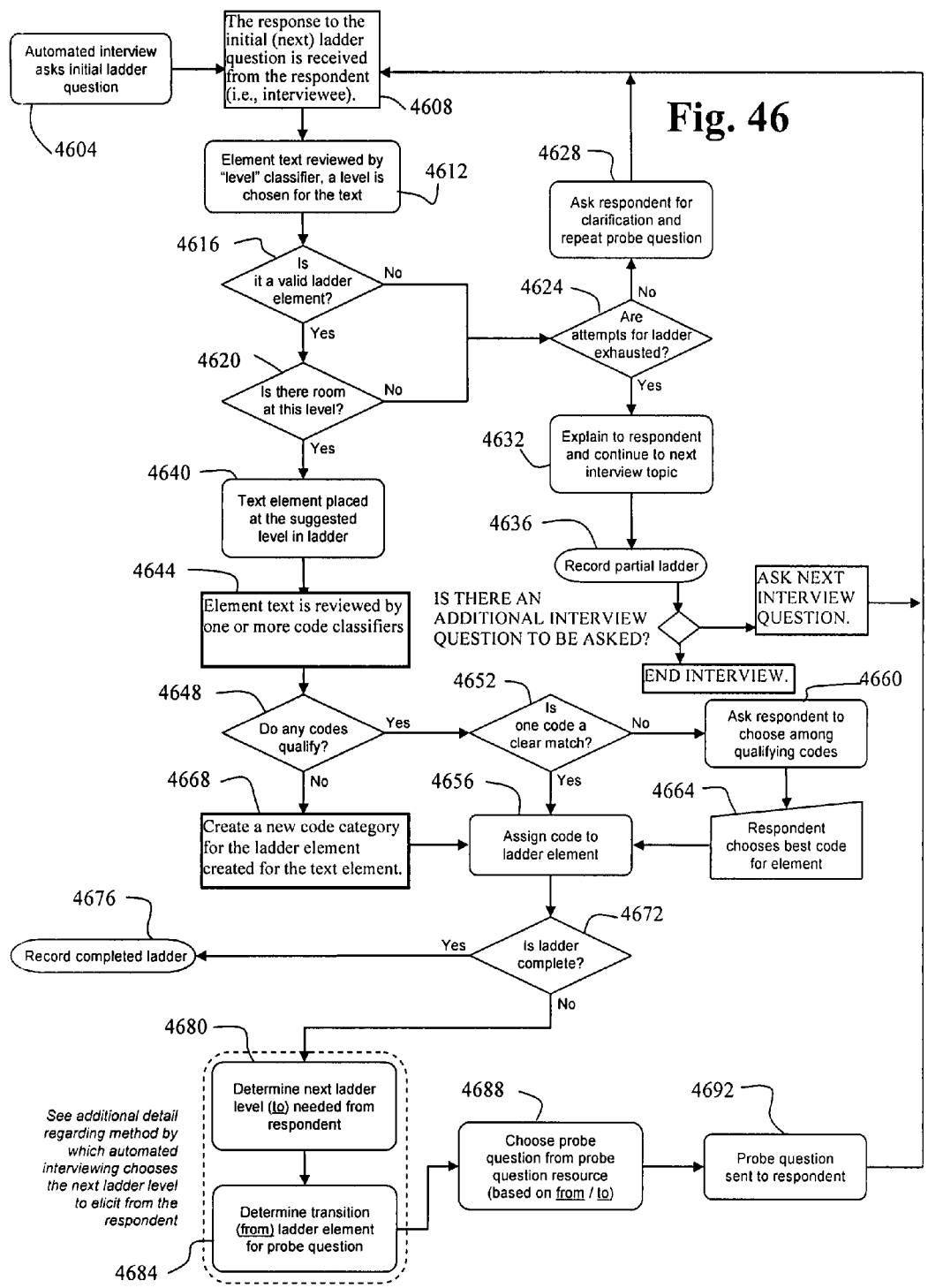
FIG. 46 shows a flowchart of the steps performed by the StrEAM automated interview subsystem (StrEAM*Robot) 2913 when generating questions for a given ladder.

Through the use of the ladder element classification service 2966 and the ladder probe question service 2971, the automated interviewer server 2965 (FIGS. 29 and 45) is able to automatically perform the four tasks LQ-1 through LQ-4 described in the Ladder Questioning section hereinabove, that are also required of a human interviewer. The automated interviewing subsystem 2913 can thereby simulate the iterative dialog required in an interview session to elicit ladder responses from a respondent. The logic for this process is described hereinbelow in reference to FIG. 46. In particular, the flowchart of FIG. 46 shows the high level steps performed in the decision making and interactions between: (i) an interviewee, and (ii) the components of the market research analysis method and system 2902, and in particular, the components of the automated interview subsystem 2913 during the dialog of an interview session when a response for a single ladder question is desired.

As indicated above the ladder probe question service 2971 will word a probe question so that a prior interviewee response is used to generate a probe question for obtaining an interviewee response for an adjacent as yet unfilled in ladder level. In addition, as also indicated above, for most interview session states, the preferred direction is to move "up" the ladder (i.e., from attribute to functional consequence, or from functional consequence to psychosocial consequence, or from psychosocial consequence to value). A flowchart showing the steps performed by the StrEAM automated interview subsystem (StrEAM*Robot) 2913 when generating questions for a given ladder is shown in FIG. 46. The steps of FIG. 46 are described as follows.

Step 4604: An initial question for a selected ladder (L) is presented to the interviewee via the robot interview server 2965. Note that the initial question may be directed to the attribute level of the ladder L in one embodiment, and to the value level of the ladder L in another embodiment.

Step 4608: The response to the initial ladder question is received by the robot interview server 2965 from the respondent (i.e., interviewee).

Step 4612: The interviewee response is input to the ladder classification service 2966 for determining a ladder level (for the ladder L) for which the interviewee's response most closely matches. Note as discussed hereinabove, a presumed representative collection of interviews will have been previously conducted using a human interviewer(s) (e.g., via the interview subsystem server 2910), and the resulting interview data will have been previously analyzed as described hereinabove by a human analyst(s) (e.g., via the interview analysis subsystem server 2914). Accordingly, the results of the analysis of the representative collection of interviews are used for populating the classification knowledge database 2967. In particular, the determination in this step may be dependent upon whether any of the hypothesized ladder levels (output by the one or more classifiers 4514) have an associated confidence or likelihood measurement above a predetermined threshold as described in the section titled "Ladder Element Classification" hereinabove.

Step 4616: A determination is made (by the ladder classification service 2966) as to whether the ladder level determined in step 4612 is a ladder level for which the ladder question (of step 4604) is intended to elicit an interviewee response, i.e., a determination is made as to whether the element text will yield a valid ladder element (cf. Definitions and Descriptions of Term section hereinabove for "ladder element") for the ladder level for which the ladder question is intended elicit a response.

Step 4620: If the interviewee response is identified for further processing in step 4616, then a further determination is made (by the ladder classification service 2966) as to whether there is there is a vacancy to be filled in at the identified ladder level (which is now also a ladder level for which the ladder question is intended to elicit a response). Note that in some embodiments, only a small number of interviewee responses can be associated with any particular ladder level. In particular, such a small number is generally in the range of 1 to 5. Note that, in general, when there is no further room at the identified ladder level, this is an indication that the interviewee has likely provided a response for a different ladder level than the interview question was intended to elicit.

Step 4624: If one of the steps 4616 and 4620 results in a negative outcome, then in the present step a determination is made (by the robot interviewer server 2965) as to whether all attempts for obtaining an appropriate response from the interviewee have been exhausted.

Step 4628: If it is determined in step 4624 that at least one additional attempt is to be made to obtain an appropriate interviewee response for the current target ladder level, then the ladder probe question service 2971 requests an additional probe question (from the ladder probe database 2975) for clarification of the interviewee's previous response, and/or the ladder probe question service 2971 requests that robot interviewer server 2965 present the probe question to the interviewee again with a request for clarification. Subsequently, step 4608 is again performed. Note that, in general, less than three attempts are attempted for obtaining an interviewee response for a given ladder level of a given ladder (L).

Step 4632: If it is determined in step 4624 that no additional attempt is to be made to obtain an appropriate interviewee response for the current target ladder level, then in the present step, robot interviewer server 2965 informs the interviewee that the current series of questions is being terminated due to difficulties in processing the interviewee's responses.

Step 4636: The robot interviewer server 2965 identifies or labels the current ladder L as only partially completed (i.e., not all of the ladder's levels have a ladder element). In particular, such information identifying the ladder as incomplete is entered into the interview archive database 3130.

Step 4640: If the interviewee response is identified for further processing in step 4620, then in the present step, the ladder classification service 2966 associates the interviewee response with the identified ladder level of the ladder L. More particularly, a ladder element data structure is created for the interviewee response.

Step 4644: One or more of the code classifiers 4510 are activated (by the ladder classification service 2966) for identifying a code with which the response most closely corresponds (i.e., the interviewee's response is coded, whenever there is a likely match, with a predetermined phrase that is presumed to be substantially semantically equivalent for the group of interviewees being interviewed).

Step 4648: Of the possible codes hypothesized by the one or more code classifiers 4510, a determination is made (by the ladder classification service 2966) as to which (if any) of these codes qualify for further consideration as a code for the element text. The determination in this step may be dependent upon whether any of the hypothesized codes have an associated confidence or likelihood measurement above a predetermined threshold as described in the section titled "Ladder Element Classification" hereinabove.

Step 4652: If step 4648 determines that one or more of the hypothesized codes have sufficiently high confidence or likelihood measurements, in the present step, a determination is made (by the ladder classification service 2966) as to whether there is one of the codes that is clearly a best match for the text element. In particular, such a determination may be made by determining whether one of the hypothesized codes has a confidence or likelihood measurement that is substantially greater than any of the other qualified codes. In one embodiment, when a difference ($\Delta_1$) between the highest confidence or likelihood measurement (for a code $C_1$), and the next highest confidence or likelihood measurement (for a code $C_2$) is at least as large as the difference ($\Delta_2$) between confidence or likelihood measurement for a code $C_2$ and the second most highest confidence or likelihood measurement (for a code $C_3$), then $C_1$ is identified as a clear match. Of course, alternative techniques for determining such a clear match may be used. For example, a clear match may be determined when $\Delta_1 \geq k^* \Delta_2$ wherein $0 < k < 2$.

Step 4656: If a clear match is determined in step 4652, then the ladder classification service 2966 assigns the code identified as the clear match to the ladder element created for the interviewee response.

Step 4660: Alternatively, if step 4652 determines that there is no clear code match, then in the present step, the ladder classification service 2966 requests the robot interviewer server 2965 to present a question to the interviewee requesting him/her to choose from among the qualified codes determined in step 4648.

Step 4664: The interviewee selects, from the presentation of step 4660, the code that most closely identifies the interviewee's previous response, and the selection is provided to the robot interviewer server 2965. Subsequently, step 4656 is performed.

Step 4668: If step 4648 results in a determination that no codes qualify for semantically identifying the element text, then in the present step, the ladder classification service 2966 creates a new code category for the ladder element corresponding to the interviewee response text element. Subsequently, step 4656 is again performed.

Step 4672: Once a code is assigned to the ladder element (step 4656), a determination is made in the present step (by the robot interviewer server 2965) as to whether the ladder L has obtained a ladder element for each level of L.

Step 4676: If it is determined in step 4672 that each level of the ladder L has at least one ladder element, then in the present step, the robot interviewer server 2965 marks or labels a record identifying the ladder L in the interview archive database 3130 as being complete.

Step 4680: If, however, the step 4672 determines that the ladder L is not yet complete, then in the present step, the robot interviewer server 2965 requests the ladder probe question service 2971 to determine a next ladder level of L to be probed during the interview session as described in the section titled StrEAM Ladder Probe Questions hereinabove.

Step 4684: The ladder probe question service 2971 also determines a previously filled in ladder level and a corresponding ladder element which is to be integrated into the new probe question so that the probe question directs the interviewee to transition his/her responses from this previously filled in ladder level to the ladder level for which an appropriate response has not as yet been obtained. Note that in the Probe Schema Example of the section titled StrEAM Ladder Probe Questions, the "from-level" is determined in this step.

Step 4688: The ladder probe question service 2971 determines a ladder probe question for transitioning from filled in ladder level of L to an unfilled ladder level of L. Note, description of the process for performing this step is further described in the section titled StrEAM Ladder Probe Questions hereinabove.

Step 4692: The robot interviewer server 2965 receives the new probe question from the ladder probe question service 2971, and transmits it to the interviewee's respondent application 2938 for presentation to the interviewee. Subsequently, step 4608 is again performed.

It should be noted that during an automated ladder question dialog, the robot interviewer server 2965 prevents respondent interactions from going on indefinitely through the use of counters and elapsed timers. For the sake of clarity only one instance of this type of safeguard is depicted in FIG. 46. Also not shown in FIG. 46 are the processing steps when a respondent asks for help during a ladder question dialog. Note that in one embodiment, the processing for such requests for help may include one or more of:

(i) providing predetermined context sensitive descriptions related to the current state of the interview session; e.g., if a probe question is presented for obtaining an interviewee response indicative of a functional consequence ladder level, wherein attribute data for the ladder is used in a ladder probe question for obtaining the corresponding function consequence ladder data, then if context sensitive help is requested by the interviewee, examples of similar ladder probe questions and corresponding appropriate answers may be presented to the interviewee, and/or (ii) an on-line human interviewer may be contacted for assisting the interviewee.

Note that prior to classifying an interviewee's response to an interview question, the robot interviewer server 2965 will first examine the input from the respondent to see if it is a request for help—in which case appropriate messages are sent and the ladder dialog is resumed.

(6.6) Robot-Assisted Manual Interviews

Figure 49:
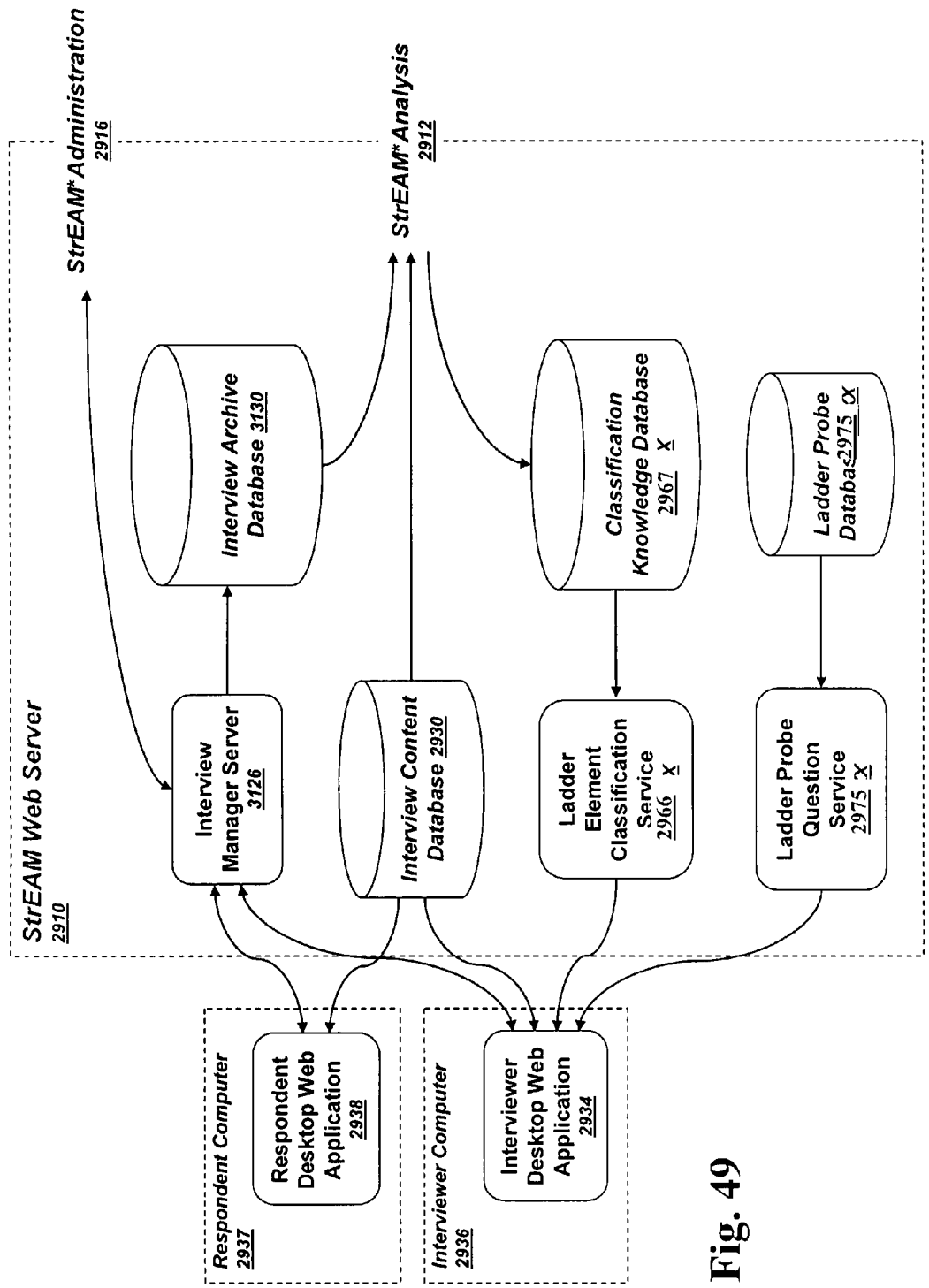
FIG. 49 shows an alternative embodiment, wherein the automated interview subsystem 2913 (FIG. 29), or components thereof, are used to assist a (human) interviewer in coding interviewee responses during an interview session.

The StrEAM*Robot subsystem 2913 components can also provide assistance to human interviewers when conducting manual StrEAM*Interview interviews. In such a case, the interviewer desktop web application 2934 can be configured to connect to the ladder element classification service 2966 and the ladder probe question service 2971 as shown in FIG. 49. In this way, these services 2966 and 2971 can provide runtime recommendations to a human interviewer regarding what the ladder level might be for text coming from respondents and for potential follow-up probe questions to ask.

Figure 50:
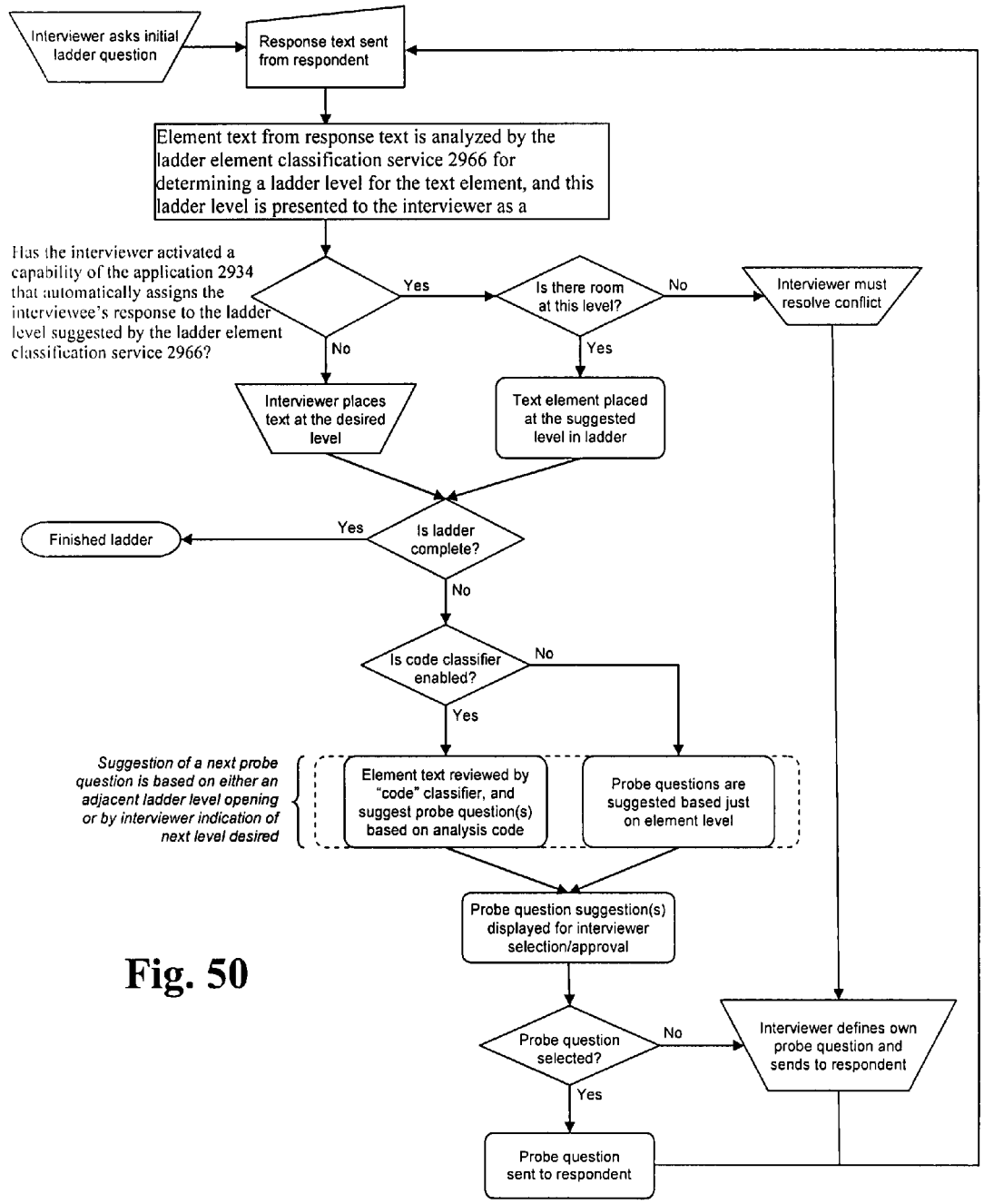
FIG. 50 shows a flowchart of the steps performed when using the StrEAM*Robot components during an interview session, wherein the interviewer is assisted with the coding of interviewee responses.

In the context of a manual StrEAM*Interview, the StrEAM*Robot components only provide recommendations to the human interviewer. Therefore the logic utilizing the StrEAM*Robot components differs from that during automated interviews. A flowchart showing the steps performed when using the StrEAM*Robot components during a manual interview is depicted in FIG. 50.

It should be noted that since the automated interview subsystem 2913 components may, in one embodiment, only provide recommendations, such components can be used with manual StrEAM*Interviews whether or not the ladder element classifiers 4514 are fully trained. This allows the ladder element classifiers 4514 to be used even during pilot interviews that are performed by an interviewer.

(6.7) Other Embodiments and Extensions

The StrEAM*Robot subsystem 2913 as described hereinabove is readily extended to make use of text-to-voice technologies that can mimic a human interviewer further, e.g., via synthesized speech. Accordingly, a speech synthesizer may be provided with input text to "verbalize" by the robot interviewer server 2965 based on the text contained in the interview definition data 3110 (FIG. 31). Additional syntax in the interview content database 2930 may be used to specify the text to be spoken along with what is to be correspondingly displayed on an interviewee's computer screen. The ladder probe database 2975 may similarly be extended to include specification of spoken text along with a display of the probe text. The speech synthesizer may output to the network transmission data stream that would otherwise be used by the human interviewer's microphone.

Note that in one alternative embodiment, the automated interviewing tool 4514 may be provided at (e.g., downloaded to) an interviewee's computer. Thus, the automated interviewing tool 4514 may be incorporated into the respondent application 2938 (FIG. 29), wherein interview session results are transmitted to the market research network server 2904. Additionally, in an alternative embodiment, the automated interviewing tool 4514 may be used to provide an interviewee with insights into his/her own perceptions related to, e.g., a personal problem. Additionally, the automated interviewing tool 4514 may be used to gather appropriate data for, e.g., to matching employees with employers, matching individuals looking for a mate, etc.

Note that the automated interview subsystem 2913 can be incorporated into the market research network server 2904 (FIG. 29), or one or more copies of the subsystem 2913 may be provided at other network servers (not shown) or interviewer computers 2936. In one embodiment, where the automated interview subsystem 2913 is able to notify an interviewer that an interview session is not progressing as intended, such an interviewer may be able to intervene in the interview session and get the session back on track. When such notifications to an interviewer are available, a plurality of interviewers may be assigned to a group as in a call center so that the call center distributes such notifications among the group of interviewers. Accordingly, if it is expected that no more than, e.g., 20% of interview sessions may be interviewer intervention, then 20 to 30 interviewers is expected to handle interview session interventions for 100 simultaneous interviews.

(7) StrEAM*Administration 2916

The StrEAM*administration subsystem 2916 provides the basic capabilities to administer a StrEAM research study (one that utilizes StrEAM*Interview subsystem 2908, and the StrEAM*analysis subsystem 2912).

The primary focus of the administrative subsystem are the processes involved in organizing the desired set of study participants (respondents) and coordinating them to be interviewed by StrEAM interviewers. In the general case, these processes are depicted in FIG. 51.

Figure 51:
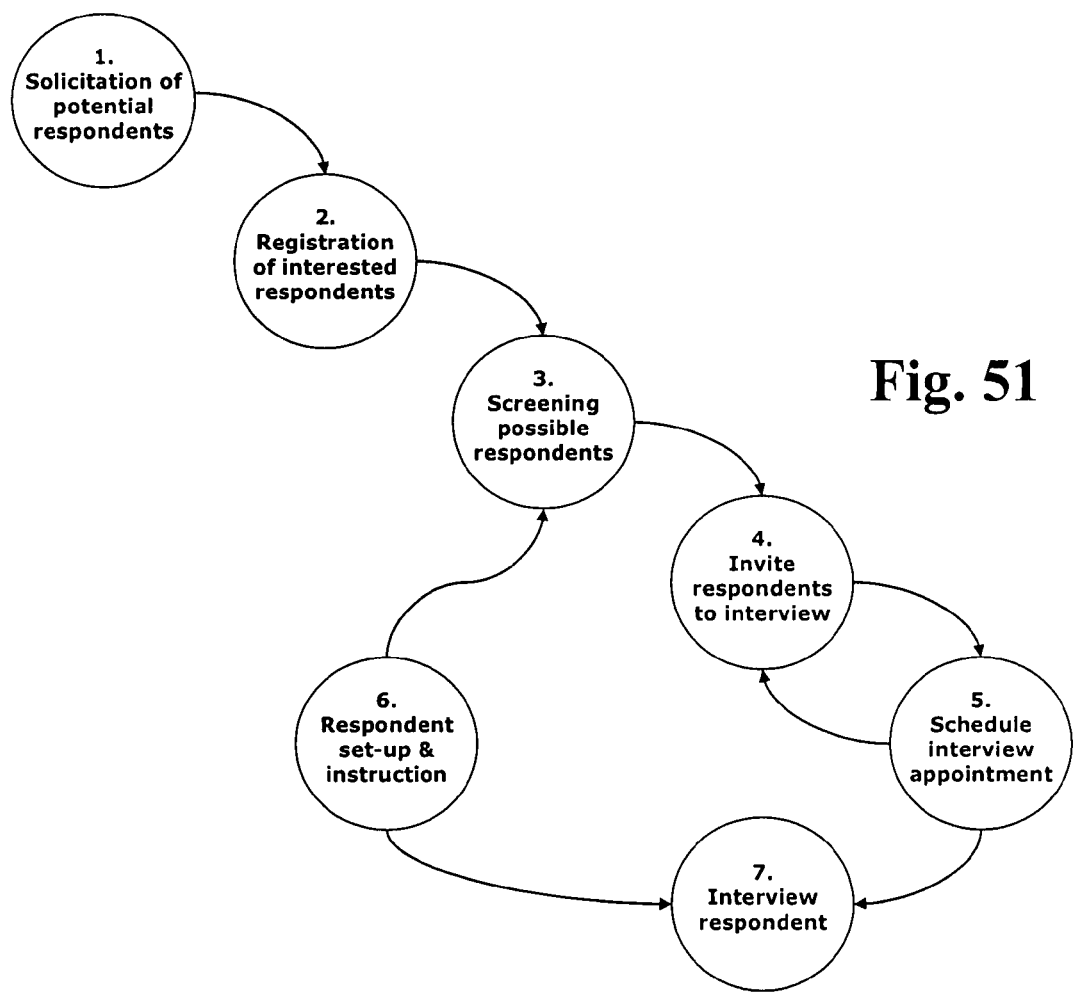
FIG. 51 shows a high level illustration of the steps performed by the StrEAM*Administration subsystem 2916.

FIG. 51 depicts the most general case for administrative processes. Not all studies will follow this exact flow. For instance, FIG. 51 includes processes for soliciting participation (via email) with potential respondents registering their interest. Some studies may instead begin with a predefined list of interested potential respondents, and thus begin with Step 3 of FIG. 51. Other studies might begin with pre-screened respondents and thus skip to Step 4 of FIG. 51. Still other studies could even start with pre-screened and pre-scheduled respondents (collected, perhaps, by a phone-based solicitation process), and therefore skip directly to Steps 6 and 7 of FIG. 51.

An important characteristic of the StrEAM*Administration system is its flexibility in supporting these various workflows which might be used to get to the point of conducting interviews. Study-specific configuration information determines how the workflow for that study will differ (if at all) from the generic process flow shown in FIG. 51.

Figure 52:
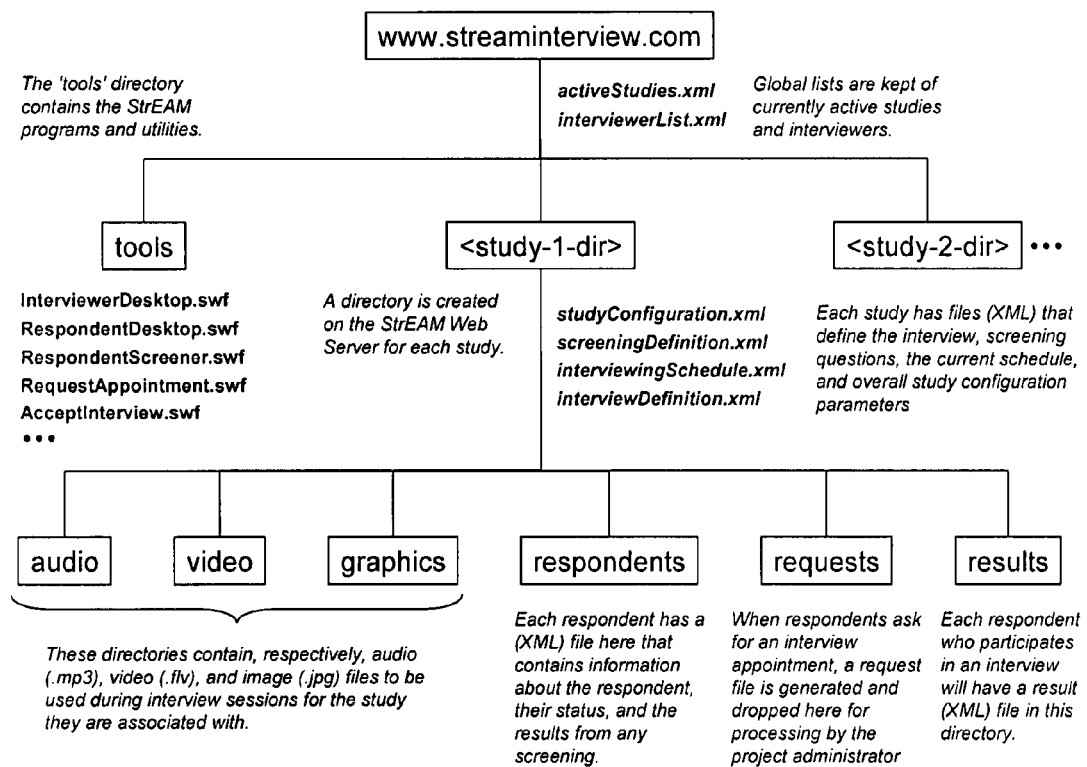
FIG. 52 shows a diagram of a special directory structure that is created for each StrEAM market research study being conducted. The structure of the directory is the same for all StrEAM market research studies, as is the purpose of each of the sub-directories.

The automation contained in the StrEAM*Administration subsystem 2916 is supported by a special directory structure on the central StrEAM Web Server 2904 (FIG. 29). The relevant portions of this directory structure are shown in FIG. 52 below:

As FIG. 52 shows a special directory structure is created for each StrEAM study being conducted. The structure of the directory is the same for all StrEAM studies, as is the purpose of each of the sub-directories.

Configuration information, respondent data, interview definitions, etc. that are specific to a market research study are then contained in XML document files in each study directory. Standard names (and naming conventions) are used across StrEAM studies. A summary of the XML documents involved is given in Appendix I hereinbelow.

Referring to FIG. 51, the StrEAM*Administration subsystem 2916 processes may be described as follows.

Step 1: Solicitation, Registration, Invitation
Interviewees are solicited for interviews, then registered, and provided with an invitation for participation in an interview session.

Step 2: Respondent Screening
StrEAM*Screening is a module that provides a web-based screening questionnaire for use prior to the selection of respondents for actual interviews. StrEAM project administrators may define a questionnaire from a rich set of traditional question types. By collecting screening data from potential respondents, the interviews scheduled may be balanced according to some pre-arranged criteria (demographics, product usage, past voting, etc.).

Step 3: StrEAM*Screening
StrEAM*Screening is a self-service activity that potential respondents do through the StrEAM*Portal, wherein potential respondents can be screened as to whether they satisfy the interviewee requirements for one or more market research studies. These potential respondents are invited to do so (by email or phone call) and are given a StrEAM Respondent ID and password (typically their email address). The invited potential respondents log in to the StrEAM*Portal and answer a screening questionnaire. While a respondent may complete the questionnaire at any time, he/she typically will not be scheduled for an interview until he/she has completed the questionnaire.

Like the StrEAM*Interview system itself, the StrEAM*Screening questionnaires are defined in a simple XML-based language. The StrEAM*Screening language supports a similar set of capabilities to that of the StrEAM*Interview subsystem 2910, however in the case of StrEAM*Screening there is no dialog between the respondent and an interviewer. So interviewing questions requiring a dialog (like Ladder questions) or those typically requiring some assistance (like Chip Allocation) are not included in the StrEAM*Screening language.

Step 4: Interview Scheduling

Figure 53:
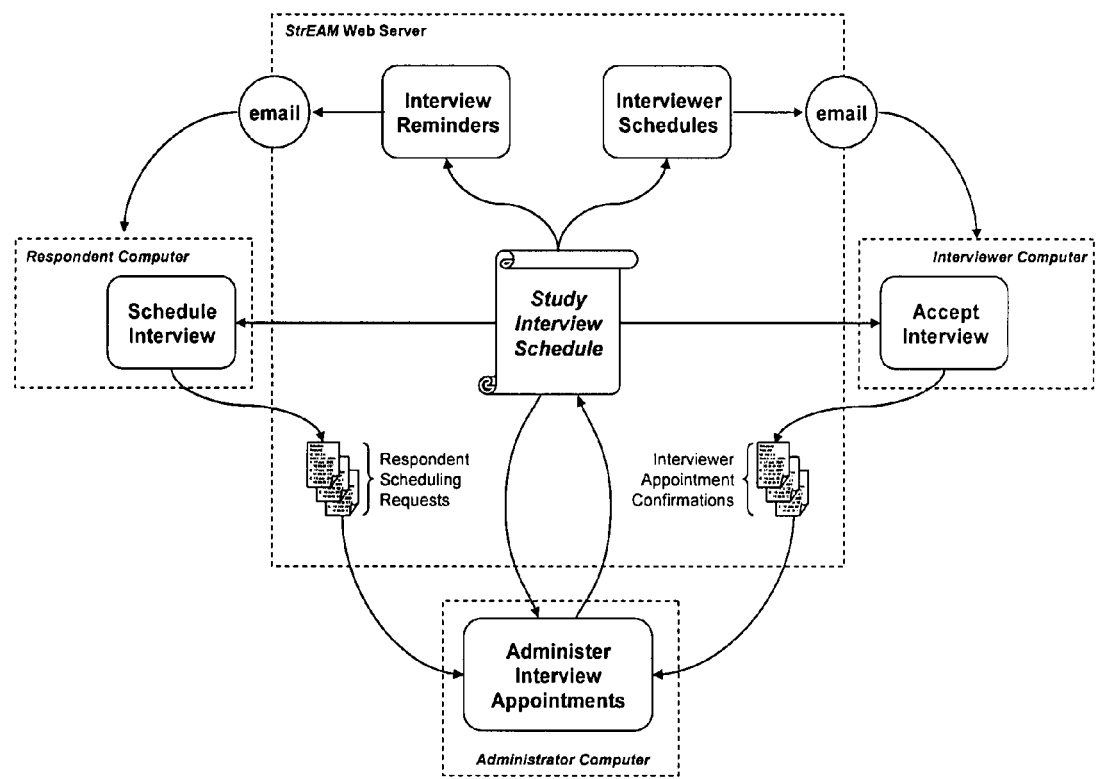
FIG. 53 shows a process flow diagram for scheduling a respondent's interview.

FIG. 53 shows a process flow diagram for scheduling a respondent's interview.

Step 5: Interview Scheduling

Interviewees are scheduled for an interview session. Note that if the automated interview subsystem 2913 is used such scheduling may be unnecessary.

Step 6: Respondent Set Up

A process is conducted prior to an interview session to assure that the interviewee can appropriately communicate via the network (Internet) during the interview session, and that the interviewee understands how the interview session is to be conducted.

Step 7: Conduct the interview session with the interviewee.

While various embodiments of the present invention have been described in detail, it is apparent that modifications and adaptations of those embodiments will occur to those skilled in the art. It is to be expressly understood, however, that modifications and adaptations are within the scope of the present invention, as set forth in the following claims.

APPENDIX A

Interview Definition Data (XML)

A description of the language used for defining an interview is given below. Overall, the definition of a StrEAM interview is contained within an interview definition element which may be described as follows:

| XML Element | Definition |
| --- | --- |
| <StrEAM-Interview-Definition> | This element contains the definition of a StrEAM interview. The contents of this element are used by the Interviewer application 2934 to drive a StrEAM*Interview session. |

A StrEAM-Interview-Definition in turn contains three (3) container sub-elements:

| XML Element | Definition |
| --- | --- |
| <header> | A <header> element is required and there can only be one. This contains a series of elements with information about the interview definition data 3110 itself. |
| <topics> | A <topics> element is also required and there can only be one. It is a container for any number of "interview topics" (as described hereinabove). That is, each interview topic defines a display for the "interview display window" (e.g., the display window shown in FIG. 32 having the subwindows 3206, 3212, 3218 and 3224) for presenting interview information via both the interviewer application 2934 and a respondent application 2938. |

Each of the above three XML interview definition elements is described hereinbelow.

Header Element

There are seven possible elements in the header section of a StrEAM*Interview Definition data 3110:

| XML Element | Definition |
| --- | --- |
| <interview-id> | Contains a String with a unique identifier for the interview. This element is required (and there can only be one). |
| <interview-title> | A String containing a short title to display for this interview. There must be one (and only one) <interview-title> element. |
| <description> | This element is a String that contains a full description for the interview. There must be one (and only one) <description> element. |
| <original-author> | This is a String that holds the user name of the original author of the interview definition. Only one <original-author> is allowed. It is not required. |
| <version> | This is a String that holds an optional version for the interview. |
| <modified-by> | This is a String element that will have the user name of the last person to modify this interview definition data 3110. |
| <last-modified> | This is a date/time stamp of the most recent modification to the interview definition data 3110. |

Topics Element

A StrEAM*Interview session includes a series of "topics". Each topic may include of some form of survey question or just some information to be displayed to the interview respondent. There are twenty-one different types of "topics" that may be included in a interview definition. Generally these may appear in any order, and with any desired frequency. The exceptions are the <opening-information> and <closing-information> elements which are used at the beginning and end (respectively) of every interview (only one occurrence of each).

The available types of StrEAM*Interview topics are defined by the following XML elements:

| XML Element | Definition |
| --- | --- |
| <general-information> <opening-information> <closing-information> <general-question> <expectation-question> <usage-question> <purchase-question> <image-question> <occasion-question> <consideration-question> <radio-question> | All topics, whether information-only or actual interview questions, can have one or more of the following attributes: resource = \|Flash file name\| reference-id = \|Reference question-id\| answer2 = \|Reference question-id\| answer3 = \|Reference question-id\| answer4 = \|Reference question-id\| answer5 = \|Reference question-id\| rotate-group = \|String\| topic-group = \|String\| |
| <rating-scale> <trend-scale> <preference-scale> <valence-scale> <chip-allocation> <ladder-question> <plus-equity-rating> <minus-equity-rating> <plus-equity-trend> <minus-equity-trend> | choice-group = \|String\| practice = \|Boolean\| |

There are several sub-elements that are common to all StrEAM*Interview topics. These are:

| XML Element | Definition |
| --- | --- |
| <display-text> | This element contains the text that will be displayed in the "display area" window of both the Respondent and Interviewer displays. This element is required for all interview topics (though the text can be blank). Only one <display-text> element is allowed per topic. Several attributes can be used with a <display-text> element. These are: font = \|Font name\| bold = \|Boolean\| italic = \|Boolean\| minSize = \|Integer >0\| maxSize = \|Integer >0\| |
| <interview-text> | This may contain a piece of text that will automatically be sent through the Interviewer's message box when the topic is displayed. There can be any number of <interviewer-text> elements (including none at all). Each will be sent in sequence. An <interview-text> element may have one attribute: clear = \|Boolean\| If set to True, then the Respondent's Interviewer instant message box will clear before the text in the <interview-text> element is sent. If missing, the default is False. |
| <interviewer-hints> | This may contain any number of <hint> elements. A <hint> element simply contains a text field that will be one of the possible pieces of text that will be displayed on the pop-up menu (and sent through the Interviewer message box if chosen). |
| <skip-when> | Each of these elements specifies a condition where the topic is not processed for this interview. The condition is the answer to a previous question. Any number of <skip-when> elements may be used (including none). Note that multiple <skip-when> elements combine in an OR relationship - if any of the conditions is met, the topic is skipped. A <skip-when> element MUST include this attribute: reference-id = \|question topic question-id\| this points at the reference question. The content of the <skip-when> element is the answer value that will trigger the condition. |
| <ask-when> | Each of these elements specifies a condition where the topic IS processed for this interview. The condition is the answer to a previous question. Any number of <ask-when> elements may be used (including none). Note that multiple <ask-when> elements combine in an OR relationship - if any of the conditions is met, the topic is asked. An <ask-when> element MUST include this attribute: reference-id = \|question topic question-id\| this points at the reference question. The content of the <ask-when> element is the answer value that will trigger the condition. |

Information Topic Elements

Several XML elements of the interview definition language exist to define interview topics that are not questions, but just display information for the respondent. No response is required from the respondent (though a conversation may take place through the instant messaging windows). These elements are defined below:

| XML Element | Definition |
| --- | --- |
| <general-information> <opening-information> <closing-information> | These three elements are all information-only topics. Opening-information and closing-information elements enable special functionality for the starting and finishing topic of an interview. There are no attributes or sub-elements unique to these information topics, those defined earlier which are available for the XML elements described here. |

Question Topic Elements

All other interview definition topic elements define interview questions that have a built-in expectation of a response from the respondent. As such, each of these puts the interviewer's interview application 2934 into a mode expecting a response from the respondent, such that the response can be recorded when it is received.

The interview question topics break down into four (4) basic categories:

| | |
| --- | --- |
| Simple Questions | where an open-ended, text response is expected<br><general-question>    <image-question><br><expectation-question>  <occasion-question><br><usage-question>      <consideration-question><br><purchase-question> |
| Radio Questions | where the respondent selects a response from multiple choices<br><radio-question>    <preference-scale><br><rating-scale>      <valence-scale><br><trend-scale> |
| Chip Allocations | where the respondent distributes a fixed number of units (chips) across multiple choices<br><chip-allocation> |
| Ladder Questions | where the interviewer engages the respondent in a conversation to elicit an in-depth, four-level ladder response<br><ladder-question>   <plus-equity-trend><br><plus-equity-rating>  <minus-equity-trend><br><minus-equity-rating> |

Simple Question Elements

Several types of "simple", open-ended questions are currently allowed. Each simply elicits an open-ended response from the respondent, which is typically saved verbatim by the interviewer. Each of the simple question elements has an identical structure:

| XML Element | Definition |
| --- | --- |
| <general-question><br><expectation-question><br><usage-question><br><purchase-question><br><image-question><br><occasion-question><br><consideration-question> | id = \|String\| |

All simple questions may include the following sub-elements:

| XML Element | Definition |
| --- | --- |
| <label> | This element is required and gives the question a label for display purposes in various StrEAM tools (rather than the <display-text> element). |
| <SPSS-variable> | This element is required and gives a name to be used for the answer to this question when results are exported to SPSS. This string will be used as an SPSS "Variable Label". |
| <answer-hints> | <hint> |

Radio Question Elements

A StrEAM Radio Question is a multiple choice question, where the respondent is presented with several options and is required to select one (and only one).

| XML Element | Definition |
| --- | --- |
| <radio-question><br><rating-scale><br><trend-scale><br><preference-scale><br><valence-scale> | id = \|String\|<br>randomize = \|Boolean\| |

Each Radio Question element can contain the following sub-elements:

| XML Element | Definition |
| --- | --- |
| <label> | This element is required and gives the question a label for display purposes in various StrEAM tools (rather than the <display-text> element). |
| <SPSS-variable> | This element is also required and gives a name to be used for the answer to this question when results are exported to SPSS. This string will be used as an SPSS "Variable Label". |
| <answer-option> | At least one of these elements is required. Each <answer-option> defines one of the alternatives that the respondent will have to choose from as an answer to the question.<br>answer = \|String\|<br>label = \|String\|<br>reference-text = \|String\|<br>SPSS-value = \|Integer\| |
| <drop-choice> | reference-id = \|String\| |

Chip Allocation Element

Chip Allocation questions enable a StrEAM interviewer to present a respondent with a series of options to elicit a response about the relative weighting of those options in response to some question. Currently this is done by presenting a set of 10 chips and the respondent distributes those 10 chips across the options presented.

| XML Element | Definition |
| --- | --- |
| <chip-allocation> | id = \|String\|<br>randomize = \|Boolean\|<br>total-chips = \|0 < Integer < 11\| |

Chip Allocation elements contain the following sub-elements

| XML Element | Definition |
|---|---|
| <label> | This element is required and gives the question a label for display purposes in various StrEAM tools (rather than the <display-text> element). |
| <allocation-option> | One (or more) of these elements are required. Each defines an option that will be presented to the respondent and may possibly have chips allocated to it. The following attributes are required for each <allocation-option>.<br>id = \|String\|<br>label = \|String\|<br>reference-text = \|String\|<br>SPSS-variable = \|String\| |

Ladder Question Element

The interview definition language supports several forms of Ladder Questions. They all define an interaction between the respondent and interviewer in which an answer in the form of a multi-level "ladder" is elicited in response to some question.

| XML Element | Definition |
|---|---|
| <ladder-question><br><plus-equity-rating><br><minus-equity-rating><br><plus-equity-trend><br><minus-equity-trend> | id = \|String\| |

All of these ladder type question elements can have sub-elements as follows:

| XML Element | Definition |
|---|---|
| <label> | This element is required and gives the question a label for display purposes in various StrEAM tools (rather than the <display-text> element). |
| <SPSS-variable> | This element is also required and gives a name to be used for the answer to this question when results are exported to SPSS. This string will be used as an SPSS "Variable Label". |
| <value-hints><br><psychosocial-hints><br><functional-hints><br><attribute-hints> | Each of these elements defines a set of "hints" for the respective ladder level (attribute, functional consequence, psychosocial consequence, and value). Within each of these there can be any number of <code> sub-elements. A <code> element has one attribute:<br>id = \|String\|<br>that identifies the StrEAM*analysis code (if any) for that "hint". The content of the <code> element itself is the verbatim text that will be inserted into the respective ladder element box (if it has no content already). |

APPENDIX B

Interview Result File XML Description

The following is a description of the data format for the interview result files 3118. The results of a single interview session are contained within a <StrEAM-Interview-Session> element that can be described as follows:

| XML Element | Definition |
|---|---|
| <StrEAM-Interview-Session> | This element contains the results of interview session. The contents of a <StrEAM-Interview-Session> element are written out (to the interview subsystem server 2910) by the interviewer application 2934 during an interview session. |

Note that when interview results are approved and promoted for subsequent analysis (e.g., via the StrEAM analysis subsystem 2912), multiple <StrEAM-Interview-Session> elements are, in one embodiment, combined together into a single StrEAM*analysis model database 2950 (FIG. 39) wherein this database may be a single file and the combining may be a concatenation operation.

An <StrEAM-Interview-Session> element in turn contains three main container elements:

| XML Element | Definition |
|---|---|
| <header> | A <header> element is required, and there can only be one per interview result file 3118. Each <header> element contains a series of elements with information about the interview session that was conducted. |
|  | A  element is also required, and there can only be one per interview result file 3118. Each  element is a container for any number of interview <answer> elements. Each <answer> element contains the results of a single interview question topic. |
| <footer> | A <footer> element is required, and there can only be one per interview result file 3118. Each <footer> element contains a few sub-elements with information about the termination of an interview session. |

In one embodiment, there are eleven possible sub-elements elements in an interview result <header> element.

| XML Element | Definition |
| --- | --- |
| <study-id> | A String with the unique identifier for the StrEAM research study for which this interview session was conducted. There must be one (and only one) <study-id> element per interview result file 3118. |
| <session-id> | This element is a String that contains a unique identifier for the interview session. This identifier is provided by the StrEAM*Project subsystem 2916 (FIG. 30). There must be one (and only one) <session-id> element per interview result file 3118. |
| <start-date-time> | This element records the date and time when the corresponding interview session began. There must be one (and only one) <start-date-time> element per interview result file 3118. |
| <interviewer-id> | This element is a String having the unique identifier of the interviewer that conducted this interview. This ID is provided by the StrEAM*Project subsystem 2916. There must be one (and only one) <interviewer-id> element per interview result file 3118. |
| <interviewer-screen-name> | The screen name used by the interviewer for this interview session is contained in this String element. This name is provided by the StrEAM*Project subsystem 2916. There must be one (and only one) <interviewer-screen-name> element per interview result file 3118. |
| <interviewer-ip-address> | The IP address (more generally, network address) of the interviewer's computer 2936 is recorded in this element. This element is detected by the interview manager 3126 (FIG. 29). There must be one (and only one) <interviewer-ip-address> element per interview result file 3118. |
| <respondent-id> | This is a String element having a unique identifier for the respondent in the interview session. This element is provided by the StrEAM*Project subsystem 2916. There must be one (and only one) <respondent-id> element per interview result file 3118. |
| <respondent-screen-name> | This element stores the screen name used by the respondent for the interview session. The screen name is stored as a String data type. The name is provided by the StrEAM*Project subsystem 2916. There must be one (and only one) <respondent-screen-name> element per interview result file 3118. |
| <respondent-ip-address> | The IP address of the respondent's computer is recorded in this element. This is detected by the interview manager 3126 (FIG. 29). There must be one (and only one) <respondent-ip-address> element per interview result file 3118. |
| <definition-filename> | This element is a String containing the pathname of the interview definition data 3110 used when conducting the interview. There must be one (and only one) <definition-filename> element per interview result file 3118. |
| <resource-filename> | This element is a String containing the pathname to the Flash ® Interview Resource data 3114 used when conducting the corresponding interview. There must be one (and only one) <resource-filename> element per interview result file 3118. |

The results of each interview session conclude with a <footer> element that reports information available at the end of the interview session. The <footer> element includes the following elements.

| XML Element | Definition |
| --- | --- |
| <termination-status> | This element is a String that indicates the status at the termination or conclusion of the interview session. This element is used to keep track of whether an interview session was run to completion or was only partially complete for some reason. Possible values are:<br>1 'COMPLETED'<br>2 'INTERRUPTED'<br>3 'SUSPENDED'<br>There must be one (and only one) <termination-status> element per interview result file 3118. |
| <end-date-time> | The actual date and time the interview session is concluded (from the Interviewer's perspective) is recorded in the <end-date-time> element.<br>There must be one (and only one) <end-date-time> element per interview result file 3118. |
| <session-duration> | The duration of the interview session is recorded in (as HH(hours):MM(minutes):SS(seconds)) in this element.<br>There must be one (and only one) <session-duration> element per interview result file 3118. |

The <result> element includes all of the answers recorded for questions in a corresponding interview session. Each <result> element includes a series of <answer> sub-elements as described below:

| XML Element | Definition |
| --- | --- |
| <answer> | A <result> element may contain any number of <answer> elements. There should be one of these <answer> elements for each question topic that was actually asked during an interview session. |

-continued

| XML Element | Definition |
| --- | --- |
| | Note that questions that are skipped do NOT have a corresponding <answer> element, and information-only topics also do not have a corresponding <answer> element. Also interview topics that have been marked as Practice = 'True' also do not have answers recorded since such topics and corresponding questions are practice topics and questions for acquainting a respondent with the techniques for properly responding during an interview session. |

Each <answer> element may contain the following sub-elements.

| XML Element | Definition |
| --- | --- |
| <question-id> | This element is a String that contains the identifier of the question for which this <answer> applies. The identifier is the id attribute from the question element in the interview definition data 3110.<br>There must be one (and only one) <question-id> element per <answer> element. |
| <elaboration-index> | In the case of elaboration questions (where a set of questions/answers are generated), the present element contains the index of the generated question to which a response is obtained as the present <answer> element. Note that an elaboration process generates multiple questions at interview time, one question for each member of a previous multi-valued answer. The result of an elaboration process includes questions for each member of a set-generation question answer or each element of a ladder question response.<br>When there was no elaboration, this element will have the value of 0.<br>There must be one (and only one) <elaboration-index> element per <answer> element. |
| <question-type> | This element is a String that records the type of question for which this <answer> was a response to. The <question-type> is the topic element type from the corresponding interview definition data 3110.<br>There must be one (and only one) <question-type> element per <answer> element. |

| XML Element | Definition |
|---|---|
| <reference-question-id> | This element is a String containing a reference question id (if any) that was used in the asking of this question. The present element can be the question-id of any preceding question topic in the interview definition. |
| <display-text> | This element is a String that contains the text displayed (in the Display window) when this question was answered. Note that the <display-text> is recorded with any string substitutions made as they were at the time this question was displayed for this interview session at hand. There must be one (and only one) <display-text> element per <answer> element. |
| <interviewer-text> | There can be as many <interviewer-text> elements as there were at the time the question was asked during the interview (including none). Each one is a string that records the text that was sent (as part of the interview definition) when the question at hand was asked. Note that the <interviewer-text> strings are recorded with any string substitutions made as they were at the time this question was asked. |
| <radio-response> <simple-response> <ladder-response> <chip-allocations> | Each <answer> element contains one (and only one) of these four (4) answer type sub-elements. They are for (respectively): 4 radio (multiple-choice) questions 5 simple (open-ended) questions 6 ladder questions 7 chip allocation questions |

Simple Response Element

As befits the name, a <simple-response> element contains one (and only one) sub-element:

| XML Element | Definition |
|---|---|
| <response> | The value of the <response> element is an unstructured text String that contains the open-ended response given to this question. |

Radio Response Element

A <radio-response> element contains simply one (and only one) sub-element that indicates the choice made by the respondent:

| XML Element | Definition |
|---|---|
| <choice> | The <choice> element identifies the answer that was given for a Radio Question. The <choice> value is the answer attribute of the <answer-option> chosen. |

Chip Allocations Element

A <chip-allocation> element will contain one or more <allocation> sub-elements. Where there is an <allocation> sub-element for each possible option that the respondent may allocate chips to.

| XML Element | Definition |
|---|---|
| <allocation> | There is one of these elements for each item that can be allocated chips in the question. Note that even items that are given zero chips have an <allocation> element in the answer. The content of the <allocation> element is an integer (between 0 and the total number of chips, inclusive). This is the number of chips that the respondent allocated to that item. |

| XML Element | Definition |
|---|---|
| | Each <allocation> element as an attribute: id = |String| this is the id of the <allocation-option> element of the interview definition for which this allocation of chips corresponds. |

Ladder Response Element

The result for a ladder question consists of a <ladder-response> element that contains individual <ladder-element> sub-elements.

| XML Element | Definition |
|---|---|
| <ladder-element> | There is one of these elements for each ladder level element that is collected in response to a ladder question. There can be between one (1) and six (6), inclusive, ladder elements for each ladder. Note that ladder responses produced by the StrEAM*Interview system should ALWAYS have at least four (4) ladder elements (at least one for each level). The content of a <ladder-element> is the actual verbatim text given by the respondent for that portion of the ladder response. Each <ladder-element> will have all of the following four (4) attributes: interview-level = |Ladder level| interview-code = |String| current-level = |Ladder level| current-code = |String| |

APPENDIX C

Analysis Configuration (XML) Database 2980 Data Implementation

The StrEAM*analysis configuration database 2980 may be a plain text file, in one embodiment, using an XML-based syntax. This syntax defines each of the StrEAM*analysis configuration items described in the Analysis Configuration Database section hereinabove. The format of such a configuration database (file) 2980 is described below.

| XML Element | Definition |
| --- | --- |
| <StrEAM-Analysis-Configuration> | This element is the overall container for the various definitions to be used during analysis. Typically there will be one configuration database/file 2980 per StrEAM object research assessment or study, though it is possible that different configuration databases/files 2980 could be used with the same data to provide different views of it. |

The <StrEAM-Analysis-Configuration> element in turn can contain the following sub-elements:

| XML Element | Definition |
| --- | --- |
| <header> | A <header> element is required and there can only be one. This contains a series of elements with information about the configuration database/file 2980 itself. |
| <code-set> | There can be a <code-set> for each non-ladder, qualitative question, as well as one each for the four ladder levels. Each <code-set> will define codes to be used for those answers (ladders and other qualitative questions). |
| <question-group> | There can be any number of <question-group> elements. Each one defines a group that includes one or more Ladder questions to be analyzed together. |
| <data-filter> | There can be any number of <data-filter> elements. Each defines a condition under which an interview will be included in a data set for analysis. |
| <mention-report> | There can be any number of <mention-reports>. Each defines a report format that will generate statistics regarding the use of codes in any subsection of the analysis data. |
| <decision-modeling> | There can only be one <decision-modeling> element. This contains a series of default settings for the decision analysis tool 3996 when using this configuration database/file 2980. |
| <export-list> | An <export-list> defines the data items (and their order) to be exported to SPSS by StrEAM*analysis subsystem 2912. There may be any number of <export-list> elements. Note that while syntactically an analysis configuration database/file 2980 can have no <export-list> elements, it is necessary to have at least one in order to perform data exports from StrEAM*analysis subsystem 2912. |
| <footer> | A <footer> element is required and there can only be one. |

Header Element

There are six (6) possible sub-elements elements in a StrEAM*Analysis Configuration <header> element.

| XML Element | Definition |
| --- | --- |
| <study-id> | This element contains a String that is the unique identifier identifying the object research for which the present configuration database/file 2980 is to be used. |
| <study-title> | This is a String that holds the short title for identifying the object research for which the present configuration database/file 2980 is to be used. |
| <description> | A String element that contains a full description of the analysis configuration database/file 2980 itself. |
| <modified-by> | This element is a String with the user name of the person who most recently modified the analysis configuration database/file 2980. |
| <last-modified> | This is a Date/Time stamp of the last time that the analysis configuration database/file 2980 was modified (by a StrEAM tool) |
| <idefml-file> | A String element containing the pathname of the StrEAM*Interview Definition data 3110 corresponding to this analysis configuration database/file 2980. |

Code Sets 3942 (also Denoted Code Set Elements)

A <code-set> element is a container for a series of codes to be used to quantify the responses to a qualitative StrEAM*Interview question. There must be one <code-set> defined for each ladder level (attribute, functional consequence, psychosocial consequence, and value). There can also be a <code-set> defined for any other qualitative (open-ended) questions as well.

| XML Element | Definition |
| --- | --- |
| <code-set> | There may be any number of <code-set> elements 3942 in an analysis configuration database/file 2980. However, there must typically be at least four, one each for coding ladder levels. The following 2 attributes are on all <code-set> elements: type = \|String\| where the String is either "ladder" or "question". In the case of "ladder", this code set is for ladder elements. In the case of "question" this code set is for a general open-ended question. target = \|String\| where the String is either "attribute", "functional", "psychosocial", or "value" when the type = "ladder", indicating which ladder level the Code Set is for. Otherwise, if type-"question" then String is the question-id of the open-ended question which the Code Set is targeted at. |

Within a <code-set> element, there may be any number of <code> sub-elements. There always should be at least one.

| XML Element | Definition |
| --- | --- |
| <code> | This element defines a specific Code to be used for coding qualitative data. The Code is used within the Code Set it appears in. However, to avoid confusion, the actual code is unique within the whole analysis configuration database/file 2980 (all Code Sets). The following attributes appear on <code> elements: id = \|String\| This attribute is required and is the Code itself. analyze = \|Boolean\| This (optional) attribute indicates whether an answer (or ladder element) given this code should be considered at analysis time. By default, this is True. The use of False for this attribute is for special codes indicating an item that is not useful. |

Then each <code> definition will include the following sub-elements:

| XML Element | Definition |
|---|---|
| <code-title> | This element contains a String that is the short title for this code. This title is what will be displayed in reports and various StrEAM*analysis tools. |
| <description> | This element contains a String that is a long description for this code. This is for documentation (and explanation purposes). The description is not displayed on reports. |

Question Group 3954 Element(s)

There may be any number of <question-group> elements 3954 in an analysis configuration database (file) 2980, as defined below. Note that question groups 3954 are not mutually exclusive. Interview questions may appear in any number of question groups 3954. In order for a question to be accessed during analysis, it must appear in at least one question group 3954.

| XML Element | Definition |
|---|---|
| <question-group> | There can be any number of <question-group> elements in an Analysis Configuration database/file 2980. Each defines a grouping of ladder questions for decision segmentation analysis (DSA, cf. Definitions and Descriptions of Terms section above) via the decision analysis tool 3996. Each <question-group> element has an attribute: id = \|String\| which is the identifier for the question group 3954. Note that while it is legal for an analysis configuration database (or file) 2980 to have no question groups 3954 defined, there must - in fact - be at least one in order to conduct an analysis. |

Within each <question-group> 3954 is the following sub-elements:

| XML Element | Definition |
|---|---|
| <group-title> | There is one (and only one) of these elements for each Question Group. This contains a short title for the question group 3954 for display purposes. |
| <description> | Each question group 3954 must have one (and only one) <description> element that contains a full description of the question group and its purpose. |
| <question> | A <question> element exists for each Interview Question to be included in the question group 3954. There must be at least one <question> defined for a question group 3954. Also, questions cannot be repeated within a question group 3954. They can, however, appear in multiple question groups 3954. Each <question> element has an attribute: id = \|String\| which is the <question-id> of the question. The content of the <question> element is actually the <display-text> of the question. This is used for display purposes. |

Data Filter 3958 Element(s)

Data filters 3958 are used to select a subset of an analysis model database 2950 for examination. Such data filters 3958 identify certain questions (and their answers) that will be used to select interviews from the analysis model database 2950.

| XML Element | Definition |
|---|---|
| <data-filter> | Each of these elements defines a data filter 3958 which can be applied to select only those interviews in an analysis model database 2950 that meets certain conditions. There can be any number of data filters 3958 defined in an analysis configuration database 2980. Note that there must be at least one, however, to conduct an analysis of interview data. Typically, there should at least be an "All Interviews" filter set up, wherein such a filter allows all interviews to be selected. The "All Interviews" data filter 3958 must be provided in the analysis configuration database 2980, but requires no further definition Each <data-filter> element has an attribute: id = \|String\| which is the identifier for the data filter 3958. |

Each data filter 3958 definition (except for the special "All Interviews" filter) will include the following sub-elements:

| XML Element | Definition |
| --- | --- |
| <filter-title> | This is a string of text that serves as a short title for the Data Filter 3958. This is used for display purposes. There must be one of these elements (and only one). |
| <description> | This is a full description for the Data Filter 3958. There must be one of these elements (and only one). |
| <question> | The <question> sub-element identifies a question to be used as a filter. There must be at least one <question> listed in a Data Filter 3958 (except in the special "all" filter). There is no limit to the number of <question> elements that can be included (though questions can not be repeated in a single Data Filter 3958). Each <question> element has an attribute: id = \|String\| which is the question-id of the referenced interview question. Each <question> element will then contain several sub-elements itself, including the valid answers that will be used. |

Each <question> element in turn will contain the following sub-elements:

| XML Element | Definition |
| --- | --- |
| <display-text> | One (and only one) of these elements must be present. This is simply the <display-text> from the interview question. It is repeated in the Data Filter 3958 definition for display purposes. |
| <include> | The <include> sub-element defines an answer value for the criteria question that will be selected by the Data Filter 3958. There can be an unlimited number of these <include> sub-elements. There always must be at least one. Each <include> question has an attribute: answer = \|String\| which is an answer value for this question to be included by this Data Filter 3958. The content of the <include> element itself is the <label> of the answer (in the cases of Radio Question answers). |

Mention Report 3986 Element(s)

Each <mention-report> element hereinbelow defines a StrEAM*analysis Code Mention report 3986 as follows:

| XML Element | Definition |
| --- | --- |
| <mention-report> | One of these elements identifies a specific Code Mention Report 3986 definition. An analysis configuration database 2980 may include any number of <mention-report> elements, including none. Each <mention-report> element has an attribute: id = \|String\| which is an identifier for the report. |

A <mention-report> definition will then include the following sub-elements:

| XML Element | Definition |
| --- | --- |
| <report-title> | This is a String that contains the short title for the report 3986. This title will be displayed in the StrEAM*analysis tools and will be displayed in the header of the mention report 3986 itself. |
| <description> | A String that holds a full description of the report and its purpose. |
| <column> | Any number of <column> elements can exist (at least one is required for a valid report). Each of these <column> elements defines a column in the mention report 3986 output. |

Each <column> sub-element, in turn, contains the following elements:

| XML Element | Definition |
| --- | --- |
| <heading> | This is a String that contains the heading to be displayed at the top of the column in the report 3986. |
| <data-filter> | A String that contains the unique identifier of the Data Filter 3958 to be used to select the data for this column. Note that the <data-filter> is applied on top of any selection criteria already applied to determine the data set in use for the report 3986. |

Decision Analysis Tool 3996 Parameters

The <decision-modeling> section may contain any of the elements listed below.

| XML Element | Definition |
|---|---|
| <implication-threshold> | Each of these elements can specify a default value for the decision analysis tool 3996 (FIG. 39) via a corresponding analysis configuration database (file) 2980. All of these parameters are defined in detail in the section herein that describes decision segmentation analysis (DSA, cf. Definitions and Descriptions of Terms section above). Any defaults specified in the analysis configuration database (file) 2980 may be overridden, but if no such action is taken, then the values in the <decision-modeling> section of the analysis configuration database (file) 2980 are used to drive the |
| <implications-included> | |
| <ladders-threshold> | |
| <knowledge-threshold> | |
| <matching3-threshold> | |
| <strength-threshold> | |
| <assignable-threshold> | |
| <assignable-limit> | |
| <assignable-increment> | |
| <minimum-seeds> | |
| <maximum-seeds> | |
| <max-strength-decrease> | |
| <map-2-chains> | |
| <map-3-chains> | |
| <map-4-chains> | |
| <map-5-chains> | |
| <map-6-chains> | |
| <map-7-chains> | |

| XML Element | Definition |
|---|---|
| <map-8-chains> | decision segmentation analysis (DSA) processing. |
| <map-9-chains> | |

Export List 3962 Element

The <export-list> element defines a single, named, "Export List" item. An Export List 3962 is used to determine the data to be exported in tools like the export to the statistical package, SPSS®. Any number of Export List items can be defined.

| XML Element | Definition |
|---|---|
| <export-list> | Each of these elements defines a named Export List 3962. An analysis configuration database (file) 2980 may include any number of <export-list> elements, including none.<br>Each <export-list> element has the required attribute:<br>    id = \|String\|<br>which is a name for the export list. |

Each <export-list> element will contain the following sub-elements:

| XML Element | Definition |
|---|---|
| <list-title> | This is a String that contains a short title that will be displayed in reference to the Export List 3962. |
| <description> | A String that a full description of the Export List 3962 and its intended purpose. |
| <item> | Each <item> element indicates a data item to be exported. There may be any number of <item> elements, though it will be limited by the number of questions in an interview. The StrEAM*analysis tools will only allow a question to be exported once in a list.<br>Each <item> has the following required attributes:<br>    sequence = \|Integer\|<br>which is a positive, non-zero, number indicating the position in which to export this data item<br>    type = "standard" OR "question"<br>which indicates the type of the data item to be exported. A "question" <item> type indicates that it is the response to an interview question that should be exported. A "standard" <item> type indicates that the data item is one of the fixed pieces of interview information —like the session ID.<br>The content of the <item> element itself indicates the data associated with the item to be exported.<br>In the case of a "question" <item> type, the content will be the <question-id> of the response to be exported.<br>In the case of a "standard" <item>, the content will be one of the following labels. Each indicates a standard piece of interview session information. Below are the possible choices for "standard" <item> elements:<br>    session-id<br>    start-date-time<br>    interviewer-id<br>    interviewer-screen-name<br>    interviewer-ip-address<br>    respondent-id<br>    respondent-screen-name<br>    respondent-ip-address<br>    termination-status<br>    end-date-time<br>    session-duration |

APPENDIX D

StrEAM* analysis Model Database 2950 Data Implementation

Part of the data used during StrEAM*analysis subsystem 2912 processing is contained in an analysis model database 2950 (FIGS. 29 and 39). This may be a plain text file with its own XML-based syntax. The bulk of each analysis model database 2950 is the results of the interview sessions (i.e., interview session data 3932 for a market or object research being conducted), wherein such results have been promoted, from their individual files that were saved in the interview content database 3930 (FIG. 29). Other contents of the analysis model database 2950 include header information (e.g., title of the analysis model, description of the analysis model, modification information, etc.) about the analysis model database 2950, and the results of decision segmentation analysis (DSA, cf. Definitions and Descriptions of Terms section above) as performed by the decision analysis tool 3996.

The result of each StrEAM*analysis decision segmentation analysis is stored in a StrEAM*analysis model database 2950 in the form of a decision model 3944 (FIG. 39). For each decision model 3944, the mappings of each ladder 3995 represented by the solution maps 3940 of the decision model are included in the solution maps.

Below is a detailed description of the XML-based syntax contained in a StrEAM*analysis Model database 2950.

| XML Element | Definition |
| --- | --- |
| <StrEAM-Analysis-Model> | This element is the overall container for the StrEAM*analysis database 2950. |

An analysis model element in turn contains the following sub-elements:

| XML Element | Definition |
| --- | --- |
| <header> | A <header> element is required and there can only be one. This contains a series of elements with information about the corresponding configuration database (file) 2980 itself |
| <decision-model> | This element describes a complete set of decision segmentation analysis solutions. That is a set of Solution Maps given a specific set of data and set of analysis parameters. |
| <interview-session> | Each <interview-session> element contains the results of a StrEAM*Interview session as described in the StrEAM*Interview Result XML. In an Analysis Model, though, the results from an individual interview session are contained in an <interview-session> element rather than a <StrEAM-Interview-Session> element.<br>There can be any number of <interview-session> elements in an Analysis Model. If there aren't any, however, the model cannot be used for analysis.<br>In the context of an Analysis Model, an <interview-session> element may also include the results of Decision Segmentation Analysis for ladders contained in that session. The form of the results of Decision Segmentation Analysis is documented below (Ladder Mappings). |
| <footer> | A <footer> element is required and there can only be one. At this time no footer elements have been implemented. It is only a placeholder for potential future use. |

Header Element

There are nine (9) possible sub-elements elements in a StrEAM*analysis model <header> element.

| XML Element | Definition |
| --- | --- |
| <study-id> | A string containing the unique identifier for the study that this Analysis Model database 2950 is used for. |
| <study-title> | A string containing the short title for the study this Analysis Model is for. |
| <description> | A string with a description of the Analysis Model database 2950. |
| <modified-by> | A string with the user name of the last person to modify this Analysis Model database 2950. |
| <last-modified> | The data and time of the most recent modification of this Analysis Model database 2950. |
| <version> | A string with a version indicator for this Analysis Model database 2950 that may be used to track changes made. |
| <status> | A string indicating the current status of the contents of this Analysis Model database 2950. |
| <idefml-file> | The pathname to the StrEAM*Interview Definition data 3110 that corresponds to the interview results in this Analysis Model database 2950. |
| <configuration-file> | The StrEAM*analysis configuration database (file) 2980 that corresponds to the analysis-related data in this analysis model database 2950. |

Decision Model Element

The results of StrEAM*analysis decision segmentation analysis (DSA, cf. Definitions and Descriptions of Terms section above) are stored in a StrEAM*analysis model database 2950 in the form of a decision model(s) 3944 (FIG. 39) and the mappings on each ladder 3995 for the solution maps in that decision model. In one embodiment, the information in each decision model 3944 may be contained in a <decision-model> element as described below. There may be any number of <decision-model> elements in an analysis model database 2950 (including none at all).

| XML Element | Definition |
| --- | --- |
| <decision-model> | There can be any number of <decision-model> 3944 entries in an analysis model database 2950. Each defines a group of solutions generated by the decision analysis tool 3996 as shown in FIG. 39. Each <decision-model> element has an attribute:<br>id = \|String\|<br>which is the identifier for the Decision Model |

The <decision-model> element contains the following sub-elements:

| XML Element | Definition |
| --- | --- |
| <description> | A description of a Decision Model 3944. |
| <last-modified> | The date and time that this Decision Model 3944 was last updated. |
| <question-group> | The ID of the Question Group being used to define the Data Set used for this Decision Model 3944. |
| <data-filter> | The ID of the Data Filter in effect to define the Data Set used for this Decision Model 3944. |
| <implication-threshold><br><implications-included><br><ladders-threshold><br><knowledge-threshold><br><matching3-threshold><br><minimum-seeds><br><maximum-seeds><br><assignable-threshold><br><strength-threshold><br><max-strength-decrease> | These are the modeling parameters that are used to generate the decision model 3944. The decision segmentation analysis process records the parameters in effect when the solutions for the decision map are generated. These are described in detail elsewhere in the present disclosure. |
| <solution-map> | A <solution-map> element contains a specific solution map 3940. There can be up to eight (8) solution maps 3940 in a decision model 3944. |
| <initial-chain-map> | This is a special solution map 3940 that contains a list of the initial "seed" cluster chains generated by and used during the Decision Segmentation Analysis processes. There can only be one of these in a decision model 3944. |

The <solution-map> sub element contains information detailing a specific solution (map of cluster chains). The <solution-map> element is described below. Note that the <initial-chain-map> is of the same form as the <solution-map> element, however it does not represent an actual solution, but rather some important interim results that might be of interest later.

| XML Element | Definition |
| --- | --- |
| <solution-map><br>OR<br><initial-chain-map> | These elements contain a list of cluster chains that define solution maps 3940. In the case of <initial-chain-map>, this is the set of potential cluster chains generated as "seeds" and used to find optimal solution maps. The other <solution-map> elements are the optimal solutions found for each dimension setting (2 chains, 3 chains, etc.).<br>Either of these two element types have the following attributes:<br>id = \|String\|<br>which is the identifier for the solution map.<br>dimensions = \|Integer > 0\|<br>which is the number of "dimensions" in the solution (number of cluster chains contained therein).<br>These elements contain some number of <cluster-chain> sub-elements. |

Each solution map XML element (of either type) in turn contains a series of <cluster-chain> elements. These are the ladder code sequences (pseudo-ladders) that represent a particular solution to the Decision Segmentation Analysis. In the case of an <initial-chain-map> element, the cluster chains are not a solution, but list of "seed" chains used to find the solutions maps 3940 in the decision model 3944.

| XML Element | Definition |
|---|---|
| <cluster-chain> | Contains a list of codes that define a Chain (code sequence). Note that there as many <cluster-chain> elements as there are dimensions specified in the Solution Map.<br>Each <cluster-chain> element has an attribute:<br>id = \|String\|<br>which is an identifier for the Cluster Chain |

A <cluster-chain> element is made up of a list of codes. These are defined in <code> sub-elements. There can be up to six (6) <code> elements in a <cluster-chain>. For solutions generated by StrEAM*analysis Decision Segmentation, there will always be at least four (4) codes (one for each ladder level).

| XML Element | Definition |
|---|---|
| <code> | This element contains a Code (a Ladder code from the Analysis Configuration).<br>For convenience, the level of that code is specified as an attribute of each <code> element:<br>Level = \|String\|<br>where String is either "attribute", "functional", "psychosocial", or "value" |

Interview Session Element

An analysis model 2950 contains <interview-session> elements which hold the interview results used for analysis (i.e., the interview session data 3932). As noted earlier, most of interview session data 3932 is exactly as described in the StrEAM*Interview Result XML documentation.

The difference, in an Analysis Model, is that the ladder results contained in Interview Sessions may also contain the results of Decision Segmentation Analysis. Such results are represented in the form of <ladder-mapping> elements. There will be one <ladder-mapping> element for each decision model 3944 that a ladder result participates in'.

Therefore, each <ladder-response> element may contain one or more <ladder-mapping> elements as defined below:

| XML Element | Definition |
|---|---|
| <ladder-mapping> | Contains the result of how the ladder was mapped by the solutions in a specific Decision Model 3944. There can be any number of these elements within a <ladder-response>.<br>Each <ladder-mapping> element has an attribute:<br>decision-model = \|String\|<br>which is the ID of the Decision Model that this mapping is part of. |

Within each <ladder-mapping> element is a series of individual <mapping> sub-elements. These specify how the ladder was mapped in the Solution Maps for the Decision Model 3944. There are as many <mapping> sub-elements as there are Solution Maps in the Decision Model (note that this does NOT include the Initial Chain Map).

| XML Element | Definition |
|---|---|
| <mapping> | Defines how a ladder is mapped by a specific Solution Map. The content of a <mapping> element is the ID of the Cluster Chain in the Solution Map that the ladder was assigned to[2]. If the ladder did NOT get assigned to a Cluster Chain in this Solution Map, the content will be "0". Each <mapping> element has an attribute:<br>solution = \|String\|<br>which is the ID of the Solution Map that this mapping corresponds to. |

[1]Participation is a result of a ladder response qualifying under the Question Group used and the Interview Session itself qualifying under the Data Filter used.
[2]The notion of "assingning" a ladder to a Cluster Chain is defined elsewhere in the StrEAM*Analysis documentation.

APPENDIX E

Naïve Bayesian Description

Abstractly, the probability model for a classifier is a conditional model $$p(C|F_1, \ldots, F_n)$$

over a dependent class variable C with a small number of outcomes or classes, conditional on several feature variables $F_1$ through $F_n$. The problem is that if the number of features n is large or when a feature can take on a large number of values, then basing such a model on probability tables is infeasible. We therefore reformulate the model to make it more tractable.

Using Bayes' theorem, we write $$p(C \mid F_1, \ldots, F_n) = \frac{p(C) p(F_1, \ldots, F_n \mid C)}{p(F_1, \ldots, F_n)}.$$

In practice we are only interested in the numerator of that fraction, since the denominator does not depend on C and the values of the features $F_i$ are given, so that the denominator is effectively constant. The numerator is equivalent to the joint probability model $$p(C, F_1, \ldots, F_n)$$

which can be rewritten as follows, using repeated applications of the definition of conditional probability:

$$p(C, F_1, \ldots, F_n) = p(C) p(F_1, \ldots F_n \mid C)$$
$$= p(C) p(F_1 \mid C) p(F_2, \ldots, F_n \mid C, F_1)$$
$$= p(C) p(F_1 \mid C) p(F_2 \mid C, F_1) p(F_3, \ldots, F_n \mid C, F_1, F_2)$$
$$= p(C) p(F_1 \mid C) p(F_2 \mid C, F_1) p(F_3 \mid C, F_1, F_2)$$
$$p(F_4, \ldots, F_n \mid C, F_1, F_2, F_3)$$

and so forth. Now the "naive" conditional independence assumptions come into play: assume that each feature $F_i$ is conditionally independent of every other feature $F_j$ for j≠i.

This means that $$p(F_i|C,F_j)=p(F_i|C)$$

and so the joint model can be expressed as $$p(C, F_1, \ldots, F_n) =$$
$$p(C)p(F_1 \mid C)p(F_2 \mid C)p(F_3 \mid C)\ldots = p(C)\prod_{i=1}^{n} p(F_i \mid C).$$

This means that under the above independence assumptions, the conditional distribution over the class variable C can be expressed like this:

$$p(C \mid F_1, \ldots, F_n) = \frac{1}{Z}p(C)\prod_{i=1}^{n} p(F_i \mid C)$$

where Z is a scaling factor dependent only on $F_1, \ldots, F_n$, i.e., a constant if the values of the feature variables are known.

Models of this form are much more manageable, since they factor into a so-called class prior p(C) and independent probability distributions $p(F_i|C)$. If there are k classes and if a model for $p(F_i)$ can be expressed in terms of r parameters, then the corresponding naive Bayes model has (k−1)+n r k parameters. In practice, often k=2 (binary classification) and r=1 (Bernoulli variables as features) are common, and so the total number of parameters of the naive Bayes model is 2n+1, where n is the number of binary features used for prediction.

Parameter Estimation

In a supervised learning setting, one wants to estimate the parameters of the probability model. Because of the independent feature assumption, it suffices to estimate the class prior and the conditional feature models independently, using the method of maximum likelihood, Bayesian inference or other parameter estimation procedures.

Constructing a Classifier from the Probability Model

The discussion so far has derived the independent feature model, that is, the naive Bayes probability model. The naive Bayes classifier combines this model with a decision rule. One common rule is to pick the hypothesis that is most probable; this is known as the maximum a posteriori or MAP decision rule. The corresponding classifier is the function classify defined as follows:

$$\text{classify}(f_1, \ldots, f_n) = \operatorname{argmax}_c p(C = c)\prod_{i=1}^{n} p(F_i = f_i \mid C = c)$$

Discussion

The naive Bayes classifier has several properties that make it surprisingly useful in practice, despite the fact that the far-reaching independence assumptions are often violated. Like all probabilistic classifiers under the MAP decision rule, it arrives at the correct classification as long as the correct class is more probable than any other class; class probabilities do not have to be estimated very well. In other words, the overall classifier is robust enough to ignore serious deficiencies in its underlying naive probability model. Other reasons for the observed success of the naive Bayes classifier are discussed in the literature cited below.

Example: Document Classification

Here is a worked example of naive Bayesian classification to the document classification problem. Consider the problem of classifying documents by their content, for example into spam and non-spam E-mails. Imagine that documents are drawn from a number of classes of documents which can be modeled as sets of words where the (independent) probability that the $i^{th}$ word of a given document occurs in a document from class C can be written as $$p(w_i|C)$$

(For this treatment, we simplify things further by assuming that the probability of a word in a document is independent of the length of a document, or that all documents are of the same length).

Then the probability of a given document D, given a class C, is $$p(D \mid C) = \prod_i p(w_i \mid C)$$

The question that we desire to answer is: "what is the probability that a given document D belongs to a given class C?"

Now, by their definition, $$p(D \mid C) = \frac{p(D \cap C)}{p(C)}$$

and $$p(C \mid D) = \frac{p(D \cap C)}{p(D)}$$

Bayes' theorem manipulates these into a statement of probability in terms of likelihood.

$$p(C \mid D) = \frac{p(C)}{p(D)} p(D \mid C)$$

Assume for the moment that there are only two classes, S and ¬S.

$$p(D \mid S) = \prod_i p(w_i \mid S)$$

and $$p(D \mid \neg S) = \prod_i p(w_i \mid \neg S)$$

Using the Bayesian result above, we can write:

$$p(S \mid D) = \frac{p(S)}{p(D)} \prod_i p(w_i \mid S)$$

$$p(\neg S \mid D) = \frac{p(\neg S)}{p(D)} \prod_i p(w_i \mid \neg S)$$

Dividing one by the other gives:

$$\frac{p(S|D)}{p(\neg S|D)} = \frac{p(S)\prod_i p(w_i|S)}{p(\neg S)\prod_i p(w_i|\neg S)}$$

Which can be re-factored as:

$$\frac{p(S)}{p(\neg S)}\prod_i \frac{p(w_i|S)}{p(w_i|\neg S)}$$

Thus, the probability ratio p(S|D)/p(¬S|D) can be expressed in terms of a series of likelihood ratios. The actual probability p(S|D) can be easily computed from log(p(S|D)/p(¬S|D)) based on the observation that p(S|D)+p(¬S|D)=1.

Taking the logarithm of all these ratios, we have:

$$\ln\frac{p(S|D)}{p(\neg S|D)} = \ln\frac{p(S)}{p(\neg S)} + \sum_i \ln\frac{p(w_i|S)}{p(w_i|\neg S)}$$

This technique of "log-likelihood ratios" is a common technique in statistics. In the case of two mutually exclusive alternatives (such as this example), the conversion of a log-likelihood ratio to a probability takes the form of a sigmoid curve: see logit for details.

APPENDIX F

Text Classification Implementations

The classification of natural language text has been studied extensively by academic and commercial researchers. As a result there are numerous software packages that can be used to provide the underlying mechanics for the StrEAM*Robot 2913 text classification processing. These range from generic toolkits for text modeling and manipulation to complete document categorization applications.

A sampling of currently available software (some free, some licensable) is given below. Any of these—or others like these—may be used by one skilled in the art to implement the text classification mechanisms required for the StrEAM*Robot Subsystem 2913 components. The order of their presentation below is not significant.

1. A robust set of tools for text classification is available (via GNU Public Licensing) from a research team at Carnegie Mellon University. The package is from Andrew McCallum and is titled: "Bow: A toolkit for statistical language modeling, text retrieval, classification and clustering." The software is available for download at: http://www.cs.cmu.edu/~mccallum/bow. There are two packages of interest:
    Bow—a library of C code for writing statistical text analysis, language modeling and information retrieval programs.
    Rainbow—a tool built with Bow to perform document classification using any of the methods supported by Bow (Naive Bayes, TFIDF/Rocchio, Probabilistic Indexing, and k Nearest Neighbor). While Rainbow is designed to manipulate (and classify) documents, it is readily adaptable to operate on text strings.
2. Weka is an extensive collection of machine learning algorithms implemented in Java for data pre-processing, classification, regression, clustering, association rules, and visualization. Weka contains support for a variety of classification algorithms (including Bayes networks, decision trees, decision rules, kNN, SVM) that can be adapted for use in an implementation of StrEAM*Robot 2913. Weka is open source software issued under the GNU General Public License. It is available from the University of Waikato, at http://www.cs.waikato.ac.nz/ml/weka/index.html.
3. An implementation of Support Vector Machines (SVM) is available from researchers at Cornell University. This package is called SVM$^{light}$ and is available for research and commercial licensing at http://svmlight.joachims.org. This is implemented in C and provides the capabilities to categorize text documents via the SVM approach. Again, the software is currently set up to process documents, but can be interfaced to handle of text strings outside of actual document files.
4. Two simple text/document classification components are available for download at http://software.topcoder.com. Both components are available for limited commercial licensing. Each of these components provides a framework for text classification using multiple methods/models. A Naïve Bayesian Classifier implementation is provided with each.
    For Java: the Java Text Categorization Version 1.0 Component is available at: http://software.topcoder.com/catalog/c_component.jsp?comp=10008378&ver=1
    For C#: the .NET™ Document Classifier Version 1.0 Component is available at: http://software.topcoder.com/catalog/c_component.jsp?comp=15462331&ver=1
5. A general purpose Decision Tree/Decision Rule Classifier toolkit called See5/C5.0 is available from Dr. Ross Quinlan and his company RuleQuest Research. Details regarding downloads and licensing can be found at http://www.rulequest.com. Note that See5/C5.0 will express classifiers either as decision trees or decision rules (if-then-else structures). Note also that See5/C5.0 supports "boosting" techniques for classifier committees.
6. A very simple Perl implementation of a Naïve Bayesian Text Classifier is described (including complete code listings) in the article: "Naïve Bayesian Text Classification", Dr. Dobbs Journal; May 2005; CMP Media, LLC. While this implementation is specifically for email SPAM detection, the implementation is directly adaptable to the present application of classifying interviewee responses.

APPENDIX G

StrEAM*Administration 2916 XML Documents

All data for the administration of StrEAM studies is contained in XML documents, as is mentioned earlier. This form provides the flexibility needed for handling the relatively unstructured nature of much of the information used to administer a market research study. The sections below describe these XML documents in detail.

StrEAM Study List

| Study List Element | Description/Purpose |
| --- | --- |
| <StrEAM-Study-List> | This document includes a list of all of the StrEAM studies in the system. |

| Study List Element | Description/Purpose |
|---|---|
| <study id = \|String\|> | Note that there only can be one of these for the StrEAM Web Server. This is the element that provides a high level definition of a StrEAM study. There can be any number of studies in a study list. Note that each study includes a mandatory id attribute. This is a text string that uniquely identifies the study. |
| <directory> | The name of the sub-directory on the StrEAM Web Server where the supporting files for this study will be kept. |
| <id-prefix> | A short string to be used as a prefix when creating Respondent ID's (to keep them unique across StrEAM studies). From a respondent's standpoint, this prefix will simply be part of the ID. It is broken out only so that the study can be determined by parsing the Respondent ID entered. |
| <status> | A string indicating the current status of this study. The status has three possible values: "planning" "active" "closed". The "planning" status indicates that the study is being prepared, but has yet to be made available for any interaction (including registration, screening, scheduling, interviewing) by potential respondents. The "active" status means that the study is current underway and that all activities are possible. The "closed" status indicates that the study has been completed (or otherwise terminated), and no further interaction is allowed. |
| <title> | A text string containing a short title for the study to be used in various places as a descriptive title for the study |
| <description> | A multi-line text string containing a brief description of the study, primarily for use on reports. |
| <study-owner> | A string indicating the StrEAM client that "owns" this study. This is in support of providing StrEAM as a managed service to multiple clients. |
| <default-email> | This is a string containing the default email contact for the study so that email may be routed (if routing is not otherwise defined in the study configuration database/file 2980). This must be a valid email address. |
| </study> | Terminates a study definition. |
| </StrEAM-Study-List> | Terminates a study list document. |

Interviewer List

| Interviewer List Element | Description/Purpose |
|---|---|
| <StrEAM-Interviewer-List> | This document includes a list of all of the StrEAM interviewers in the system. Note that there only can be one of these for the StrEAM Web Server. |
| <interviewer id = \|String\|> | This element contains the definition of a StrEAM interviewer. This is a person that can conduct interviews using the StrEAM*Interview tools. There can be any number of interviewers in an interviewer list. Note that each interviewer element includes a mandatory attribute: id. This is a text string that uniquely identifies the interviewer. It must be unique across the entire StrEAM system. |
| <screen-name> | This is a short screen name for the interviewer that will be displayed during interview sessions. |
| <full-name> | This contains the full name for the interviewer. |
| <status> | This indicates the current status of the interviewer. Right now there are three possible states: "active", "inactive", "obsolete". |
| <primary-email> | This mandatory element contains the primary email address that will be used by the StrEAM software to send messages to the interviewer. |
| <primary-phone> | This is the primary phone number to be used to contact the interviewer. |
| <time-zone use-daylight-savings = \|Boolean\|> | Time zone that interviewer will be based in. This will be used for interview scheduling. The values are: "eastern", "central", "mountain", and "pacific". The attribute use-daylight-savings is a Boolean ("true" or "false") that indicates whether or not the interviewer is in a location that uses daylight savings time. By default this is "true". Note that in cases where an interviewer may operate out of different time zones often, it would be best to have multiple interviewer definitions for the same person, but with different time zones. |
| <description> | An unstructured, multi-line text field for any additional description of the interviewer, such as interview specialties, etc. |
| <comments> | An unstructured, multi-line text field for comments regarding the interviewer. This will be used only by project managers, etc. and will not be visible to the interviewer. This can be used to record sensitive data like comments about the interviewer's performance, etc. |

| Interviewer List Element | Description/Purpose |
|---|---|
| <home-email> | An additional email address (home). This is optional. |
| <office-email> | An additional email address (office). This is optional. |
| <other-email> | Additional email address. This is optional. |
| <cell-phone> | Additional phone number (cell). This is optional. |
| <home-phone> | Additional phone number (home). This is optional. |
| <office-phone> | Additional phone number (office). This is optional. |
| <other-phone> | Additional phone number. This is optional. |
| <street-address-1> | Line 1 of street portion of mailing address. |
| <street-address-2> | Line 2 of street portion of mailing address. |
| <city> | City portion of mailing address. |
| <state> | Two letter abbreviation for state of mailing address. |
| <zip-code> | Zip code of mailing address. |
| </interviewer> | Terminates an interviewer definition. |
| </StrEAM-Interviewer-List> | Terminates an interviewer list document. |

Study Configuration

| Study Configuration Element | Description/Purpose |
|---|---|
| <StrEAM-Study-Configuration> | This document contains configuration information for a StrEAM study. One of these configuration database/files 2980 will exist for each study on the StrEAM market research network server 2904. |
| <study-id> | This element records (redundantly) the study identifier to avoid errors due to the location of files on the StrEAM Web Server. |
| <interviewing-start-date> | Date of the first day of interviews for this study. No interview appointments may be scheduled before this day. |
| <interviewing-finish-date> | Date of the last day of interviews for this study. No interview appointments may be scheduled after this day. |
| <study-time-zone> | Specifies the default time zone to be used when recording times for the study. If there is a geographic focus for the study, then it is best to use that time zone as the canonical time zone - requiring the least possible "translation" by users of the system.<br>Note that all tools dealing with times will translate times appropriately for the time zones of interest. So this parameter just establishes what time zone will be used to record times. |
| <interviewing-day day = \|String\|> | This element defines general parameters for interviewing (for this study) on a particular day of the week. A mandatory parameter indicates which day of the week (possible values: "Monday", "Tuesday", "Wednesday", "Thursday", "Friday", "Saturday", and "Sunday") this element refers to.<br>For interviews to be scheduled for a day of the week there must be an interviewing day element defined for it. There can be only one definition for each day. So there can be a maximum of seven (7) interviewing day elements. If a day of the week does not have an interviewing day definition, then no interviews can be scheduled for that day of the week.<br>Note that the interviewing day element only provides general guidelines for interview scheduling. More specific rules can be embedded in the schedule itself. In addition, the guidelines of the interviewing day element can be overridden by specific actions in the interview scheduling tools. |
| <earliest-interview-start> | The time of the earliest interview start time for the day of the week being defined.<br>Note that this will be stored according to the study's default time zone. Note also that if the time specified here is not on the boundary specified in the start interviews parameter (see below) then the next time that fits that parameter (after the earliest time specified here) will be the first allowed. |
| <latest-interview-start> | The latest start of an interview for the day of the week being defined.<br>Note that this will be stored according to the study's default time zone. Note also that if the time specified here is not on the boundary specified in the start interviews parameter (see below) then the latest allowed interview start will end up being the last time fitting that parameter that precedes the latest interview time specified here. |
| </interviewing-day> | Terminates an interviewing day element. |
| <interview-length> | Estimated time (in minutes) to schedule for interviews. Note that this is only used for scheduling. There is no constraint put on the actual time of interviews. |
| <start-interviews> | This element indicates the scheduling boundary for interview appointment start times. There are three possible variables: "hour", "half-hour", and "quarter-hour". These indicate that interviews can start (respectively) on the hour, on the half hour, or on the quarter hour. |

| Study Configuration Element | Description/Purpose |
|---|---|
| <use-solicitation> | A Boolean flag ("true"/"false") indicating whether the study's workflow will include the email solicitation of prospective respondents. |
| <use-registration> | A Boolean flag ("true"/"false") that indicates whether the study's workflow will include a step where interested prospective respondents register their interest through the website. |
| <use-screening> | A Boolean flag ("true"/"false") indicating whether the study's workflow will include an on-line screening questionnaire for respondents prior to their selection as candidates for interviewing. |
| <use-invitation> | A Boolean flag ("true"/"false") indicating whether the study's workflow will include a specific step to invite prospective respondents (via email) to schedule themselves for an interview. |
| <interviewer> | This element lists a StrEAM interviewer ID for an interviewer who may participate in conducting interviews for this study. There must be at least one interviewer for a study, but there is no maximum. |
| </StrEAM-Study-Configuration> | Terminates a study configuration document. |

Screening Definition

| Screening Definition Element | Description/Purpose |
|---|---|
| <StrEAM-Screening-Definition> | This document defines a StrEAM screening questionnaire. Note that there will typically be only one of these for a study. |
| <header> | Begins the document section containing information about the screening definition itself |
| <questionnaire-id> | Contains a string that uniquely identifies this screening questionnaire definition. |
| <title> | A short title for this screening questionnaire. This is used for display and reporting purposes. |
| <description> | An unstructured text string containing a full description for this screening questionnaire. |
| <author> | The name of the original author of this screening questionnaire. |
| <version> | A version string for this questionnaire definition. |
| <modified-by> | The name of the person who most recently modified this screening questionnaire definition. |
| <last-modified> | A date/time stamp indicating when this screening questionnaire definition was last modified. |
| <study-id> | The identifier of the study that this questionnaire definition belongs to. |
| </header> | Terminates the header section. |
| <topics> | Begins a section of the document that contains all of the "topics" for the screening questionnaire. This includes both information-only displays as well as actual questions. Note that unless directed by rotation groups, the order that these topics appear in this section will be the order in which they are presented to the respondent. Below is a summary of the types of topics that may be present in this section. There may be any number of them (in any combination). The details about the topics (attributes and sub-elements) are defined later, after this table. |
| <information-topic> | Defines an information only display. This will be displayed to the respondent until he/she clicks the "next" button. See Appendix H for subelements of this data type. |
| <text-question> | Defines a question that expects an answer in the form of an unstructured text string. See Appendix H for subelements of this data type. |
| <date-question> | Defines a question that expects an answer in the form of a date (using a date chooser). See Appendix H for subelements of this data type. |
| <radio-question> | Defines a multiple choice question where the respondent picks one (and only one) of a series of options. See Appendix H for subelements of this data type. |
| <checkbox-question> | Defines a multiple choice question where the respondent picks one or more of a series of options. See Appendix H for subelements of this data type. |
| <droplist-question> | Defines a multiple choice question where the respondent picks one (and only one) option from a series of options presented as a drop-down list. See Appendix H for subelements of this data type. |
| <combobox-question> | Defines a multiple choice question where the respondent may either pick one (and only one) option from a drop-down list OR can enter a text response (for an option not on the list) instead. See Appendix H for subelements of this data type. |
| </topics> | Terminates the topics section of the document. |
| <footer> | Begins a footer section for the document that contains some trailer information for the screening questionnaire definition. |
| <comments> | A block of text containing arbitrary comments regarding this questionnaire definition. Note that this is mainly a placeholder so that there can be a valid footer section. |
| </footer> | Terminates the footer section of the document. |
| </StrEAM-Screening-Definition> | Terminates a screening questionnaire definition document. |

APPENDIX H

Additional Administration 2916 XML Documents

All (7) Screening Questionnaire Topic types (<information-topic>, <text-question>, <date-question>, <radio-question>, <droplist-question>, <checkbox-question>, and <combobox-question>) may have the following attributes (none of these are required).

| | |
|---|---|
| reference-id = \|String\| | Points to another topic (a question topic) in the questionnaire. Enables the use of the $(reference)$ token to be replaced by the answer for the referenced question topic. |
| reference2-id = \|String\| | Points to another topic (a question topic) in the questionnaire. Enables the use of the $(reference2)$ token to be replaced by the answer for the referenced question topic. |
| reference3-id = \|String\| | Points to another topic (a question topic) in the questionnaire. Enables the use of the $(reference3)$ token to be replaced by the answer for the referenced question topic. |
| reference4-id = \|String\| | Points to another topic (a question topic) in the questionnaire. Enables the use of the $(reference4)$ token to be replaced by the answer for the referenced question topic. |
| reference5-id = \|String\| | Points to another topic (a question topic) in the questionnaire. Enables the use of the $(reference5)$ token to be replaced by the answer for the referenced question topic. |
| rotate-group = \|\| | |
| topic-group = \|\| | |
| choice-group = \|\| | |

All (7) Screening Questionnaire Topic types (<information-topic>, <text-question>, <date-question>, <radio-question>, <droplist-question>, <checkbox-question>, and <combobox-question>) may have the following sub-elements.

| | |
|---|---|
| <ask-when<br>  reference-id = \|String\|<br>> | This element defines a trigger condition for "asking" the containing questionnaire topic (note that this operates on information-only topics as well). The content of the element is the value of the referenced question answer that will cause the topic to be "asked".<br>The attribute reference-id is a string that contains a questionnaire topic identifier (must be a question type).<br>Note that there can be any number of <ask-when> elements for a topic (including none). |
| <skip-when<br>  reference-id = \|String\|<br>> | This element defines a trigger condition for skipping the containing questionnaire topic (note that this operates on information-only topics as well). The content of the element is the value of the referenced question answer that will cause the topic to be skipped.<br>The attribute reference-id is a string that contains a questionnaire topic identifier (must be a question type).<br>Note that there can be any number of <skip-when> elements for a topic (including none). |
| <display-text<br>  font = \|String\|<br>  bold = \|Boolean\|<br>  italic = \|Boolean\|<br>  size = \|Integer\|<br>> | There must be one of these elements for every Topic. It contains the text that will be displayed on the screen (either as information or as a prompt for a question). There can only be one of these for a Topic.<br>There are a number of attributes as follows:<br>font - specifies the name of the font to use to display the display text<br>bold - indicates whether the display text should be shown in bold<br>italic - indicates whether the display text should be shown in italics<br>size - is the font size to use when displaying the display text. Note that this value (if present) must be greater than 0.<br>Note that text for display in a Topic may include special tokens that are processed during runtime right when the Topic is being displayed. These tokens are replaced according to the table below:<br><br>| Token | Replaced by |<br>\|---\|---\|<br>\| $(cr)$ \| a carriage return (and line feed) \|<br>\| $(reference)$ \| the answer from the question specified by the reference-id attribute \|<br>\| $(reference2)$ \| the answer from the question specified by the reference2-id attribute \|<br>\| $(reference3)$ \| the answer from the question specified by the reference3-id attribute \| |

| | |
|---|---|
| $(reference4)$ | the answer from the question specified by the reference4-id attribute |
| $(reference5)$ | the answer from the question specified by the reference5-id attribute |
| & | the ampersand sign "&" |
| < | the less than sign "<" |
| > | the greater than sign">" |

The (6) Question Topic types (<text-question>, <date-question>, <radio-question>, <droplist-question>, <checkbox-question>, and <combobox-question>) may have the following attributes.

| | |
|---|---|
| id = \|String\| | This is a mandatory attribute that contains a unique (within the questionnaire definition) identifier for the question topic. |
| required = \|Boolean\| | This attribute indicates whether the question is mandatory for the respondent to answer. If it is false, then the respondent can skip by this question without giving an answer. If it is true, then the respondent must provide an answer before proceeding.<br>By default all questions are required. So if this attribute is not present, then the question is required. |
| elaborate = \|Boolean\| | This is an optional attribute that indicates whether or not this question topic will in fact be asked for each answer to the question pointed to by the reference-id attribute. If true, then this is done. If false (the default) then no elaboration takes place.<br>Of course, this only has significance if the answer to the referenced question topic is multi-valued (for instance a checkbox-question type). And, there must be a reference-id attribute; otherwise the elaboration attribute is simply ignored. Note that in the case where a referenced question is multi-valued, but there is no elaboration being performed, the first answer found in the referenced question is always used. |

For the four (4) Question Topic types that present the respondent with a list of options, the following attribute may be used:

| | |
|---|---|
| randomize = \|Boolean\| | This indicates whether the list of answer options should be presented in the order defined - or in a randomized order. If true, then the screening application will put the list of answer options in a random sequence for each invocation of the questionnaire. If it is false (or not present) then the answer options are presented in the order in which they are defined. |

The (6) Question Topic types (<text-question>, <date-question>, <radio-question>, <droplist-question>, <checkbox-question>, and <combobox-question>) may have the following sub-elements.

| | |
|---|---|
| <label> | This is a simple text field that contains a descriptive label for this question to be used for downstream display and reporting purposes. |
| <spss-variable> | This contains the "Variable Name" to be used in SPSS when this data item (the answer to this question) is exported to SPSS. |

Both the Text Question Topic type (<text-question>) and the Combobox Question Topic type may include the following sub-elements:

| | |
|---|---|
| <minimum-length> | This is a positive integer value that specifies the minimum number of characters that must be included in the answer to this question in order for the answer to be considered valid. |
| <maximum-length> | This is a positive integer value equal to or greater than the value specified as the minimum-length. This is the maximum number of characters that may be included in the answer to this question. |
| <multiple-lines> | This is a Boolean value that indicates whether the text being asked for can have multiple lines. If it is false (the default), then only a single line of text is allowed. |
| <restricted-to> | A string defining the characters that are legal for entry. By default any characters are valid. To restrict the input to just letters (upper case or lower case) use: "A-Za-z". To restrict input to just numbers use: "0-9", and so forth. By using the special character "^" at the start of the string, it indicates NOT to accept those characters in the string. So "^a-z" would not allow lower case letters.<br>The backslash is used to "escape" special characters like ^ and the \ itself. |

Date Question Topics (<date-question>) may include the following sub-elements

| | |
|---|---|
| <start-date> | This is a date value that indicates the first valid date that may be used as an answer to the current question. |
| <end-date> | This is a date value indicating the last valid date that may be used as an answer to the current question. |

Each of the four (4) List Question Topic types (<radio-question>, <droplist-question>, <checkbox-question>, and <combobox-question>) MUST have a "choices" sub-element as defined below, which will contain the possible answers for the question. In addition, these topics may include one or more "drop-choice" sub-elements that enable the answers to previous questions to constrain the available choices

| | |
|---|---|
| <choices<br>    font = \|String\|<br>    bold = \|Boolean\|<br>    italic = \|Boolean\|<br>    size = \|Integer\|<br>> | This sub-element is required for all forms of "list" questions. It contains a series of "option" sub-elements. Each of these defines a choice for the multiple choice question. The container itself includes formatting attributes (optional) for the options when presented on the screen:<br>font - specifies the name of the font to use to display the text for each choice/option.<br>bold - indicates whether the text should be shown in bold<br>italic - indicates whether the text should be shown in italics<br>size - is the font size to use when displaying the text. Note that this value (if present) must be greater than 0. |
| <option<br>    >id = \|String\|<br>    >label = \|String\|<br>    >reference = \|String\|<br>    >spss-value = \|Integer\|<br>> | This element defines one of the possible answers to the current list type of question topic. There must always be at least one option. The element itself contains the text that will be displayed for the respondent for this option. There are a several attributes as follows. Note that all of these attributes are required:<br>id - is the string recorded as the answer when this option is chosen. All references to an answer are made with respect to this identifier. This string must be unique within the answer options for the topic. This attribute is required.<br>label - is a more readable text string that is used for display and reporting purposes when referring to this option. This allows the id to be short (and often cryptic) or numeric but still allowing an expressive reference. This label will also be used as the "Value Label" when this answer option is exported to SPSS. Obviously this label should be unique among the answer options. This attribute is required.<br>reference - when a reference is made (using the $(reference)$ family of tokens) to this answer, the string defined in this attribute is used. That way a piece of text appropriate for the context of a reference may be defined for this option. If this attribute is not specified, then the label attribute will be used as the reference.<br>SPSS-value - is a numeric value that will be used in SPSS as a Value for the question. While SPSS can accept non-numeric answer Values, it can get a bit fussy about them and is typically more set up for numeric values. This allows a mapping from answer option identifiers in StrEAM which might be expressive to numeric values for SPSS. This attribute is required. |
| </choices> | Terminates a "choices" element. |
| <drop-choice> | This element contains a pointer to another (previously asked) question (via a question-id). By doing so it indicates that if the answer to that previous question is one of the answer options for the current topic, then it should be dropped and not presented to the respondent as an option.<br>This allows, for instance, a radio question to be asked twice in sequence where the second time it is asked, the answer given previously is not presented as an option. This would let the questionnaire ask: "what is your favorite?" followed by: "what is your second favorite?"<br>Note that there can be multiple drop-choice elements. Each would refer to a different question (it would make no sense to have multiple for the same question). |

APPENDIX I

XML Documents for Configuring Market Research Study

Configuration information, respondent data, interview definitions, etc. that are specific to a market research study are then contained in XML document files in each study directory. Standard names (and naming conventions) are used across StrEAM studies. A summary of the XML documents involved is given in the table below.

| File Type | Description/Purpose |
| --- | --- |
| activeStudies.xml | Contains a summary of all the studies that are currently active (and valid) in the StrEAM system. Each study will have a description, the directory name, the ID prefix, the name and contact information for the project administrator. There is only ONE activeStudies.xml file in the StrEAM system. |
| interviewerList.xml | Holds a list of all of the interviewers that are valid for the StrEAM system. Each interviewer has a name, an ID, a screen name, and contact information. There is only ONE interviewerList.xml file in the StrEAM system. |
| studyConfiguration.xml | This file contains various configuration parameters regarding a StrEAM study. That would include: the estimated time for a study, the start and end dates for interviewing, . . . There is one of these files for each StrEAM study. |
| screeningDefinition.xml | Defines the respondent screening session. This contains a list of questions (and information topics) that will be presented to the respondent during a screening session. There is one of these files for each StrEAM study. |
| interviewingSchedule.xml | This contains the current master interviewing schedule for a StrEAM Study. It contains the valid dates and times for interviewing and then the schedule for assigned (to respondents) and accepted (by interviewers) interview appointments. This schedule is maintained by the StrEAM study administrator via the schedule administration application. Note that it is never modified directly by respondents or interviewers. Rather, they generate requests to the administrator that result in schedule changes. There is one of these files for each StrEAM study. |
| interviewDefinition.xml | Contains the actual StrEAM*Interview definition. This drives the interactive. interview session between the interviewer and a respondent. There is one of these files for each StrEAM Study. Note that the contents of these files are defined in the StrEAM*Interview documentation. |
| respondentData.xml | Each respondent for a study has one of these files. It contains information about the respondent and his/her interactions with the StrEAM administration. There is standard information like the respondent identifier, current status, and primary contact information. This is also where screening information is stored after it is collected. All requests (and responses) for scheduling for the respondent are also archived in the respondent data document. |
| administrationRequest.xml | These are temporary files generated by either respondents or interviewers that request some change or update to the current study schedule. These files are processed by the StrEAM study administrator and deleted as they are successfully processed. Only outstanding (unprocessed) requests exist as administrationRequest.xml files. Note that request files are processed sequentially in order of creation. |
| interviewResults.xml | This file contains the result of a StrEAM*Interview session. There is one of these for each respondent that actually is engaged in an interview session. Note that these files are defined in detail in the StrEAM*Interview documentation |

What is claimed is:

1. A method for determining information related to a population's perception of an object, comprising performing the following steps by computational equipment:

obtaining interview data for conducting an interview session with each of one or more respondents indicative of the population, wherein the interview sessions are for determining perceptions of the object by the respondents, the interview data substantially defining how the interview sessions are conducted;

conducting the interview sessions with each of the respondents;

wherein for each of the respondents, the corresponding interview session is interactive with the respondent for obtaining responsive data related to the respondent's perception of the object, wherein the respondent is presented with each of:

(i) a first request for a first characteristic of the object that the respondent perceives as more positive than another characteristic of the object;

(ii) a second request for a second characteristic of the object that the respondent perceives as more negative than another characteristic of the object;

storing the responsive data obtained from the respondents, said responsive data including responses to each of: the requests of (i) and (ii);

coding said stored responsive data using a plurality of code categories, each category for identifying respondent responses in the responsive data having a common semantic content that is associated with the category;

first determining, for each category of at least some of the plurality of code categories, a corresponding importance data indicative of an importance of the category, wherein the corresponding importance data includes a result of a function that is non-decreasing in a number of respondent responses in the category, wherein the result is dependent upon a number of the respondent responses in the category obtained from both the first and second requests;

second determining, for each category (C) of the at least some of the code categories (CC), a corresponding belief value indicative of a perception of a degree of favorableness, by the respondents, of the category C as applied to the object;

wherein each of the belief values (BV) includes a result that is: (a) dependent upon a corresponding number, N, of responses to the first request, in the corresponding category for the belief value BV, and (b) dependent upon a corresponding number, M, responses to the first request for another of the categories CC whose respondent responses include the respondent responses of the corresponding category to which the belief value BV corresponds, wherein the dependency of the belief value BV on M is inverse to the dependency of the belief value BV on N;

wherein for each of the belief values, the corresponding result therefor is obtained from a function that is non-decreasing as the number, N, of respondent responses increases for the belief values; and identifying a first category of the categories CC for improving the first category, as related to the object, to thereby establish a more favorable perception of the object, or a related object, by the population;

wherein the identification of the first category is: dependent upon the importance data of the first category, and dependent upon the belief value for the first category;

wherein for performing the step of identifying, a step of ranking the categories CC is performed for identifying for the first category; and wherein in performing the step of ranking, when at least one category of the categories CC has a first belief value that is indicative of a lower perception of object favorableness than a second belief value for a second of the categories CC, the first belief value influences the ranking of the at least one category more for identifying the at least one category as the first category, than the second belief value influences the ranking of the second category for identifying the second category as the first category.

2. The method of claim 1, further including for each respondent, a step of presenting, on a display of computational equipment, a request for the respondent to input an evaluation of the object, and subsequently presenting at the display, the second request, wherein the second request includes a request for a characteristic of the object that the respondent perceives as a reason as to why the respondent did not evaluate the object higher.

3. The method of claim 1, further including for each respondent, presenting, on a display of computational equipment, a request for the respondent to input an evaluation of the object, and subsequently presenting at the display, the first request, wherein the first request includes a request for a characteristic of the object that the respondent perceives as a reason as to why the respondent did not evaluate the object lower.

4. The method of claim 1, further including one or more steps of providing to the respondents, via computational equipment, a question, wherein a respondent response thereto is used for determining respondent perceptual linkages between at least two of the following collections (a-1) through (a-4) of the plurality of code categories:

(a-1) categories that are each representative of a corresponding attribute of the object, (a-2) categories that are each representative of a corresponding functional consequence related to the object, (a-3) categories that are each representative of a corresponding psychosocial consequence related to the object, and (a-4) categories that are each representative of a corresponding value attributable to the respondents;

storing data indicative of the respondent perceptual linkages in a non-transient machine data storage.

5. The method of claim 4, wherein the one or more steps of providing include determining respondent perceptual linkages between at least some of the following pairs of collections: a first pair: collection (a-1) and collection (a-2); a second pair: collection (a-2) and collection (a-3); and a third pair: collection (a-3) and collection (a-4).

6. The method of claim 5, wherein the one or more steps of providing include determining respondent perceptual linkages between each of the pairs of collections.

7. The method of claim 1, further including transmitting, to each respondent, a plurality of interview session questions via a telecommunications network, wherein a response from the respondent to a first of the questions is received by computational equipment and classified thereby within a predetermined hierarchy of classifications, the hierarchy including classifications for: (a) a perceived attribute of the object, and (b) a corresponding respondent personal value the respondent associates with the attribute, and wherein a response from the respondent to a second of the questions is classified within a different classification of the predetermined hierarchy.

8. The method of claim 1, wherein the step of conducting includes, for each respondent (R) of at least some of the respondents, a step of transmitting, on a communication network, at least a portion of the interview data during the corresponding interview session in which the respondent R is interviewed, the portion being presented to the respondent R during the interview session;

a step of receiving a corresponding response to the portion from the respondent R, wherein the corresponding response is transmitted on the communication network during the corresponding interview session.

9. The method of claim 1, wherein for each respondent (R) of at least some of the respondents, an interviewer remotely conducts the corresponding interview session via a communication network, wherein at least most communications between the interviewer and the respondent R are transmitted via a predetermined intermediary node of the communication network.

10. The method of claim 9, wherein the at least most communications are routed over the Internet.

11. The method of claim 1, wherein for each respondent (R) of at least some of the respondents, the step of conducting the corresponding interview session is performed without an interviewer being in communication with the respondent during the corresponding interview session;

wherein the step of conducting includes steps of (A) through (E) following:

(A) presenting to the respondent R a ladder request (LR) for a first level of a ladder, wherein there is a plurality of ladder levels of the ladder, the levels including (1) a level for a description, by the respondent R, of an attribute of the object, and a level for at least one of: (2) a description, by the respondent R, of an aspect of the respondent R's interpersonal relationships attributable to the attribute, (3) a description, by the respondent R, of a perceived functional consequence of the attribute wherein a veracity of the functional consequence can be objectively verified independently of the respondent R, (4) a description, by the respondent R, of a psychological characteristic of the respondent R is attributable to the attribute, or (5) a description, by the respondent R, of a personal value held by the respondent R that is reinforced by the object;

(B) determining, for at least one response from the respondent R to the request LR, whether the at least one response is acceptable for the first ladder level corresponding to the request LR;

wherein the step of determining includes comparing a computed value indicative of the acceptability of the at least one response with an acceptability threshold for accepting the at least one response for the first ladder level;

(C) coding the at least one response, wherein the step of coding includes classifying the at least one response into one of the code categories when there is a favorable comparison between: (i) the computed value indicative of the acceptability of the at least one response being classified in the one code category and (ii) a classification threshold value for being classified in the one code category;

wherein the one code category is associated with the first ladder level;

(D) assigning the one code category to the first ladder level of the ladder; and (E) subsequently, determining a next of the ladder levels wherein a corresponding next ladder request is for presenting to the respondent R, wherein the next ladder request is refers to the at least one response;

wherein a preference for the next ladder level is:
 (a) the ladder level (2) when the first ladder level is (1),
 (b) the ladder level (3) or (4) when the first ladder level is (2), and
 (c) the ladder level (5) when the first ladder level is one of ladder levels (3) or (4).

12. The method of claim 11, wherein at least some of the plurality of code categories are determined prior to the step of conducting the interview sessions performed without an interviewer.

13. The method of claim 1, wherein the step of ranking includes ranking using a function that increases with increasing values of the importance data for the categories being ranked, and decreases with increasing values of the belief data for the categories being ranked.

14. The method of claim 1, further including performing the following steps by computational equipment:

as a consequence of an instance ($I_1$) of a response by one of the respondents to the first request, a step of providing first additional questions to the one respondent, the first additional questions related to the instance $I_1$, and for obtaining first information indicative of an association of the one respondent's responses to the first additional questions for determining a first linkage between two or more of: (a-1) one of the categories representative of a corresponding attribute of the object, (a-2) one of the categories representative of a corresponding functional consequence related to the object, (a-3) one of the categories representative of a corresponding psychosocial consequence related to the object, and (a-4) one of the categories representative of a corresponding value attributable to the one respondent as a consequence of an instance ($I_2$) of a response by the one respondent to the second request, a step of providing second additional questions to the one respondent, the second additional questions related to the instance $I_2$, and for obtaining second information indicative of an association of the one respondent's responses to the second additional questions for determining a second linkage between two or more of: (b-1) one of the categories representative of a corresponding attribute of the object, (b-2) one of the categories representative of a corresponding functional consequence related to the object, (b-3) one of the categories representative of a corresponding psychosocial consequence related to the object, and (b-4) one of the categories representative of a corresponding value attributable to the one respondent.

15. A method for predicting how to change a population's perception of an object, comprising performing the following steps by computational equipment:

obtaining interview data for conducting a corresponding interview session, with each of one or more respondents indicative of the population, wherein the corresponding interview sessions are for determining perceptions of the object by the respondents, the interview data substantially defining how the corresponding interview sessions are conducted;

transmitting on a communication network at least a portion of the interview data to an interview conducting computer for conducting with each of the one or more respondents, the corresponding interview session;

for each of the respondents, communicating with a computer for the respondent and with the interview conducting computer for conducting the corresponding interview session, via the communications network, for obtaining corresponding responsive data related to the respondent's perception of the object, wherein the corresponding responsive data includes representations of respondent responses to presentations of each of (i) through (iii):
 (i) a first request for obtaining a first characteristic of the object that the respondent perceives as more positive than another characteristic of the object;
 (ii) a second request for obtaining a second characteristic of the object that the respondent perceives as more negative than another characteristic of the object; and
 (iii) a plurality of questions related to the object, wherein a response from the respondent to a first of the questions is classified within a predetermined hierarchy of classifications of perceptions related to the object, the hierarchy including classifications for: (a) a perceived attribute of the object, and (b) a corresponding respondent personal value the respondent associates with the attribute, and wherein for a second of the plurality of questions, an additional response is requested for classification within the predetermined hierarchy, the additional response for classifying in a different classification of the hierarchy than the classification for the response;

coding, for each of the respondents, said the representations of the respondent responses of the corresponding responsive data using a plurality of code categories, each category for identifying the representations having a common semantic content that is associated with the category;

determining at least one relationship between at least some of said categories (CC), wherein said at least one relationship is indicative of how at least some of the respondents associate said some categories;

wherein the at least one relationship represents a linkage between a perceived attribute, A, of the object, and a personal value associated with the attribute A of the object, the linkage identified by related associations in the representations of the respondent responses of the corresponding responsive data for the at least some respondents;

first determining, for each category, C, of code categories CC, a corresponding importance data indicative of an importance of the category C, wherein the corresponding importance data includes a result of a function that is non-decreasing in a number of the representations of the respondent responses identified by the category C, wherein the result is dependent upon a number of the respondent responses in the category C which includes the representations of the respondent responses from both the first and second requests;

second determining, for each category (D) of the code categories CC, a corresponding belief value indicative of a perception of a degree of favorableness, by the respondents, of the category D as applied to the object;

wherein each of the belief values (BV) includes a result that is: (a) dependent upon a corresponding number, N, of responses to the first request, in the corresponding category for the belief value BV, and (b) dependent upon a corresponding number, M, responses to the first and second requests, in the corresponding category for which the belief value BV, the dependency of the belief value BV on M being an inverse dependency to the dependency on N;

wherein for each of the belief values, the corresponding result therefor is obtained from a function that is non-decreasing as the number, N, of respondent responses increases for the belief values; and identifying a first category of the categories CC for improving the first category, as related to the object, to thereby establish a more favorable perception of the object, or a related object, by the population;

wherein the identification of the first category is: dependent upon the importance data of the first category, and dependent upon the belief value for the first category;

wherein for performing the step of identifying, a step of ranking the categories CC is performed for identifying for the first category; and wherein in performing the step of ranking, when at least one category of the categories CC has a first belief value that is indicative of a lower perception of object favorableness than a second belief value for a second of the categories CC, the first belief value influences the ranking of the at least one category more for identifying the at least one category as the first category, than the second belief value influences the ranking of the second category for identifying the second category as the first category.

16. The method of claim 15, wherein there is a plurality of the categories that are each representative of a corresponding attribute of the object, a plurality of the categories that are each representative of a corresponding functional consequence related to the object, a plurality of the categories that are each representative of a corresponding psychosocial consequence related to the object, and a plurality of the categories that are each representative of a corresponding value attributable to the respondents.

17. An apparatus for determining information related to a population's perception of an object, comprising:

a non-transient machine data storage for obtaining interview data for conducting an interview session with each of one or more respondents indicative of the population, wherein the interview sessions are for determining perceptions of the object by the respondents, the interview data substantially defining how the interview sessions are conducted;

an interview server for transmitting the interview data for conducting the interview sessions with each of the respondents;

wherein for each of the respondents, the corresponding interview session is interactive with the respondent for obtaining responsive data related to the respondent's perception of the object, wherein the respondent is presented with each of:

(i) a first request for a first characteristic of the object that the respondent perceives as more positive than another characteristic of the object; and (ii) a second request for a second characteristic of the object that the respondent perceives as more negative than another characteristic of the object;

a non-transient machine data storage for storing the responsive data obtained from the respondents, said responsive data including responses to each of: the requests of (i) and (ii);

one or more computational machine code processing programs for coding for the stored responsive data, wherein the programs identify at least one category of a plurality of code categories with respondent responses in the responsive data having a common semantic content that is associated with the at least one category;

one or more computational machine evaluators for determining, for each of at least some of the plurality of code categories (CC), a corresponding importance data indicative of an importance of the category, wherein the corresponding importance data includes a result of a function that is non-decreasing in a number of respondent responses in the category, wherein the result is dependent upon a number of the respondent responses in the category obtained from both the first and second requests;

one or more computational machine evaluators for determining, for each category (C) of the code categories CC, a corresponding belief value indicative of a perception of a degree of favorableness, by the respondents, of the category C as applied to the object;

wherein each of the belief values (BV) includes a result that is: (a) dependent upon a corresponding number, N, of responses to the first request, in the corresponding category for the belief value BV, and (b) dependent upon a corresponding number, M, responses to the first and second requests, in the corresponding category for which the belief value BV, the dependency of the belief value BV on M being an inverse dependency to the dependency on N;

wherein for each of the belief values, the corresponding result therefor is obtained from a function that is non-decreasing as the number, N, of respondent responses increases for the belief values; and one or more computational machine programs for identifying a first category of the categories CC for improving the first category, as related to the object, to thereby establish a more favorable perception of the object, or a related object, by the population;

wherein the identification of the first category is: dependent upon the importance data of the first category, and the belief value for the first category; and wherein the one or more computational machine programs for identifying also rank the categories CC for identifying for the first category, wherein when at least one category of the categories CC has a first belief value that is indicative of a lower perception of object favorableness than a second belief value for a second of the categories CC, the first belief value influences the ranking of the at least one category more for identifying the at least one category as the first category, than the second belief value influences the ranking of the second category for identifying the second category as the first category.

* * * * *